United States Patent [19]

Hall, III

[11] E Re. 31,023

[45] Reissued Sep. 7, 1982

[54] HIGHLY AUTOMATED AGRICULTURAL PRODUCTION SYSTEM

[75] Inventor: Arthur D. Hall, III, Port Deposit, Md.

[73] Assignee: Advanced Decision Handling, Inc., Port Deposit, Md.

[21] Appl. No.: 16,845

[22] Filed: Mar. 2, 1979

Related U.S. Patent Documents

Reissue of:

[64] Patent No.: 4,015,366
Issued: Apr. 5, 1977
Appl. No.: 567,322
Filed: Apr. 11, 1975

[51] Int. Cl.[3] ..... A01D 46/00; A01G 27/00; A01G 13/00

[52] U.S. Cl. ..... 47/1 R; 137/386; 47/2; 47/DIG. 6; 56/237; 56/328 R; 137/79; 137/236 R; 180/305; 138/111; 193/25 E; 198/570; 209/173; 239/69; 239/191; 239/210; 358/108; 364/172; 364/400; 364/413

[58] Field of Search ..... 47/1, 9, 2, 58, 1.7, 47/17, 48.5; 111/1; 56/1, 13.3, 38.8 R, 339; 239/63-65, 67-70, 191; 137/78; 317/DIG. 3

[56] References Cited

U.S. PATENT DOCUMENTS

| | | | |
|---|---|---|---|
| 3,039,698 | 6/1962 | Richards | 239/64 |
| 3,200,539 | 8/1965 | Kelly | 47/1 |
| 3,200,575 | 8/1965 | Hurst | 56/328 R |
| 3,235,009 | 2/1966 | Nelson | 47/1 X |
| 3,269,099 | 8/1966 | Fricks | 56/1 |
| 3,330,068 | 7/1967 | Carson | 47/1 |
| 3,578,245 | 5/1971 | Brock | 239/66 |
| 3,584,442 | 6/1971 | White | 56/1 |
| 3,590,335 | 6/1971 | Tetar | 239/64 X |
| 3,596,455 | 8/1971 | Adrian | 56/329 |
| 3,613,308 | 10/1971 | Klein et al. | 47/17 |
| 3,626,286 | 12/1971 | Rauchwerger | 239/63 X |
| 3,635,004 | 1/1972 | Webb et al. | 56/329 X |
| 3,721,254 | 3/1973 | Rutten | 137/78 |
| 3,728,254 | 4/1973 | Carothers | 47/48.5 X |
| 3,777,976 | 12/1973 | Milovancevic | 239/64 |
| 3,785,564 | 1/1974 | Baldocci | 47/1.7 X |
| 3,844,305 | 10/1974 | McCormick | 137/78 |
| 3,905,153 | 9/1975 | Enter | 47/58 |

*Primary Examiner*—Robert E. Bagwill
*Attorney, Agent, or Firm*—Sughrue, Rothwell, Mion, Zinn and Macpeak

[57] ABSTRACT

The present invention provides a highly automated agricultural production system which comprises, as essential components:

1. A sensing subsystem comprising direct and indirect sensing means in an agricultural production area. The direct sensing means are generally ground or plant mounted. The indirect sensing means are remote from the area being sensed. The direct and indirect sensing means are adapted to jointly generate data on all important parameters in the homogeneous agricultural production area;

2. A data transmitting subsystem for forwarding data generated by the direct and indirect sensing means to computing means and for transmitting instructions from the computing means via interfacing means (controllers) to various devices (field effectors) in the agricultural area to perform various functions;

3. A computing subsystem linked by way of said data transmitting subsystem to said indirect and direct sensing means in a pattern of many feedback loops. The computing means is programmed to enable correlation of data received from the indirect and direct sensing means and to generate appropriate instructions to accomplish a substantive number of functions required for the operation of the automated agricultural production system of the present invention as will be later described in detail, including, but not limited to, the control of the following subsystems.

4. A fluid delivery subsystem which provides:
   - means for delivering water, chemicals in liquid or gaseous form, air, and the like to various parts of the agricultural production area; and
   - means for providing power to various peripheral devices which utilize the power of moving liquid and/or gases-for example, a water powered (hydromotor) platform.

5. A field operations subsystem which, in a highly preferred embodiment, comprises means to harvest agricultural products, convey the agricultural products, grade the agricultural products, store the agricultural products, and pack the agricultural products. In addition to the above means which are essentially concerned with presenting the agricultural products in a form amenable for marketing, additionally means are provided for plant care, e.g., pruning, thinning and the like.

A field operations subsystem which accomplishes the functions of fruit harvesting, fruit conveying, fruit grading and fruit storage which, in a most preferred embodiment of the present invention, accomplishes the above functions utilizing fluid received from the fluid delivery subsystem of the present invention. It is also highly preferred that such fluid powered means be utilized in the agricultural system of the present invention for tree care, e.g., pruning of trees, thinning of trees and the like.

The field operations can be accomplished, if desired, utilizing a vehicle which is powered by fluid, typically water, derived from the fluid delivery subsystem of the present invention by means of a water-to-mechanical torque converter (hereafter often called a hydromotor platform).

97 Claims, 48 Drawing Figures

COMMENTARY

ALL SPRAYING PHASES MADE ACTIVE (RECALLED FROM CENTRALIZED STORES).

PROVIDES HUMAN TO SPECIFY THE CAUSE OF TROUBLE.

CONFIRM HUMAN DIAGNOSIS, QUANTIFY, AND CHECK FOR ADDITIONAL PROBLEMS.

CONFIRM HUMAN DIAGNOSIS AND REMOTE SENSOR DIAGNOSIS, AND DETECT OTHER PROBLEMS.

FINAL CONCLUSION ON THE SYMPTOMS OF TROUBLE.

COMMENTARY

RELATE THE SYSTEMS TO THE SET OF POSSIBLE DISEASES OR INFECTIONS.

CALCULATION MADE TO REDUCE THE NUMBER OF ALTERNATIVES.

TO FURTHER REDUCE THE NUMBER OF ALTERNATIVE CAUSES.

FINAL CHOICE OF TROUBLE.

COMMENTARY

HUMAN PRESCRIBES TREATMENT.

COMPUTER PRESCRIBES TREATMENT.

* AS A FUNCTION OF LOCATION MATRIX

FIG.22
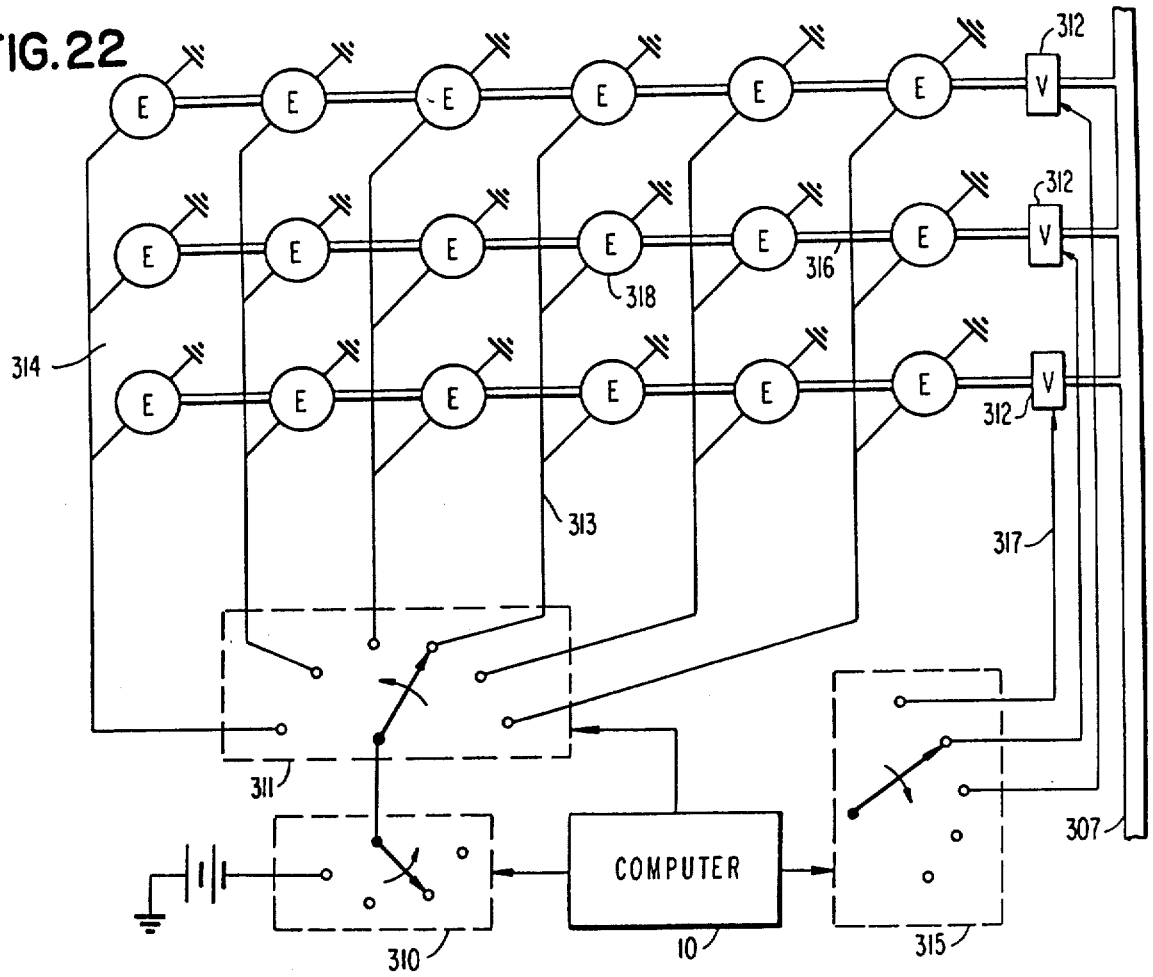
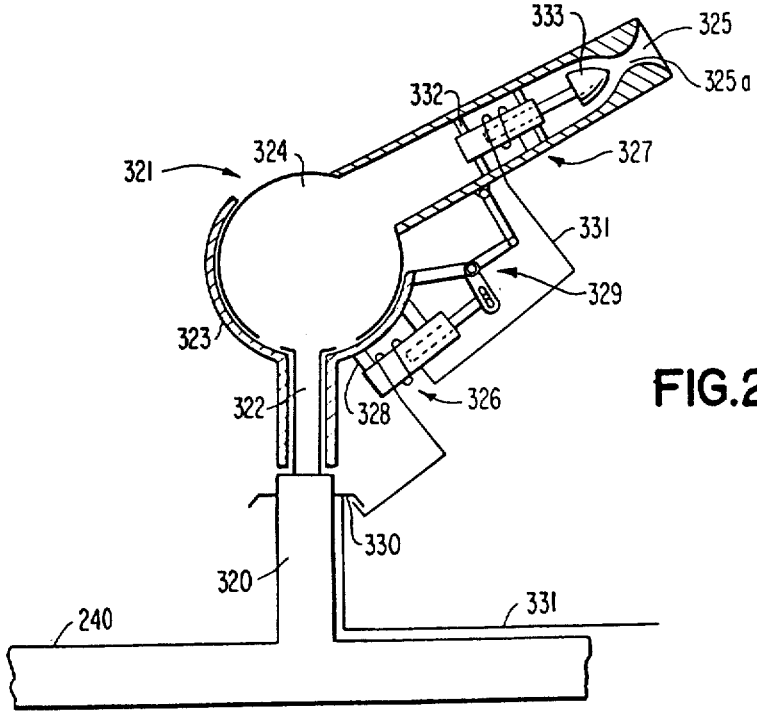
FIG.23

FIG.26A
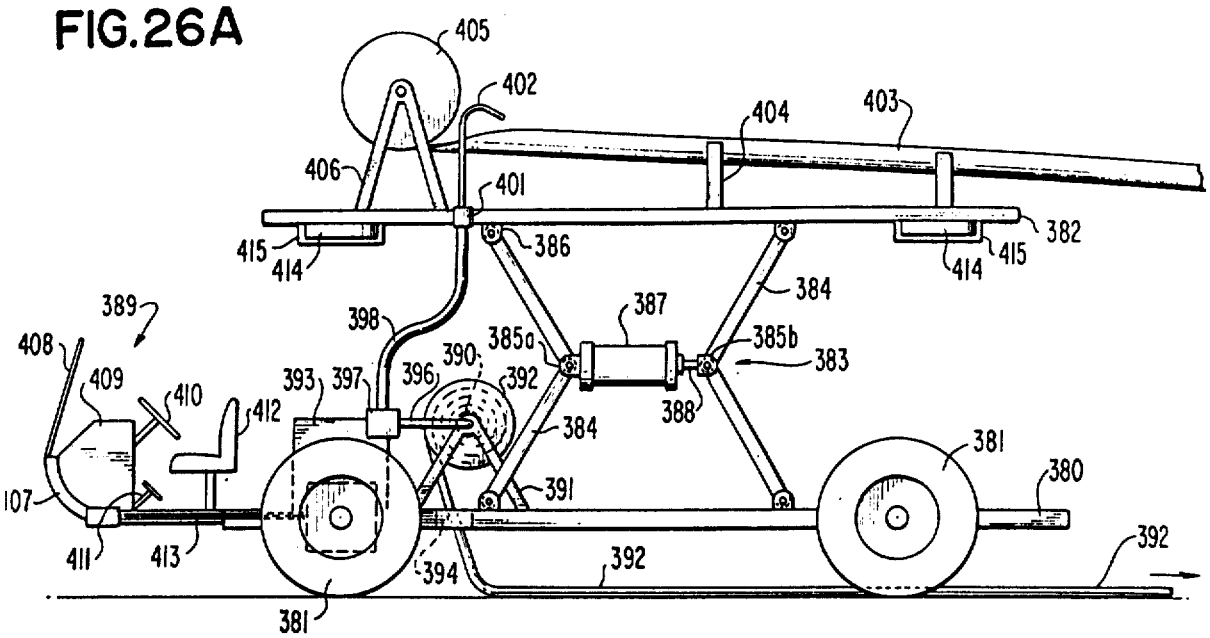
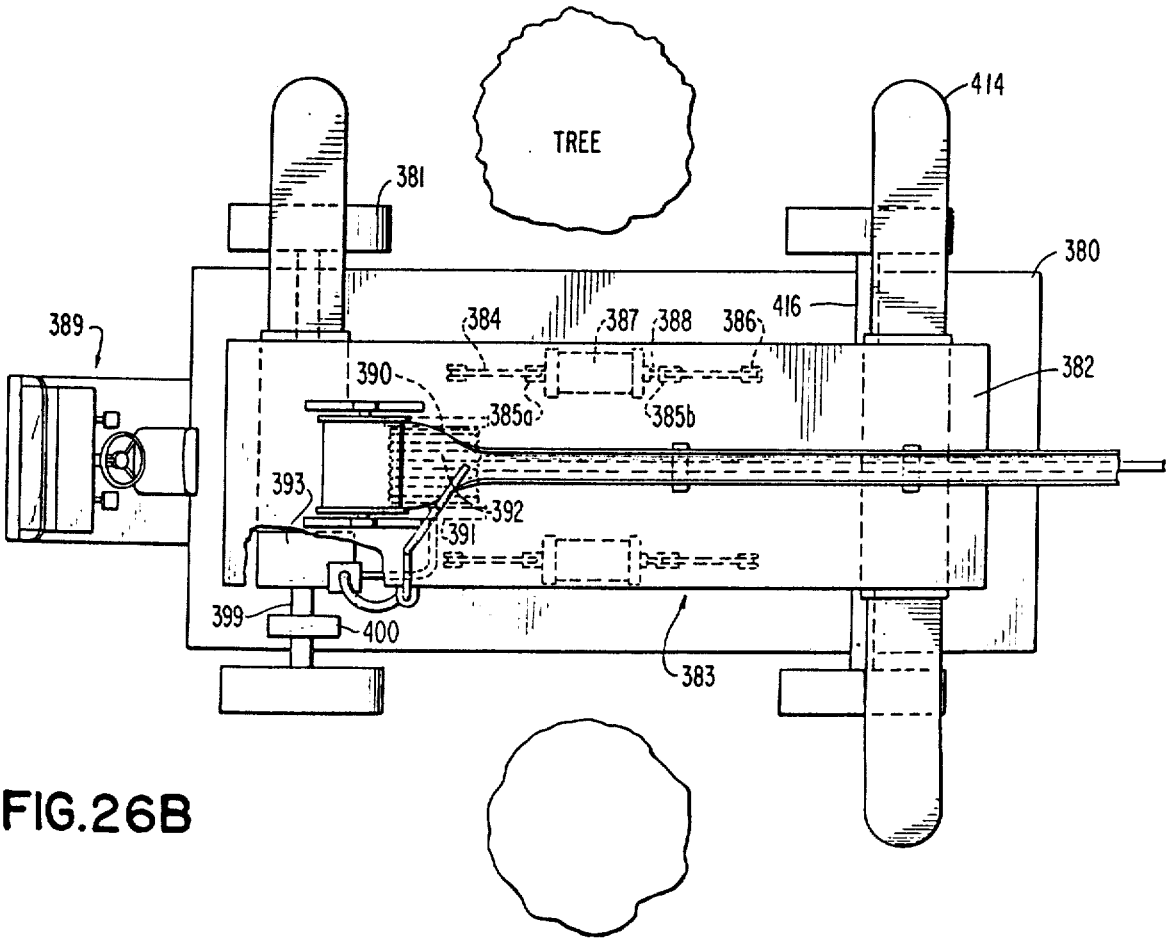
FIG.26B

FIG.29A
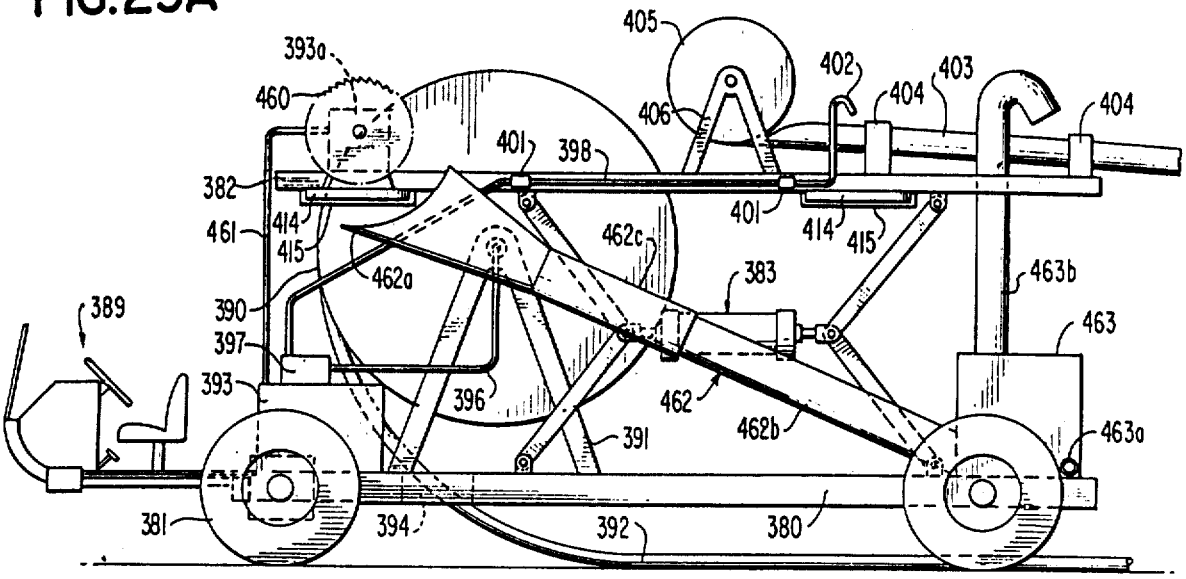
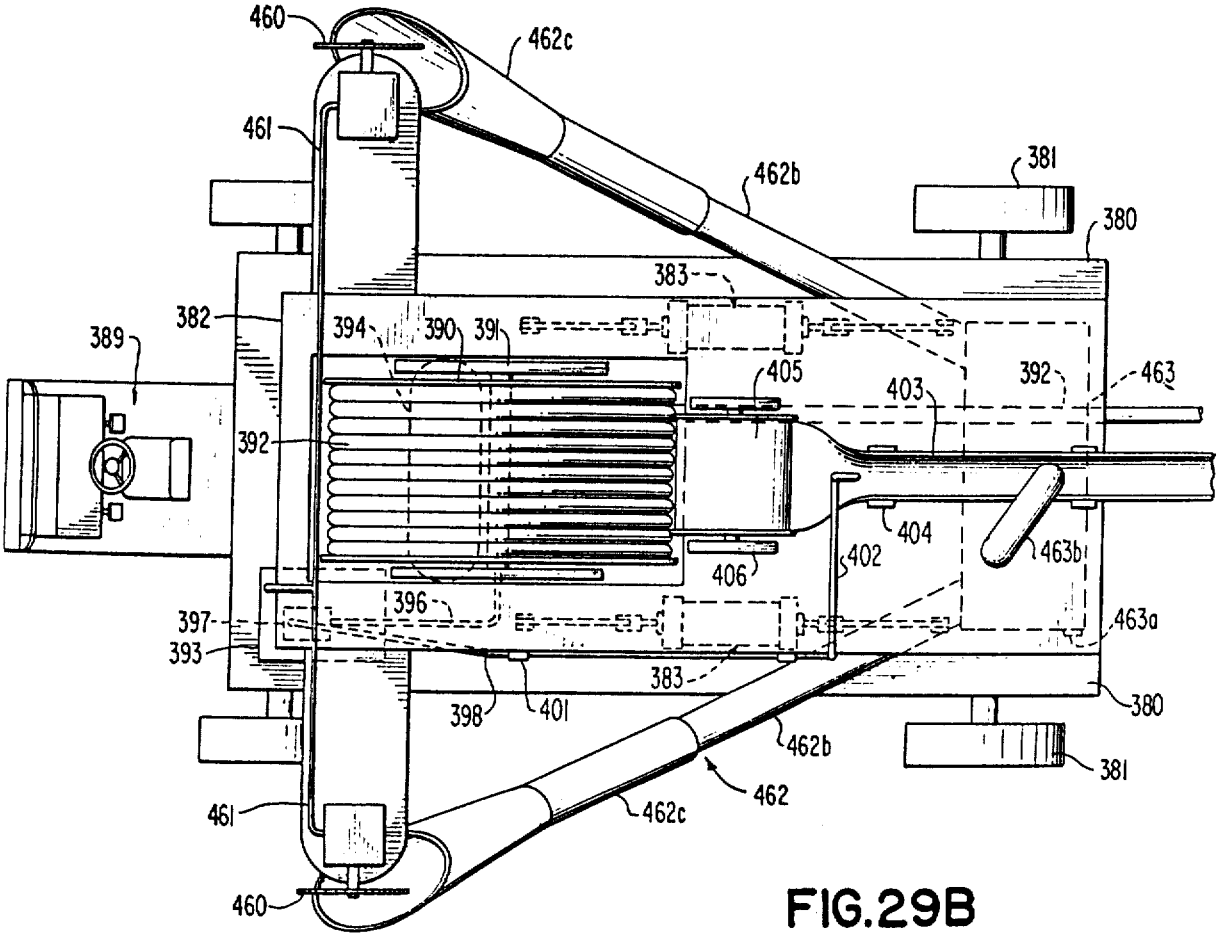
FIG.29B

FIG.32A
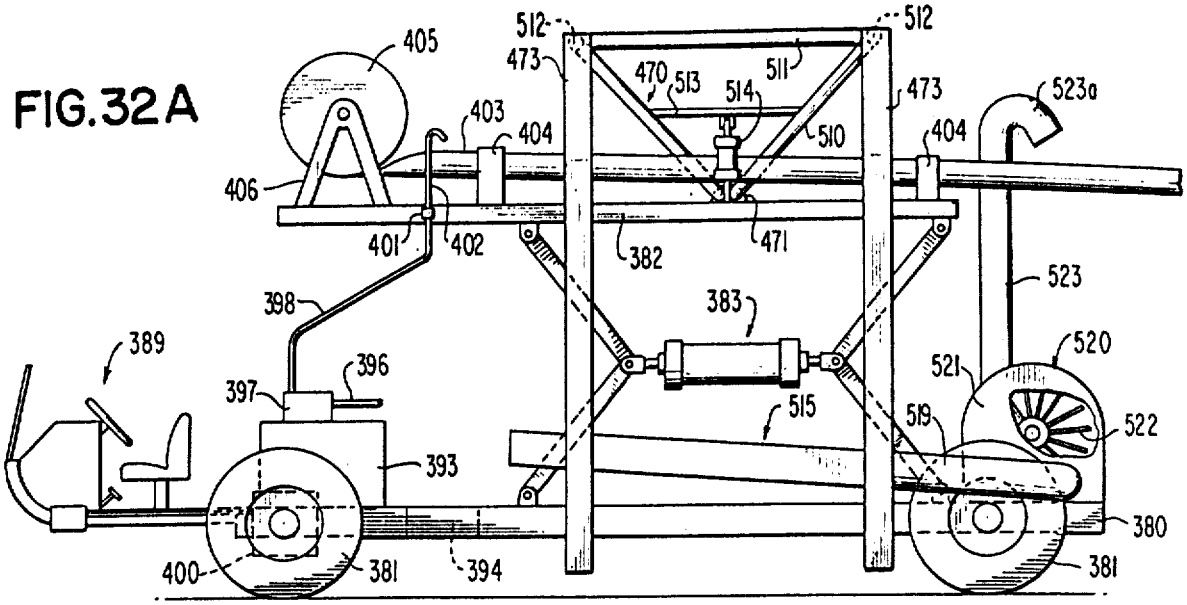
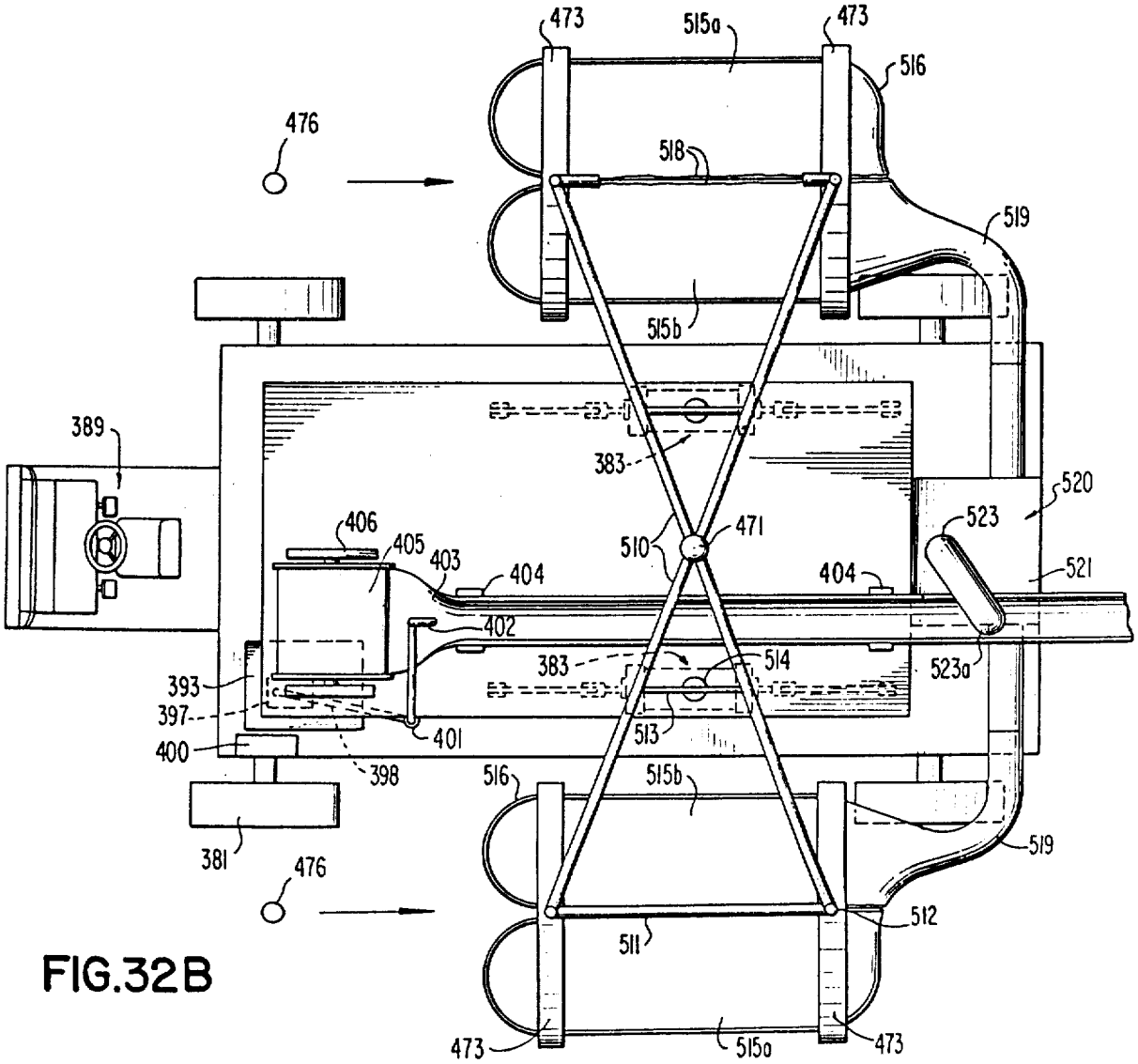
FIG.32B

FIG.35
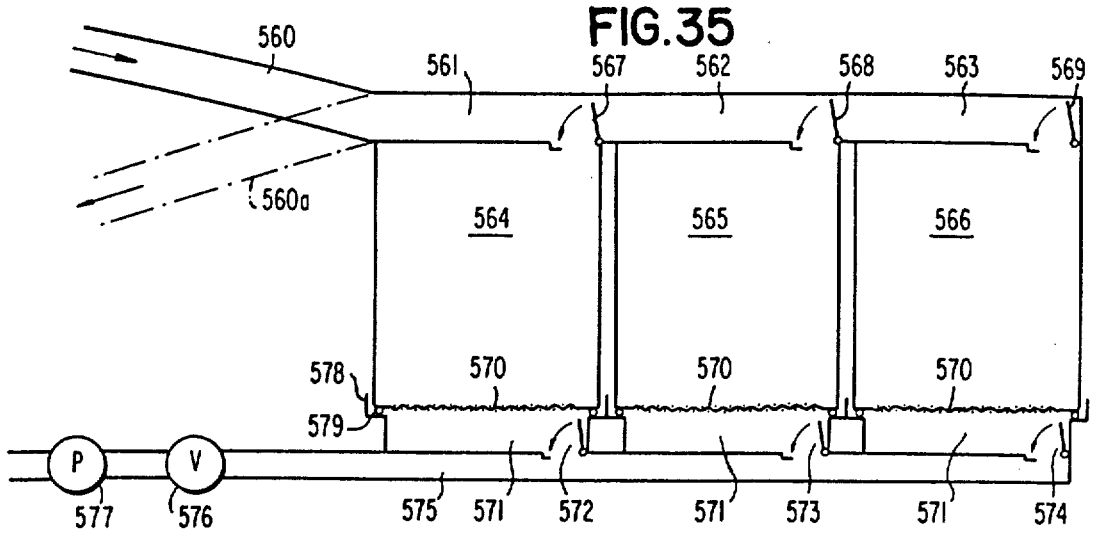
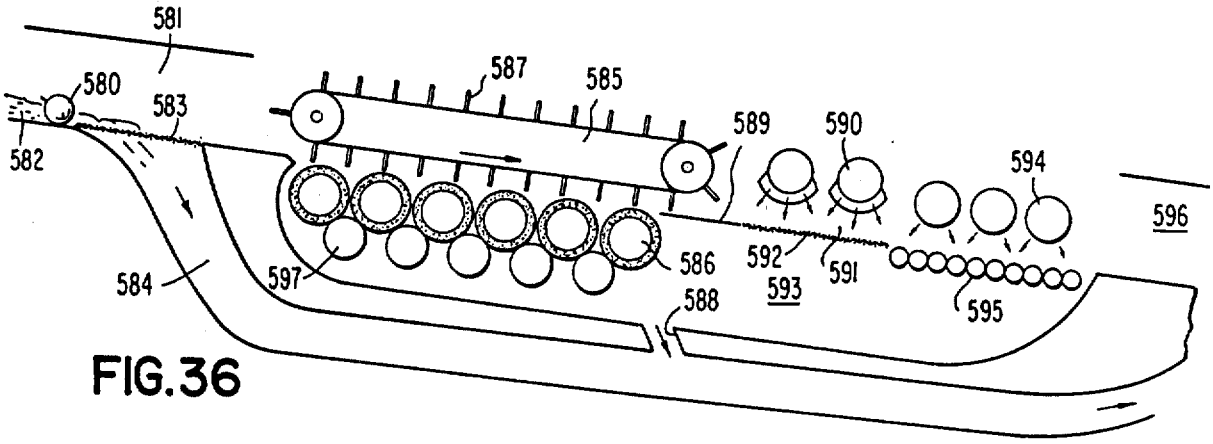
FIG.36
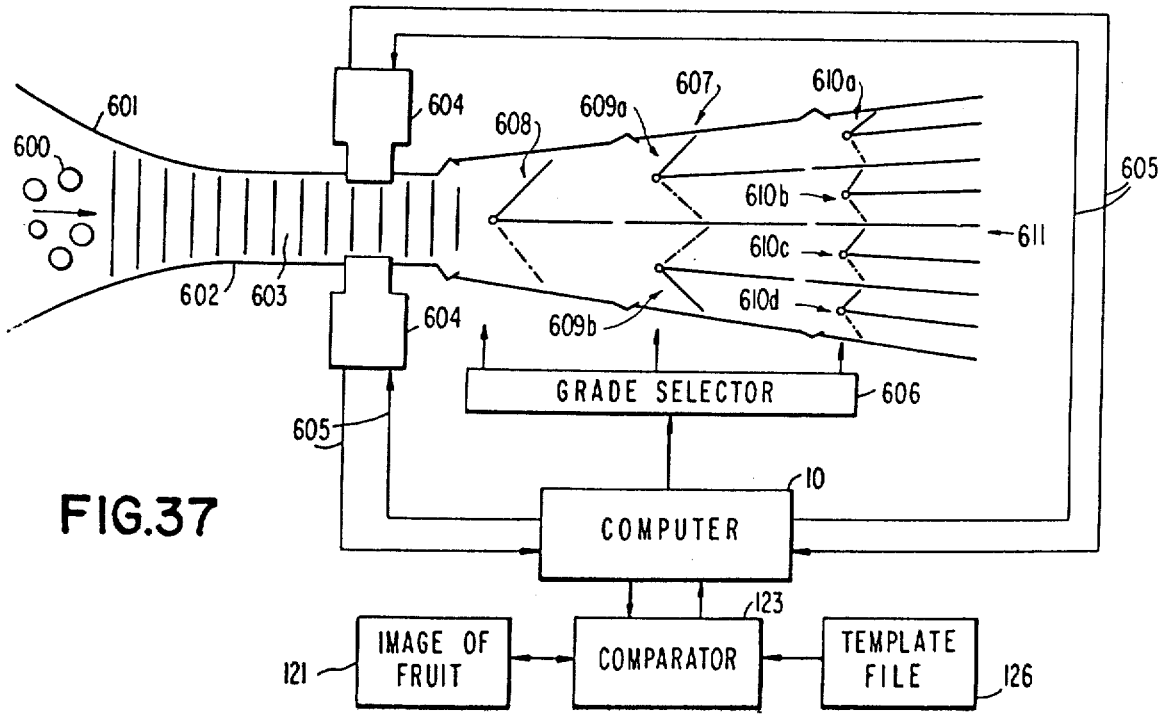
FIG.37

FIG.41
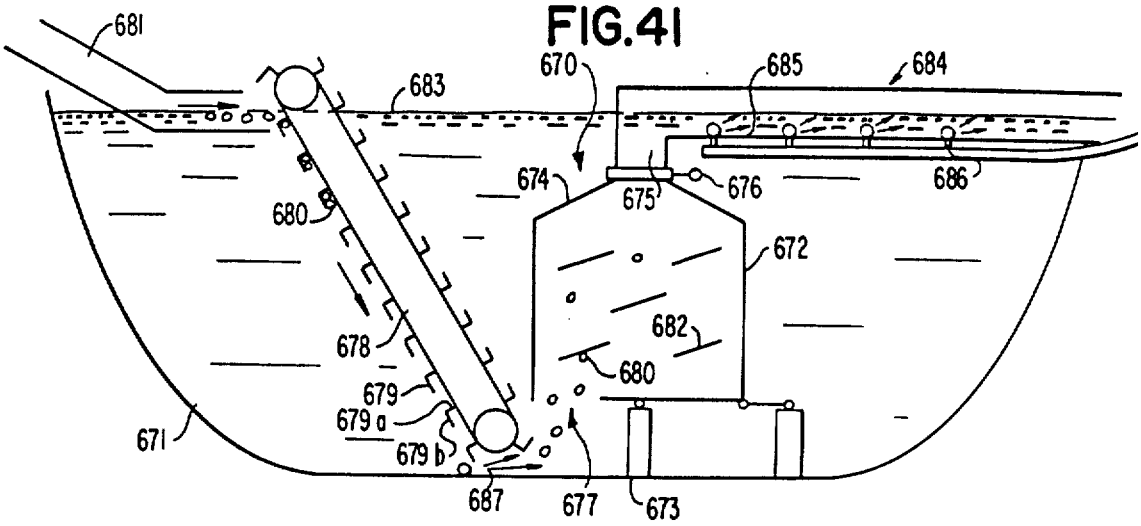
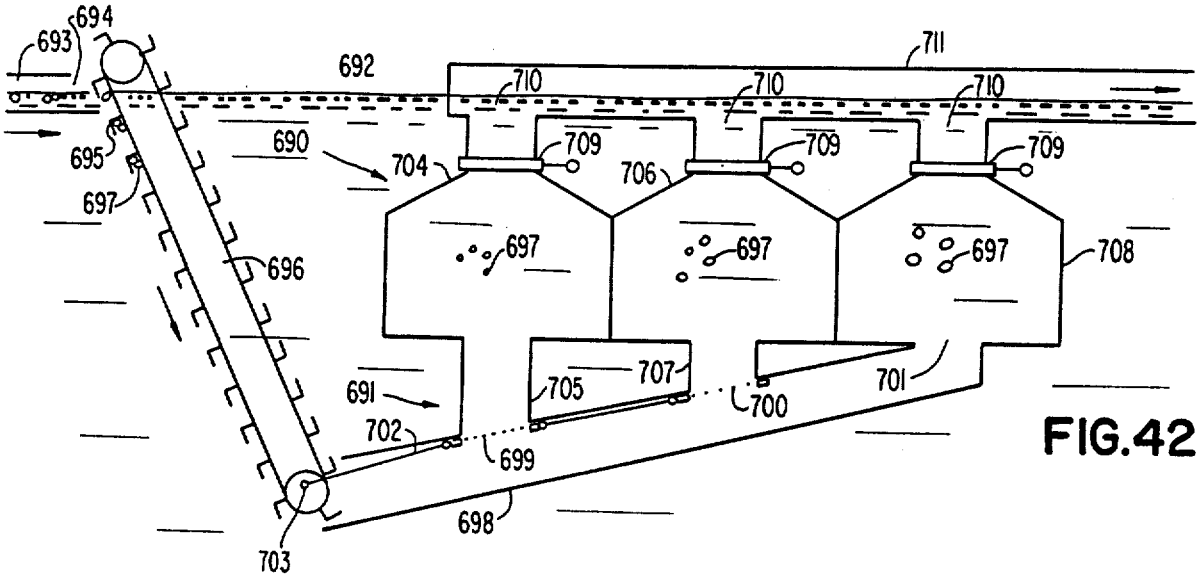
FIG.42
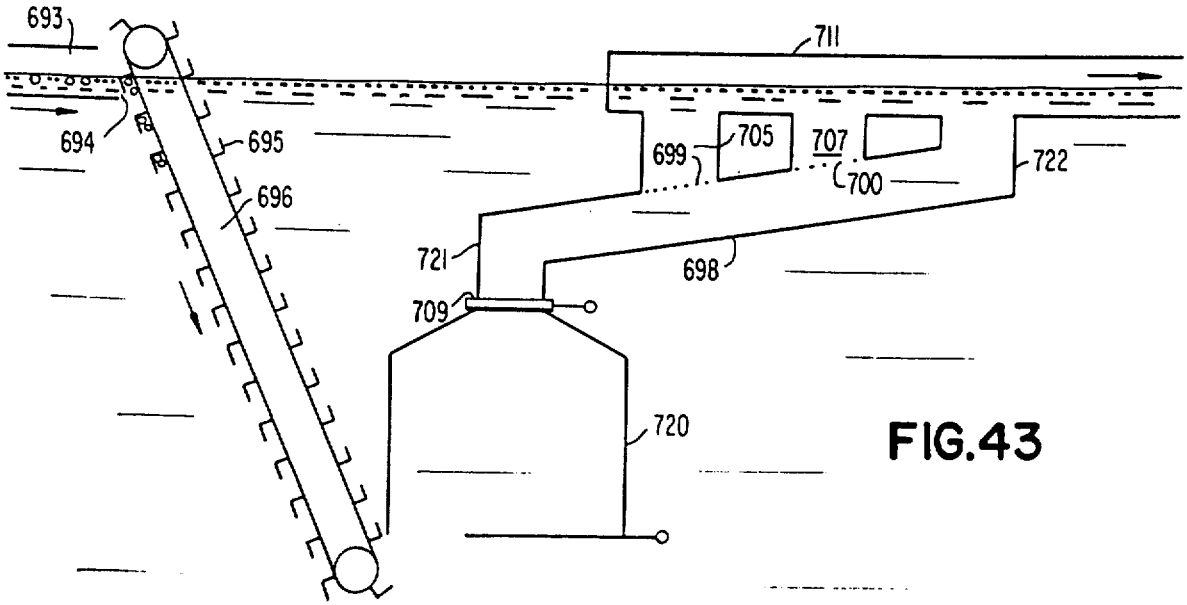
FIG.43

FIG.44
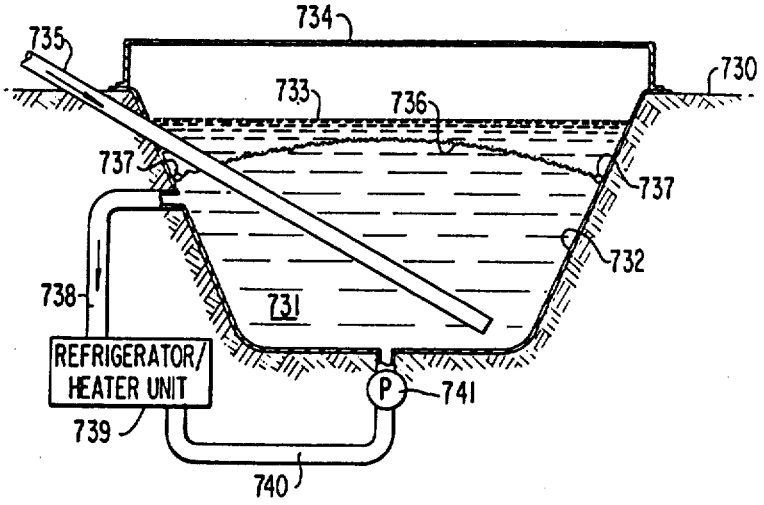
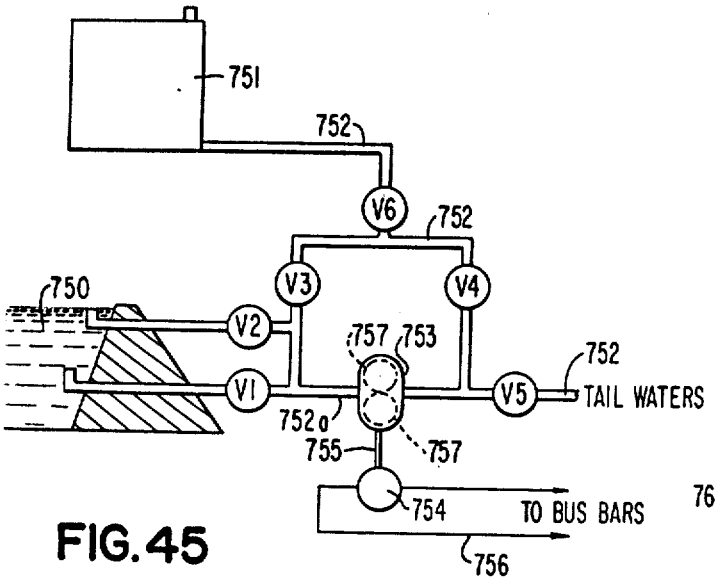
FIG.45
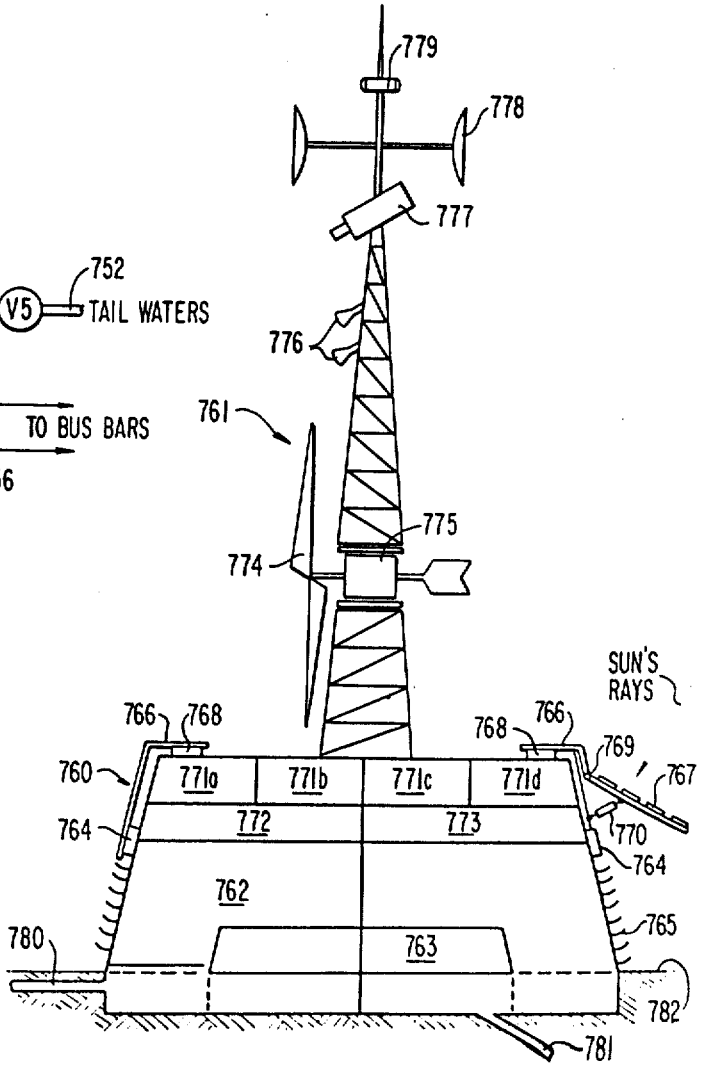
FIG.46

HIGHLY AUTOMATED AGRICULTURAL PRODUCTION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to means for the production of agricultural products.

2. Description of the Prior Art

U.S. Pat. No. 484,294, Carlson, discloses an automatic water sprinkler. The automatic sprinkler may be guided along a desired path by a rope placed on the ground, the sprinkler traversing the rope with wheels on each side of the rope. At the end of its desired path, the automatic sprinkler strikes an object such as a preplaced stake, thereby causing the gears of the automatic sprinkler to reverse and the automatic sprinkler to travel back to its original path until it gets to its starting point, where it again strikes another stake and reverses its gears. The automatic sprinkler travels back and forth between the two stakes until stopped.

U.S. Pat. No. 1,079,817, Williamson, discloses a sprinkling device which travels back and forth suspended from a pipe track from which the vehicle draws water periodically through valves. The water drawn from the pipe track can be utilized not only for irrigating purposes but, while falling under the influence of gravity, strikes paddle wheels in the sprinkling device to move the same.

U.S. Pat. No. 1,142,442, Lord, discloses an automatic lawn sprinkler which is adapted to run on tracks over a desired path, the described lawn sprinkler utilizing a double winch with a draw cable extending in each direction along the track so that at the end of its travel the lawn sprinkler reverses its direction, returns to its starting point and is there automatically stopped. The lawn sprinkler is powered by a water jet striking against a water wheel.

U.S. Pat. No. 2,578,981, Parker, discloses an electronically operated irrigation system, in this patent, sprinklers are under the control of a fixed timer. The timer selects an appropriate time for a soil moisture test and, if the soil moisture test calls for irrigation, the system proceeds through a fixed routine until the irrigation cycle is completed, thereafter being inactive until the timer indicates another soil moisture sample should be taken. In the Parker system, the moisture sensor is not independent of ion concentrations, the moisture sensor cannot be sampled at any desired time and the entire system must be duplicated for each sensor, all features which are unlike the present invention.

U.S. Pat. No. 2,674,490, Richards, discloses an irrigation system controlled by a single soil moisture sensor of the tensionometer type. The tensionometer actuates a timer through a vacuum line and, in a manner similar to U.S. Pat. No. 2,578,981, Parker, the timer initiates an irrigation cycle which must be completely run through prior to completion of the cycle.

U.S. Pat. No. 2,831,434, Hunter et al., discloses a mechanical system for controlling irritation apparatus which essentially can be utilized to serve only one sensor.

U.S. Pat. No. 3,037,704, Kinigsberg et al., discloses an electromechanical automatic control for irrigation systems involving a soil moisture sensor which depends upon electrical conductivity between two electrodes for the sensing of soil moisture, rendering the sensor susceptible to error due to ions found in soil. Kinigsberg makes no provision for space division or time division switching.

U.S. Pat. No. 3,114,243, Winters, provides an automatic system of ditch irrigation where the flow of water from the ditch to rows is controlled by solenoid operated gates under the control of a radio receiver which receives signals from a soil moisture sensor. The soil moisture sensor of Winters is, of course, not subject to feedback loop control and, once an irrigation cycle is initiated, it must be taken to completion until all fields are flooded and the contact at the meter location is opened. Further, Winters suggests the use of only one sensor on the entire farm.

U.S. Pat. No. 3,200,539, Kelly describes a system for heating, irrigating, and fertilizing a farm. The Kelly system is an open-loop system providing no provisions for feedback loop control.

U.S. Pat. No. 3,244,676, Rauchwerger, provides electronic means for automatically controlling a sprinkler system, which can be used only for controlling one function, viz, water irrigation. The Rauchwerger system can be utilized to serve only one homogenous agricultural area; to serve other areas, duplicating essentially the entire system of Rauchwerger is necessary. Finally, in Rauchwerger a photocell is utilized to inactivate the system in the daytime, a feature which is not desirable, and, in Rauchwerger a thermistor inactivates the system at 32° F., rendering the system useless for frost protection.

U.S. Pat. No. 3,354,579, Gross et al., discloses a system for the prevention of frost damage. The Gross et al. system is an open-loop system, i.e., no sensors are provided. Further, the utilization of hot air and smudge in Gross et al is not an efficient means of frost protection and, in fact, can lead to dangerous air pollution. In Gross et al since no sprinkler heads or the like are provided, it is impossible for the system to provide a spraying function.

U.S. Pat. No. 3,349,794, Behlen discloses a hydraulically powered self-propelled, continuously fed irrigation device. The Behlen device is for flat rectangular fields, is not adapted to arbitrarily chosen terrain, and is, essentially, not automatically controlled.

U.S. Pat. No. 3,643,442, Houston, teaches an irrigation method wherein slots are dug into the ground approximately eight inches deep and four inches wide, filled with mulch or other permeable material, and thereafter a machine run over the slots discharging water into the slots. The machine is charged manually, the water being taken from hydrants positioned throughout the field, and no provision is made for a common irrigation system which accomplishes many functions in addition to irrigation, not is the system provided with the capability for a feedback loop relationship with a computer. Rather, the system is simply prescheduled to apply a uniform amount of water to every slot, whether required or not.

U.S. Pat. No. 3,684,178, Friedlander, discloses a traveling agricultural sprinkler which is provided with a reel utilized to take up a cable laid down by the sprinker during its run. The travelling sprinkler is driven by way of water fed to the travelling sprinkler by a hose, which water is directed against a turbine wheel or impeller to drive the sprinkler. When the travelling sprinkler reaches the end of its run, a conventional tractor or the like must be hooked to the sprinkler and the power take-off of the tractor coupled to the pipe take-up reel of the travelling sprinkler to provide energy to rewind the pipe take-up reel. Water is then cut off and the water pipe decoupled from the travelling sprinkler and sprinkling means. The tractor then moves the vehicle and retraces the original path of the vehicle.

U.S. Pat. No. 3,771,720, Courtright discloses a winch-driven water spray irrigation device which comprises a fourwheel pipe frame structure carrying a large water gun. In operation, a tractor draws the device to its starting point, where the device is uncoupled from the tractor. A steel cable is then pulled from a winch on the device and carried across the field to be irrigated to the end of the travel of the device. The end of the cable is there attached to a stake in the ground called a "dead man". A water hose is then attached to the rear of the machine and, by operating a manual clutch, water is supplied to the machine. The water drives a water turbine, or fluid motor, which in turn is geared down to drive the winch to pull the device across the field to the "dead man". Upon reaching the "dead man", brakes in the device are operated automatically while the water gun continues to rotate and discharge water. At that time, it is necessary to cut the water off, go to the device, disconnect the water hose and winch cable, turn the device around and pull it to the next area to be located whereafter the above operation is repeated. No provision is made for accomplishing functions other than irrigation, for example, pruning, brush removing, thinning, picking or conveying. Further, the device described cannot be considered self-propelled; it cannot travel either forward or in reverse, it must drag along substantial amounts of agricultural hose, and it is not provided with elevating means to achieve control in the vertical dimension.

U.S. Pat. No. 3,785,564, Baldocchi, discloses apparatus adapted to automatically travel between two rows of low plants, such as cotton plants, and dispense insecticide upward into the branches of the plants. The device is open-loop controlled by radio means.

U.S. Pat. No. 2,660,021, McDowell, discloses a tractor-drawn machine for picking berries wherein the machine is adapted to straddle the berry plants, and, by blasts of air generated from two fans carried on the machine, knock the berries from the plant into catch basins disposed on opposite sides of the plant, which catch basins are carried by the berry-picking machine. There is no provision described in the McDowell patent for conveying fruit from the berry-picking machine utilizing a water conveyor, nor is the McDowell device adapted to pick two rows at the same time.

U.S. Pat. No. 2,996,868, Voelker, discloses a pneumatic fruit harvester which is carried on or mounted on the body of a flat bed truck. The device is moved beneath the tree from which the fruit is to be harvested and, by way of air jets generated by the pneumatic harvester, fruit is knocked from the tree from below. Enormous quantities of air are required by the device described in the Voelker patent, and the device is not capable of surrounding the tree, rather, it only rests on the ground underneath the branches to be picked and a complete picking requires a number of movements around the tree. There is, of course, no suggestion whatsoever of a water conveying system.

U.S. Pat. No. 3,269,099, Fricks, discloses a berry harvester which essentially comprises a moveable platform having two tilted troughs on either side thereof. The device is particularly adapted for harvesting fruit which grows upon vines which can be trained to grow on a trellis. The fruit is knocked from the vines, using, for example, a compressed air vibrator, and as the fruit falls from the vines it is allowed to fall into the troughs which contain water. The troughs are sloped, and a conveyor belt is mounted along the back of the apparatus for transporting water containing the berries the suspension into a tank mounted on the device. No provision is made in the Fricks patent for conveying the fruit in a water conveyor, nor is there provision for a continuous water supply.

U.S. Pat. No. 3,276,194, Mohn et al, discloses a berry-picking machine wherein fluid sprays are utilized to dislodge the fruit; the device is specific to the picking of berries. In the device described by Mohn et al, a water storage tank is described as mounted on the apparatus. Berry-catching means are provided at the bottom portion of the device to catch the berries which are dislodged from the plant by the fluid sprays. No provision is provided by Mohn et al for the continuous supply of water to the berry-picking machine nor for the continuous removal of picked fruit.

U.S. Pat. No. 3,439,746, Lee, discloses a method and apparatus for selecting plants of a crop for harvesting, apparently being limited to small vegetables such as lettuce plants. Means are provided for sensing the size of the plant and for removing all plants that do not meet the size requirements built into the sensing device.

U.S. Pat. No. 3,522,696, Miller et al, discloses harvesting apparatus which is provided with oscillatory tine means whereby, as the device travels by a tree, the tine means are vertically reciprocated and the rate of forward movement of the device is correlated with the horizontal movement of the tine means so that the horizontal movement of the tines relative to the tree is zero, whereby shaking is avoided. Catching means are provided beneath the tines including a web which receives the fruit, a conveyor beneath the web to receive the fruit and a water tank which receives the fruit from the conveyor. A padded roller is provided in the water tank to submerge the fruit and to transport the fruit away from the conveyor discharge area. The device described by Miller et al is not self-propelled, can effectively work on only one side of the tree, and, importantly, is provided with no means for conveying the harvested fruit away from the machine nor with a continuous water supply.

U.S. Pat. No. 3,584,442, White, discloses a method and apparatus for picking citrus fruit by submerging the trees temporarily in water; in greater detail, a tank encloses the tree, the tank is filled with water and the rising water removes the citrus fruit from the tree due to the buoyancy of the citrus fruit.

U.S. Pat. No. 3,600,131, McDowell, discloses an improvement upon the earlier discussed McDowell patent, U.S. Pat. No. 2,660,021. The device described is a pneumatic machine in which the fans of the earlier McDowell patent are replaced by a series of ducts in which the air can be pulsated to provide a shaking effect to the berry plant being picked. The ducts are present on only one side of the machine, and the berries are blown to the other side of the machine, generally through the berry plant.

U.S. Pat. No. 3,720,050, Rozinska, discloses a machine for picking blueberries similar to the earlier described McDowell machines except that a deflector is inserted between the branches of the berry plants so as to bend the branches outward and over pick-up arms provided in the device, as air stream stripping the berries from the branches to either side and downward to the pickup arms provided on the blueberry picker. The requirement of utilizing a deflector in the Rozinska patent renders the described device useless for removing fruit from large plants such as trees which may not have separable branches and, in fact, which may be grown on a central leader system such as is typically used with dwarf and semi-dwarf fruit trees. The general principles utilized are similar to those of the earlier McDowell patents.

U.S. Pat. No. 3,776,316, Eberhart, discloses electronic control means for crop thinning. The Eberhart patent does not describe a complete thinning system; it relates primarily to control means for such a system. While no detailed description is provided on the machine which accomplishes thinning, apparently it would be similar to a mechanical roto-tiller or a cutting knife which can be raised and lowered from the ground to remove excess plants in a row, such as corn, soy beans and the like. The machine which performs the thinning is controlled by a sensor which detects the presence of a plant by resistance contact therewith. The sensor controls whether or not the hoeing head is lowered or raised in accordance with a set of options provided by the controller. The present invention, on the other hand, is primarily directed in its thinning function to orchards, rather than small ground plants such as corn or soy beans, though the general approach could be adapted to plants of any size.

U.S. Pat. No. 3,776,316, Cascarine, is quite similar to the Eberhart patent is disclosing the use of a conventional tractor pulling a hoeing device for automatically removing excess plants in a row, the device being specifically developed for thinning beet roots.

U.S. Pat. No. 1,955,749, Jones, discloses means for washing, brushing, polishing and similar operations upon the surface of fruit which comprises a series of circular rotary brushes provided with transverse grooves to retain the fruit as it is impelled from brush-to-brush, a conveyor system being mounted beneath the transverse brushes and the fruit being immersed in water while passing through the apparatus. The described device is extremely complicated, and fruit reversal means are required. Further, there is no provision for feeding fruit to the described device while it is carried in water and, since the system is essentially a closed system, no level control means are provided.

U.S. Pat. No. 2,162,415, Allen, discloses apparatus for handling fruits wherein the fruits are transported in a preserving liquid such as a sulphur dioxide solution. As described in Allen, fruit is unloaded from boxes onto a belt conveyor system, and thence dumped into a trough, contacted therein with preserving sulphur dioxide in solution, and carried into a storage tank. The fruit maintained in the sulphur dioxide solution can thus be stored for substantial periods of time. Excess sulphur dioxide solution is placed in storage container 19 as shown in Allen. When it is desired to take the fruit from solution, an outlet at the bottom of the tank is opened and fruit is removed from the storage tank by way of a discharge pipe under the influence of gravity. The fruit then falls into a second trough which contains sulphur dioxide in solution, and is removed from therefrom by conventional belt conveyor immersed in one end thereof. The sulphur dioxide solution from the second trough may be recirculated to the fruit storage container or the sulphur dioxide solution storage container. In the present invention, of course, it is unnecessary to utilize a preserving liquid as is disclosed in Allen. Rather, in accordance with the present invention, storage is typically conducted under water maintained at a low temperature.

U.S. Pat. No. 2,362,130, Glenn, discloses means for grading fruit by specific gravity wherein fruit is introduced into a tank of liquid on a platform and a stream of flowing water carries the fruit from the platform into a series of grading screens, the fruit dispersing to the appropriate grading screen due to specific gravity differences. The grading screens permit water to be removed from the fruit and recirculated in the system prior to the fruit being introduced into storage containers. The device described in the Glenn patent is relatively complicated, and requires a large standing fluid reservoir and a circulating pump. Further, there is no provision for water conveyors into and out of the Glenn device and extremely accurate control of water is needed. The device is operable only for items which have a specific gravity greater than 1.

U.S. Pat. No. 3,288,265, Smith, discloses liquid feeding and positioning means for fruit and vegetables. The object of the described device is to receive dry fruit or vegetables dumped into a large water-filled hopper and thereafter convey the same on an endless conveyor provided with position cups in the bottom thereof. In one embodiment, a single file of fruit or vegetables is obtained for the purpose of subsequent grading and counting. The conveyor is inclined upwardly so that the articles are not only positioned and spaced on the conveyor but are also drained of water as they rise from the holding tank. This is necessary since subsequent operations must be performed when the fruit or vegetables are dry. As exemplified in FIG. 9 of the Smith patent, the fruit or vegetables can be graded using a photocell. There is no provision in the Smith path for the introduction of fruit in water, whereby a pump and recirculator and agitators are unnecessary as is the case in the present invention. Further, the grading means of the Smith patent is capable of measuring only a single variable, an integrated measurement of the color of the fruit.

U.S. Pat. No. 3,499,687, Ellis, discloses apparatus for feeding fruit from a bulk supply into a pick-up station where pieces of fruit are floated in a continuous trough and recirculated until they are picked up by a conveyor. The device described in the Ellis patent is relatively complicated and, by necessity, requires a recirculating path for the fruit.

U.S. Pat. No. 3,786,917, Rousselie et al, discloses a fruit grading plant wherein fruit enters the packing plant in boxes and is removed by immersing the boxes in water so that the fruit floats up and into the grading machine. No provision is made in the Rousselie et al packing plant for the direct receipt of fruit from an orchard in flotation.

U.S. Pat. No. 3,186,493, Barry, discloses an automatic farming system wherein a machine intended to accomplish primarily plowing, cultivating, discing, harrowing and the like is mounted on rails laid out in parallel across a field in a manner such that the device can move itself from track to track.

U.S. Pat. No. 3,468,379, Rushing et al, discloses automatic farming apparatus wherein a tractor pulling a plow or the like is adapted to trace a path defined by buried conductors in a field, a separate conductor being buried along the edges of the field for controlling the turning of the vehicle. A digital control system is provided by which the operation of the vehicles steering means, the vehicle throttle, implement positioning means and the like is controlled by pre-selected combinations of control pulses which may be generated upon crossing a control wire or by a radio receiver responsive to a plurality of separate signals. In accordance with the teachings of the Rushing et al patent, once the cable system is laid in the ground, a fixed pattern of operation is set, and it is impossible to vary the pattern of operation of the described device without relocating the cable system or introducing new cables. While the use of radio signals is suggested, no feedback means of any type are disclosed in the Rushing et al patent.

U.S. Pat. No. 3,609,913, Rose, discloses a method of controlling weeds along a row of plants wherein the weeds can be smaller than, or at least no greater in size than, the desired plant. Essentially, a wheel-mounted tank containing herbicide travels over a row of plants and, when an undesired weed is detected, herbicide is applied to the weed. Detection of undesirable weeds is pre-controlled and is conducted by direct sensing.

U.S. Pat. No. 3,123,304, Sutton, discloses an orchard-treating system wherein irrigation and related functions are accomplished utilizing special sprinkler headers in conjunction with both air and water lines leading to the special sprinkler headers from a central station. The system described in the Sutton patent is, however, an open-loop system-i.e., no provision is made for closed feedback loops involving sensors, a data transmission system and effectors which make the system automatic. As later explained, however, the sprinkler headers described in the Sutton patent can be used in the agricultural system of the present invention.

The following references are cited as being of marginal interest:

U.S. Pat. No. 1,744,363, Chapman; U.S. Pat. No. 2,876,488, Zebarth; U.S. Pat. No. 2,975,055, Brown et al; U.S. Pat. No. 3,001,656, Brooks et al; U.S. Pat. No. 3,650,097, Nokes; U.S. Pat. No. 3,759,557, Manzer; U.S. Pat. No. 3,763,360, Nishimura et al; and U.S. Pat. No. 3,771,258, Charney.

SUMMARY OF THE INVENTION

The present invention provides a highly automated system for the production of agricultural products which comprises, as essential components:

1. sensing means comprising both direct and indirect sensing means;

2. data transmitting means for forwarding data generated by the sensing means to computing means and for transmitting instructions from the computing means via appropriate interfacing means (controllers) to various devices (field effectors) in the agricultural area;

3. computing means linked by way of said data transmitting means to said sensing means and to said field effectors in a pattern of many feedback loops. The computing means is programmed to enable correlation of data received from all direct and indirect sensing means and to generate appropriate instructions to accomplish a substantive number of functions required for the operation of the agricultural system; and 4. fluid delivery means.

To utilize the full potential of the agricultural system of the present invention, further preferred means are: field operation means which can include any or all of the following:

means to harvest the agricultural product;

means to convey the agricultural product away from the site of harvesting;

means to grade the agricultural product;

means to store the agricultural product (optional where the product is directly sold), and means to containerize the agricultural product.

In a further preferred embodiment of the present invention means are provided to effect plant care operations such pruning, thinning, brush removal and the like.

The most highly preferred embodiment of the present invention makes maximum utilization of water received from the fluid delivery means to perform one or more of the field operations set forth above, most preferably, harvesting, conveying, grading which is conducted in water, storage which is conducted under water and plant care operations which are conducted utilizing power derived from the water flowing in the fluid delivery means by way of one or more water to mechanical torque converters.

Some of the primary advantages provided by most preferred forms of the agricultural system of the present invention are:

1. It avoids all heavy machinery in the field, thereby lowering capital and operating costs and avoiding soil compaction and plant damage.

2. Due to the absence of heavy machinery and precise control of water, carbon dioxide and nutrient levels, closer spacing of plants than is possible following present state of the art techniques can be achieved. For instance, conventional planting distance for full size peach trees is 20–24 feet. On the block plan, the number of trees per acre is 74–108. In the present invention, a spacing of 15 feet or less is feasible on a triangular plan, thus permitting 226 trees per acre.

3. Product grading and storage means can be integrated functionally and geographically with the balance of the agricultural system. In addition, the packing means can be much smaller and much less expensive to operate than conventional packing means.

4. Only one prime power source is needed for the entire agricultural system, an electric motor. The motor and all controls can be located in any area where its duty cycle is high-for example, in the packing plant.

5. Maintenance of farm machinery is drastically reduced.

6. Risks of crop failure are sharply reduced because of the elimination of frost damage, and the provision of maximum environmental characteristics necessary for plant growth, e.g., precise control of water, nutrients and the like.

7. Quality and size of produce will be better, permitting higher prices to be obtained. In addition to the reasons advanced in paragraph (5) above, this is due in part to the fact that transport and processing of produce may be in flotation, whereby bruising is reduced and cooling starts at the instant of picking, increasing the maximum feasible storage time.

8. Labor costs are drastically reduced.

9. Chemicals can then be transported and dispensed in common liquid form without the danger of personnel exposure to toxic materials, thereby reducing the costs for expensive protective clothing.

10. Since only the necessary amounts of water and chemicals are utilized, substantial savings in water and chemical costs will be achieved. This leads to a secondary benefit that soil leaching and ground and water pollution are reduced.

11. More efficient land use is possible. This is due not only to the reasons advanced in paragraph (2) above, but also due to the fact that land useless under current techniques due to frost damage potential can be utilized and soil too soft for heavy equipment can also be utilized since the system of the present invention requires no heavy machinery.

12. In one embodiment, the agricultural system of the present invention does not require external sources of electricity, gasoline or fuel oils.

OBJECTS OF THE INVENTION

One object of the present invention is to provide a highly automated agricultural production system (hereafter the agricultural system).

A further object of the present invention is to provide an agricultural system in which both direct and indirect sensing means are utilized to generate maximum data in an economical manner from an agricultural area.

Another object of the present invention is to provide an agricultural system which is in large part computer controlled.

Still yet another object of the present invention is to provide an agricultural system wherein direct and indirect sensing means are linked to computing means in a pattern of many feedback loops.

A further object of the present invention is to provide an agricultural system wherein in a preferred embodiment water is utilized to power various devices, under the control of computing means.

Still yet a further object of the present invention is to provide an agricultural system wherein liquid and/or gas can be utilized to derive power for performing various field operation functions such as harvesting, conveying, grading and storing.

A further object is to reduce consumption of fossil fuel by more efficient accomplishment of all needed functions, to utilize all organic wastes in energy production, and to employ any energy source available on a farm, including water, sun and wind.

Yet another object is to reduce soil, water and noise pollution by minimizing the use of water and toxic chemicals and eliminating the use of gasoline or diesel engines in tractors and other implements. A corollary is to reduce the use of all agricultural chemicals.

BRIEF DESCRIPTION OF THE DRAWINGS

FIG. 22 is a schematic representation of XYZ orchard wiring.

FIG. 23 shows a solenoid controlled sprinkling device.

FIG. (a) and (b) shows a hydromotor platform in accordance with the present invention.

Figure 27:
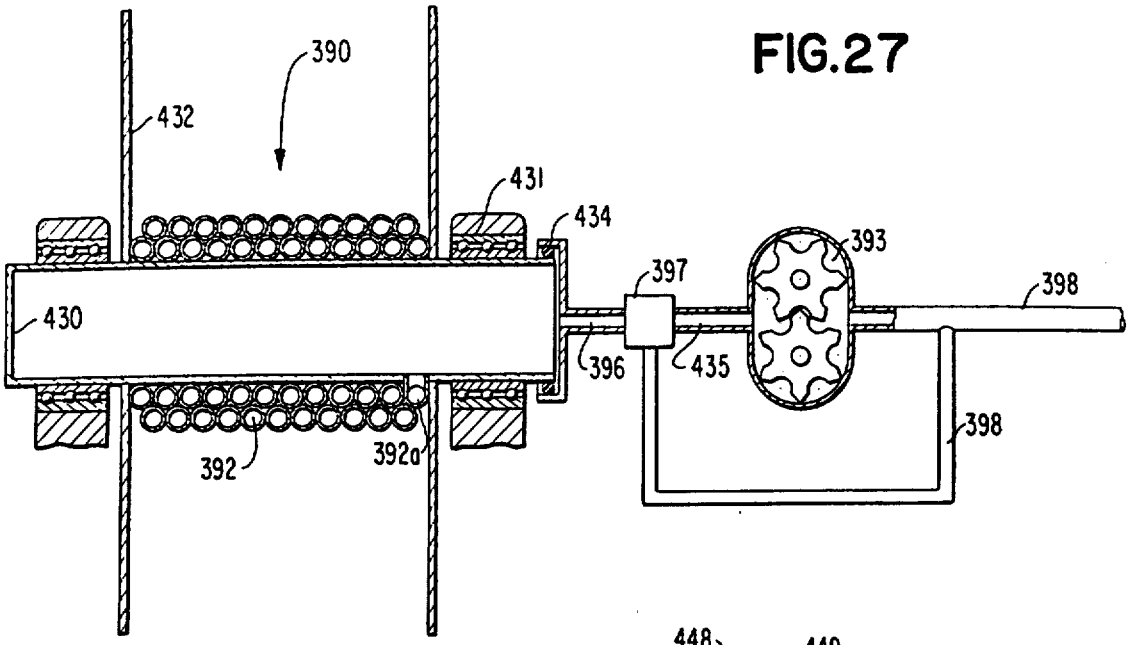

FIG. 27 shows water transmission means in combination with a hydromotor useful for the apparatus of FIG. 26.

Figure 28:
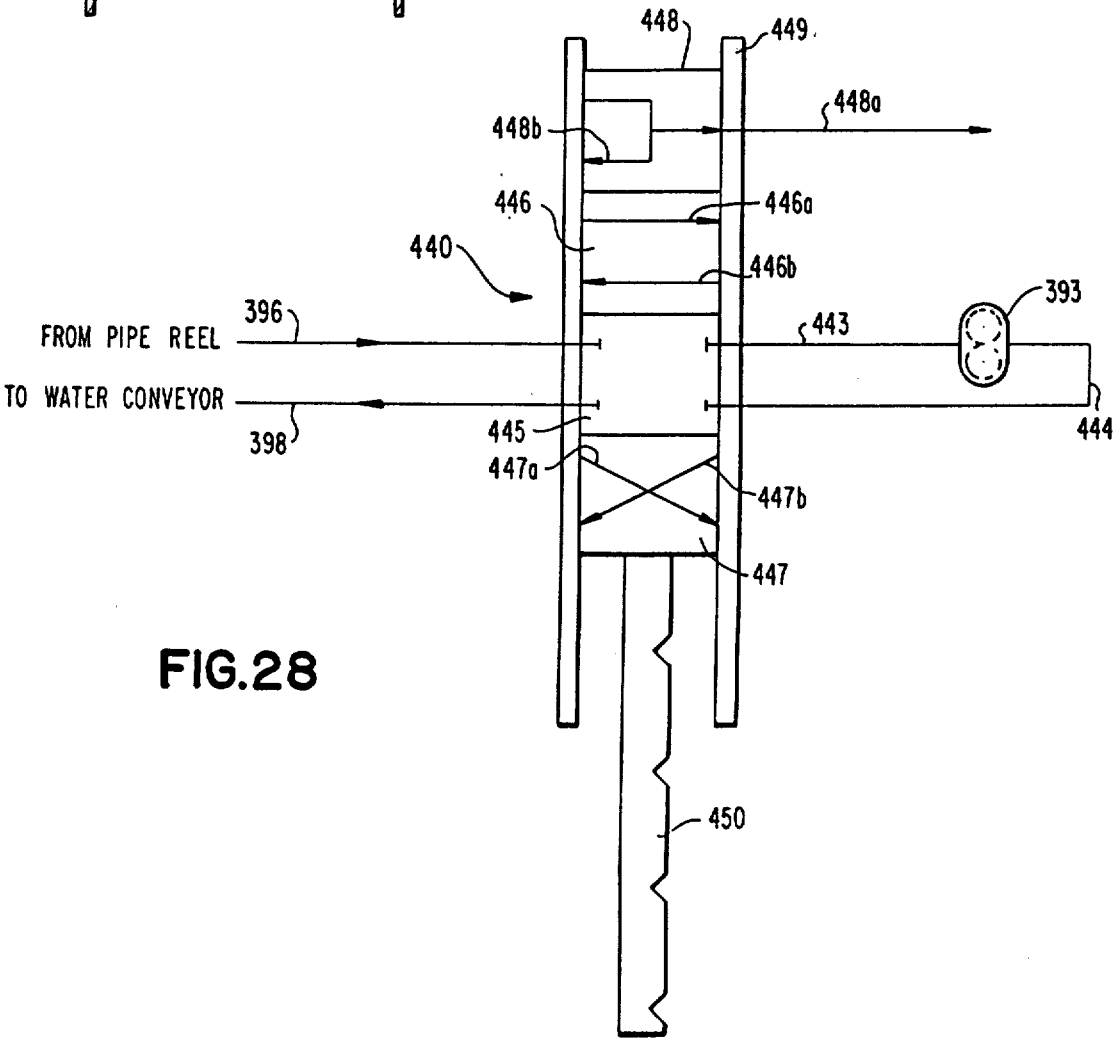

FIG. 28 shows hydromotor valve control means useful in the apparatus of FIG. 26.

Figure 29C:
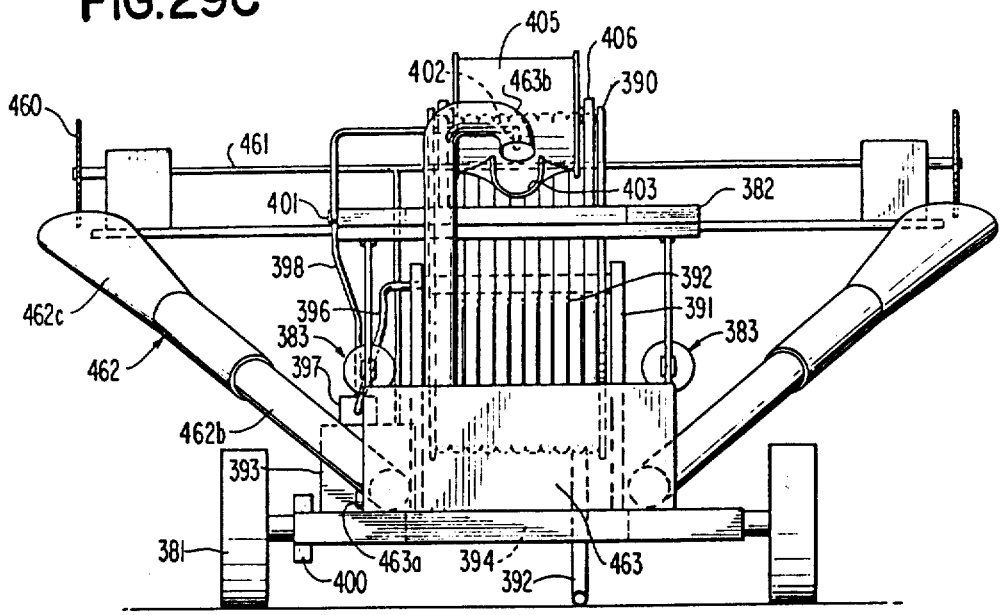

FIG. 29(a) (b) and (c) show an embodiment of the hydromotor platform of FIG. 26 useful for pruning.

FIG. 30 shows an embodiment of the hydromotor platform of FIG. 26 useful for thinning or spraying.

Figure 31:
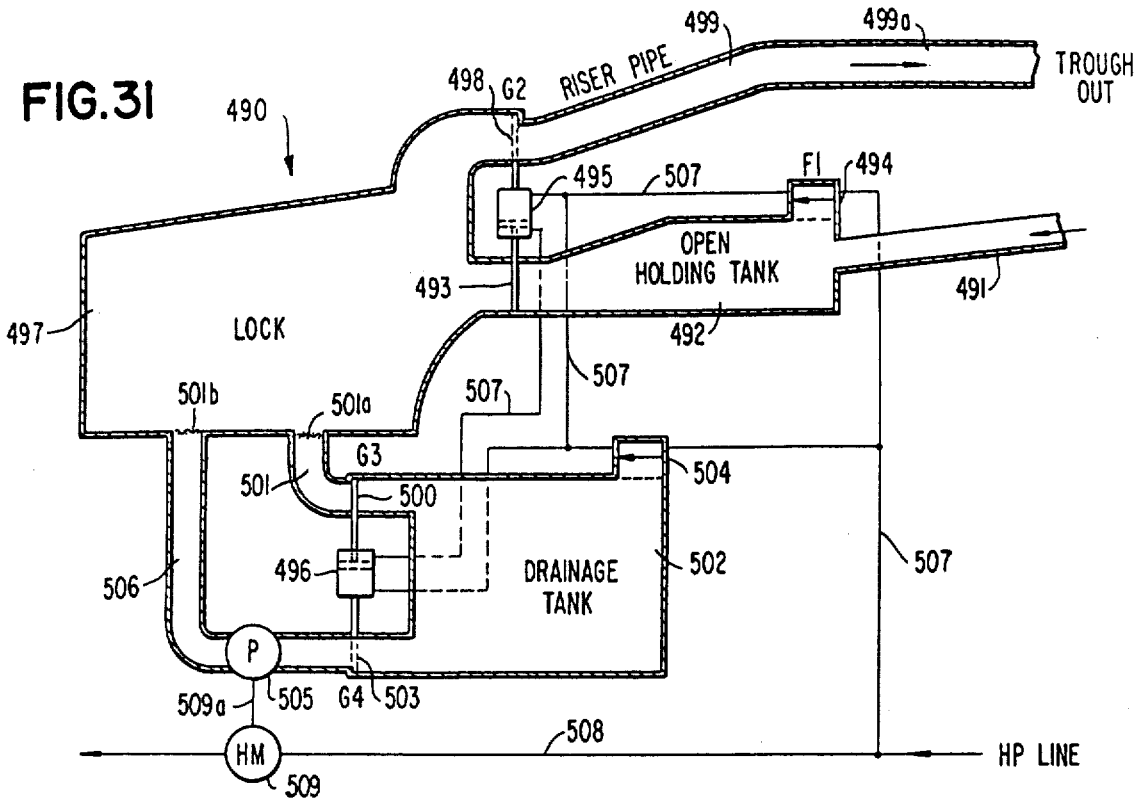

FIG. 31 shows a water lock for the transportation of fruit up an incline.

FIGS. 32(a), (b) and (c) show a modification of the apparatus of FIG. 26 useful for continuous harvesting.

Figure 33:
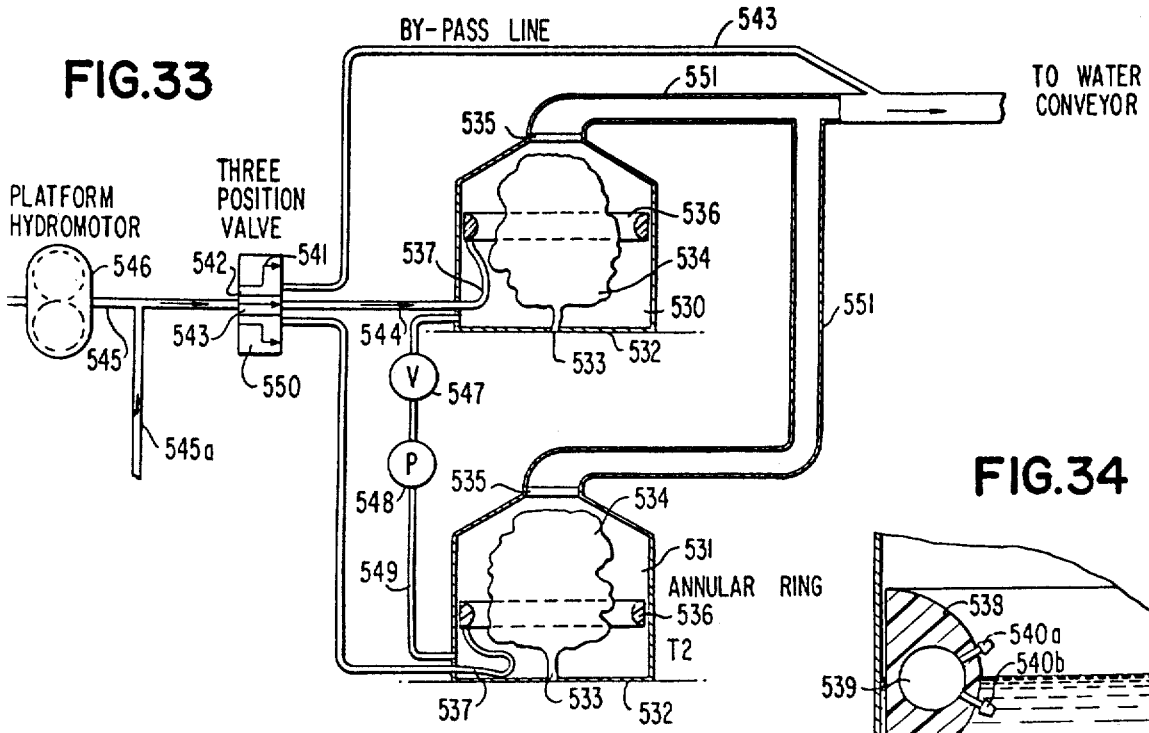
Figure 34:
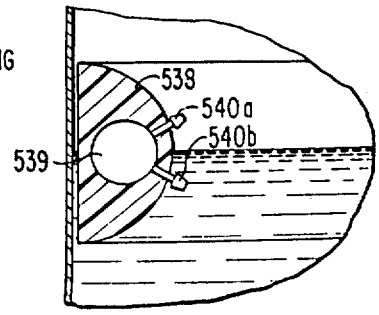

FIGS. 33 and 34 show means for batch harvesting of fruit.

FIG. 35 shows means for the storage of fruit.

FIG. 36 shows means for the drying and, optionally, the waxing of fruit.

FIG. 37 shows means for electronically grading fruit by pattern recognition.

Figure 38:
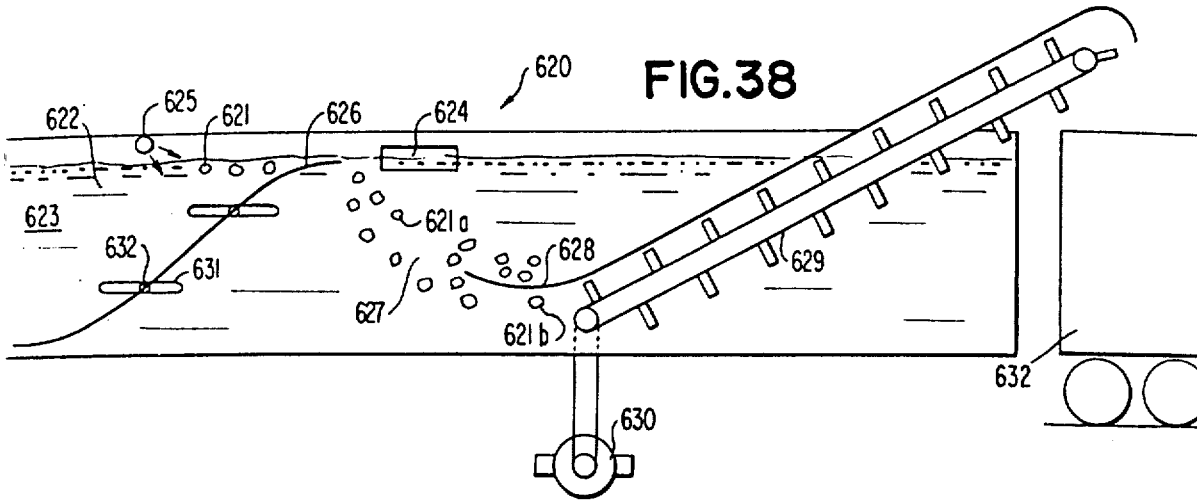

FIG. 38 shows means for the grading of fruit utilizing specific gravity differences.

Figure 39:
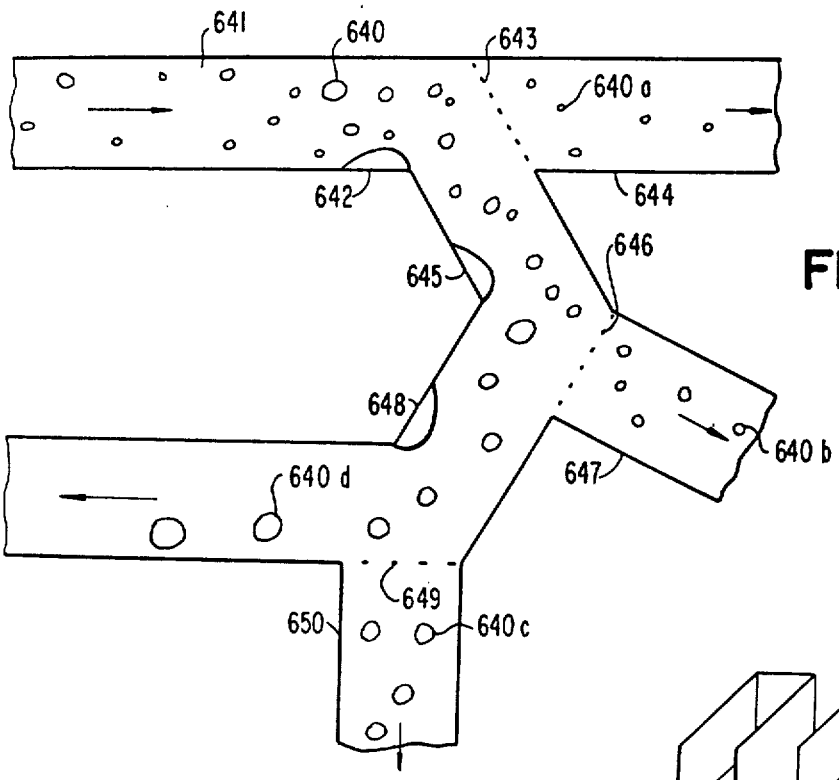
Figure 40:
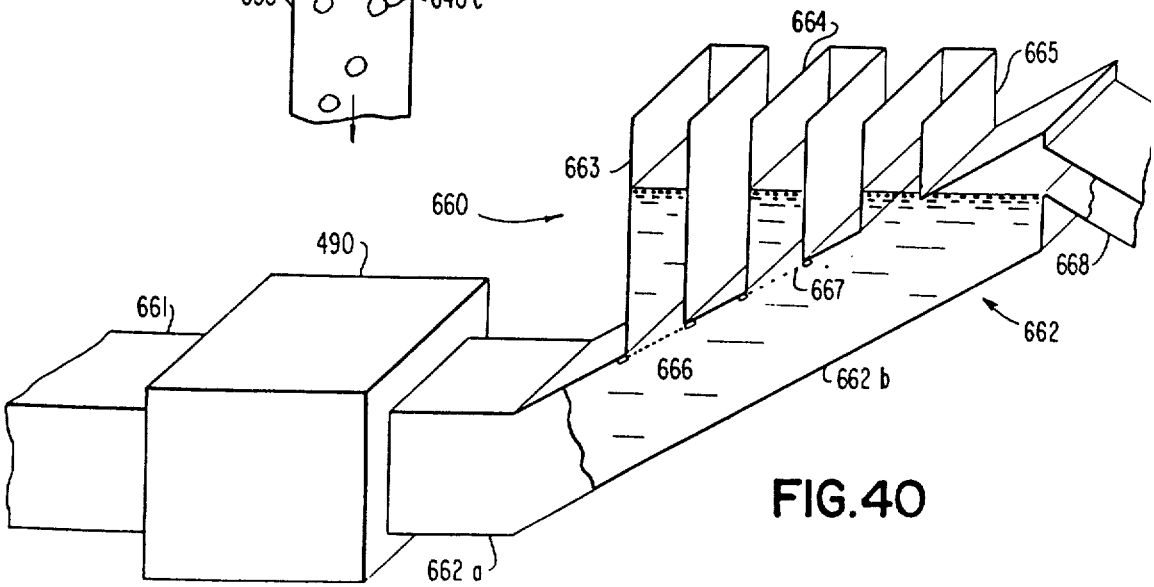

FIGS. 39 and 40 show means for sizing fruit using underwater sizing screens.

FIG. 41 shows means for the underwater storage of fruit.

FIGS. 42 and 43 show means for the underwater grading and storage of fruit.

FIG. 44 shows means for the underwater refrigerated storage of fruit.

FIG. 45 shows a hydroelectric system particularly useful in the present invention.

FIG. 46 shows a multi-function tower which may be utilized in the system of the present invention, if desired.

Figure 47:
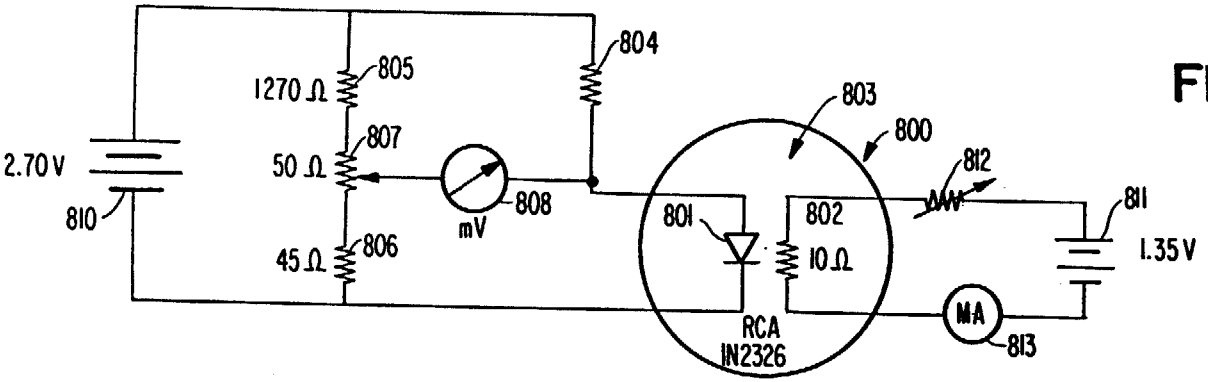

FIG. 47 is a schematic representation of a circuit for direct sensing of soil moisture and soil temperature.

Figure 48:
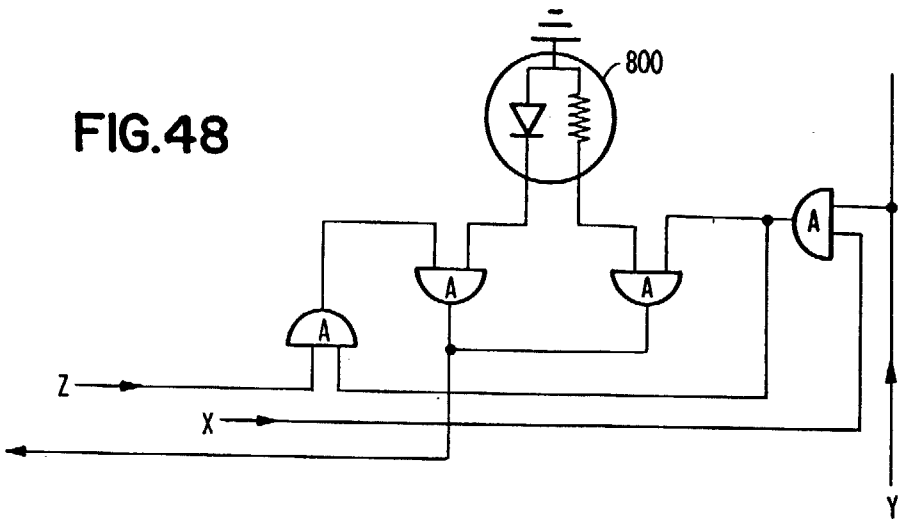

FIG. 48 is a logic diagram of a circuit utilized in combination with the circuit of FIG. 47.

DETAILED DESCRIPTION OF THE INVENTION

The present invention provides a computer controlled agricultural system which effectively enables one to automatically perform all major agricultural production system activities for the successful production of agricultural products from the planting of the same to the storage of the same ready for sale, if desired, to an end use consumer.

While the applications of the agricultural system of the present invention are not limited, the present invention finds particular application in a fruit tree farm. As will be evident, the agricultural system of the present invention can also be utilized for bush and cane fruits, nursery products and many vegetables. For purposes of illustration, however, the following detailed discussion will be in the context of a fruit tree farm, on which for example, apples, oranges or peaches, are grown as the agricultural system of the present invention finds particular application thereto.

The term "fluid" in the present application includes liquids, gases, solids in liquids (either in dissolved or particulate form), solids in gases and combinations thereof useful in an agricultural system, and the term is purposefully given broad construction. However, for purposes of illustration, unless otherwise indicated, in the following discussion the term fluid refers to water, air or agricultural chemicals dissolved in water, as most generally the fluid delivery subsystem is used to "deliver" water, air or (dissolved) agricultural chemicals in water to desired points.

Figure 15:
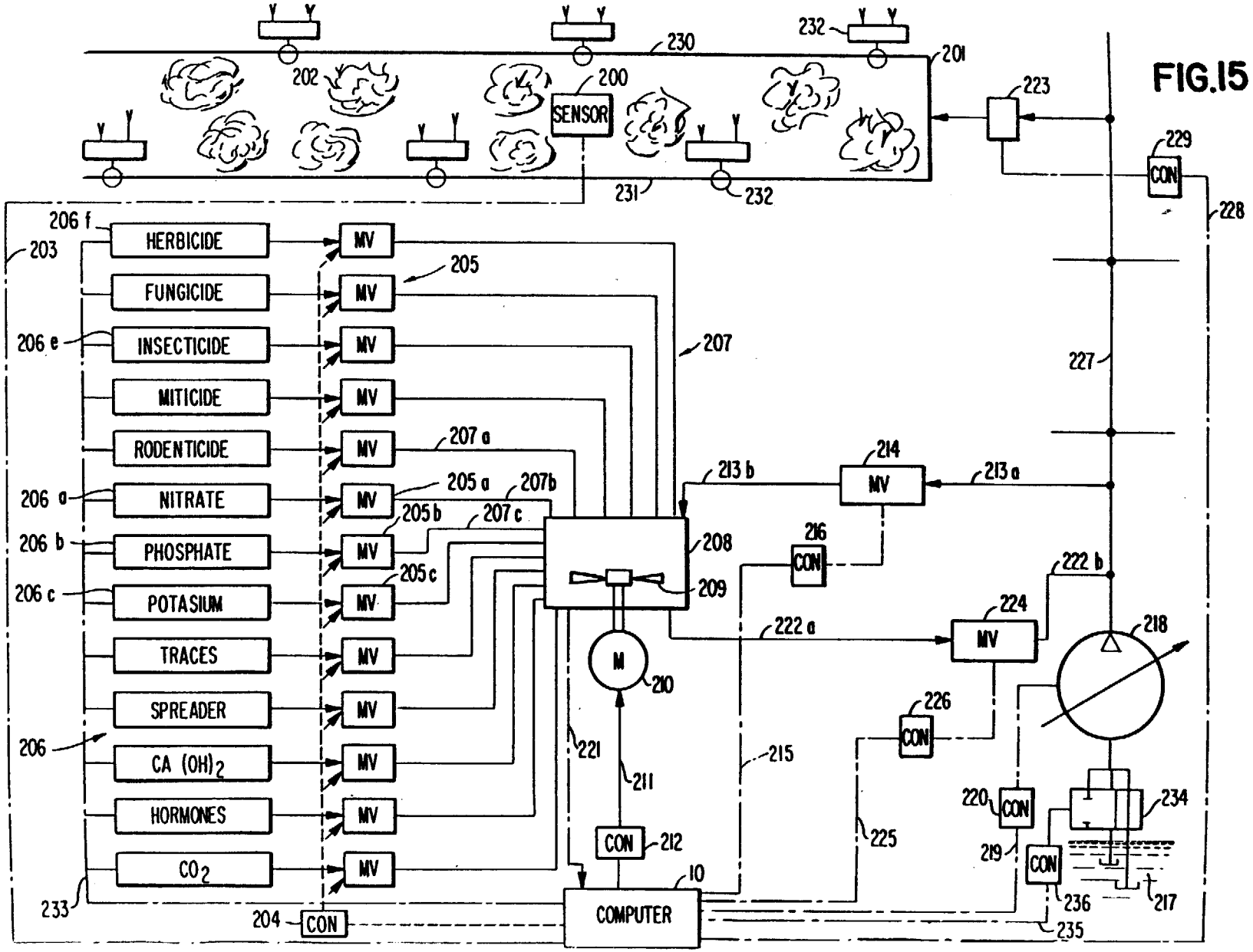
FIG. 15 is a schematic representation of a computer controlled fluid distribution system useful in the present invention.

Further, hereafter all materials, other than water per se, which are dispensed in liquid form via the fluid delivery subsystem are called "agricultural chemicals"; a representative sampling thereof is shown in FIG. 15 in containers 206.

While the operation of farming is viewed by many individuals as a rather simple procedure, in fact, a substantial number of rather sophisticated skills are necessary for successful agricultural production.

For instance, a partial listing of the activities conducted following conventional agricultural production methods on a fruit farm include liming (pH control), fertilizing (provision of nutrients), pruning (plant growth control), brush removal (field sanitation), frost protection (temperature control), spraying (control of insects and disease), thinning, weeding (control of unwanted plant species), cultivation (control of soil permeability), irrigation (moisture control), harvesting, trucking to a packing plant (conveying), cleaning of the agricultural product, culling and sizing (grading of the agricultural product by quality variables), storage of the agricultural product, packing or boxing, transportation to the marketing area, and the like.

The agricultural system of the present invention is adapted to accomplish all of the above conventional functions performed on a typical farm, including greenhouse and hydroponic farming.

However, in addition to the above conventional functions, the agricultural system of the present invention is uniquely adapted to accomplish the following functions which are not generally performed on the average farm:

Continuous sensing of plant needs;

Control of carbon dioxide to promote plant growth;

Control of light to promote plant growth and to enable sensing of plant conditions easily detected under radiation of certain wavelengths;

Chemical growth control involving the application of sophisticated chemicals as opposed to conventional fertilizers;

Humidity control;

Automatic planting of seeds;

Automatic recycling and distribution of plant and animal wastes;

On-farm generation of all energy needs combined with maximum utilization of internal energy, whereby minimal pollution is generated;

Prevention of premature ripening of agricultural products; and

Providing simultaneous maturity of agricultural products, thereby simplifying the harvesting load.

A further substantial advantage provided by the agricultural system of the present invention is the provision of system components which perform multiple functions, thereby avoiding a growing tendency in the agricultural arts today for excessive utilization of apparatus designed to perform one task only a few times a year, thereby resulting in an extremely high duty cycle for major components of the agricultural system of the present invention.

The agricultural system of the present invention in a preferred embodiment thereof comprises the following generic subsystems or means, as these terms are used interchangeably in the present specification and claims:

a. A sensing subsystem comprising remote and direct sensing means as later defined. The sensing subsystem is adapted to monitor all important parameters necessary for the successful production of agricultural products beginning with the planting thereof and terminating with the obtension thereof in a form ready, if desired, for sale to the ultimate consumer. It is important to note that the sensing subsystem of the present invention comprises both remote and direct sensing means as will be later described in detail.

b. A data transmitting subsystem which conveys data generated by the remote and direct sensing means to computing means and instructions from the computing means to various peripheral devices located in the agricultural area (field effectors) via appropriate interfacing means (controllers). In general, a controller converts a low power digital signal into a high power analog or digital signal.

Illustrative, but non-limiting, specific illustrations of various "controllers" in combination with devices which can be controlled are: a diode network which responds to a digitally coded signal and operates a relay which in turn connects high power to an electric motor; a similar decoder which operates a solenoid to turn on a valve, and the like.

An illustrative, but non-limiting, listing of representative "effectors" includes irrigation sprinklers, pumps, solenoids, hydraulic cylinders, flow valves, metering valves, high pressure water jets, slotting saws, and the like.

c. A computing subsystem linked to the indirect and direct sensing means in a pattern of many feedback loops. The computing means is provided with programming which permits the same to utilize stored data and translate sensory information obtained from the direct and indirect sensing means into control settings for various peripheral devices in the agricultural system (effectors).

d. A fluid delivery subsystem which provides:

means for delivering water, chemicals in liquid or gaseous form, air and the like to various parts of the agricultural production area; and means for providing power to various peripheral devices which utilize the power of a moving liquid and/or gas—for example, a water powered (hydromotor) platform.

Having thus described the general components of the agricultural system in accordance with the present invention, the subsystems generally outlined above will now be discussed in detail.

Figure 1:
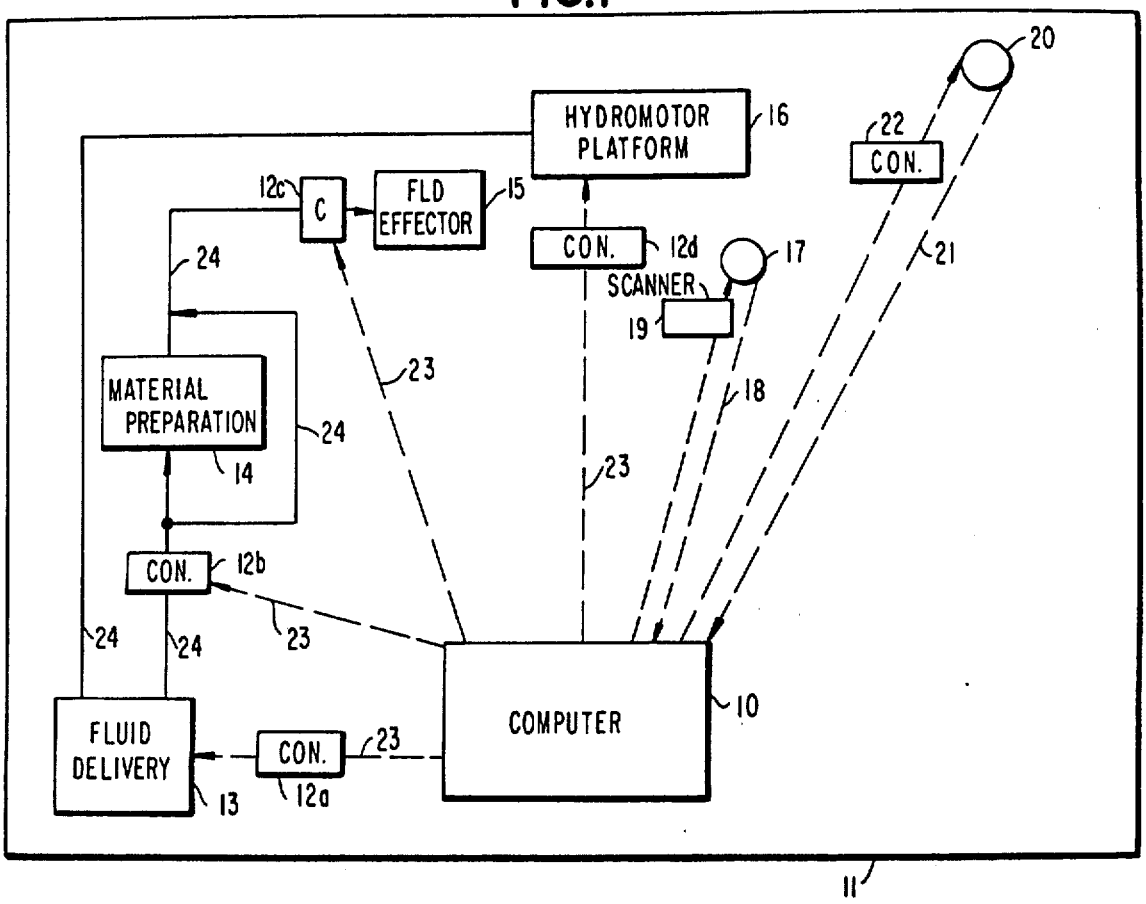
FIG. 1 is a schematic representation of the major components of the agricultural system of the present invention.

The general components of the agricultural system of the present invention, and their interrelationship, are schematically illustrated in FIG. 1.

Referring to FIG. 1, central to the agricultural system of the present invention is computer 10, generally shown disposed within agricultural area 11. Computer 10 can be selected from standard main-frame computers as are currently available to the art, for example, the PDP 11-20, available from Digital Equipment Corp., the Model 2100S available from Hewlett-Packard and the like.

It shall be clearly understood that the exact computer selected for use in the agricultural system of the present invention is relatively non-critical, so long as the computer has sufficient memory capacity. As will be apparent to one skilled in the computing arts, computers as are described above typically comprise input and output units which may include a keyboard and an automatic printout device, respectively, a memory for storing data and programs, and an arithmetic and logic unit for performing computations and other logic operations on data under control of a program. The memory may be composed of a plurality of memory devices including high-speed solid-state or core memories for frequently used data, bulk memories such as magnetic tape for less frequently used data, read-only memories such as diode matrices for table lookup operations, buffer and temporary storage registers and so forth.

Computer 10 is, of course, provided with a standard display panel, be the display visual or written (the display is not shown), and computer 10 is shown in FIG. 1 as connected to various controllers 12a-12d in the agricultural area 11. Controllers are adapted to receive a digital code signal from computer 10 and to thereafter appropriately activate or deactivate devices in the agricultural area 11. For instance, the controller can be used to receive an appropriate code signal from computer 10 and activate an electrical motor. Such interfacing means are well known to the art, and in this respect any conventional apparatus adapted to receive a code signal from a computer and thereafter convert that code signal into an appropriate device activating signal can be used. Typically, the code signal is a digital code signal.

Turning to some of the other primary components of the agricultural system of the present invention, computer 10 is shown linked to a fluid delivery subsystem 13 by way of controller 12a; typically, controller 12a will receive a digital code signal from computer 10 and activate, for example, an electrically controlled solenoid valve which permits water to be delivered to an effector, such as a sprinkler.

Computer 10 is also shown linked to controller 12b, interfacing the fluid delivery subsystem 13 of the present invention with a material selection and preparation subsystem 14 as is later exemplified with reference to FIG. 15. Material selection and preparation subsystem 14 could be, for example, mixing means where water from the fluid delivery subsystem 13 is combined with agricultural chemicals and therafter forwarded to a field effector such as generally shown as 15. A typical field effector could be, as earlier indicated, a sprinkler. In this case, the field effector 15 is under computer control by way of controller 12c which permits water flow thereto via a flow valve (not shown). The fluid delivery subsystem 13 is also shown linked to a hydromotor powered platform 16 (which will later be described in detail), in this case the hydromotor powered platform 16 being shown linked to computer 10 by way of controller 12d.

Direct sensors 17 are schematically shown as linked to computer 10 by data transmission lines 18, scanner 19 being generally shown as inserted in the data transmission lines.

Also shown in FIG. 1 is indirect sensor 20, shown linked to computer 10 by way of data transmission lines 21 in combination with controller 22.

Data transmission lines not specifically referenced above are generally identified in FIG. 1 as 23. Fluid flow lines are generally identified as 24.

It is to be specifically noted that FIG. 1 aptly illustrates three primary concepts of the present invention:

1. The use of current state of the art computer technology to effectively control a farm;
2. The maximal utilization of the capabilities of fluid to perform many functions on a farm which have heretofore not been utilized; and
3. The use of a pattern of many feedback loops linking the computer to data generating means an instruction receiving means.

THE SENSING SUBSYSTEM

The sensing subsystem of the present invention comprises two essential types of sensors: indirect sensors and direct sensors, both of which are linked to the computer subsystem via a data transmission subsystem in feedback loop patterns.

At several points in the following discussion, the term "field sensor package" will be utilized. In the present invention, a "field sensor package" is a generic term utilized to represent the field sensors involved in maintaining a homogeneous agricultural area; a field sensor package can include any or all of the sensors, be they direct or indirect, earlier recited. It is a term used for purposes of convenience in the following discussion.

It is generally necessary that one "set" of direct sensors be provided for each homogeneous area in the agricultural production area, that is, a section of the field in which the species of plants, soil type, sun exposure, slope, wind exposure, and the like variables are identical. This insures sensing of all important parameters for that homogeneous agricultural area.

The indirect sensors can, and generally will, be utilized to gather data from more than one homogeneous area of the agricultural production area; thus, generally indirect sensing will occur on a periodic basis. It is thus seen that with indirect sensors a "set" thereof will usually serve a plurality of homogeneous agricultural areas.

The reason that direct and indirect sensors are keyed to homogeneous agricultural areas is a practical one—i.e., if all variables in a particular area are homogeneous, then computer control for the entire area under consideration can be effected more economically.

One exception to the above correlation of sensors with a homogeneous agricultural area is means for sensing weather conditions, as generally weather conditions over the entire agricultural area will be substantially identical. Exceptions might be encountered, of course, due to topographical variations if the agricultural area is extremely large, and in such case more than one weather sensing system will be used.

The concept of a "homogeneous agricultural area" is, as indicated above, an important one to the present invention. It shall be specifically understood, in this regard, that "homogeneous agricultural areas" need not be rigid in accordance with the present invention but, in fact, can be changed as conditions dictate. For example, during one season of the year a homogeneous agricultural area might include a certain set one-acre area, whereas during another season with changing climatic conditions the homogeneous agricultural areas might differ somewhat. The concept of variable boundaries of the homogeneous agricultural areas of the present invention is a valuable one as it permits maximum benefits to be obtained from the computing subsystem.

DIRECT SENSING MEANS

Variables particularly amenable to direct sensing in the agricultural system of the present invention include percent soil moisture, ground temperature, pH, nitrate/phosphate/potassium ion concentration, and preferably, carbon dioxide concentration. Weather conditions, for example, air temperature, wind velocity and direction, humidity, pressure, rainfall, and sunlight energy spectrum can be measured by a separate weather sensor package.

The above listing of variables will be appreciated by one skilled in the art as obviously not all-inclusive. For example, the listing of variables amenable to direct sensing could include any of the 17 elements necessary for plant growth and reproduction, i.e., carbon, oxygen, hydrogen, nitrogen, phosphorus, potassium, calcium, magnesium, sulphur, iron, manganese, copper, zinc, boron, molybdenum, chloride and cobalt.

Nitrogen, phosphorus and potassium are specifically listed because these are the primary nutrients for plant growth and reproduction and are generally present in the lowest quantities relative to plant needs. Because of their importance for plant growth and reproduction, and their relatively wide fluctuation during a plant growing season, the amounts thereof must generally be sensed more frequently than secondary variables as discussed above, such as calcium, magnesium and sulphur.

The direct sensors utilized in the agricultural system of the present invention can be selected from conventional sensory means. It is preferred, as will become clear from the later discussion regarding the data transmission system, to utilize direct sensors which generate an electrical signal which can be transmitted via the data transmission subsytem to the computer subsystem. For example, direct sensing means as follows are useful in the agricultural system of the present invention:

1. Percent soil moisture can be sensed utilizing apparatus as described in Phene et al, "Measuring Soil Matrix Potential In Situ By Sensing Heat Dissipation Within A Porous Body": I. Theory and Sensor Construction, Soil Science Society of American Proceedings, Vol. 35, No. 1, Madison, Wisconsin, January-February-1971.

2. Ground temperature can also be sensed using the means described in the above citation.

3. pH can be sensed utilizing, for example, Corning Code 0150 Glass Electrode, pH meter Model 801 (Orion Research, Inc., Cambridge, Mass.) or carbon electrodes as are known in the art.

4. Nitrate ion concentration can be determined utilizing liquid ion-exchange electrodes manufactured by Orion Research, Inc.

5. Potassium ion concentration can be determined using glass electrode type 78137V, manufactured by Beckman Instruments Company.

It should be noted that in those instances wherein direct sensing electrodes are used to determine a certain condition, for example, the concentration of nitrate ions or potassium ions, response separation from the electrodes is performed utilizing matrix inversion to obtain the desired signal from the interfering background "noise". While matrix inversion is known in the art and has been performed in the laboratory, it has never before been performed "On the line" to directly control an agricultural process as is accomplished in the agricultural system of the present invention.

6. Other parameters can be sensed utilizing apparatus currently available which is easily rendered compatible with the data transmitting and computer subsystems of the present invention, e.g., carbon dioxide can be detected with a device as described with reference to FIG. 2, air temperature by a thermistor bead which is part of the carbon dioxide sensor described with reference to FIG. 2, wind velocity using an anemometer, wind direction using a weather vane coupled to a potentiometer (voltage output being proportional to the angular position of the potentiometer), humidity utilizing electrodes imbedded in a hygroscopic porous medium to measure conductivity, air pressure using an aneroid barometer coupled to a potentiometer (providing a voltage output proportional to pressure), the intensity of sunlight utilizing a plant growth photometer available from International Light, Inc., and rainfall by a rain gauge comprising two carbon electrodes in a calibrated tube, the two carbon electrodes connected to a Wheatstone bridge which becomes more and more unbalanced as the water level in the calibrated tube rises.

Figure 2:
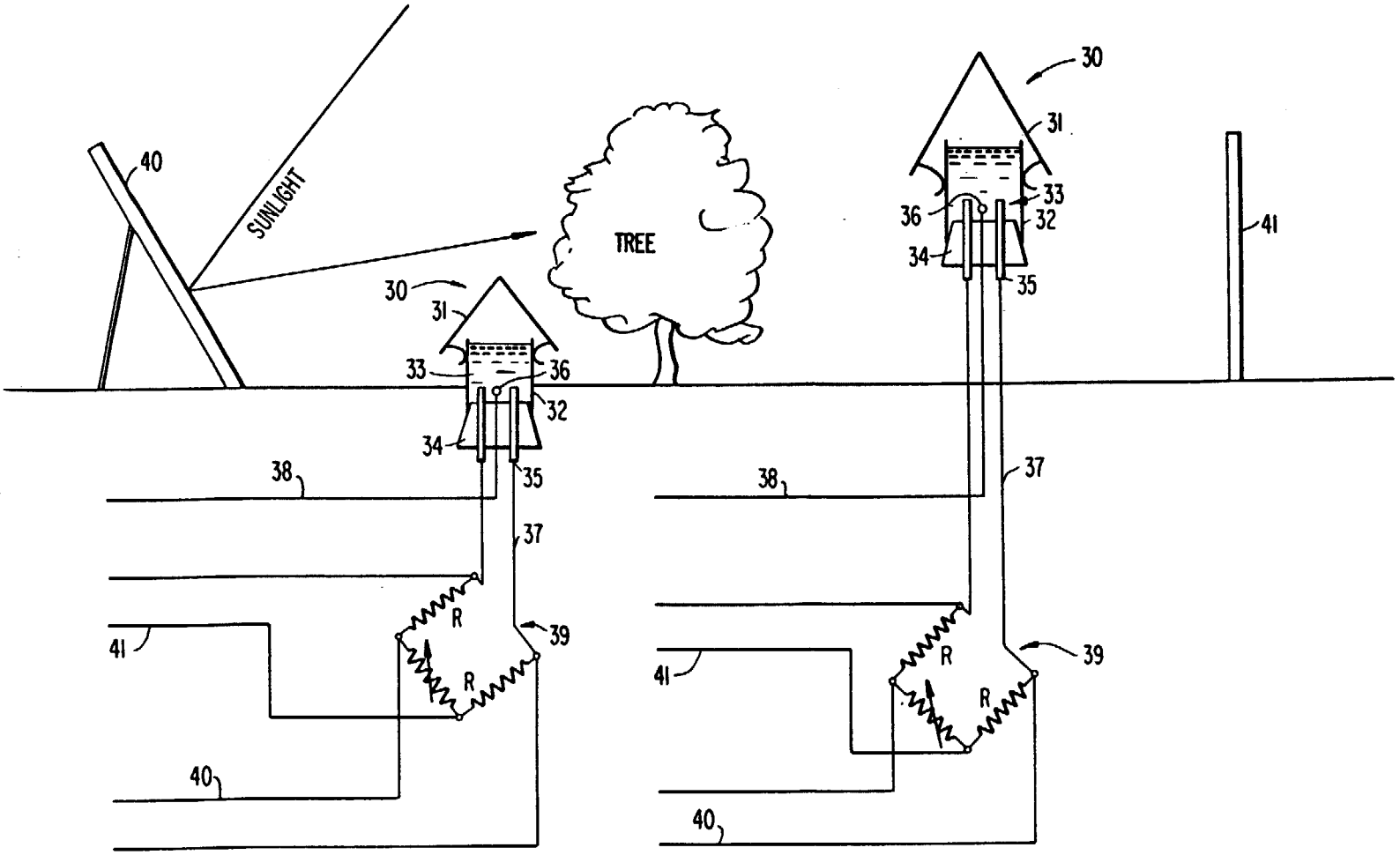
FIG. 2 illustrates a carbon dioxide direct sensor.

A specific exemplification of a carbon dioxide detector which finds use in the agricultural system of the present invention is shown in FIG. 2. Referring to FIG. 2, the carbon dioxide detector is generally indicated by numeral 30, and comprises a sun and water shade 31, a container 32 shown holding distilled water 33, an electrically and fluid impervious support 34 for carbon electrodes 35 and temperature thermistor 36, appropriate leads from the carbon electrodes (generally designated as 37) and from the thermistor (generally designated as 38). A conventional Wheatstone bridge is designated 39.

Direct sensor leads from the Wheatstone bridge to the data transmission sub-system are generally designated 40, and effector leads from the data transmission system are generally designated 41. Leads 40 and 41 are, of course, in communication with the computer sub-system.

When the carbon dioxide sensor shown in FIG. 2 is to be interrogated by the computer sub-system, the computer applies a direct voltage across the bridge 39 and at the same time measures the voltage across the remaining two branches of the bridge 39, the latter voltage being an indication of the carbon dioxide concentration at the site.

The concentration of carbon dioxide can be determined by measuring the pH of a water sample contained in refluxing means with a pH detector, a rather sophisticated arrangement, or simply by taking conductivity measurements of a pure water sample containing carbon dioxide as carbonic acid, as shown in FIG. 2. At saturation, the pH of carbonic acid is 3.8 at 77° F. Carbonic acid concentration results in an approximately linear variation in pH at a given temperature. It will, accordingly, be necessary for the computer to simultaneously measure the temperature of the carbonic acid containing water sample undergoing analysis, but since air temperature measurements are generally required throughout the agricultural system of the present invention, this does not impose an additional burden upon this system.

For the system shown in FIG. 2, twelve output leads are required in total, six for each carbon dioxide sensor. These leads are connected to the data transmission system where they are later reduced to one lead as explained with reference to FIG. 9. Two sensors per site are needed to measure the concentrations at two altitudes, since carbon dioxide is heavier than other components of the air, and will settle to the ground.

A carbon dioxide sensor is interrogated by the computer applying a direct voltage across the Wheatstone bridges 39, and, at the same time, measuring the voltage across the other two branches of the bridges.

Since the output of the carbon dioxide sensor is a voltage, it will be apparent to one skilled in the art that the Wheatstone bridges 39 are initially adjusted for normal ambient carbon dioxide concentrations, conductivity measurements for the carbonic acid/water sample being programmed into the computer at various pH/temperature conditions. This is relatively simple since variations in conductivity are basically linear with respect to temperature and pH changes.

Also shown in FIG. 2 are a north baffle 40, and a south baffle 41. In general baffles are placed to enclose a contour line of an elevation. The function of these baffles is to retain carbon dioxide introduced into the agricultural area to promote plant growth. Carbon dioxide will generally be introduced via the fluid delivery sub-system as will be later explained.

It will be appreciated that although only one direct sensor interrogating means has been described above, similar means are utilized to interrogate other direct sensors since, generally speaking, all direct sensors are chosen to generate an electrical output which can be interrogated by the computing subsystem by sampling the output of the sensor at the Nyquist rate.

INDIRECT SENSING

The term "indirect sensing" implies that a homogeneous agricultural area, or plurality of homogeneous areas, may be subjected to analysis by sensors which need not necessarily be present in the homogeneous agricultural areas(s) undergoing sensing. For example, the indirect sensors can be mounted on a tower which permits observation of the desired homogeneous agricultural area(s), on a tethered balloon, can be carried in an airplane, a satellite or combinations thereof can be used.

In research accomplished at Purdue University, an aircraft-mounted oscillating mirror was utilized to reflect light from the ground and the light detected using a photo-detector, the output signal being recorded on a magnetic tape. A portion of the light was split using a half-silvered mirror, subdivided by a prism into four bands and each of the resulting photodetector outputs recorded on magnetic tape. The tapes were then replayed through a pre-amplifier and an analog-to-digital converter, the resulting output being introduced to a computer programmed to recognize contours for variables being measured, the computer then printing out a contour map for crop species and the like. Llimitations in the described system were, however, small scale, excessive delay for real-time control, and, importantly, poor registration of successive images.

Data can be taken in the form of photographs using a camera, by electronic scanning, by direct human visual observation or the like.

In accordance with the agricultural system of the present invention, natural sunlight need not be the only type of radiation utilized; on the contrary, not only can sunlight be used but broad-band artificial light or narrow-band artificial light can be used, an example of the latter being from a coherent laser.

If desired, a plurality of indirect sensing means can be used to view a homogenous agricultural area(s) from a number of different viewpoints, thereby permitting a geometric perspective to be gained, permitting both sides of the plants to be viewed and, inherently, increasing the number of sample points involved.

In the context of the present discussion, it should be understood that "viewing from a plurality of viewpoints" for the purpose of gathering and recording data implies, for example, not only that viewing can be utilizing a plurality of indirect sensors, for instance, situated on different sides of the plant under consideration, but also implies the use of radiation of varying wavelengths, which essentially can be used to generate highly specific data in different forms from the plant, radiation of different wavelengths being very useful as providing high sensitivity for a particular condition under consideration.

The images or data generated can be interpreted in a number of different fashions, for example, by direct human visual observation by an appropriately trained individual or, alternatively, electronically by comparing the image or data generated with a pre-generated reference image, the reference image permitting a comparison to be made to optimum conditions and enabling the computer to indicate when conditions deviate from optimum. Alternatively, of course, a harmful condition can be stored as a reference image and when the image generated from the indirect sensors corresponds thereto, a similar indication of required action is obtained.

The success of indirect sensing depends upon the fact that any particlar ground condition will generate, upon exposure to appropriate radiation, a particular reflection or emission "signature"; this signature can be compared to known standards to determine the variation from the known standard, and to gain an indication of what remedial action needs to be taken in those cases where the known standard represents optimal conditions. For example, the amount of soil moisture can be detected by the amount of infrared radiation emitted by the soil; for wet soil an infrared photograph or scanning indicates that the ground is cold, and accordingly wet areas will appear dark on an infrared photograph. On the other hand, if the soil is dry an infrared photograph shows the soil to be hot.

It is appropriate to further discuss and exemplify in some detail the various types of radiation sources which can be used.

To date, sensing of the type contemplated for use in the agricultural system of the present invention has involved only natural sunlight and, essentially, has involved only photographic means. See for example, Remote Sensing With Special Reference To Agriculture and Forestry, National Academy of Sciences, 1970; Aerospace Science and Agricultural Development, May 970; and Ecological Surveys From Space, Washington, D.C., 1970.

In no instance has the prior art utilized indirect sensing coupled with a computer for direct control of effectors in an agricultural area.

It is specifically contemplated in the agricultural system of this invention that artificially generated light of a desired wavelength which is specifically keyed to enable maximum data generation of certain desired conditions and/or that desired bands of natural light be used. The artificial radiation can be broad-band, or, if desired, can be restricted to the wavelength region of the radiation that is best matched for the spectral signature being sought.

If desired, the artificial radiation can be used in nondaylight hours, thereby securing reflection spectra with little or no interference with emission spectra.

Of particular interest is the use of narrow-band artificially generated radiation for indirect sensing purposes, such narrow-band artificially generated radiation including but not being limited to radiation generated by monochromatic lasers. When the light from a monochromatic laser is reflected from the homogeneous agricultural area and detected by a flying spot scanner, extremely specific spectral signatures can be obtained, this aspect of the invention being later illustrated with reference to FIG. 5. Example of other types of artificial light sources which can be used include incandescent light, fluorescent light, mercury arc lamps, lithium flares (670 nm), etc.

One important feature of the agricultural system of the present invention relates to the means utilized to mount indirect sensors.

The following discussion deals with such mounting means in detail, and discusses several alternatives.

Assuming that a tethered balloon in utilized, generally it would be secured to the ground by three cables. By varying the length of the cables the tethered balloon could be rendered movable in both a horizontal and vertical plane and could cover a significant area for remote sensing. One of the cables could, in fact, serve as a control cable and a.c. power cable to the indirect sensing means carried by the tethered balloon.

One criterion which should be considered in initially establishing the height of a tethered balloon or the height of a platform utilized is the optical resolution of currently available commercial vidicon scanners. This is typically on the order of 400 usable scanning lines per frame (horizontal and vertical directions), and such will suffice for most uses. While sophisticated vidicon scanners are available which will enable a scanning of about 1000 scanning lines per frame, the cost of such is relatively high, and, unless a large agricultural area can be scanned with one such scanner, usually lower cost vidicon scanners will be utilized.

One substantial advantage encountered with the use of a tower(s) or tethered balloon(s) is that images can be recorded with sufficient frequency to enable field effectors to be controlled on a real time basis; substantial difficulties would be encountered in achieving real time sensing using indirect sensing from an aircraft or a satellite.

Since animation is generally not required for field sensing, scanning of field sensors (direct and indirect) can be performed at very low rates, for instance, on the order of about one frame per minute, and the signal thus generated can be returned to the computer over low bit rate transmission lines or, if the line is relatively short, over an analog line. Because of the computer comparison used in this invention, it is necessary with any indirect sensing means used that succeeding frames be in accurate registration with preceeding frames to enable an accurate comparison. Accordingly, it is an essential requirement for indirect sensing that extremely accurate image registration be obtainable on a reproducible basis. Because of this requirement, and the requirement for high resolution, photographic means in satellites or aircraft-mounted sensors are not preferred.

An alternative to a tethered balloon is, of course, the utilization of multiple towers at appropriate locations throughout the agricultural area. Several advantages accrue with the utilization of multiple towers, since such towers can serve various functions in addition to supporting the remote sensing means, including:

1. To mount a home TV antenna;
2. To mount communications transceiving and/or telemetry transceiving antennas;
3. To mount appropriate weather instruments and other indirect sensors;
4. Farm surveillance using the same cameras used for indirect sensing;
5. The tower can, if desired, be used for water storage in the manner similar to a typical water storage tower and can, if desired, by used for the cold underwater storage of farm products (as will later be described in detail), as the secondary reservoir in an energy conservation system and for like purposes;
6. The tower can be used to mount a windmill for pumping water and/or driving a generator to charge batteries or the like, the combination of water, wind and batteries being used to ensure a constant-output energy supply;
7. The tower can be used to mount artificial radiation generating sources which can generate radiation serving various purposes in the agricultural system, for example, to control both wanted and unwanted growth.

The number of towers required will obviously be determined by the nature of the agricultural product involved and can easily be determined by one skilled in the art. For example, assuming an agricultural area which contains semi-dwarf apple trees, 12 feet in height, rows of such trees spaced every 10 feet, towers 100 or 150 feet high will have a clear view of an area of at least 250 feet in radius (4.5 acres). Ground plants such as strawberries or field crops could be adequately scanned over great distances using a smaller tower, of course.

A number of various alternatives can be used to gather and record data for either manual or machine processing by way of indirect sensors. A number of these alternatives will now be discussed in detail.

For sake of illustration, it will be assumed that the agricultural area of the present invention consists of 12 contiguous homogenous agricultural areas, each of which must be observed. For example, each homogenous agricultural area might be on the order of 30 acres.

It must be kept in mind that in accordance with the present invention it is not essential to view the entire agricultural area of the present invention at one time; it is necessary, however, to secure a sufficient sample of the agricultural area such that the conditions within individual homogeneous agricultural areas can be statistically derived. In the following description, sampling procedures are described in which the sample size can range up to 100%, which procedures can be utilized to gain an accurate summarization of the conditions that exist within the agricultural area or, more correctly, within the individual homogeneous agricultural areas.

One initial point to consider, which has already been alluded to, is the location or site of the indirect sensor; for purposes of the present discussion the indirect sensor will be assumed to be a tower mounted television camera. It will be apparent to one skilled in the art, however, that the following discussion will hold for indirect sensors in general.

It is possible to use one camera to cover several homogeneous agricultural areas in order to decrease the number of cameras required, or, alternatively, one may utilize several cameras to obtain as many points of observation for one or more homogeneous agricultural areas as possible. An obvious instance where multiple observation points would be required would be where due to topographical factors substantial variations occur in lighting conditions. Another example of when multiple observation points would be desirable is to locate and control the position of devices in the field, e.g., by means of triangulation performed by the computer using angular position data from the camera(s).

Whether one camera is used to cover several homogeneous agricultural areas to reduce the number of cameras or several cameras are used to obtain an many observation points as possible, generally remote control of individual cameras will be necessary, and for complete flexibility means must be provided for adjusting the variables of interest, which can include pan, tilt, zoom, focus, aperture, band pass and polarization. While providing these features may substantially increase the cost of inexpensive monochromatic vidicon cameras that can be used for most observational purposes, in certain instances the benefits attendant to such features will more than offset the increased cost.

Commercial devices are currently available which permit all of the above variables to be remotely controlled via a manual "joy-stick" control. Such devices would be particularly appropriate where the TV cameras are to be controlled by an operator.

Alternatively, it is feasible to directly control the above variables by the computer, and since generally a predetermined routine will be followed by the indirect sensors, the programming for the remote sensors will be relatively simple.

Several alternative systems will now be discussed in detail; assume 12 one-acre homogeneous areas are to be scanned.

In the first alternative, fixed cameras are provided which are trained on areas which represent an acceptable sample of a homogeneous agricultural area which is to be subjected to indirect sensing. As the camera is fixed at the desired location, upon activation an individual camera returns its signal to a television monitor or a video tape recorder, or to both, whereafter the view can be analyzed by a skilled observer or by computer analysis, or both. A clock signal from the computer can be impressed upon the recorded image to record the exact time and data of the scene as it is viewed. If desired, a sound track can be multiplexed onto the tape to record the observer's impressions at the time of viewing.

Advantages of this particular alternative are that, if desired, full-time coverage of sample area can be obtained since the cameras are fixed, that the viewpoint and camera adjustments can be individually optimized for each viewing scene and, primarily, that it is extremely simple to install and utilize. The primary disadvantage of this alternative is that substantial numbers of cameras are required, in view of the fixed nature thereof, and more data than is necessary may be produced, since the sampling requirement would not call for imaging 100 percent of the time.

A second alternative is similar to that described above except that four cameras, four monitors and four video tape recorders are utilized. The major modification from the first alternative involves the use of remotely controlled cameras, necessary so that all homogeneous agricultural areas can be examined by remote control of pan, tilt, zoom, aperture and spectral band adjustments.

Since each camera basically is utilized to view a plurality, for example, three homogeneous agricultural areas, the sequence of viewing can be pre-programmed in the computer and the cameras automatically activated to sequentially examine the homogeneous agricultural areas under consideration. Separate records of each homogeneous agricultural area can be recorded on the video tape recorders for later analyses by a skilled observer, or by computer analysis.

This particular arrangement will also find use when artificially generated radiation is used to secure remote images, in which case each of the four cameras would pan across the three homogeneous agricultural areas under individual consideration for that camera in a single arc of constant radius, thus avoiding the cost and time loss of remote control of zoom and focus. If desired, a lens-aperture-light combination can be used to provide broad depth of focus (or field).

The above panning procedure also offers the advantage, when artificial light is used at the camera location, that camera aperture changes can be avoided since the light distribution increases from maximum to minimum from the light source to the most distant point.

The second alternative requires an indexer and a signaling lead, used to indicate to the observer (or to the computer) which area is being viewed, or, alternatively, a visually observable indicator can be placed as an identifier, the index can be derived from a remote control box, coded and recorded on the sound track of the video tape recorder as it is recording the scene under observation.

The major advantage of this above alternative is cost reduction, i.e., the number of cameras is substantially reduced. A further advantage is that the cameras can be utilized to cover any area as long as each camera stays focused on an area of constant distance from the camera.

A disadvantage of this alternative is that only a third of the areas can be viewed at one time; however, for certain sampling situations this will be entirely adequate.

A third alternative is similar to the second alternative above, except each camera is switched one at a time to a plurality of video tape recorders, the individual tape recorders being either manually or automaticaly activated as the camera pans across the desired homogeneous agricultural area(s). Many alternative embodiments are possible, ranging from one camera serving twelve video tape recorders to, for example, four cameras each serving three video tape recorders.

The main advantage of this alternative over the second alternative described above is best illustrated where twelve video tape recorders are used in combination with four cameras, viz: each video recorder contains a record for a separate sampled area, instead of the records for separate areas being presented in sequential order on one video tape as would be the case with a camera panning across three homogeneous agricultural areas as in alternative two. Further, no indexing is required in this embodiment.

A disadvantage of this particular alternative is that data generation of a particular homogeneous agricultural area is possibly only one third of the time, on an average.

A fourth alternative is similar to the third alternative above but rather a plurality of cameras is utilized to record on one or two video tape recorders using an electronic sampling gate. Such an embodiment is shown in FIG. 3, which represents a time division multiplex system to minimize the use of a video tape recorders.

Figure 3:
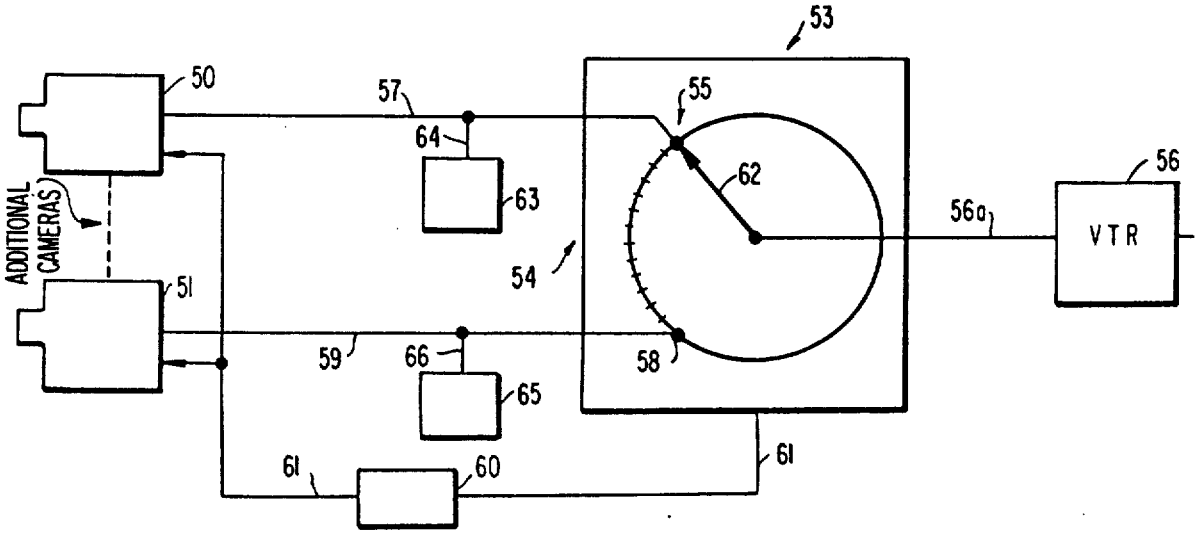
FIG. 3 shows indirect sensing means with an electronic sampling gate which can be utilized in the present invention.

Referring to FIG. 3, camera 50 represents the first camera in a twelve camera set, and camera 51 represents the twelfth camera in the twelve camera set; for purposes for simplicity, cameras 2 through 11 are omitted.

53 generally indicates an electronic sampling switch provided with twelve contacts generally indicated at 54, contact 55 being shown to place the video tape recorder 56 in electrical communication with camera 50 via lines 57 and 56a, and contact 58 being shown to put video tape recorder 56 into electronic communication with camera 51 via lines 59 and 56a.

Synchronization generator 60 is shown connecting switch 53 to cameras 50 and 51 (it would, of course, be connected to all cameras in the twelve camera set) via line 61. Its function, of course, is to insure that all frames are initiated at the proper time.

Assuming all twelve cameras are connected to the electronic sampling gate 53 and contact switch 62 of electronic sampling gate 53 is rotated at a frame rate of 30 frames per second, then in twelve thirtieths of a second the video tape recorder would have recorded one frame from each of the twelve cameras, whereafter the above cycle is repeated.

Upon playback, the video tape recorder 56 will deliver the frame from the first camera 50 to a storage monitor 63 via lines 57/64, will deliver the first frame from the second camera to a second storage monitor (not shown), etc., until the first frame of camera 51 is delivered to storage monitor 65 via lines 59/66. Each storage monitor thus receives an additional frame every twelve thirtieths of a second.

Ordinary television monitors will not work on such a signal since they need a frame every one thirtieth of a second, and inexpensive video tape recorders can not be speeded twelve fold to provide such capabilities. Thus, the monitors must be provided with a storage tube to maintain the frame received until the next frame is received. Since the frame receipt rate in the embodiment described in FIG. 3 is only two and one-half frames per second, the apparatus described does not provide animation. If animation is required for any purpose, the frame rate can be increased by assigning fewer cameras to each video tape recorder. For example, if only three cameras are provided per electronic sampling gate, the frame receipt rate can be increased to ten frames per second on playback, which would be an adequare animation level for securing information from human conversation, or for remote control of the hydromotor platform.

The advantage of the alternative above described over the earlier alternatives is that it provides full time coverage of all sample areas; disadvantages are that picture quality is somewhat degraded on playback and that some gray scale distortion will be encountered due to the use of memory storage tubes in the storage monitors.

If desired, this defect can be overcome by utilizing a dynamic storage in the computer and having the dynamic storage feed a conventional CRT monitor. In such case, the memory storage tubes can be omitted. The dynamic storage can use acoustic delay lines or other devices such as charge-coupled devices. In this arrangement, only one monitor can be used if desired, and the computer can continue "refreshing" the image until the viewer (or computer) desires to observe the next homogeneous agricultural area.

In the fifth embodiment, cameras are utilized which can be remotely controlled with respect to pan, tilt, zoom, focus, aperture and spectral band to provide multiple points of view of each area being sampled. In this embodiment, switching is also utilized to provide reliability and to concentrate both cameras and VTR's to permit the use of smaller arrays. This embodiment will be explained with reference to FIG. 4, which illustrates indirect sensing means involving twelve separate remote controlled cameras in combination with twelve VTR's.

Figure 4:
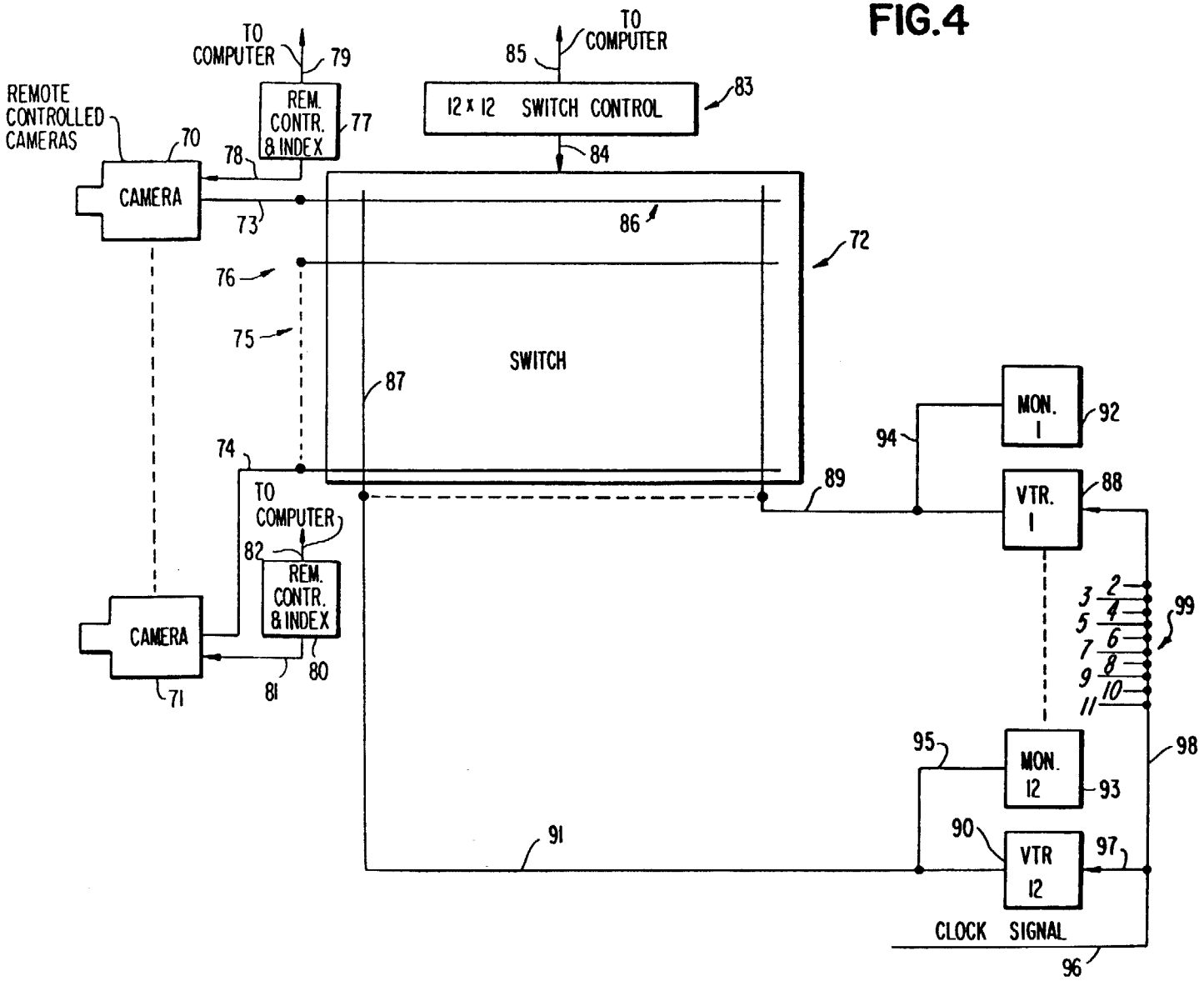
FIG. 4 shows another sampling means.

Referring to FIG. 4, only the first and twelfth cameras in the twelve camera array are shown, the first camera being identified as camera 70 and the twelfth camera being identified as camera 71.

Camera 70 is shown in electrical communication with switch 72 via line 73, and camera 71 is shown in electrical communication with switch 72 via line 74.

The second to eleventh cameras would also be joined to switch 72 by way of similar lines generally indicated at 75, in this instance the communication line for the second camera generally being indicated by 76.

Camera 70 is also shown linked to a remote controller and indexer 77 by way of data transmission line 78; remote controller and indexer 77 is in electrical communication with the computer (not shown) by way of line 79. Camera 71 is in electrical communication with remote controller and indexer 80 by way of line 81, remote controller and indexer 80 being linked to the computer (not shown) by way of data transmission line 82.

Switch 72 is controlled by switch control 83 by way of line 84, which switch control itself is linked to the computer by way of data transmission line 85. Switch control 83 permits switch 72 to place any of the cameras in the twelve camera array into communications with any of the VTR's as will later be explained.

Returning now to the remote controller and indexers 77 and 80, the functions of these particular devices will now be explained in detail; since the functions of remote controller and indexers 77 and 80 are substantially identical, only one explanation will be offered for remote controller and indexer 77.

The first function is to receive instructions from the computer via line 79 which permits the pan, tilt, zoom, focus, aperture and the filter selection of camera 70 to be controlled.

Typically this will be accomplished by the use of positioning motors in the remote controller and indexer. The positioning motors can be controlled in many different fashions; for example, a digitally encoded signal can be generated by the computer and forwarded to the remote controller and indexer 77 via line 79, a decoder (not shown) in the remote controller and indexer can then convert the digitally encoded signal to an analog signal and selectively supply power to drive the motors to control pan, tilt, zoom, focus, aperture and filter selection. Remote controlled cameras of this type are available as current state of the art technology.

The second function of remote controller and indexer 77 is essentially to advise the computer via data transmission line 79 which camera is undergoing remote control and/or viewing (indexing). Any conventional state of the art indexing signal can be applied to line 79 and forwarded to the computer for appropriate recognition of the camera involved, for example, a ground signal, a twenty Hz pulse, and the like. If a substantial number of cameras are being utilized, the indexer most preferably would be a binary number generator which, when the computer connects a certain VTR to a certain camera, generates a binary number representative of the camera undergoing viewing.

The purpose of switch 72 is to provide reliability and maximum concentration of either cameras or of VTR's, i.e., as a review of FIG. 4 will indicate, reducing the number of switch verticals as represented by 87 permits the number of cameras to be reduced, and reducing the number of switch horizontals as indicated by 86 permits the number of VTR's to be reduced. As will be appreciated by one skilled in the art, switch 72 as shown in FIG. 4 is actually a 12 by 12 array, and only one switch horizontal 86 and one switch vertical 87 is shown for purposes of simplicity. In fact, even in the 12 by 12 array shown in FIG. 4, switch 72 serves as a concentrating means since each camera can be, if desired, a multifunctional device, having a plurality of filters, zoom capability and the like.

Since the computer determines the area to be viewed and the camera which is to view that area, the computer can make the choice of the camera and the area to be viewed through switch control 83, camera control generally being conducted in an open-loop fashion, though if the number of choices involved is large, as is the case with the embodiment of FIG. 4, feedback control is desirable. For example, control can be effected as follows: the pan, tilt and zoom servomotors in the remote controller and indexers 77 and 80 can be coupled to a resistance potentiometer so that the position of the camera results in an encoded signal specific to one particular resistance value, the encoded value being transmitted to the computer. If this embodiment is practiced, an analog to digital converter is, of course, necessary.

A second method of accomplishing this result enables identification of the homogeneous agricultural area(s) being viewed to be achieved. Visually observable indicators such as can be automatically interpreted by the computer (e.g., a coded sign mounted on a stake in the field) can be used to permit the camera to scan a number of indicators and, when the appropriate visual indicator is scanned by the camera and the recognition pattern thereon identified by the computer, the camera is trained upon the desired area. This method also enables precise registration of the scene as is required when the same area is to be observed at different times, and the two observations are to be compared by the computer for decision analysis.

Referring now to switch 72 and its relationship with switch control 83, switch control 83 essentially converts digital signals derived from the computer via data transmission line 85 into high-power signals which permit control of switch 72. The exact type of switch chosen can be freely selected. For instance, an electromechanical crossbar switch could be used in which contact springs at the intersection of a switch horizontal (row) and a switch vertical (column), the switch horizontal for camera 70 being identified in FIG. 4 by 86 and the switch vertical for camera 70 being identified in FIG. 4 by 87, are closed by a common select magnet (not shown) on the switch horizontal and a common hold magnet (not shown) on the switch vertical. As an alternative, a time division switch could be used wherein conventional diode gates are utilized instead of mechanical contact springs. Such switching devices are within the skill of the art, and are disclosed in Principles of Switching, Second Edition, Paul Fleming, Paullen Press, Chesterfield, Missouri, 1974.

The relationship of the cameras and the VTR's will, for illustrative purposes, be explained with reference to camera 70.

As shown in FIG. 4, camera 70 is linked to VTR 88 by line 73, switch 72 and line 89. Camera 71 is linked to VTR 90 in a similar fashion by line 74, switch 72 and line 91.

Both VTR's are provided with monitors identified as 92 and 93, respectively, connected thereto by lines 94 and 95. The monitors of the embodiment of FIG. 4 are essentially the same as those that can be utilized in the earlier four embodiments i.e., either ordinary monochrome or color TV receivers or storage television monitors, storage television monitors being utilized in the situation where the picture must be held by the monitor instead of the computer.

If ordinary color TV receivers are utilized, it is only necessary that the computer refresh the picture sufficiently often to prevent picture decay.

In FIG. 4, data transmission line 96 is shown from the computer to the VTR's, being linked to VTR 90 by data transmission subline 97 and to VTR 88 by data transmission subline 98.

Data transmission line 96 would be similarly linked to the second through eleventh VTR's, not shown in FIG. 4 for purposes of simplicity, by way of data transmission sublines generally indicated by 99.

As one will appreciate from the heretofore offered discussion on five illustrative indirect sensing alternatives, the cameras utilized therein can, of course, be capable of performing specialized functions, thereby permitting one to minimize cost and maximize utility. For instance, if desired, one camera in a multi-camera array could be specific to infrared observations, while another could be used only for high resolution observation. In a further alternative, a decrease in resolving power could be offset against utilizing a standard frame rate of 30, thereby permitting the camera to be utilized to detect rapid movement in the area being sampled. A similar approach could be utilized with the monitors and VTR's.

It should be understood, of course, that the term "electrical communication" in the above discussion merely means that appropriate electrical interconnections of a conventional nature are provided to connect the various components under discussion.

While the above scanning means have been described with reference to an indirect sensor of the television monitoring type, such scanning means can be utilized for other indirect sensors, and, in fact, can be used for direct sensors if desired.

As was earlier indicated, the cameras in accordance with the present invention are subject to full remote control, including spectral band control, to provide multiple points of vieqw of each sampled area. The desired spectral band can be obtained using a filter wheel as will be explained with reference to FIG. 5, or, alternatively, by varying the spectral radiation impinged upon the homogeneous agricultural area(s) undergoing sampling, or by a combination of both methods.

As will be apparent to one skilled in the art, the twelve by twelve array as described above can be scaled up or down as required. Further, it will be seen that the described alternative is extremely versatile, since the cameras can cover any portion of the agricultural area of the present invention, not merely the sample areas, and can, utilizing the zoom capability, permit extremely close inspection of individual plants or parts thereof.

As compared to the fourth alternative described above, the present alternative is a ture full-access space-division switching system for remote sensing. Although in the alternative described twelve cameras and twelve video tape-recorders are shown, it will be apparent to one skilled in the art that the switching sub-assembly in combination with the switch control can be utilized to concentrate the number of monitors and VTR's down to a minimum of one camera, or to concentrate the number of cameras down to a minimum of one recorder. The latter alternative, of course, becomes the equivalent of FIG. 4.

Overviewing the concept of indirect sensing, it is valuable to analyze the fundamental variables utilized in indirect sensing and to briefly illustrate the essential variations in these variables. At least nine variables can be considered in the establishment of an indirect sensing means:

1. The source of radiation;
2. The wavelength of the radiation;
3. The observational site of the indirect sensing means;
4. The number of observational sites;
5. The method of generating the indirect sensing image;
6. The method of image interpretation;
7. The time required for feedback between image generation and utilization of the data derived from the image for control purposes;
8. The frequency of generating images from a desired area; and
9. The degree of cross-correlation between data generated by indirect sensing with data generated by direct sensors.

These points will now be discussed in detail.

Turning first to the radiation source, representative radiation sources contemplated for the agricultural system of the present invention include:

1. emissions from the soil or plants which are derived from prior radiation, i.e., involving the inherent retention capability of the soil or plants.
2. direct reflection of natural daylight.
3. artificial electromagnetic sources such as earlier described, e.g., incandescent lamps (broad spectrum), mercury arcs (multiple spectrum lines), lithium flares (narrow band) and lasers (monochromatic).

A particularly useful embodiment of the indirect sensing means of the present invention involves a radiation source generating images in the red, green and blue bands of the visible spectrum. These three colors can be used independently to perform analyses or, alternatively, can be used in combination to generate a color image using the technique originally developed for sequential color television imagery by C.B.S. Laboratories, the individual monochrome images being generated by a single flying spot scanner or television camera.

The wavelength of the electromagnetic energy used for generating images by indirect sensing can be controlled in two primary fashions:

1. By selecting an appropriate frequency band, and
2. By controlling the band width utilized for indirect sensing.

The frequencies utilized can range from the centimeter radar band up through ultraviolet radiation and beyond. For instance, long (radar) wavelengths have the capability to penetrate ground cover and can be utilized to measure the thickness of snow-cover, the height of desirable and undesirable plants, for example, weeds, the thickness of mulch and the like. One consideration involved in determining whether long (radar) wavelengths should be utilized is that large antennas are required, increasing expense. Extremely short wavelength radiation may be needed in certain instances to obtain the highest resolutions, for example, to detect fungus infections and the like.

Illustrative of the many types of radiation which can be used to determine various parameters in the agricultural area are those used in the recent government Skylab program. For example, the microwave L-Band (approximately 20 cm) can be uses to measure water temperature of large bodies of water, the surface conditions of the water and potentially wind direction. Dielectric constant can be used to measure, e.g., salinity variations. Apparatus useful for detecting the microwave L-Band includes, for example, the S194 L-Band radiometer.

The microwave K-Band (approximately 2.0 cm) can be utilized to measure the above parameters (exclusive of dielectric constant) and, in addition, is more suitable for the detection of wind velocity. It is potentially useful to the measurement of wind direction and subsurface slope in large bodies of water. Apparatus to detect the microwave K-Band includes, for example, the S193 Microwave Radiometer/Scatterometer and Altimeter.

The thermal infra-red wavelength region (approximately 10 mm) can be utilized to detect rock and soil types, soil moisture boundaries, water courses - in general, any parameter measurable by way of varying thermal emission.

The intermediate infrared wavelength band (at approximately 0.7–0.9 mm) can be utilized to detect many parameters also measurable using radiation in the visible wavelength band (about 0.4 to about 0.7 mm), for example, distribution of soil moisture by infrared water vapor absorption band analysis, terrain roughness by monochromatic reflection, vegetation types and vegetation vigor by false color interpretation.

Radiation in the visible wavelength band is particularly useful for detectng vegetation by multi-spectral reflection and identifying the type of agent that is causing loss of plant vigor.

If desired, conventional means to sense and analyze radiation of the above wavelengths can be utilized, the apparatus specifically set forth is illustrative only, and other equivalent commercial means will be apparent to one skilled in the art. Suffice it to say that such apparatus is selected so as to provide an output signal compatible with the data transmission subsystem and the computing subsystem of the present invention.

The observational site of the indirect sensing means of the present invention can be varied in two primary fashions:

1. By altering the altitude of the indirect sensing means from the ground plane, and
2. By altering the position of the indirect sensing means with respect to the scene being observed, that is, in the X and the Y dimensions of the ground plane.

The fourth variable above, that is, the number of indirect sensing observational points, has already been explained and will not be discussed in great detail. The fourth variable is important since it substantially expands the completeness of the data generated from a particular area. In this regard, while indirect sensing of a gross nature has been performed both from aircraft and from satellites in broad daylight, it has never been appreciated that multiple-viewpoint indirect sensing in a practical, feasible manner could be conducted from an essentially ground-stabilized position, thereby enabling high resolution, extremely accurate registration of successive frames and multiple viewpoints to be achieved, all of which factors are necessary to obtain sufficient accuracy of computer controlled feedback loops.

The method of generating the indirect sensing images in accordance with the present invention will most typically include electronic scanning and direct human visual observation. At present, the state of the art of indirect sensing has involved the use of photographic techniques, for example, in the Earth Resources Technology Satellite Program (ERTS). Such systems have suffered from a lack of resolution, registration, color repeatability, fidelity and time delay in the feedback control loop. Accordingly, such is not preferred in the agricultural system of the present invention. Rather, the use of flying spot scanners and television technology is preferred, for instance, as later explained with reference to FIG. 5. One substantial advantage of the use of flying spot scanners and television technology is, of course, that at the initial stages establishing the agricultural system of the present invention a human operator can identify the first templates and thereafter such can be appropriately inserted into the computer programming for use by the computer for the interpretation of succeeding images.

Briefly turning to methods of image interpretation as earlier alluded to, absolute interpretation by direct visual observation can be practiced or absolute determination by computer pattern recognition can be used; alternatively, either direct visual or computer comparison can be practiced with a reference image, i.e., using templates.

In the situation where absolute determination by computer pattern recognition is practiced (pure pattern recognition), it is, of course, necessary to program the computer to recognize a particular scene or objects within the scene relative to some decision rule that specifies what action is to be taken.

In the situation where computer comparison to a template is practiced, it is necessary to pre-record a scene, for example, to pre-record the infrared emission from ground when it is saturated after a rain, and to make this scene the norm or standard template for the computer. The decision rule is then written to the effect that when the soil moisture falls to, for instance, 40 percent of the value present on the template, irrigation should be started in that area.

The time required for feedback for image generation and utilization of the data which can be derived from that image for control purposes can be vary substantially with the agricultural system of the present invention; it can range from real time to a delay time of X, where the value of X is determined to be less than the time in which some irreversible patholgoy would occur without some exertion of the required control measure.

The frequency of image generation from an area (frame rate) has been earlier described in some detail; this is, obviously, a continuous variable.

The degree of cross-correlation of data generated by the indirect sensing means of the present invention with the data generated by the direct sensors in an important variable. For many instances, the use of direct sensors will be most advised, while for other purposes remote sensing will be most preferred. While the reliance upon indirect or direct sensors can vary, in the agricultural system of the present invention it is absolutely necessary that both direct and indirect sensors be utilized. The variable will be the degree of each type of sensor which is used, the degree being determined by economics and the state of the art consideration. For instance, readings from direct moisture sensors are highly correlated with the readings from indirect infrared moisture sensors, so that readings from the former can be utilized to calibrate templates from the latter. This improves the precision of temperature measurement by the infrared indirect sensors for which there is little correlation, for instance, in determining insect infestation.

One of the most important differences between the agricultural system of the present invention and indirect sensing techniques used in the prior art is that in accordance with the present invention artificial visible light sources can be used to illuminate the scene to be sensed. In the prior art, artificial illumination has been used by only for relatively long (non-visible) centimeter waves, e.g., radar. In the present invention, radar sensing can be used, but it is not preferred because the resolution obtainable may be less than required to identify plant pathologies. Shorter wavelengths, and narrow-bands, of artificial radiation may be utilized to secure the desired resolution and more positive spectral signatures.

Variables particularly amenable to indirect sensing by the agricultural system of the present invention include, for example, plant temperature, identification of undesired plant species, e.g., weeds, identification of insects and plant diseases, soil moisture contours, thickness of ground cover, determination of some chemical deficiencies or chemical excesses, estimation of crop yield and mapping of ground temperatures. As will be apparent to one skilled in the art, the above listing is not all inclusive but does include some of the most important variables amenable to indirect sensing.

While the majority of the direct sensing means used in accordance with the present invention are relatively inexpensive, in contradistinction the indirect or remote sensing means utilized in the present invention tend to be of higher cost. Accordingly, it is important that the indirect sensing means be utilized for purposes of gathering data from a plurality of homogeneous areas in the agricultural area to minimize the cost of indirect sensing per homogeneous agricultural area.

The particular "signature" generated by an indirect sensor, is, in a preferred embodiment of the agricultural system of the present invention, compared to a standard which is stored in the computer. For instance, in determining the amount of soil moisture by infrared radiation, standards can be set for various homogeneous areas in the overall agricultural area. Once this standard has been set, the infrared response of various soils can be correlated with the amount of moisture contained therein. The amount of infrared radiation generated by a particular homogeneous agricultural area can then be sensed by indirect sensing, for example, by a tower mounted infrared detector, and the information generated compared to the standard and variations therefrom which have been stored in the computer sub-system.

The above concepts of "signatures" comparison are essential to the effective utilization of indirect sensing in accordance with the present invention. The data bank which can be accumulated in a computer serves, of course, as an excellent means to store literally millions of "templates" or "signatures" to which the data generated by indirect sensing can be compared.

Soil moisture detection by measuring the infrared radiation therefrom is one of the simplest forms of remote detection. As example of such will now be described.

Assume an agricultural area with a plurality of individual homogeneous agricultural areas therein. The topography of the agricultural area is, in this instance, generally assumed to be flat. A tower can be installed in the approximate center of the agricultural area, a rotatable turntable provided with means adapted to adjust the plane of the infrared detector in both a horizontal and vertical plane being mounted on the tower. Such apparatus is known in the art and can be constructed so as to be adjustable upon computer command in the horizontal and vertical directions. Communication with the computer can be by way of electronic communication cable, radio, or the like.

The timing of indirect sensing of soil moisture can be selected on predetermined in a number of fashions. For example, the infrared detector can be trained upon a preselected homogeneous agricultural area and, when the soil moisture content as indicated by infrared radiation falls beneath a certain minimum value, such would be detected by the infrared detector and an appropriate signal forwarded to the computer sub-system. This would initiate an overall scanning of the total agricultural area. Rather than continuous scanning, infrared scanning could be, of course, initiated on a periodic basis, for example, hourly. Alternatively, the computer could be programmed to initiate indirect sensing of infrared radiation for the entire number of homogeneous agricultural areas on a timed basis, for example, hourly.

The former procedure reduces the use of the infrared sensor, but the latter procedure is more accurate in gaining an overall determination of the moisture content of the agricultural area.

An important use for the infrared detector would be, of course, to detect the temperature of growing plants in the homogeneous agricultural area. It is an established fact that an unhealthy plant will often have a temperature which varies from that of a healthy plant. In this case, the "template" or normal value lodged in the computer memory would have to be initially determined for the particular plants in the homogeneous agricultural area. However, thereafter an infrared scanning of a particular agricultural are a could be utilized to indicate if that particular agricultural area contains a plant whose temperature varies from the normal or healthy value. By reference to its file of templates the computer will attempt to determine the cause of the deviation. As a last resort, the computer can alert and request the farmer to view the scene over the television link to diagnose the trouble and report back to the computer by keyboard for determination of the necessary treatment.

As another example of template formation, the formation of templates for determining the growth stage of corn will be given. The first step in establishing the templates for the growth stage of corn will be for the farmer to train an appropriate indirect sensor, for example, a television camera, flying spot scanner or the resulting image is then stored in the computer's memory bank and, by way of the input keyboard, information is fed to the computer that the storage image is representative of corn at the known stage of growth. Subsequent images are taken at any desired interval to permit an adequate representation of the corn at all growth stages of interest.

Thereafter, when corn of an "unknown" age is subjected to visual scanning, the computer makes a rapid comparison of the instant image to the "prerecorded" images or templates until the "unkonwn" image can be matched to a prerecorded image or template. In this manner, it is possible, utilizing the computer, to determine the age of the corn.

Figure 5:
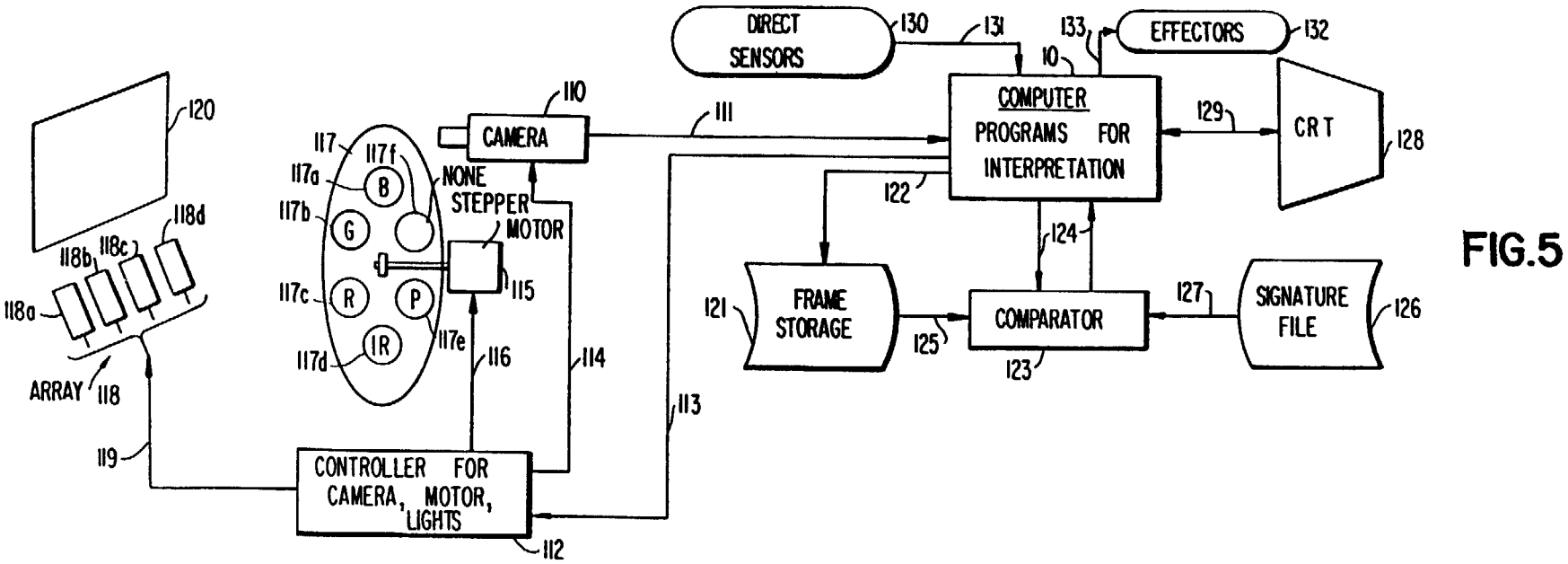
FIG. 5 shows indirect sensing means in combination with computing means and variable radiation generating means.

A schematic representation of an indirect sensor subsystem for multispectral imagery pattern recognition is shown in FIG. 5.

Referring to FIG. 5, there is shown computer 10 in electrical communication with monochromatic television camera 110 by way of data transmission line 111 and in electrical communication with controller 112 by way of data transmission line 113, controller 112 being shown in electrical communication with camera 110 by way of data transmission line 114 and in electrical communication with stepper motor 115 by way of data transmission line 116.

Stepper motor 115 is adapted to rotate filter wheel 117 which contains filter means 117a to 117f in the periphery thereof. By selectively rotating the filter wheel 117, any of filter means 117a to 117f can be inserted into the path of radiation detected by camera 110. To permit accurate registration of the filter means with the camera it is, of course, necessary that stepper motor 115 and filter wheel 117 be securely attached to camera 110 so that misregistration cannot occur.

Controller 112 is also shown in electrical communication with light array 118 comprising radiation sources 118a to 118d by way of control wires 119.

The radiation sources 118a to 118d are adapted to selectively impinge radiation upon agricultural area 120.

For purposes of illustration, computer 10 is shown in communication with frame storage means 121 by way of line 122 and in communication with comparator 123 by way of lines 124. Frame storage means 121 is in communication with comparator 123 by way of line 125. Signature (or template) file 126 is shown in communication with comparator 123 by way of line 127. It will be appreciated by one skilled in the art that the computer, frame storage means, comparator and signature file will, in actuality, be part of the computer, and the above illustration is for purposes of explanation.

CRT display 128 is shown in communication with computer 10 by way of data transmission line 129.

Also shown in FIG. 5 are field sensors 130 in communication with computer 10 by way of data transmission line 131 and effectors 132 in communication with computer 10 by way of data transmission line 133.

Turning to the method of use of the indirect sensors, controller 112 receives an appropriate digital code instruction from computer 10 via line 113 and can translate the same in a conventional manner into a high power output which activates camera 110 via line 114, activates stepper motor 115 via line 116 to permit rotation of the filter wheel 117 to insert a selected one of the filter means 117a–117f into the viewing path of camera 110 and which can, if desired, activate radiation generating means 118 via line 119.

Camera 110, a species of indirect sensor, is in this example a line by line scanning device. Since multispectral use is contemplated, it is preferred that the pickup tube of the camera, or any remote sensor, have a broad spectral response, for example, 300–1,000 nanometers. An alternative to the television camera would be a flying spot scanner or like device. When camera 110 is activated, a constant data output is provided to computer 10 by way of data transmission line 111.

If desired, the signals from camera 110 can be routed by the computer 10 to a short-term buffer memory 121 via line 122. For example, the short-term buffer memory can comprise a magnetic tape recording means wherein blocks of one television frame can be stored. The one television frame can then be compared with a frame stored in signature file 126 in comparator 123 and differences above certain thresholds utilized to initiate corrective action. The rule for comparison will depend on the parameter being sensed. For conditions requiring the highest resolution, point-by-point low resolution, such as sensing moisture contours, moving averages of many points will generally be compared.

If desired, the computer can utilize a plurality of frames in combination. For example, by displaying red, green and blue images in rapid sequence, a full-color image of the homogeneous agricultural area can be obtained, this basic technique being similar to that used in field-sequential, color television systems as are known in the art. Full-color viewing would be especially useful when human visual inspection of the scene is desired, for example, by way of CRT 128.

For the embodiment illustrated in FIG. 5, the radiation generating means 118 comprises four sources of artificial radiation: a monochromatic laser, for example a neon-helium laser, an argon laser or the like, identified as 118a; a lithium flare 118b; a flash 118c such as a xenon flash; and a mercury arc lamp 118d. As will be apparent to one skilled in the art, four radiation sources shown are illustrative only, and not limiting.

When radiation from such specific sources is reflected from the homogeneous agricultural area 120 and detected by the camera 110, a specific condition can be recognized in the homogeneous agricultural area 120. It is necessary, of course, that a "template" be prerecorded or stored in the signature or template file 126, the pre-recorded scene representing a specific condition under examination to which the real-time data which is being generated can be compared in comparator 123. Where artificial radiation sources are used, it is necessary, of course, that the "template" be recorded using the same type of artificial radiation. This permits the computer 10 to compare the data input received to a scene pre-recorded under conditions which provide a basis for comparison.

The primary objective of utilizing any specific type of radiation, or combination of specific types of radiation, in indirect sensing is to select a particular wavelength of radiation or combination of wavelengths which permits a unique signature for a specific condition to be detected and recorded as a template in the computer. In this regard, laser sources offer a potential means to identify specific conditions with great accuracy as the specificity of a signature will be a function of decreasing bandwidth, and extreme specificity can be obtained when one is essentially utilizing a band of radiation comprising one line in the spectrum.

The radiation generating means 118 shown in FIG. 5, however, finds particular application for use in those hours of the day when sunlight is insufficient to provide adequate spectral response, for example, in the early morning hours or in the evening hours. It can be utilized, however, even in the absence of natural sunlight, since at these times the artificial light can be impinged upon the homogeneous agricultural area undergoing indirect sensing to provide a spectral reflection pattern with little or no interference to the emission spectra due to natural sunlight.

Filters 117a to 117f are used to remove undesirable spectra reflected from a homogeneous agricultural area prior to the same impinging upon camera 110. In the exemplification shown, filter 117a passes blue radiation, filter 117b passes green radiation, filter 117c passes red radiation, filter 117d passes infrared radiation, filter 117e is a polarizing filter and filter 117f is a neutral density filter. These six filters are not limiting; in practice, a dozen or more filters may be used.

Assuming, for example, that the condition being subjected to indirect sensing is percent soil moisture and infrared radiation is utilized, in this instance computer 10 would issue an appropriate digital code signal to controller 112 by way of data transmission line 113. The digital code signal is converted by the controller into an appropriate high power signal to activate camera 110 via lines 114 and to train the camera upon the desired agricultural area. In addition, of course, camera 110 would be activated for radiation reception and transmission to computer 10 by way of data transmission line 111.

Assuming that it is desired to insert infrared filter 117d into the viewing path of camera 110, an appropriate high power signal is also issued to stepper motor 115 via data transmission line 116 whereby filter wheel 117 is rotated until infrared filter 117d is inserted into the viewing path of camera 110.

Constant data input is then provided to the computer 10 from the selected homogeneous agricultural area or areas, and thereafter the comparison to a pre-recorded series of templates retained in signature file 126 is conducted. Should the closest "template" in the template or signature file 126 indicate that the moisture level in the homogeneous agricultural area is low, the computer would, via an appropriate controller, issue a command to initiate irrigation in the homogeneous agricultural area and, by continuous indirect sensing (feedback loop), would terminate irrigation at the point where the water level in the homogeneous agricultural area has reached a sufficient level. Alternatively, the termination point of the irrigation can be determined by computer calculations of the type to be explained later in connection with the flow charts of FIG. 16.

It shall be understood by one skilled in the art that the above apparatus is only illustrative of one indirect sensing means which can be utilized in accordance with the present invention, and that the components of the apparatus described with reference to FIG. 5 can be replaced by equivalents.

As will be appreciated by one skilled in the art, lines 111 and 113 in FIG. 5 will generally be interfaced with a plurality of remote sensing means (array 118, controller 112, camera 110, etc.) by way of a switching system as shown in FIG. 4 to permit time-division multiplexing. By use of a switch and switch control combination as shown in FIG. 4, a substantial number of cameras and controllers can be selectively brought into communication with the computer. A simple modification of switch 72 as shown in FIG. 4 will permit a camera and controller to be simultaneously brought into communication with the computer.

CONTROL OF RADIATION IN THE AGRICULTURAL SYSTEM OF THE PRESENT INVENTION

The following discussion describes an important but optional feature of the present invention and relates to a subsystem for the control of radiation to achieve various desirable effects. (It should be noted that the control of radiation discussed in this section is in addition to that utilized for indirect sensing which, as will be apparent, can also involve a control of radiation to achieve maximum data sensing capability as earlier explained.)

The radiation control subsystem of the agricultural system of the present invention is based upon the use of three sensors which respond to and integrate sunlight energy in three bands which provide physiologically active irradiation, namely blue (400–500 nm), red (600–700 nm) and far-red (700–800 nm). For example, the sensing subsystem can consist of three photocells each responding in one of the recited bands, or it can consist of the flying spot scanner (or camera) as shown in FIG. 5 (which has response across the visible band) equipped with filters for each of the recited bands above, and the like. In any case, the output response derived from the sensors is forwarded to the computer by way of a data transmission line so that the computer can compare the integrated light with that required by the plant. The computer can then determine how much, if any, radiation must be provided artificially in each band to bring the plant under consideration to maximum growth, if that is the result desired. The resulting decision can then be translated into switch and timer settings for radiation generating means as will now be described.

Ideally, three independent sets of field lights are used to control the five principal photochemical reactions: (1) chlorphyllsynthesis, (2) photosynthesis, (3) blue reactions such as phototropisms, (4) photomorphogenetic redinduction, and (5) photothorphogenetic far-red reversal. On a limited scale, two sets of field lights may be sufficient: one comprising a fluorescent source with a bimodal spectral energy distribution (for example, a Sylvania Gro Lux Lamp) and the other comprising incandescent lamps for red/far-red/infrared generation.

Several benefits result from the control of radiation as described for the agricultural system of the present invention, a few of which are:

- initial capital cost is low because of cost-sharing capability with other subsystems, for example, power cable subsystems, time/sharing with the computer, and the like;
- the computer can trade off the requirements for light, carbon dioxide, water, and nutrients to minimize production cost and/or maximize production;
- radiation of an appropriate wavelength, (for example, infrared) can be used to supplement or replace frost protection sprinkler subsystems.

Some of the specific results achievable by appropriate control of radiation in accordance with the present invention are:

- to increase production per acre by accelerating photosynthesis;
- to control the timing of crop maturation to permit the same to coincide with maximum market demand;
- to achieve weed control, for example, using red light to prevent flowering of cocklebur and ragweed by interrupting their dark period;
- to achieve insect control, for example, using red light to prevent the cornborer from going into its dormant period.

THE DATA TRANSMISSION SUBSYSTEM

One substantial problem encountered in obtaining a successful agricultural system in accordance with the present invention is the problem of data transmission from the sensing subsystem, be it direct or remote, to the computer, and from the computer to field effectors.

The purpose of the data transmission subsystem is, of course, to collect data from sensors at locations remote from the computer, convey data to the computer and, at the same time, to distribute data instructions from the computer to effectors in a feedback loop relationship.

Any of the data transmission systems utilized in the present invention involve the quantization of the agricultural area utilizing a Cartesian coordinate system in which the X-coordinate measures the distance between a designated origin and points in the field east or west of the origin, the Y coordinate measures the distance north or south of the origin, and the Z coordinate can be used to designate which sensor of a sensor package is originating information at any particular time.

Two alternatives immediately present themselves for possible data transmission systems. In a first system, each sensor, be it direct or remote, is connected by wiring to scanning means at the computer, the scanners essentially directly feeding the computer. In such an embodiment all scanning is performed at the central computer location, with the signals being time division multiplexed at the scanner output. Such systems are well known in the telephone art and can be directly adapted to the agricultural system of the present invention; see, for example, B. T. L. Staff, "Transmission Systems for Communications", 4th Ed. 1970 WE Co., Winston Salem, North Carolina.

Various embodiments and modifications of systems as briefly described above will now be described in detail.

To appreciate the magnitude of the data transmission subsystem, if it is assumed that each field sensor package has M sensors, and there are N sensor packages in the agricultural area, a total of $M \times N$ connections are needed between the field sensor packages and the computer. Assuming a relatively large agricultural area, the physical problems of laying a cable network of such magnitude are substantial, as are the material cost problems; such can, in fact, render the present invention uneconomical.

One solution to the above problem is to distribute scanners or samplers to the sites of the field sensor packages, instead of concentrating the scanner or sampler at the computer per se.

Figure 6:
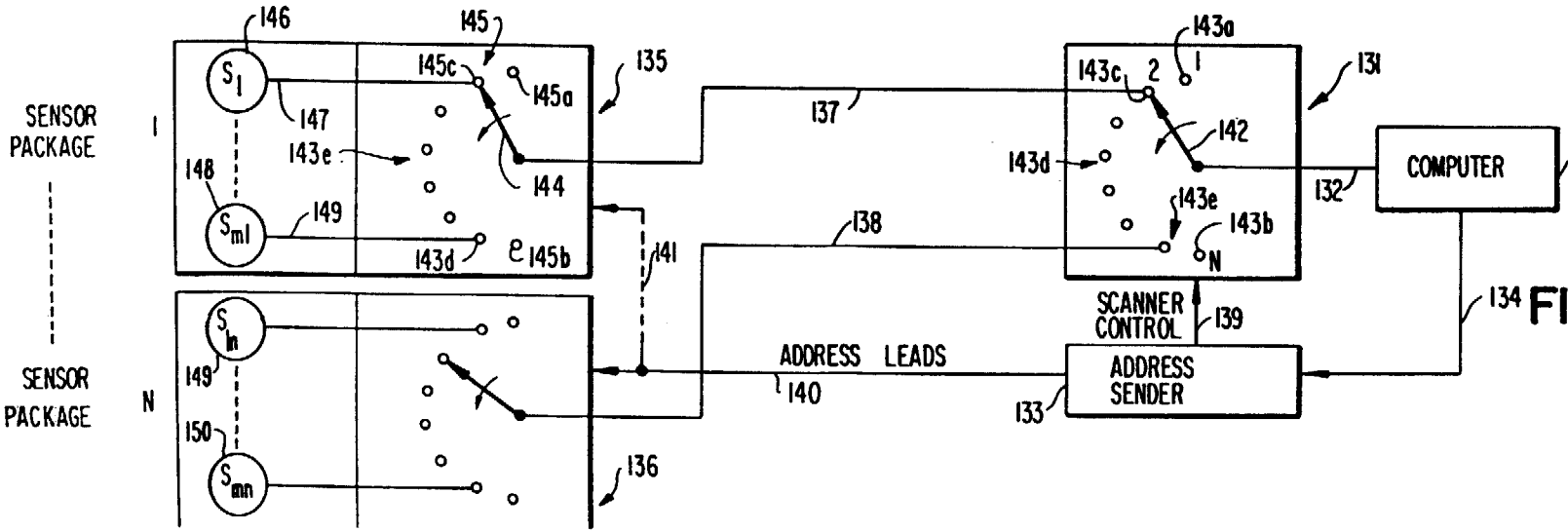
FIG. 6 shows scanning means in combination with direct sensors.

An embodiment of such a scanner or sampler is shown in FIG. 6, and will be explained with reference to FIG. 6 in some detail.

The general component and data transmission line interrelationships of FIG. 6 will firstly be explained. Computer 10 is shown linked to scanner 131 by data transmission line 132 and to address sender 133 by data transmission line 134.

Scanner 131 can be put into temporary communication with a plurality of field scanners (for purposes of simplicity, only the first field scanner 135 and the $N^{th}$ field scanner 136 are shown) by way of data transmission lines 137 and 138, respectively.

Address sender 133 is shown linked to scanner 131 by way of line 139 and to field scanners 135 and 136 by lines 140 and 141, respectively.

Scanner 131 is provided with contacts, each of which permits data transmission line 132 leading to computer 130 to be put into communication via switch 142 with a field scanner. Contacts 143a and 143b are "off" contacts, contact 143c permits communication with field scanner 135 via line 137, and the four contacts generally indicated at 143d permit communication with four additional field scanners (not shown) via data transmission lines (not shown), and contact 143e permits communication with field scanner 136 via line 138.

Although in FIG. 6 scanner 131 is shown as a mechanical rotary switch it will be apparent to one skilled in the art that equivalents can be used, e.g., diode gates or the like, as is the case with the field scanners.

Field scanners 135 and 136 function in a manner similar to scanner 131, as will now be explained for field scanner 135, which is shown provided with switch 144 adapted to step across contacts 145, of which contacts 145a and 145b are "off" contacts, contact 145c is shown connected to field sensor package 146 via line 147, contact 143d is shown connected to field sensor package 148 via line 149 and the four additional contacts generally indicated at 143e are connected to additional field sensor packages (not shown) via lines (not shown). Since field scanner 136 comprises components substantially identical to field scanner 135, no detailed explanation is believed necessary.

Address sender 133, in this embodiment, sends out a sequence of digital pulses to scanner 131 or the field scanners 135 and 136 to cause the switching means therein to advance one step upon receipt of the appropriate pulse signal.

Field scanner 135 is adapted to be put into temporary electrical communication with any one of a plurality of field sensor packages (for purposes of simplicity, only field sensor packages 146 and 148, the first and the last of the field sensor packages to be scanned by field scanner 135, are shown); in a similar manner, field scanner 136 can be linked to any one of field sensor packages 149 to 150, sensor package 150 being the $N^{th}$ sensor package in the agricultural area. Each sensor package contains M sensors.

Computer 10 can "step across" the N sensor package scanners one at a time and, within each scanner, it "steps across" M sensors. This system permits the number of data transmission cables to be reduced to N, or one data transmission cable per package, plus address leads. The embodiment of FIG. 6 would probably not be used in a single field as later described means is more efficient. Such an embodiment would be used, for example, when one set of field sensor packages must be sampled in one field and a second set of field sensor packages must be sampled in a widely separated field.

In both of the above cases, sampling is performed according to sampling theorem so that a complete sensor wave form can be reconstructed, if desired.

Further, if required for longer distance transmission, the pulse amplitude modulated signal can be encoded, if desired, in PCM or in other coded forms such as PWM or PSK.

In the second system, each sensor is separately addressed by the computer to read the sensor output over a common data wire. Assume for purposes of exaplanation that there is only one sensor at a location and that there are 15 or less locations; in order for the computer to address a sensor using a binary code, four address wires are required ($2^4=16$).

Figure 7:
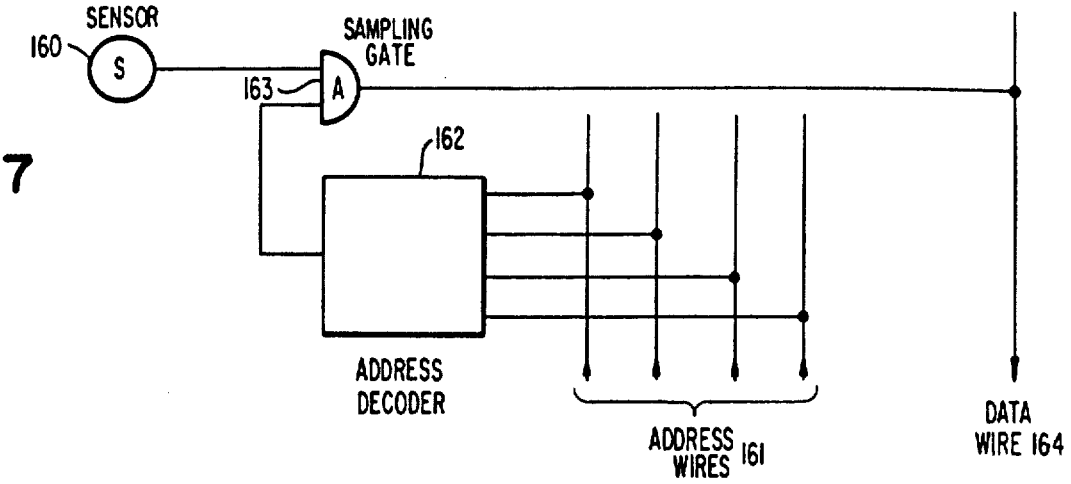
FIG. 7 is a logic diagram of the circuit required to interrogate one sensor.

The basic circuit is shown in FIG. 7 for the simple case of one sensor 160 and four address leads 161. An address decoder 162 is connected to the address wires 161 for each sensor 160. As is well known, such a decoder provides a "1" output when the address for its corresponding sensor is detected. The address leads will address the sensors one at a time in sequence. When the sampling gate 163 is enabled by the output of decoder 162, a sample of the sensor waveform connected to it will be sent to the common data wire 164. Thus, the samples from the other sensors will be time multiplexed on the same data wire.

Figure 8:
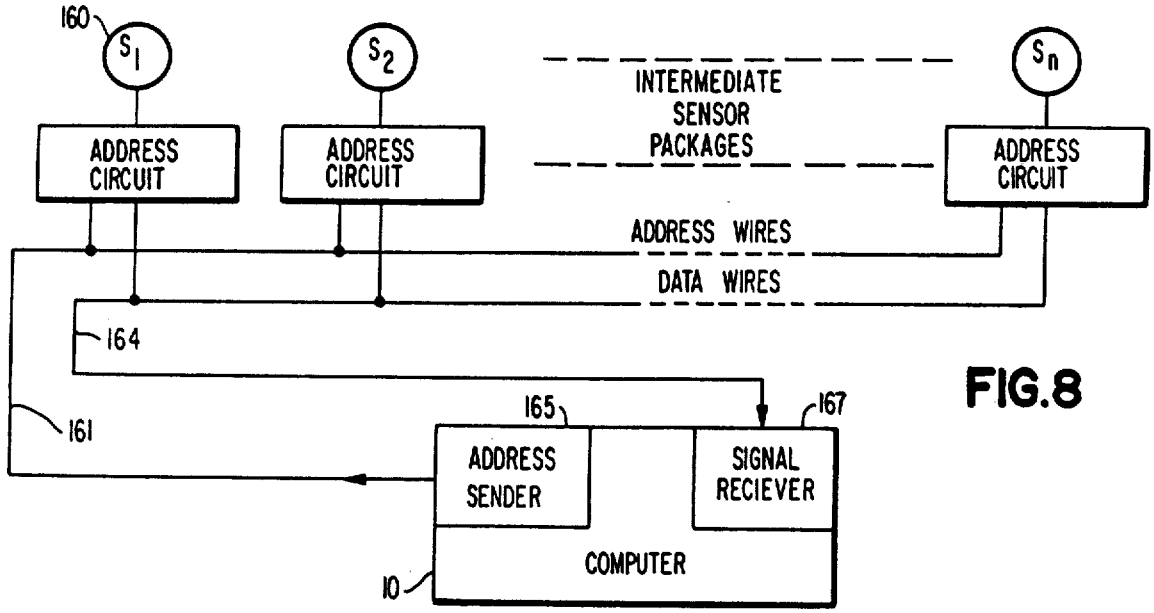
FIG. 8 is a block diagram of a data acquisition system using interrogation circuits of the type shown in FIG. 7.

The overall system using this data acquisition circuit is illustrated in FIG. 8. Here the Address Sender 165 in computer 10 is a binary counter (sequence controller) containing as many stages as address wires 161, driven by periodic cock pulses from the computer clock. The Signal Receiver 167 in computer 10 may contain equalization to compensate for distortions in the transmission line, and an amplifier. The computer 10 can be programmed to demultiplex the data, or if the data are to be displayed, the signal can be distributed (demultiplexed) by a scanner device similar to that shown in FIG. 6.

It is contemplated that in a practical application of the invention, the number of sensors will be considerably greater than 15. If, as an example, the number of sensor packages is 100, and each sensor package contains only one sensor, the number of address leads that must appear at each location is 7, plus 1 data lead, or 8 leads in all. In general, $N+1$ wires are required to connect $2^N-1$ sensors to the computer. Moreover, the $N+1$ wires required for addressing the field sensors can be reduced to one wire by many forms of encoding. If for illustrative purposes we assume that pulse code modulation (PCM) is the chosen form of encoding, then in the example just given, 7 bits, that is 7 "on" or "off" pulses, will be transmitted on a single wire for addressing a given sensor. After the 7 bit address is sent, the decoder will open the sampling gate. The computer then allows a single time slot following this 7 bit word for the sensor, on the same wire, to transmit back to the computer the information regarding its state. The functions of both addressing and of interrogating all sensors in the field have thus been reduced to one wire.

Figure 9:
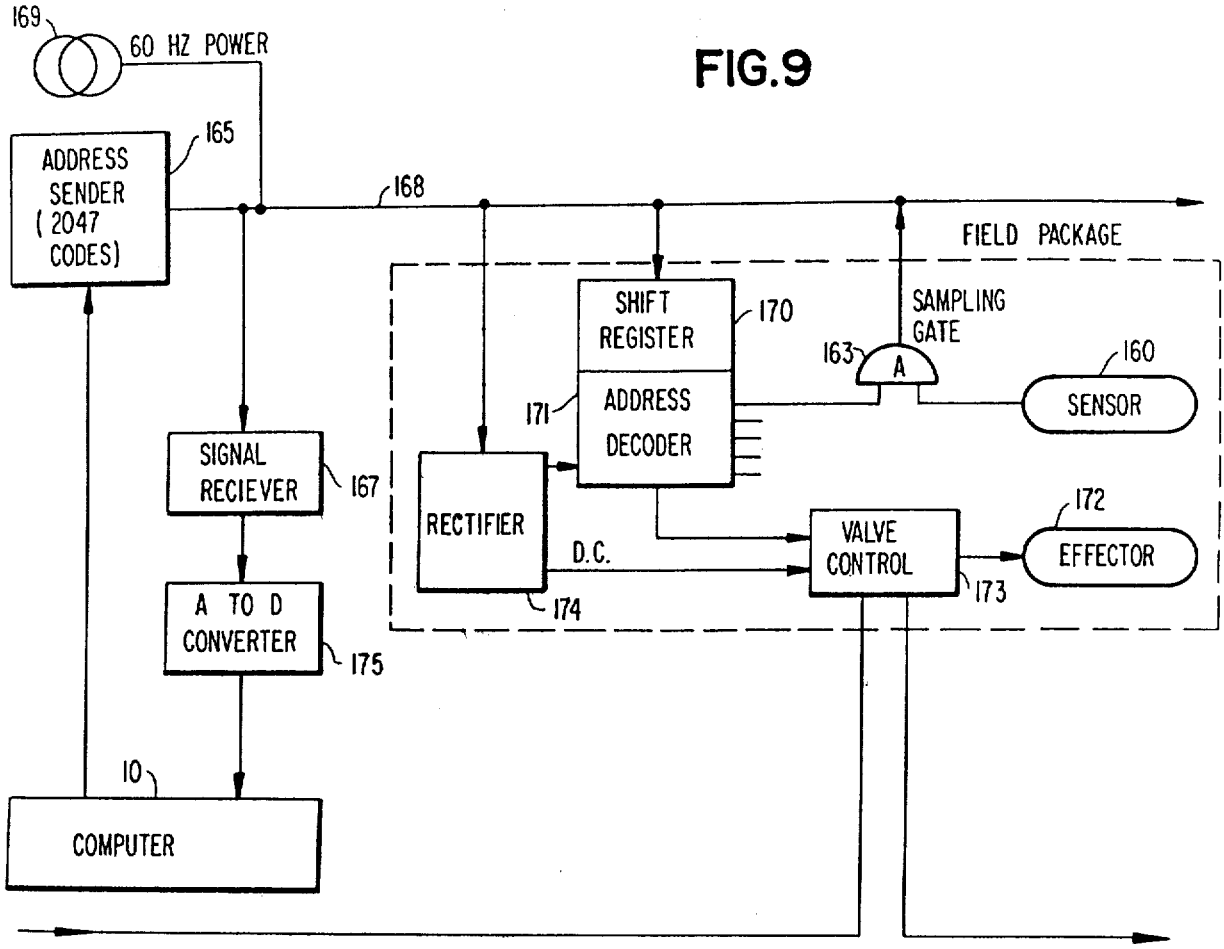
FIG. 9 is a block diagram showing the more detail a data transmission system of the type shown in FIG. 8 serving both field sensors and effectors.

FIG. 9 builds upon the foregoing by assuming that the data transmission network 168 has been combined with a 60 Hz power distribution network connected to a source of 60 Hz power 169. This is possible since the two networks are congruent, and are, topologically, tree-structured. The 60 Hz tree may be used for a variety of purposes, including the provision of power for remote power packs (such as rectifiers) for direct a.c. operation of solenold controlled valves and other effectors, for field lights, etc.

Not shown in FIG. 9 are means which may be required to separate the a.c. power from the various low-power data signals. One well known means of doing this simply is to modulate the data signals into a band of frequencies well above the 60 Hz power and its common harmonics. Any band above about 400 Hz would make simple the separation of the data channels from the power channel by the use of high pass filters in all of the data paths.

FIG. 9 shows the address sender 165 with a capacity of 2,047 separate codes. This sender could send its codes either on 11 separate copper wires in accord with the scheme shown in FIG. 7, or it can send its address by means of 11 bits on a simple wire, as shown. In this case, a register 170 is required to supply the address in a set of parallel leads to decoder 171. These codes may be used to identify any mixture of sensors or effectors, since each effector package and each effector within the package would be assigned a unique code.

As an explanation of why we might need this many codes, if we assume a 50 acre field with sprinklers spaced 50 feet by 50 feet, and if we assume that one sprinkler is controlled by one effector, then 850 sprinklers would be required, we have one sensor package per acre, each with 8 sensors in it, then 400 additional codes would be required for addressing the sensors. The total of 400 and 850 is 1,250. The next larger number of bits in the address word required is 11, and this will give almost twice as many codes as required for this size of system, i.e., $2^{11}=2048$. Since one of the codes is eleven zeroes, and must be ruled out, the available code capacity is 2047. Thus, the system has ample capacity for growth, in number of variables sensed, or in number of variables controlled.

Some field locations will contain effectors 172 but not sensors 160, and vice versa. If a location does not contain a sensor, FIG. 9 would be just the same except that the sensor 160 and the sampling gate 163 would be omitted from the diagram. If the location did not contain an effector 172, then the effector and its controller 173, shown in FIG. 9 as a valve control device, would be omitted. The power pack would be necessary in both cases. If, however, the data transmission system were not multiplexed with the power transmission system, the rectifier 174 would not be necessary, since d.c. power for the sensor and effector packages could be provided over the data transmission system.

A new function shown in FIG. 9 is analog-to-digital conversion. Remembering that the data wire contains a series of PAM pulses, and that computer 10 normally will accept only two-valued digital pulses, we see that an A-D Converter 175 is necessary to match the transmission line 168 to the computer.

Figure 10:
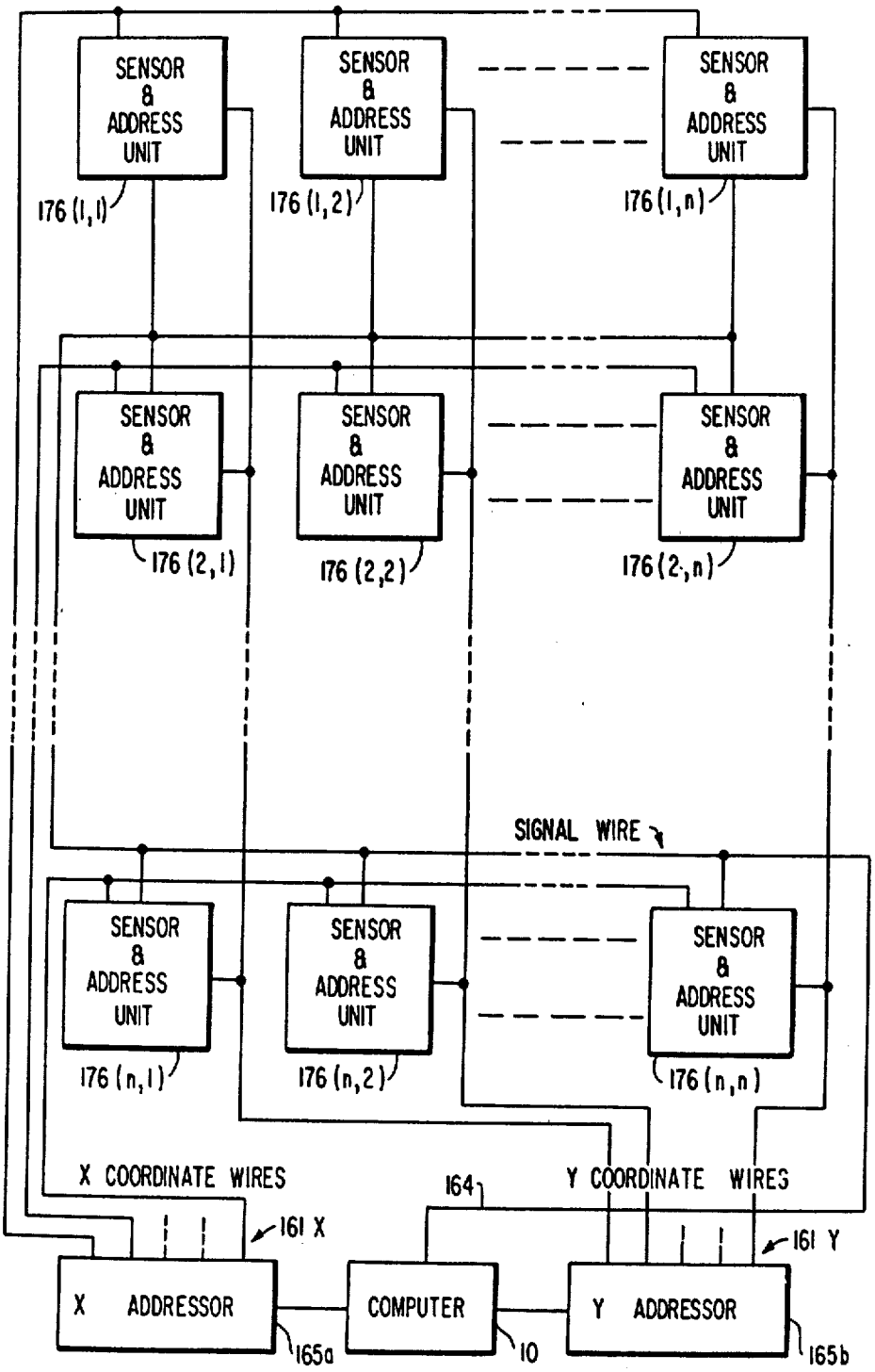
FIG. 10 is a block diagram of an alternative coordinate data acquisition system.

A modification of the addressing scheme shown in FIG. 8 recognizes that sensor/effector units are located in a two-dimensional plane so that each location can be specified by an X and a Y coordinate. In addition, if there is more than one sensor and/or effector at a location, these may be identified with a Z coordinate as will be explained in greater detail hereinafter. The basic arrangement is illustrated in FIG. 10, wherein a plurality of sensor/effector units 176 are arranged in a grid pattern. Each unit is identified by an X address and a Y address wherein the X address identifies the row of the grid and the Y address identifies the column of the grid. All units are connected by a common data signal wire 164 to computer 10 as before. However, the address sender is divided into an X addressor 165a with its associated X address wires 161x and a Y addressor 165b with its associated Y address wires 161y. To address a specific unit 176(i,i), only one X address wire 161x and one Y address wire 161y are energized corresponding to the row and column, respectively, of that particular unit.

Figure 11:
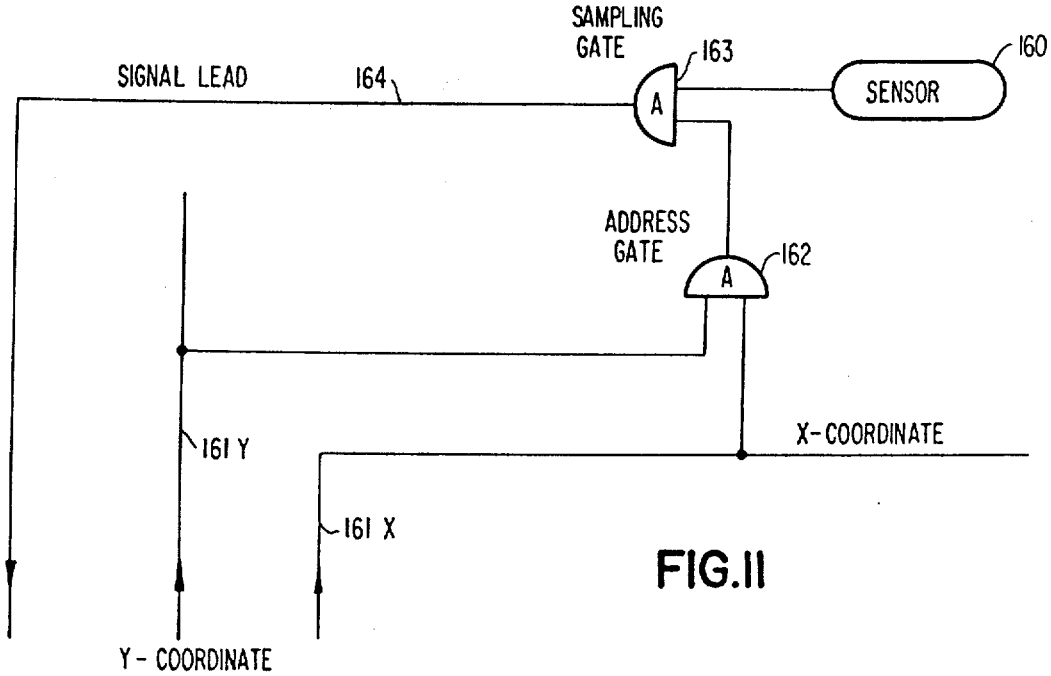
FIG. 11 is a logic diagram illustrating how one sensor is interrogated in the data acquisition system in FIG. 10.

FIG. 11 shows that for each row in the layout one wire represents the X address, and for each column in the layout one wire represents each Y address. Thus, the intersection of any row and any column provides a unique address for a given geographical location. Once a given location is addressed, the signal sampled from the sensor at that location is impressed on a single wire 164 which visits every sensor site, in the same manner as before. With this system, each sensor site needs to be served by only three wires, one each for the X and Y address inputs, and one for the data output, as shown in more detail by FIG. 11. The decoder 162 is simply a two input AND gate.

Figure 12:
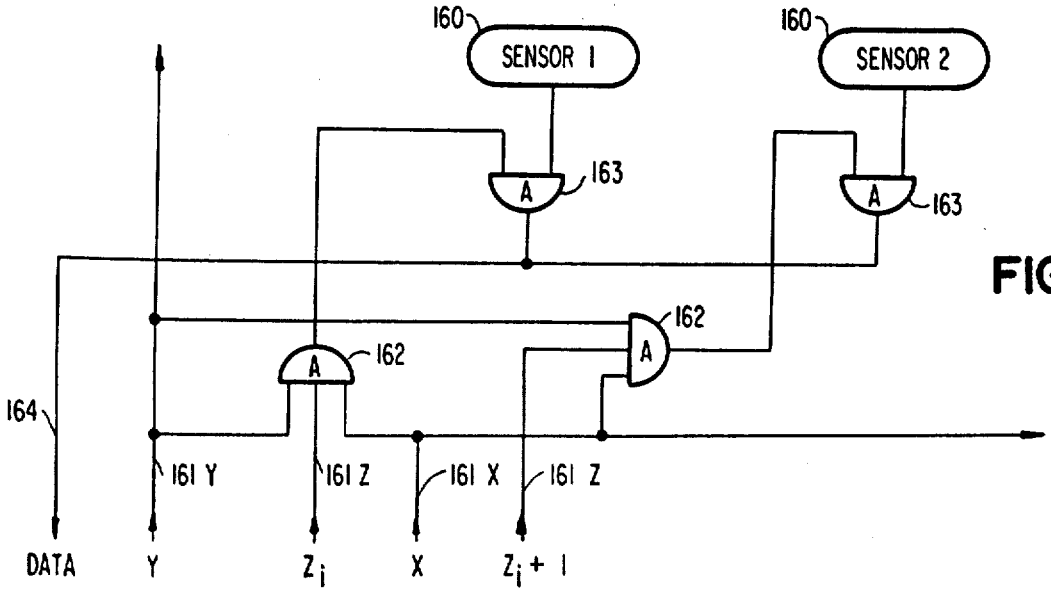
FIG. 12 is a logic diagram showing a modification to the basic data acquisition system shown in FIG. 10.

In case a given geographical location has two sensors, or effectors, a Z coordinate address lead may be used as shown in FIG. 12.

To address a sensor, the X addressor 165a places a signal on a wire 161x corresponding to the X coordinate of the sensor. The Y address 165b places a signal on a wire 161y corresponding to the Y coordinate. Then the Z addressor places a signal on a wire 161Z corresponding to the Z coordinate. In practice, the X addressor would signal each of its wires so that all sensors of a row would be addressed. Then the Y addressor would address its column wires, and the process would be repeated for the Z addressor. When a sensor 160 is addressed by a coincidence of signals on each of the three coordinate wires to decoder gate 162, thesensor signal condition is read out to the signal wire 164 by the sampling gate 163. The computer coordinates the sequence of the operation. As before, where the data are to be used by a digital computer, there must be an analog-to-digital converter in the data path, as shown in FIG. 9, to convert the PAM data signals to binary form.

For a simple system, in which the addresses are not encoded so as to be put on a single address lead, the coordinate system clearly has advantages over the systems shown in FIGS. 8 and 9 in point of number of feet of wire used to cable the field, and also in terms of simplicity required to decode the address at the site of the sensor. However, the FIGS. 8 and 9 systems have an advantage in that the number of pairs in the cable required to actually lay out a rectangular field is constant and does not vary in cross-section as would be the case with the coordinate system. Further, to secure the minimum number of feet of wire that is possible with the coordinate system, one would have to lay cables both in rows and in columns in the field, wherein in the other systems the cable can be laid out in a tree network congruent with the power distribution network, and with the fluid flow distribution network, and this offers advantages in terms of combining the functions of these three systems.

When the address leads ae reduced to one by binary coding, the relative advantages and disadvantages of the FIG. 9 system and the coordinate system of FIG. 10 are not so plain. In general, the coordinate system will be better than the former system when the number of sensors required is large.

Having this described representative and generally useful sensor interrogating means, it is appropriate to turn to several types of data transmission cable systems and installation methods therefor which can be utilized to interconnect the sensors/scanner and effector packages to the computer.

It will be apparent to one skilled in the art that, as substantial distances are involved in the agricultural system of the present invention, it would be desirable to minimize the capital cost of cable connections and the cost of installing the same.

In one embodiment of the present invention it is possible to use telephone or power cables to link the sensor/-scanner and effector package(s) to the computer. Such can be installed utilizing a conventional telephone or power cable plow which can be used to bury flexible plastic pipes up to about 4 inches in diameter.

Apparatus is now available to lay up to three pipes simultaneously, and, if desired, in addition to laying the data transmission subsystem cable, an a.c. power cable can be simultaneously laid with the data transmission subsystem cable.

If desired, the data transmission subsystem cable and the a.c. power cable, plus miscellaneous control pairs for effectors and sensors, can be combined in one cable and laid.

An alternative approach is to combine the data transmission subsystem with fluid distribution means into a single cable/pipe combination. This may be accomplished in several fashions as described below.

For example, a standard commercially available plastic pipe can be processed through a wire stranding machine, available in most cable factories, which will apply to the plastic pipe as many wires as are required to service effectors and sensors. Of course, an a.c. power cable can also be added. The thus formed assembly can then be processed in a standard extrusion die to deposit a plastic protective sheath on the wire, and the combined cable/pipe assembly can be deposited throughout the agricultural area utilizing a standard telephone cable plow.

Primary advantage of such a cable/pipe system is that it can be utilized both for the delivery of fluids (fluid delivery subsystem) and as the data transmission subsystem. Another benefit is that the wiring for the data transmission system, imbedded in the walls of the cable/pipe assembly, serves to strengthen the overall assembly so that it is capable of withstanding higher pressures, the wire serving as a reinforcing agent. Still another benefit is that it is simple to remove signals from the embedded wires by means of conventional slip rings on the hydromotor platform to be described later.

In the above embodiment, the pipe is essentially a hollow conduit of circular cross section. As a modification thereof, the circular cross section of cable/pipe can itself be compartmented, and such a modification is shown in FIG. 13.

Figure 13:
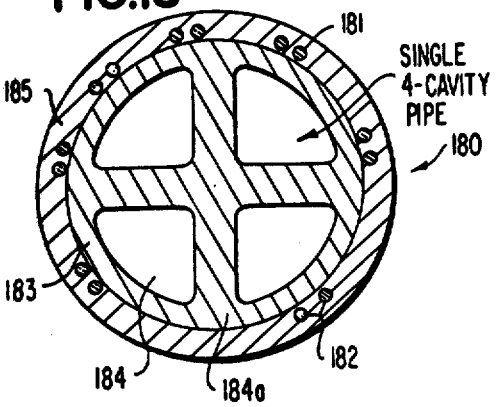
FIGS. 13 and 14 show data transmission lines in combination with fluid delivery lines useful in the present invention.

Referring to FIG. 13, the overall cable/pipe assembly is identified as 180, data transmission signal pairs are identified as 181, and power leads, be they a.c. or d.c., are identified by 182. The interior pipe is shown as 183; it can be formed of any plastic material resistant to the materials to be transported, and such materials are well known in the chemical process industry. In this particular embodiment, four interior compartments 184 are shown formed by interior strut member 184a which, of course, extends the full length of the cable/pipe assembly. If desired, and such will generally be the case, strut member 184 is generally of the same material as interior pipe 183, e.g., polyethylene. The extruded protective coating which contains the signal pairs 181 and power leads 182 is identified as 185. The protective coating, of course, serves to render the cable/pipe assembly resistant to underground placement and to contain the signal pairs 181 and power leads 182. It can be formed of the same material as interior pipe 183 or of a different plastic material, e.g., PVC or one of the polyolefins.

It will be apparent to one skilled in the art that, if desired, strut member 184a can be omitted to provide one large single-compartment cable/pipe assembly. This embodiment finds particular utility in combination with the later described hydromotor platform serving as an "umbilical" cord to provide fluid thereto from the fluid delivery subsystem via the interior pipe 183 and, if desired, power via power leads 182 and/or instructions from the computer via signal pairs 181. In such a case, the assembly should be formed of a relatively flexible material, e.g., a natural or synthetic rubber.

If desired, of course, either or both of the power leads 182 or signal pairs 181 can be omitted from the cable/-pipe assemblies as shown. For example, one might wish to provide only power, not signal transmission capability.

The embodiment shown in FIG. 13 can be utilized to achieve several unique effects. For example, individual compartments in the cable/pipe identified by 204 might be utilized to contain fluid at three different pressure levels so that it would not be necessary to send pressure signals through a single pipe. This permits one to avoid the utilization of a variable-speed motor at the head end of the system, which would be a rather expensive component. In addition, pressure-detecting sequence valves as are later described could be avoided since pressure would be individualized in various compartments of the cable/pipe assembly.

In a further modification, one compartment in the cable/pipe as shown in FIG. 13 could be used for gases, such as carbon dioxide, air or the like, or for inflammable gases for field heating as a means of frost protection. A second compartment could be utilized for sprinkler or trickler irrigation as later described, and a third compartment could be utilized for chemical distribution.

Finally, it will be apparent to one skilled in the art that more than each individual compartment could be utilized to handle the same fluid, for example, water, and the compartments could be combined at the end of a line to provide large volumes or high pressure, where necessary.

Rather than dividing a single pipe into a plurality of cavities as shown in the embodiment of FIG. 13, it is also, of course, possible to utilize a large pipe which contains a plurality of individual pipes and/or cables, for example, a large pipe which would contain three separate smaller pipes, one for water, or one for corrosive chemicals and one for air and gases in the interior thereof. Power cables could also be disposed therein in combination with the data transmission control pairs. This latter structure is similar to a multi-unit telephone cable assembly, except, of course, that the multi-unit telephone cable assembly does not contain fluid flow pipes as is the case with the above embodiment.

Figure 14:
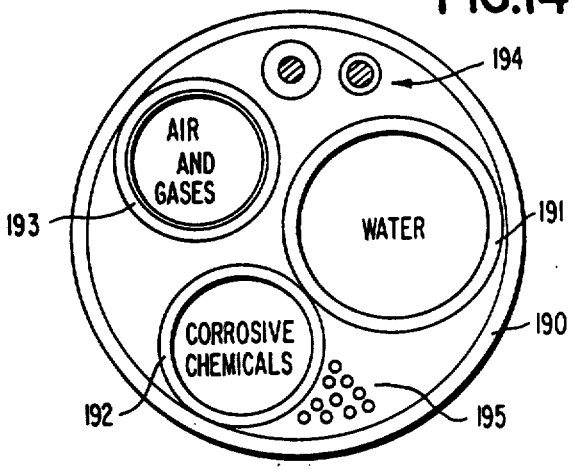

An embodiment of this latter type of apparatus is shown in FIG. 14 as comprising a circular exterior protective conduit 190 carrying therein conduit 191 for the transmission of water, conduit 192 for the transmission of corrosive chemicals, and conduit 193 for the transmission of air and gases. Also shown in the embodiment of FIG. 14 are power cables 194, for the transmission of a.c. or d.c. power, and control pairs 195, the control pairs 195 leading to various sensor and/or effector passages in the agricultural area.

In the embodiment above, a commonly used material of construction for the various conduits is polyethylene.

Since in the agricultural system of the present ivention it is highly preferred to use a single cable/pipe assembly as described above, the following discussion will be in terms of such single cable/pipe assembly. It should be understood, however, that the present invention is not limited thereto.

A typical installation sequence for a combined cable/pipe assembly as described above would be as follows:

A tractor mounted auger would pass over the desired path of the cable and would drill holes in the ground about two feet in diameter at predetermined distances. Keepng in mind that the combined cable/pipe assembly is to serve as part of the fluid delivery subsystem to be later described, it will be apparent that the holes are also to serve as take-off areas for fluid.

The above path would then be traced by a cable plow which would intersect each hole while placing the combined cable/pipe assembly therein.

At the predetermined holes the fluid carrying conduit will be drilled and tapped for fluid risers, obviously avoiding data transmission wires.

Field sensors and/or effectors can then be spliced into the data transmission cables.

Holes will be back-filled and effectors and/or fluid take-off valves attached to the risers coming from the combined cable/pipe assembly.

The risers can be attached via threads in the cable/pipe assembly or by any conventional means, for instance, using commercially available fast-setting adhesives.

THE FLUID DELIVERY SUBSYSTEM

Having thus generally described the sensing subsystem and data transmission subsystem, the data transmission subsystem in the described preferred embodiment also serving as a part of the fluid delivery subsystem, it is appropriate to turn to the fluid delivery subsystem, and the same will be generally explained with reference to FIG. 15, illustrating in detail various aspects thereof, including the chemical distribution aspects of the fluid delivery subsystem.

For sake of convenience, sprinkler heads or tricklers as are described in the present specification and claims, whether they be utilized to accomplish the functions of irrigation, chemical spraying, frost protection or a combination of such functions, will hereaftr often be referred to as "fluid ejectors" or "fluid ejection means". This generic term should hereafter be understood to include any or all of the above types of devices.

As earlier explained, the fluid delivery subsystem of the present invention is not limted to chemical delivery, delivery of water, delivery of air or like materials but, rather, it can be used to perform a diverse number of functions in the agricultural system of the present invention. A number of such functions will be exemplified after the description of the fluid delivery subsystem which will be initially offered with reference to FIG. 15.

The fluid delivery subsystem exemplified in FIG. 15 is best understood by following a typical fluid application procedure from beginning to end, and this approach will be used to describe the system of FIG. 15.

Let it be assumed that initially a direct sensor package 200 in the homogeneous agricultural area 201 containing fruit trees 202 is capble of measuring the nitrate/phosphate/potassium level in the soil. At an appropriate time, the computer 10 samples the direct sensors 200 in the homogeneous agricultural area 201 and, by way of data transmission line 203 receives the nitrate/phosphate/potassium readings from the direct sensors 200.

The computer, of course, compares the nitrate/phosphate/potassium readings from the direct sensors to its program to determine if the level of these components in the soil is sufficient.

Assuming that the level is not sufficient, the computer initiates a nitrate/phosphate/potassium distribution cycle.

Firstly, via an appropriate controller 204 the computer causes meter valves 205a, 205b and 205c to open, permitting nitrate, phosphate and potassium, respectively, to be taken from chemical storage containers 206a, 206b and 206c, respectively, and delivered via lines 207a, 207b and 207c to mixing tank 208 which is provided with mixing blades 209 driven by motor 210. Motor 210 is activated by computer 10 via data transmission line 211 and controller 212. Since generally the chemicals present in the chemical containers 206 will be in a concentrated form usually a simultaneous introduction of water via line 213a/213b is conducted into the mixing tank 208 by the computer opening meter valve 214 by way of data transmission line 215 and controller 216, thereby permitting water to be withdrwn from reservoir 217 due to the action of pump 218, which is activated by computer 10 via data transmission line 219 and controller 220. There is thus obtained a nutrient solution of the proper concentration to "make up" the deficiencies of nitrate/phosphate/potassium in the homogeneous agricultural area 201. Concentration of all nutrients in mixing tank 208 is constantly monitored by computer 10 by way of data transmission line 221; sensors in mixing tank 208 can be selected from those earlier recited direct sensors capable of sensing the components involved. It is to be specifically noted that the sensors in the mixing tank 208 provide positive feedback control. As an alternative, the computer could precalculate, in open loop fashion, the amount of time metering valves should remain open, the requisite time the water introduction valve should remain open, and the like. Existing systems of material application utilize such an open loop approach.

After the system is well agitated, the contents of mixing tank 208 are removed via line 222a/222b by a pump (not shown) and passed to solenoid valve 223 via meter valve 224 by way of line 227. Controller 226 is activated by computer 10 via data transmission line 225 to effect this flow. Since the solenoid valve 223 would be opened by the computer upon the initiation of the chemical distribution cycle by way of data transmission line 228 and controller 229, the nutrient solution passes into sub-lines 230 and 231 and into sequentially operated fluid ejection means 232, whose operation will later be explained in detail, whereafter the nutrient solution would be sprayed onto the trees and/or ground in the homogeneous agricultural area.

The amount of nutrient applied can be precalculated to bring the nitrate/phosphate/potassium level in the soil to the desired or, of course, can be constantly monitored by a direct sensor in the homogeneous agricultural area and halted when a requisite amount of the nutrient is present. It is highly preferred that both precalculation and constant monitoring be utilized. Precalculation is needed, for example, to estimate when available chemicals or the like will be completely used; the computer, based on such precalculations, can decide to delay any or all of the needed applications until additional chemicals or the like can be obtained except in, of course, emergency situations when the computer might override a precalculation indicating potential material shortage. Constant monitoring is, of course, preferred for the reasons heretofore advanced, viz: it enables a real time analysis of the homogeneous agricultural area under treatment. When the desired amount of nutrient is present, the computer then closes metal valves 205a, 205b and 205c, halts the input of water to the mixing tank 208 and returns the fluid delivery system to its pre-chemical distribution cycle state.

Although the above exemplification has only been for nitrate/phosphate/potassium, it will be apparent to one skilled in the art that other materials as are generally shown in containers 206 can be applied in an analogous manner.

Data transmission line 233 is generally shown in FIG. 15, whereby computer 10 can constantly monitor the contents of containers 206, generating a signal when replacement is necessary, as is three-way valve 234 which permits water of varying temperature to be withdrawn from reservoir 217. Valve 234 is controlled by computer 10 via data transmission line 235 and controller 236.

The fluid ejection means used in FIG. 15 can be selected from among those as later described with reference to FIGS. 17, 18, 19, 20, 21, 23 and 25, if desired, modifying the fluid delivery subsystem as explained with reference to the recited Figures where necessary.

The fluid delivery subsystem of the present invention does, of course, accomplish many other functions including, for example, irrigation. There are five general types of irrigation systems commonly used today:

1. controlled floor irrigation in which the entire field is covered with water for a very short time;
2. furrow irrigation, where small canals cover the entire field, which canals are flooded by gating from a supply ditch;
3. sub-irrigation in which a pipe is run through the agricultural area and a section directly under the plant to be irrigated is perforated to allow water to escape;
4. sprinkler irrigation, utilizing sprinkler heads set into lateral pipes which contain water under pressure. The lateral pipes are joined to a main line, and the lateral pipes can be portable, self-propelled, of the boom type, solid set and the like; and
5. trickler irrigation.

Although the agricultural system of the present invention can utilize any of the above types of irrigation systems, it is generally preferred in accordance with the present invention to utilize the solid-set sprinkler type of irrigating system or a combination of sprinklers and tricklers as the fluid ejection means, as the solid-set type sprinkler system or combination of sprinklers and tricklers can be utilized to perform all of the following functions: pH control, provision of nutrients, plant growth control, temperature control of both air and soil, control of insects and diseases, plant thinning, weeding, control of soil permeability, moisture control, control of unwanted animal species, control of carbon dioxide, planting of seeds, automatic recycling and distribution of plant and animal wastes, preventing premature dropping of fruit, ensuring simultaneous maturity of crop, and like functions.

Since solid set sprinkler type systems are generally preferred for use in the agricultural system of the present invention, the following description will largely be with reference thereto. It should be understood, of course, that the description below is not limiting.

An irrigation sequence will generally begin when a soil moisture sensor, typically a direct sensor, is sampled by the computer and the data input is that the available soil moisture is low. In actuality, the data input to the computer will be merely an indication of the soil moisture content and the computer itself will compare the minimum desirable moisture level to the moisture level actually read by the direct sensor and, if the value is approaching the minimum desirable value, at that stage will initially cross-check the indication of moisture need from the direct sensor against current meteorological data and evapotranspiration data for the crop being grown to determine, for example, if rain is forecast.

Assuming that indications are that no foreseeable precipitation is to be expected, the computer will then calculate the amount of water needed to bring the water level in the soil of the homogeneous agricultural area under consideration to the optimum level, and will then initiate the actual irrigation sequence, exemplified below.

Firstly, considering the amount of water needed, the appropriate water absorption rate characteristics of the soil, the computer will then select an appropriate pump speed, open appropriate valving as later explained and thereafter monitor the performance of the pump and the application of the water.

An important feature of the agricultural system of the present invention is that fluid, e.g., water, be available at different temperatures. A good source of water at varying temperatures is a lake or pond, since natural thermal stratification in the lake or pond ensure the presence of water at relatively low temperatures in the bottom layer of water in the lake or pond and the presence of water at relatively high temperatures in the top layer of water in the lake or pond. Needless to say, the water taken from the lake or pond can be heated or cooled artificially before delivery, and in many instances this may be necessary when dissolution of certain chemicals is required at higher temperature, for purging of the fluid delivery system of residual corrosive chemicals, for air/ground temperature control, fruit cleaning or the like.

A specific irrigation sequence will now be explained with reference to FIG. 15, which earlier served as the basis for an explanation of the application of chemicals to a homogeneous agricultural area.

Referring to FIG. 15, a source of water at varying temperatures, i.e., in this case a lake, is represented by 217. Upon initiation of the irrigation cycle, the three-way valve 234 is open to withdraw water from the lake 217 at the desired temperature. Thermal monitoring means (not shown) such as a thermometer may be immersed in the lake and water withdrawn from the desired stratum. The water will flow from valve 234 via pump 218 through line 227 to solenoid valve 223. After the desired pressure is reached, acting under instructions of the computer 10, the solenoid valve 223 is opened, water flowing from main line 227 into lateral lines 230 and 231. As the lines 230 and 231 fill with water, low angle sprinklers 232 are activated by the water pressure, and irrigation is conducted in accordance with the time schedule determined by the computer.

At the completion of the elapsed irrigation time, solenoid valve 223 closes and pressure actuated sequence valves associated with the low angle sprinklers 232 unlatched in response to the drop in pressure. In a few seconds the solenoid valve 223 is again opened, and when the pressure returns to normal, the sequence valves associated with sprinklers 232 are closed and the sprinkling action is advanced to the second set of sprinklers downstream in the lateral line, whereafter the above sequence is repeated until the total homogeneous area has been irrigated and the direct soil moisture sensor indicates that the desired moisture capacity has been reached, the irrigation sequence terminating when terminal irrigators have completed the irrigation cycle. This final stage of the cycle is the only time during which water fills all lateral lines in the total homogeneous area, and hence is the only stage in the sequence when a treatment, such as frost protection sprinkling, can be applied to the whole area at once. How this is accomplished will be described in connection with FIG. 17.

Sequence valves as described above are generally necessary only when the homogeneous agricultural area to be irrigated is so large that the total homogeneous agricultural area cannot be irrigated at one time due to, for example, insufficient pump capacity.

Sequence valves as described above are commercially available from F.M.C. Corporation under the trade name "SequaMatic" valves. Although the above exemplification has been for the situation when irrigation is initiated upon data input from a direct sensor, it will be obvious to one skilled in the art that indirect or remote sensors can also be utilized to initiate the irrigation sequence. For instance, an indirect moisture sensor as earlier described could be used to initiate the irrigation sequence. Obviously, human observation can be used to override any of the sensing systems used in the present invention, and, if desired, irrigation can be conducted purely on an elapsed time basis.

The amount of water and the rate of applications of the water can be accomplished in a well-known manner and can be programmed into the computer; for example, see Jensen et al, Scheduling Irrigation Using Climate-Crop-Soil Data, Journal of the Irrigation and Drainage Division, I.R.I., Mar. 1970, pages 25 et seq.; Jensen, Scheduling Irrigations With Computers, Journal of Soil and Water Conservation, Volume 24, No. 5, Sept./Oct. 1969, pages 193 et seq.; and like publications. However, existing programs do not envision a large number of areas, each having different irrigation requirements, nor do the existing programs envision that a computer is in direct control of the irrigation process through feedback control loops consisting of sensors, a data transmission system, and automatically controlled effectors, as in the present invention.

IRRIGATION COMPUTER PROGRAM

A preferred embodiment of the irrigation computer program is shown in flow diagram form in FIGS. 16A to 16H to illustrate the principles involved in the practice of the invention. For concreteness, a specific system of the type given by FIG. 15 has been assumed.

A. Introduction

The program is designed to automatically irrigate an entire farm. There are $S_{max}$ homogeneous production areas, each having one sensor and one or more effectors. Each of the sensors and effectors can be individually addressed. Also, each sensor and effector has a special storage area (one or more memory locations) in the computer which contains pertinent data for the sensor or effector.

Data concerning available water (reservoir level and rain forecast) are also stored in the computer. The program is designed to activate measurement of soil mositure in each field, make a decision to irrigate and control the effectors until irrigation is accomplished. The operation is real-time and controlled through a task queue procedure.

Normally, when the sensors show a shortage of water, the system responds to restore the field to capacity. However, two complications can arise for which the computer program provides. First, the reservoir may not contain enough water to restore all fields to capacity. In this case the computer must invoke decision rules for rationing the supply. Certain fields may have priority based on crop value. Assuming no priorities all fields will be allocated enough water to sustain growth. A further fall back position is to allocate only enough water to ensure survival of the plant, even though the current crop must be sacrificed. Second, a weather forecast may call for rain. In this event the computer will calculate an allocation for irrigation which, together with the forecasted rainfall, will bring each homogeneous area to its moisture capacity.

B. Sensor Table Description

The following data are stored for each sensor:

1. The field address for each sensor.
2. $N_{max}$ measurements of soil moisture and time of each measurement.
3. The soil moisture capacity, $f_{cs}$.
4. The soil moisture decision level, $f_{ds}$.
5. The memory index of the first effector for field, s.
6. The maximum number of effectors for field s, $E_s$.
7. The water rationing factor for field s, $R_s$.

The table is indexed by the variable s which runs from 1 to S, i.e., $1 \lesssim s \lesssim S$.

Effector Table Description

The following data are stored for each effector in field s:

1. The field address for the effector.
2. The memory index of the next effector in field s.

This table is indexed by the variable e which runs from 1 to $E_s$, i.e., $1 \lesssim e \lesssim E_s$.

D. Reservoir and Weather Data

The water level for the reservoir and projected rainfall are required.

E. Operation of the Task Queue

The control of the operation is the following:

1. A time-ordered list of required actions is stored in the task queue.
2. The computer delays action until the highest priority task (task with the earliest time) is ready for servicing.
3. The appropriate subprogram is executed to service the task.
4. The task queue entries are created (or generated) as a result of servicing previous tasks.

For example, sensor tasks are continually generated for a given field until that field requires irrigation. At this time a task is generated to initiate the first effector for the field. The first effector initiation then generates a task for the second, the second for the third, etc. until all effectors for the field are initiated. Tasks to stop the given effector are generated as the effectors are turned on. When the last effector for a given field is turned off a new check sensor task is generated.

The task queue can have a few entries as the number of sensors (or fields) and as many as the total number of effectors for all fields.

This principle of computer control is common and readily lends itself to the addition of other functions.

Figure 16A:
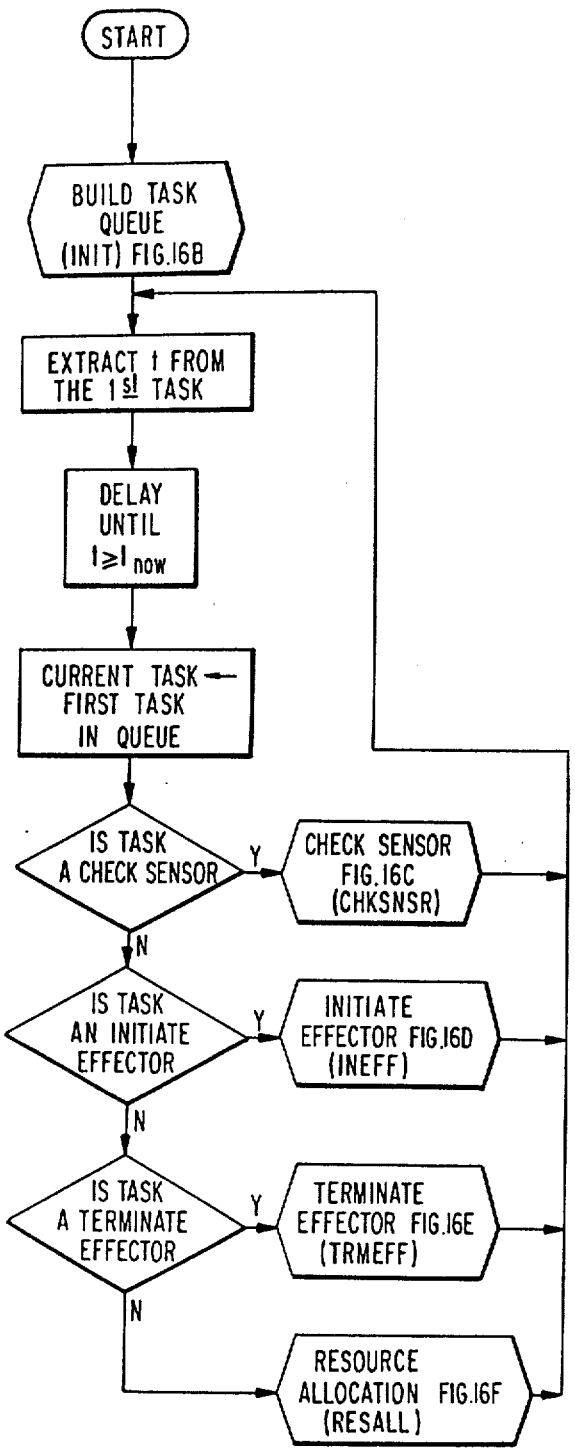
FIGS. 16A to 16N are flow diagrams illustrating typical computer programs for irrigation and spraying operations.
Figure 16B:
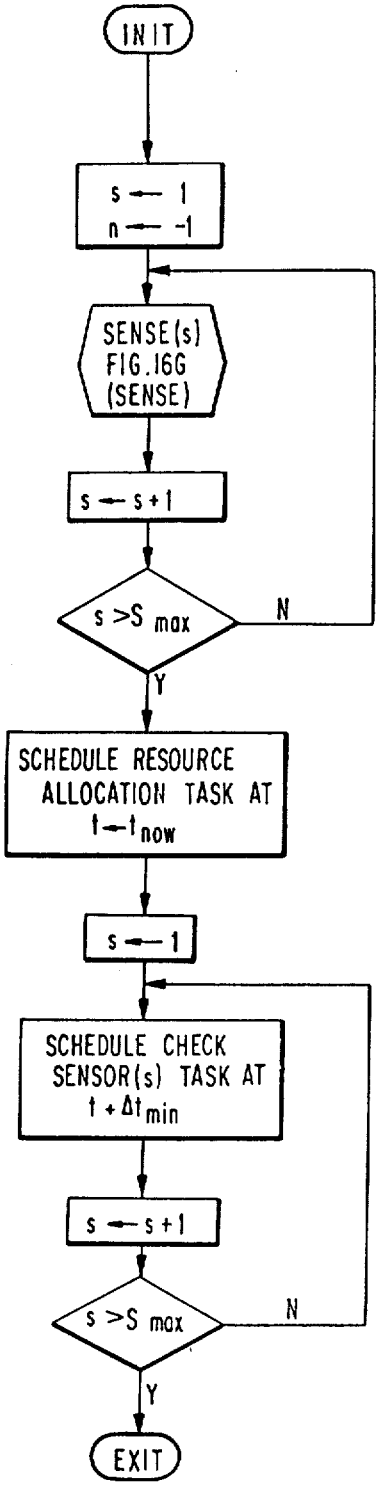
Figure 16C:
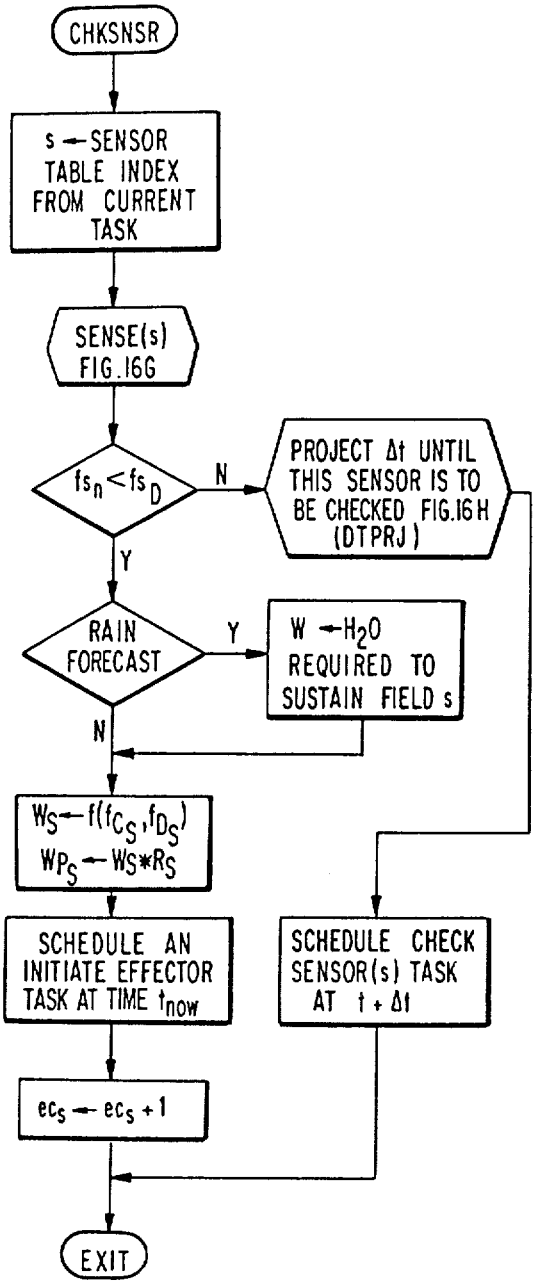

The following is a list of definitions of the variables used in the computer program:

e—effector table index
$E_s$—maximum number of effectors for field s
$e_s$—a counter for the number of active effectors in field s
$f_{cs}$—soil moisture capacity for field s
$f_{Ds}$—soil moisture decision level for field s
$f_{ss}$nth sensor moisture measurement for field s
n—sensor measurement index
$n_{max}$—maximum number of measurements for any given field
$R_s$—water rationing factor for field s
s—sensor table index
S—maximum number of sensors
t—time
$t_{now}$—present time
$t_{s,e}$—time to stop the eth effector in field s
$t_{sn}$—time at which the nth sensor measurement is taken for field s
$V_{s,e}$—volume control for the eth effector in field s
$W_{Ps}$—water to be pumped to field s
$W_{RES}$—reservoir water level
$W_s$—water required to bring field s to soil capacity
$W_{TOT}$—sum of $W_s$ for all s
$T_c$—cold sensor temperature
$T_w$—warm sensor temperature
$\Delta t$—estimated time between sensor measurements
$\Delta t_e$—time between attempts to start an effector that has been delayed
$\Delta t_{min}$—minimum time allowed between sensor measurements
$\Delta t_{max}$—maximum time allowed between sensor measurements
$\Delta t_r$—maximum time allowed between reservoir measurements The basic irrigation computer program is shown in FIG. 16A, and the subroutines which are included in the basic program as shown in FIGS. 16B to 16H. Referring to FIG. 16A, upon starting the irrigation program, the computer builds a task queue using the subroutine shown in FIG. 16B. Once this is accomplished, at the appropriate time t the first task in the queue is called up. If the first task is to check the sensors, then the subroutine shown in FIG. 16C is used and, when completed, the next task in the queue is called up at its assigned time. The other tasks in the queue which are accomplished by separate subroutines are initiate effectors shown in FIG. 16D, terminate effectors shown in FIG. 16E, and resource allocation shown in FIG. 16F.

Figure 16D:
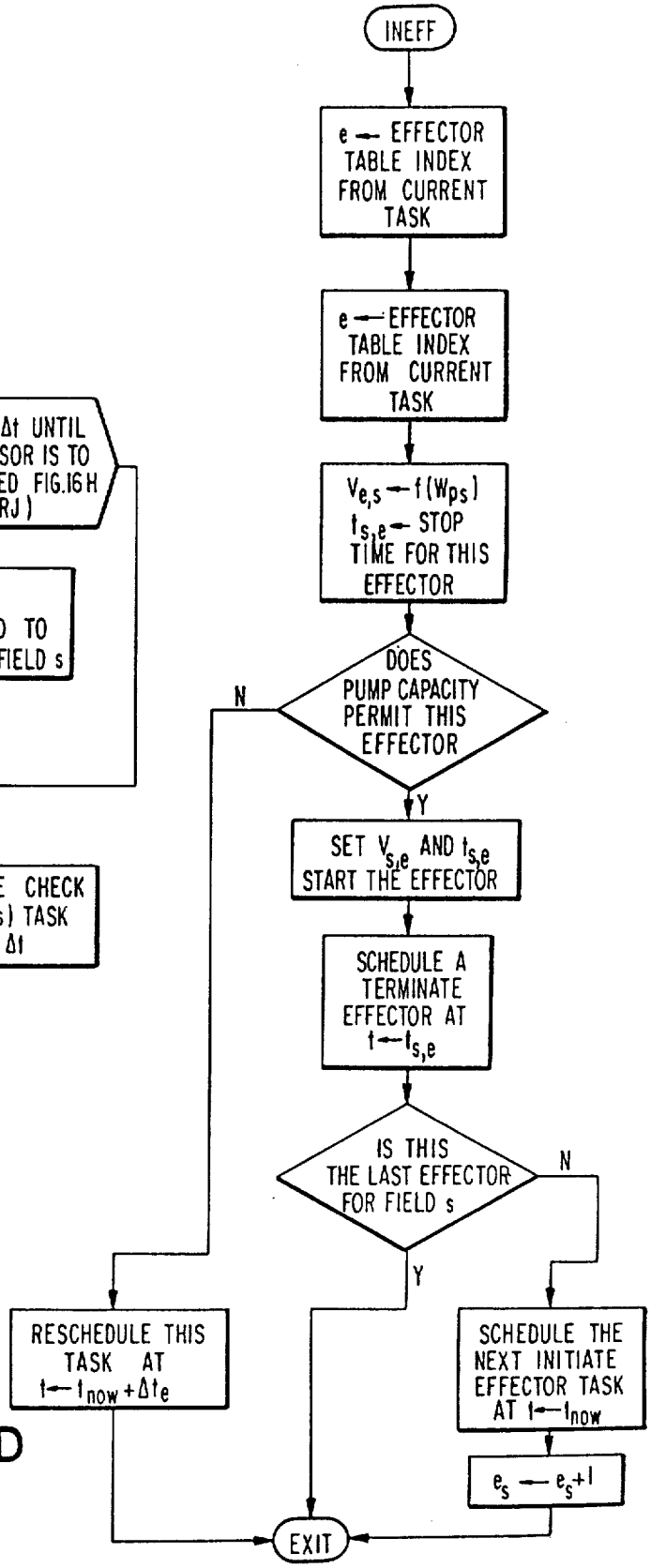
Figure 16E:
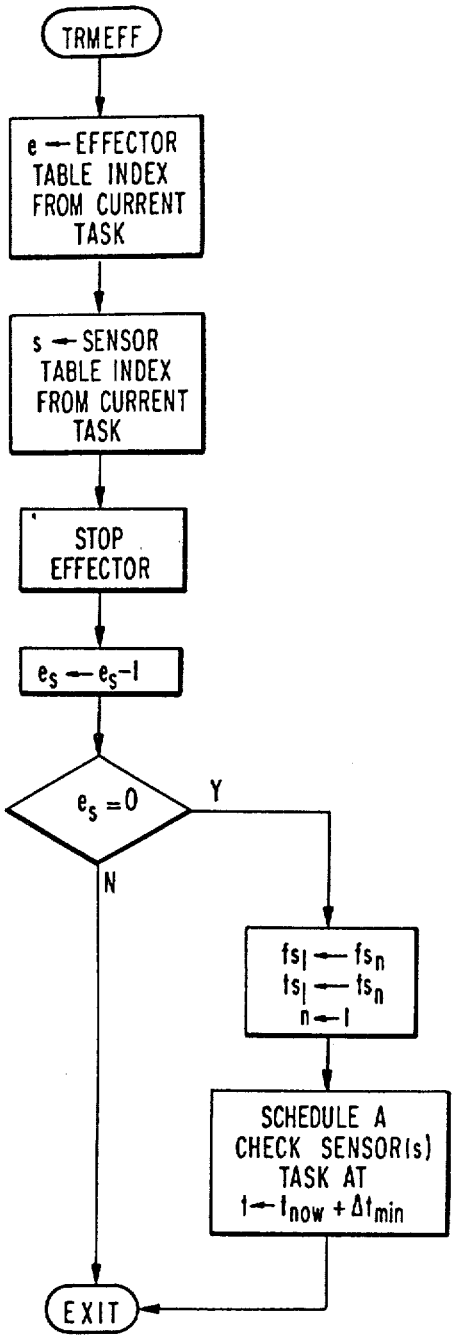
Figure 16F:
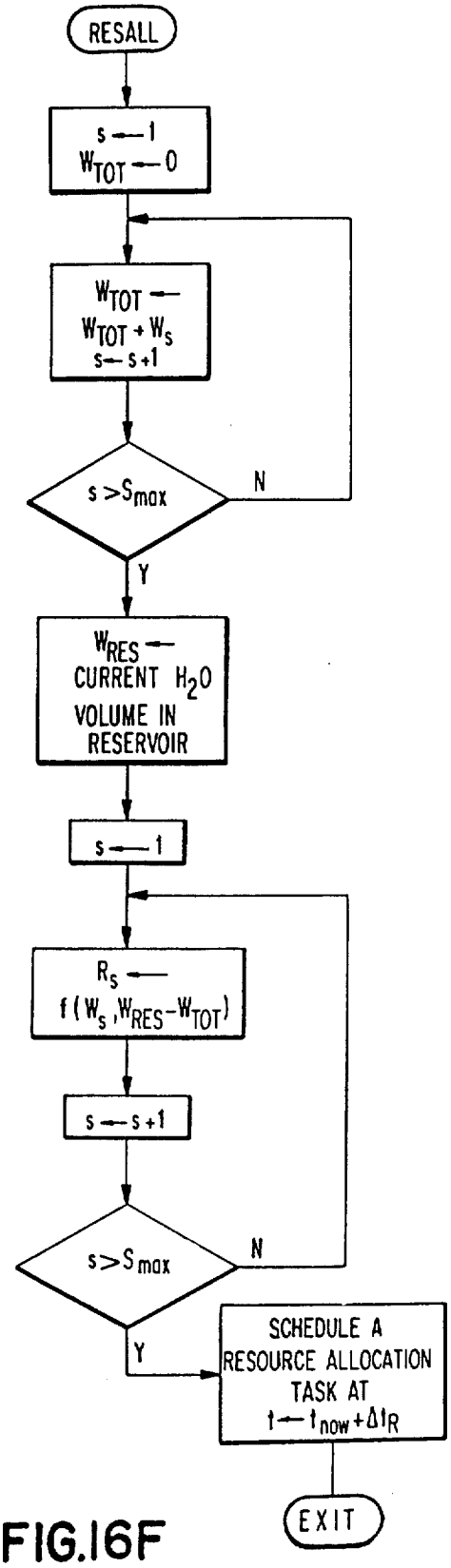
Figure 16G:
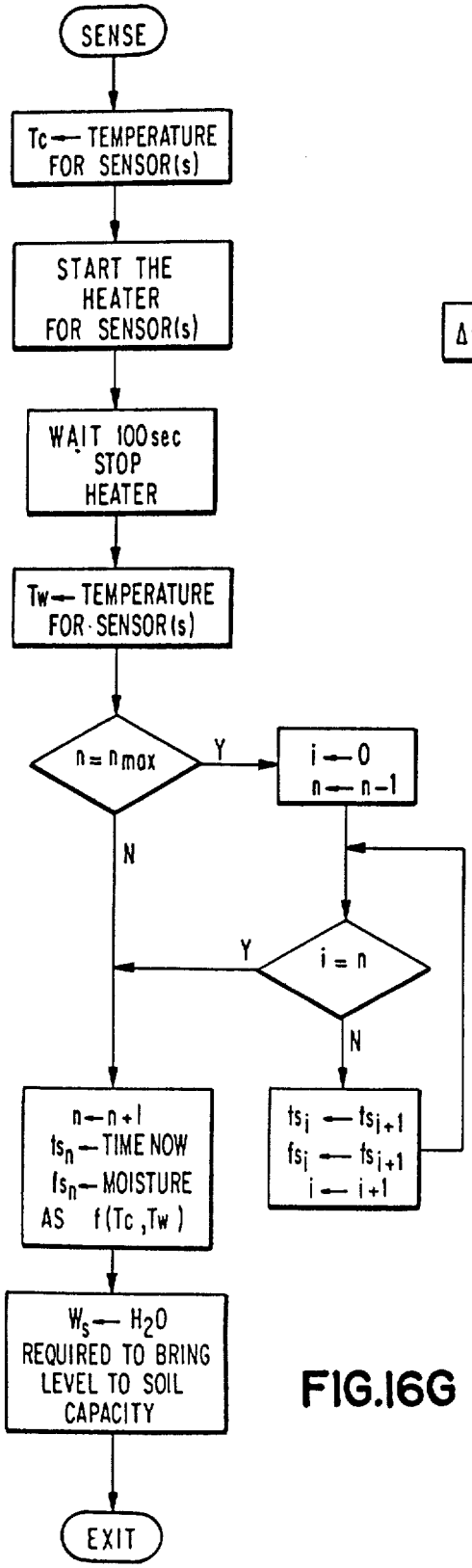
Figure 16H:
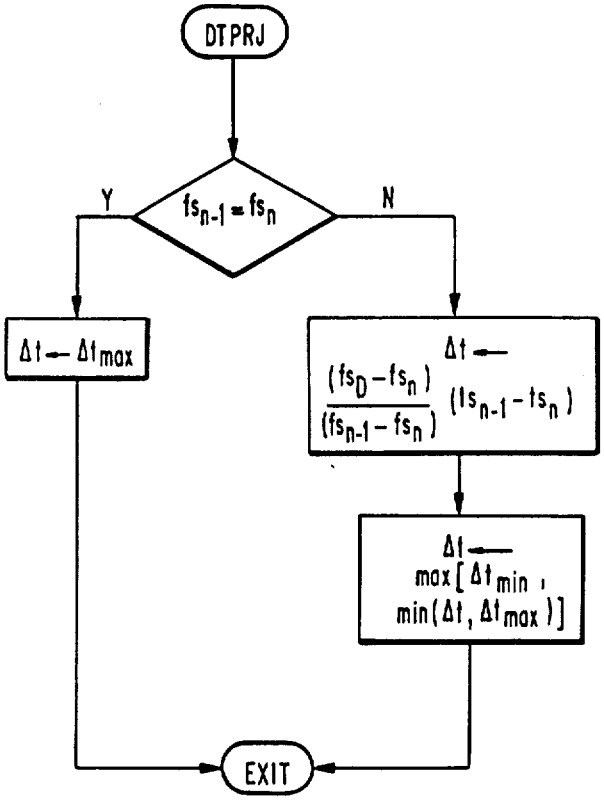

The subroutine for building the task queue shown in FIG. 16B begins with the sense subroutine shown in FIG. 16G. In that subroutine, the moisture content of the soil is first sensed and then the amount of water required to bring the soil in the area of each sensor to capacity is computed. Once this has been done for every sensor, the tasks for resource allocation and check sensors are scheduled.

The resource allocation subroutine shown in FIG. 16F begins by initiating the sensor table index and accumulating the total amount of water required to raise all fields to capacity. Next, the current volume of water in the reservoir is checked, and from this data, the computer can compute a rationing factor $R_s$ for each field in order to properly allocate the water available.

The check sensor subroutine shown in FIG. 16C initiates the sense subroutine shown in FIG. 16G. If at each sensor the moisture content of the soil is above the decision level requiring irrigation, then the time $\Delta t$ between sensor measurements is computed using the subroutine shown in FIG. 16H, and the sensor is rescheduled for checking at $t+\Delta t$. Otherwise, i.e., the moisture content of the soil is low enough to require irrigation, the rain forecast is checked, and the amount of water to be provided for each field is computed by subtracting the amount of water required to bring the soil to capacity. The computer then schedules the initiate effector task.

The initiate effector subroutine is shown in FIG. 16D and employs both the effector table index and the sensor table index. From the volume control factor for each effector and the amount of water to be provided to a particular field, the time each effector is on is computed. The pump capacity is then checked, and if it does not at this time have the capacity for an effector, that effector is rescheduled for a later time. Assuming the pump has sufficient capacity, the effector is started and its termination scheduled. This sequence is repeated until all effectors have been operated. The terminate effector task is performed according to the subroutine shown in FIG. 16E.

FIGS. 47 and 48 illustrate preferred circuitry for sensing soil moisture and soil temperature. Referring first to FIG. 47, the sensor 800 is of known type and includes a P-N junction diode 801 surrounded by a heating coil 802 and embedded in a porous ceramic medium 803. The diode 801 is connected in one arm of a bridge circuit which includes resistors 804, 805 and 806 and potentiometer 807. A voltmeter 808 is connected across one diagonal of the bridge, and more specifically between the wiper arm of potentiometer 807 and the junction between resistor 804 and diode 801. A battery or other source of voltage 810 is connected across the other diagonal of the bridge, and more specifically between the junction of resistors 804 and 805 and the junction of resistor 806 and diode 801. The heating coil 802 is connected in series with a source of voltage 811 and a variable resistor 812. An ammeter 813 may also be connected in the series circuit with the heating coil 802 to provide a measure of the current throught the coil and hence the heat generated by it.

To interrogate the sensor 800 by the computer, a 2-sensor configuration is used. That is to say, signals on the X and the Y leads locate the sensor geographically, while a signal over the effector lead activates the sensor, and the sensor response is read over the sensor data lead. The specific circuit is shown in FIG. 48. In this circuit the diode current is sampled by the computer when it is cold, thus measuring soil temperature. The current is converted to a voltage using the bridge circuit of FIG. 47. Then the heater current is applied over the transmission line, and a hundred seconds are allowed to elapse. Then the diode current is read again, and converted to voltage with the bridge. The difference between these two voltage readings now is converted by means of a calibration table stored in the computer into the percent soil moisture existing at the site of that sensor package. The translation between the voltage difference and the soil moisture is a simple matter since the voltage across the diode is linear with temperature.

The fluid delivery sybsystem of the present invention can also be utilized for insecticide spraying, which will be briefly illustrated below.

SPRAYING COMPUTER PROGRAM

Spraying would be initiated by the direct sensors, remote sensors or by direct human observation of the presence of harmful insects or fungi in a homogeneous agricultural area. For instance, an infection of apple scab would be detected by a high-resolution remote infrared scanner by its characteristic black patches on an otherwise flat colored fruit.

At early stages of use, generally an initial identification of a specific insect will be made by a human being, whereafter the area will be inspected by remote sensors and the observation of the homogeneous agricultural area which is infested will be permanently recorded in a template in the computer. Thereafter, of course, the computer can automatically scan other homogeneous agricultural areas and, upon comparison to the template, will be able to thereafter recognize that particular source of infestation.

Since insecticides effective against a particular insect are well known and established in the art, such information will be preprogrammed into the computer along with the necessary concentration of chemical required.

Prior to initiating the spraying of insecticide, the computer will perform various internal checks to determine the elapsed time since the last spraying for the particular insect involved, will determine that wind velocity does not exceed a certain value and finally will ascertain that sufficient time exists between spraying and harvesting to insure meeting legal residue requirements.

Assuming that all of the above checks are acceptable, thereafter insecticide spraying will be conducted in a manner similar to the nitrate/phosphate/potassium application earlier described except that, of course, in this instance the insecticide will be introduced from container 206e as shown in FIG. 15, and the sensors are indirect sensors, feedback being delayed for extensive periods of time as it may take a number of weeks and two, three or more separate spray applications to completely eradicate the pest involved.

By way of example, the following computer sequence is required to reach a decision for insecticide spraying. The computer will initiate spraying in the block when:

1. The field sensors, or remote sensors, or direct human observation, have sounded a trouble alert, and have given all the locations of the trouble.
2. Remote, or human, observation has identified the specific cause of trouble.
3. The computer looks up the proper treatment, in its "table of treatments", including the identity of the chemicals, and their concentrations.
4. The timer indicates the required elapsed time since the last spray (several sprays may be needed to eliminate the pest) or when
5. a heavy rain has washed off the last spray, and when
6. the wind velocity does not exceed a prescribed value, and when
7. the inventory levels of the liquid chemicals needed is adequate, and when
8. there is ample time before harvest to satisfy the legal residue requirements, and
9. other steps related to coordination with irrigation and other activities.

When the "spray" decision is reached by the computer, it directs the Controller to operate the meter valves (MV) to discharge the required amount of spray concentrates into the mixing tank. In FIG. 15 the spray tanks are labeled as herbicide, fungicide, insecticide, miticide, and spreadersticker. Through a metering valve connecting the variable speed pump with the mixing tank, water is taken in from the reservoir 217 (at the proper temperature) and mixed with the concentrates to reduce the mixture to the desired concentration for injecting the spray into the main line. The mixing motor 210 is turned on an may be held on during as much of the spraying operation as required to prevent separation of the spray materials.

The invention can accommodate either the traditional technique of "dilute spraying" or the newer technique of "concentrate spraying" described, for example, in Editors, "Save Four Ways by Spraying Low Volume", American Fruit Grower, Sept. 1972. The accommodation is made by the appropriate selection of dilution in the mixing tank, delivery pressure, and diameter of the discharge orifices.

The metering and mixing-operation just described can be done either on a continuous flow operation or a batch operation. In general, the mixing tank would not be large enough for one batch, unless the homogeneous agricultural area(s) affected is small. Thus, the computer will need to monitor the amount of fluid dispensed by means of a conductivity level detector or a float switch, or other type of sensor in the mixing tank, so that the next batch can be mixed before the tank runs out. Further, the computer program must take into account the different concentrations of the various chemicals required for different blocks of the field and arrange to spray in a sequence which avoids either over-concentrations or under-concentrations as lines are purged and refilled for a new block. By knowing the delivery rate, the computer is programmed to schedule the weakest concentrations first, and progress through the blocks in order of increasing concentrations.

Figure 16I:
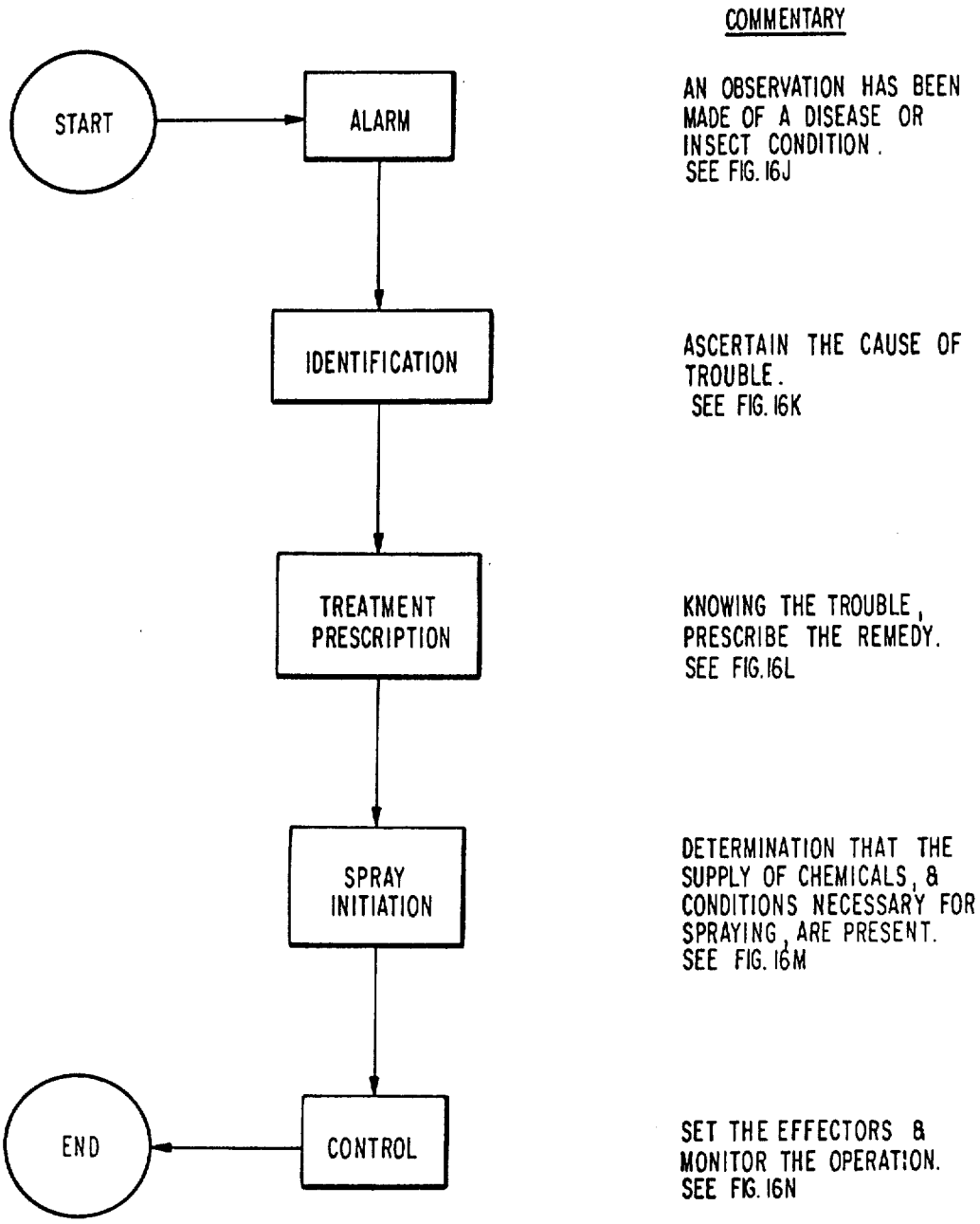
Figure 16J:
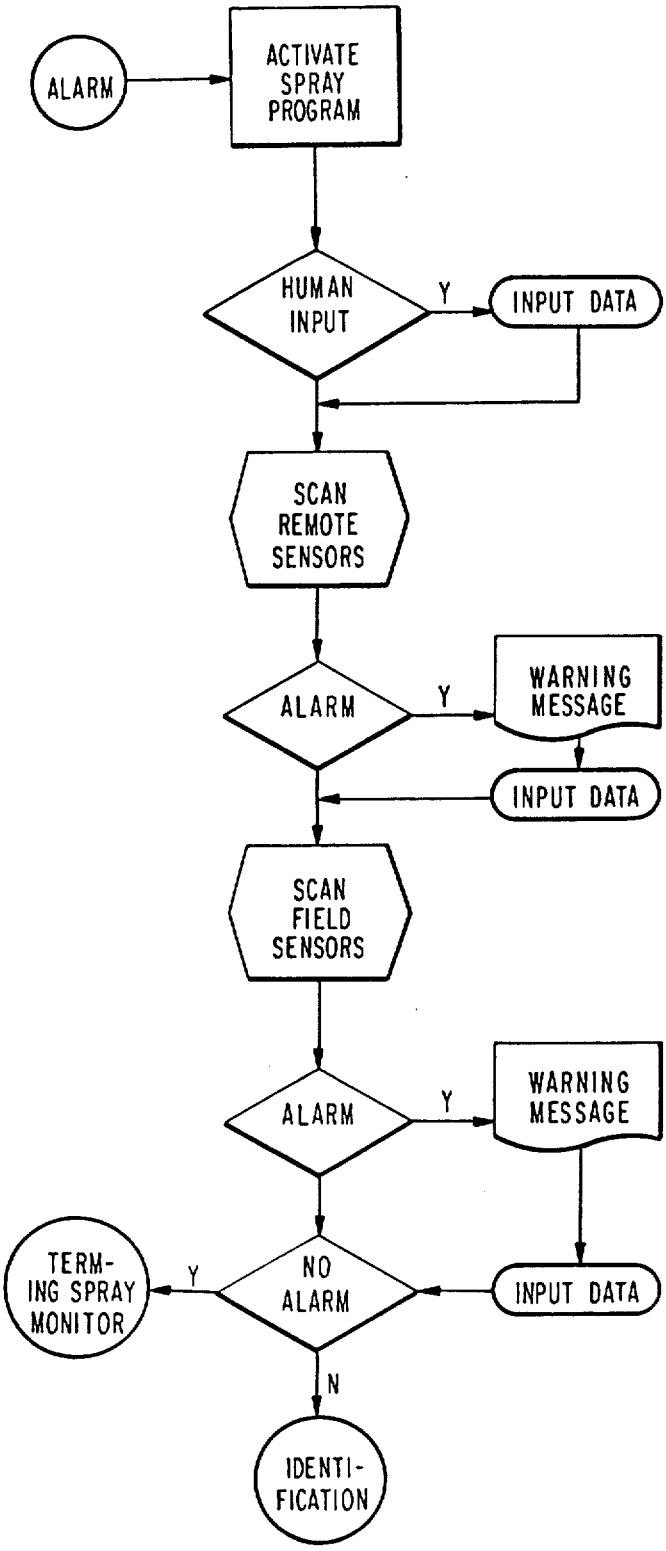
Figure 16K:
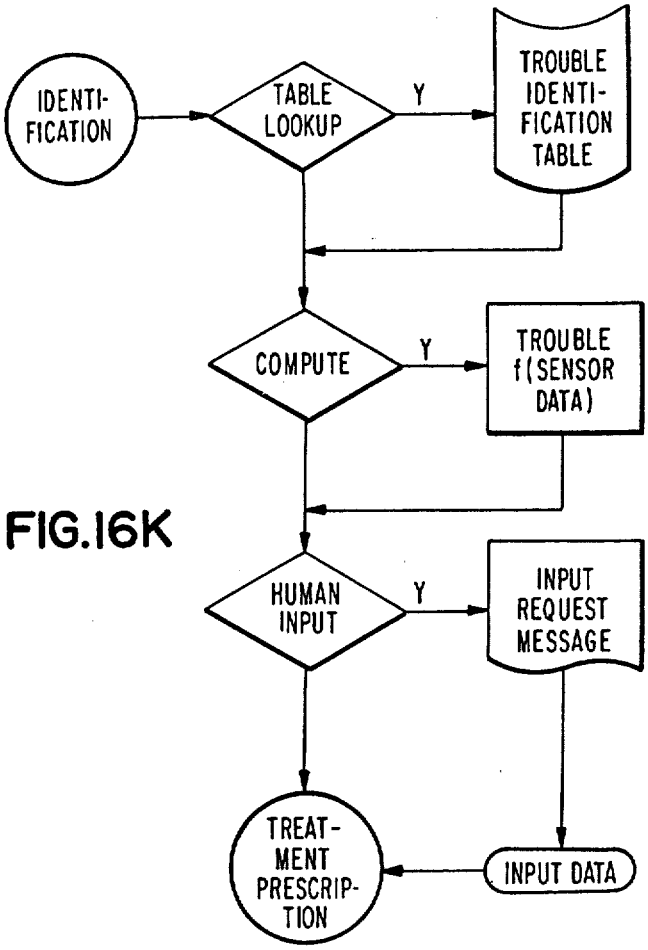
Figure 16L:
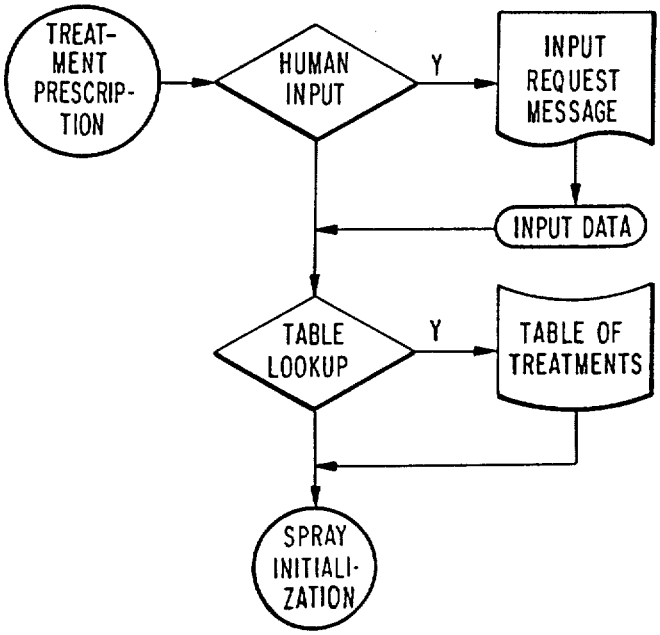
Figure 16M:
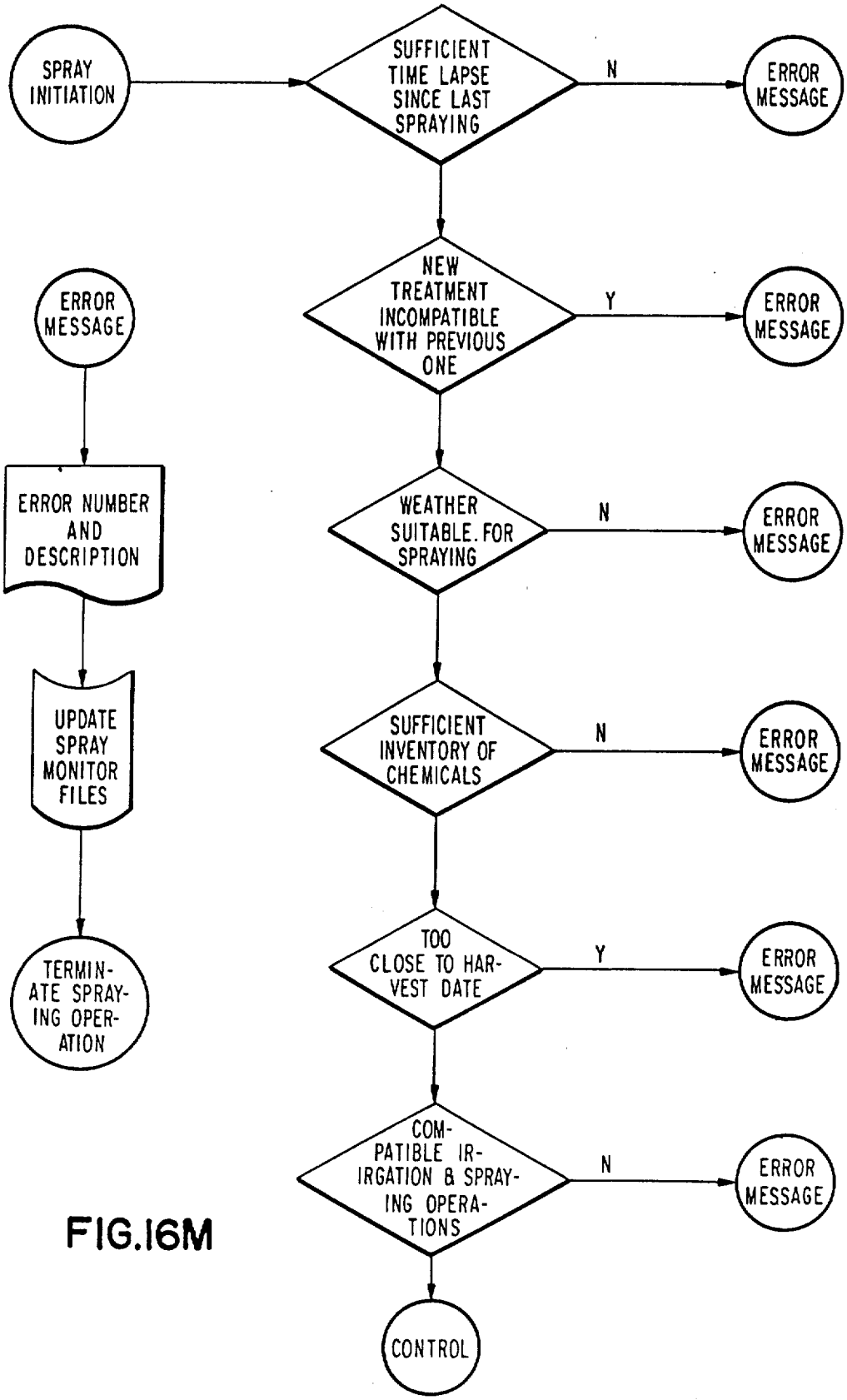
Figure 16N:
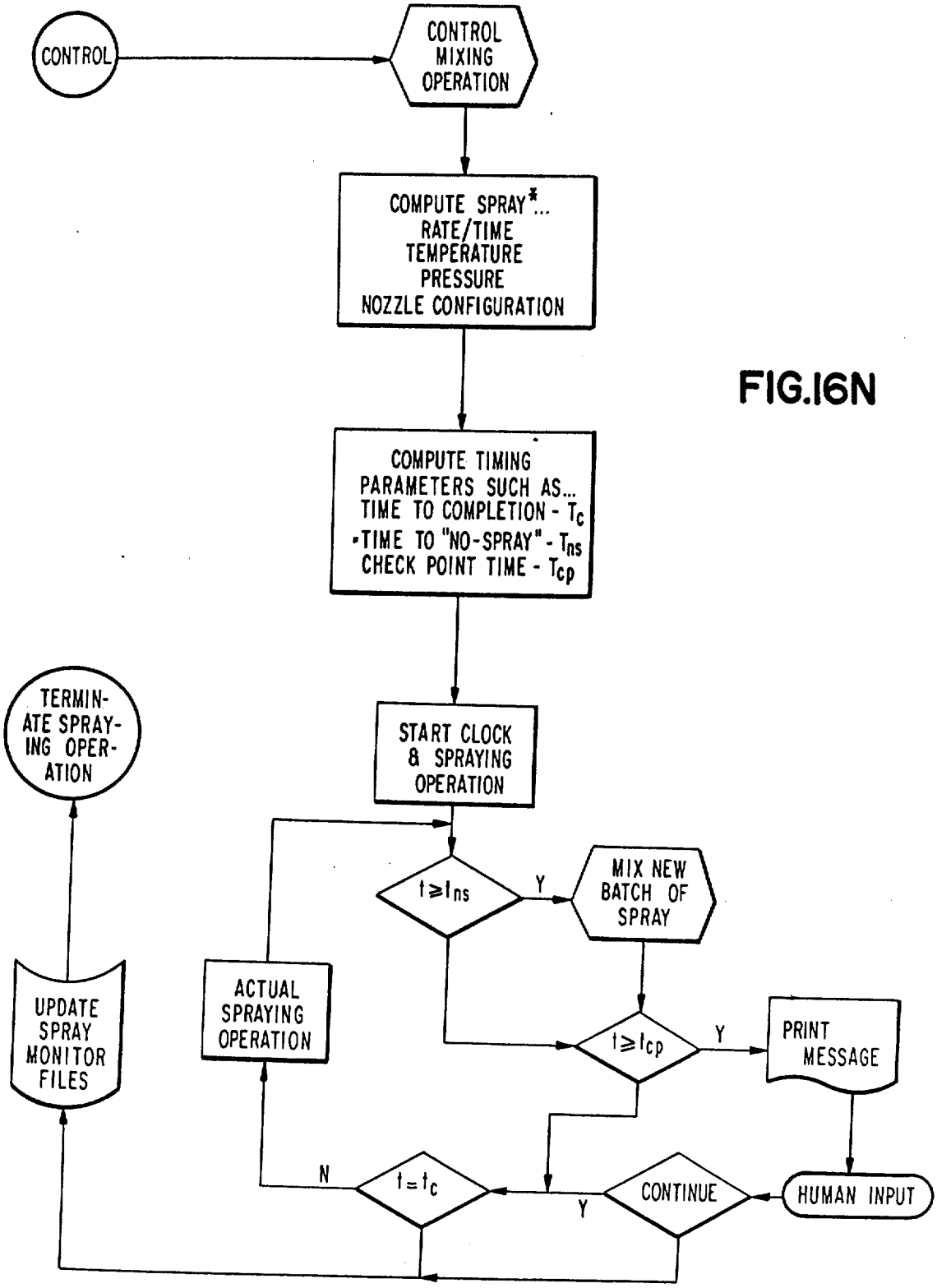

The six flow diagrams shown in FIGS. 16I to 16N, which are designed to be self-explanatory, describe the spraying operation in much greater detail. FIG. 16I shows the master flow diagram, and explains how the operation is divided into five time phases.

Automatic spraying is, of course, much more complex than is irrigation, owing to less research knowledge of pattern recognition signatures that may be left by disease and insect conditions for all plants, the more complex treatments required, etc. This is allowed for by providing for human checking of the process, by human intervention and interpretation as necessary, and by constant checking "ground truth" data coming from those direct sensors whose outputs are correlated with known pathologies.

While the above description has been primarily in terms of continuous spraying applications, it should be understood by those skilled in the art that it is possible to conduct batch spraying in accordance with the present invention. For batch spraying, of course, a premetered dosage of insecticide and diluting water would be introduced into the mixing tank 208 shown in FIG. 15, and thereafter the entire charge of insecticide applied to the desired homogeneous agricultural area or areas which require such treatment. The amount of fluid dispensed from the mixing tank 208 for batch operation can be constantly monitored by the computer by means of a conductivity level detector, flow level switch or the like.

Assuming that adjacent homogeneous agricultural areas are both subject to infestation with the same type of insect pest, but infestation in one area is more severe, batch operation might be particularly useful. For example, minimal chemical concentrations might be required for application to the first homogeneous agricultural area and maximum insecticide application required for the second homogeneous agricultural area. The first batch can be prepared at the required concentration by appropriately computer controlled metering into the mixing tank 208 and, when the level control indicates that the batch has been substantially completely dispensed, thereafter the subsequent batch can be automatically mixed at the proper concentration and thereafter insecticide spraying conducted on the second homogeneous agricultural area.

The fluid delivery subsystem of the present invention can also be used. For seeding, for example, small seeds such as alfalfa, and the like, can be sprayed in mixture with wood cellulose fiber mulch, fertilizer and adhesive.

While small seeds can be planted with the fluid delivery subsystem or by way of the hydromotor platform to be later described, larger seeds such as corn and soybeans which require considerable cover still can be planted via the fluid delivery subsystem, delivering seeds, nutrients and water to the hydromotor platform using essentially no-till technology.

The application of the fluid subsystem of the present invention for such seed planting will find particular usefulness in mature orchards and groves where planting a cover crop can be extremely difficult utilizing conventional field equipment, which can cause considerable damage to the trees. Further, since orchards are frequently planted on steep slopes, conventional field equipment may not be usable.

Referring again to FIG. 15, the sequence of seeding is similar to that earlier illustrated for nitrate/phosphate/-potassium application except that generally a batch operation would be used since seeding would be a rather infrequent function performed on an agricultural area involving, for instance, fully grown mature trees or the like.

The fluid delivery subsystem of the present invention could first be used to clear the ground in the homogeneous agricultural area to be seeded utilizing a herbicide, for instance, applied in a continuous flow manner from herbicide container 206f shown in FIG. 15 and therafter the seed mixture as described above utilized. Preferred seed mixtures are described in the U.S.D.A. Yearbook, Science for Better Living, GPO, 1968.

The fluid delivery subsystem of the agricultural system of the present invention can also be used for frost protection. The requirements for frost protection are quite dissimilar from those for fluid deliveries as earlier described, and accordingly the final decision as to whether to adapt the agricultural system of the present invention to frost protection is an economic one. However, considering the superior degree of frost protection control that can be obtained by the addition of such feature to the agricultural system of the present invention, it will often be the case that the agricultural system of the present invention will be adapted to provide frost protection.

Frost protection can generally be accomplished by any of the following four techniques:

1. By wind machines which mix lower layers of cold air with warmer air at high levels.
2. By heating air surrounding the plants by means of burning gases, smudge pots and the like.
3. By spraying the plants themselves with water so that, when the water releases its latent heat of fusion (80 calories per gram), the plant is warmed, even though it accumulates a load of ice.
4. By spraying water onto the ground under the plants.
5. By directly heating the plants with infrared lamps, this technique heretofore having been avoided because of the expense of field wiring and of electricity.

The first two options recited above are relatively inefficient or, for air heating, generate dangerous air pollutants.

Directly spraying the plants is efficient in the sense that heat is directly released to the plant, but it is much simpler to apply water to the ground surrounding a tree rather than to the tree itself. Accordingly, in the agricultural system of the present invention, it is most preferred to conduct frost protection by spraying the ground around the trees rather than the trees themselves due to the lower degree of complexity provided by such a system. This is the case even though such a system is less efficient than spraying the trees directly. In cases where the field is provided with lighting, method five can be combined efficiently with methods three or four, or both.

A potential benefit of ground spraying is that some plants cannot withstand heavy ice loads without breaking, and in such an instance ground spraying is mandatory.

As earlier indicated, it is highly preferred in the agricultural system of the present invention that the fluid distribution system have access to a source of water of varying temperatures. This is especially preferred for frost protection because it enables heated water to be used, whereby ice loading and over-saturation of the ground, which can lead to water logging, is avoided, as less water is required.

Frost damage to most plants begins at about 28° F. The general objective of frost protection is to maintain the temperature of the parts of the plant susceptible to frost damage at a temperature just below the freezing point so that water being applied to the plant is continuously freezing and releasing its heat of fusion. Typical water application rates to protect a plant from frost area:

At 25½° F.—one-tenth of an inch per hour of water;

At 24½° F.—one-eight of an inch per hour of water; and

At 22½° F.—one-fifth of an inch per hour of water.

As an average, water application rates of about 30 gallons per acre are required. By using water at a higher temperature, the rate of water application can be substantially lower, thereby decreasing the possibility of damage to plants susceptible to branch breakage, such as citrus fruit trees and peach trees.

If direct application of water to the trees is contemplated, the fluid ejection means should be just above tree height. Typically, for a citrus grove 40–60 ft. spacing is utilized with ⅛ inch to 5/32 inch nozzles operating at a pressure of about 35 psi, and hammer-operated sprinklers are used.

To permit adequate frost protection, the fluid delivery subsystem earlier described with reference to FIG. 15 is slightly modified as follows:

First, field sensors in homogeneous agricultural areas susceptible to frost damage must be provided which are capable of low temperature sensor readings. Thermistor thermometers can be utilized. The temperature at which the thermistor thermometer forwards a data pulse to the computer must be adjustable according to various stages of crop development. Either the thermistor thermometer itself can be adjusted, or, more practically, the minimum temperature at which frost protection is indicated can be programmed into the computer. For instance, to insure frost protection for blossoms, a typical temperature is 32° F., whereas for apple trees in the pink bud stage generally a temperature of 28° F. is not unduly harmful if some frost blemish is acceptable.

One advantage of the agricultural system of the present invention is that by the use of direct and indirect sensors it is possible to determine precisely where frost protection spraying may be needed. This is important because frost protection spraying requires about twice as much water per unit of time as irrigation, and accordingly if it is necessary to spray large agricultural areas at one time the fluid delivery subsystem capacity must be increased substantially beyond that needed for irrigation or like functions. This is where the cost of field lighting to provide infrared heating can be balanced off against the cost of increasing the capacity of the irrigation system.

With the use of direct and indirect sensors which are capable of analyzing the temperature of the agricultural area of the present invention, it is possible to determine the exact number of homogeneous agricultural areas where spraying is needed and to conduct frost protection spraying only to those homogeneous agricultural areas. Since it is highly unlikely that all parts of the agricultural area will simultaneously require frost protection spraying due to variations of elevations, wind conditions, water in the soil and other variables, it is seen that computer control will enable one to avoid over capacity of the fluid delivery sub-system merely for frost protection purposes.

One important criterion which the agricultural system of the present invention meets is that is provides a fluid delivery subsystem which meets the general requirements for chemical spraying, irrigation and frost protection, all of which differ substantially from each other. For example, chemical spraying requires a small diameter orifice which is capable of operating under fairly high pressure and at a high angle for covering all of the foliage and branches during application. On the other hand, for irrigation, a large diameter orifice, a low angle and low pressure are required to avoid washing beneficial materials already applied to the tree and to avoid erosion and aid percolation. When using tricklers, of course, water may be applied only to the ground.

Frost protection may require all fluid ejection means in a large area to be active simultaneously (see the explanation regarding one substantial benefit provided by the agricultural system in this regard), but the water delivery rate is very small, for example, one-tenth of an inch per hour or less, especially less for heated water.

A number of different means to achieve the above functions in the agricultural system of the present invention are further described below in detail. Exemplary of such means are a fluid ejector with elevation, angle and orifice diameter being controlled by hydraulic signals, a similar system controlled by electrical pulses, and the like.

Systems as described above require either a variable speed pump or a plurality of single speed pumps.

Such variable flow capacity is necessary for two reasons.

1. First, pressure requirements differ for different operations. Irrigation generally requires a low pressure, for example, 50 psi, insecticide spraying may require a high pressure, for example, 200 psi for high angle sprayers, and frost protection, hydraulic thinning (later explained) and the like may require still other pressures.

2. Secondly, field elevations may differ widely, and accordingly to obtain adequate pressure at certain elevations, high pump rates may be required. To accomplish the functions of irrigation, chemical spraying and frost protection, one very important element of the agricultural system of the present invention is the fluid ejector or sprinkler head. The functions of irrigation, chemical spraying and frost protection impose different requirements on the fluid ejection means or sprinkler heads utilized. In accordance with the present invention sprinkler head control means and novel sprinkler head designs are provided to enable the agricultural system of the present invention to achieve full flexibilty in accomplishing all of these functions at minimum cost and with minimum complexity.

Two essential types of fluid ejection means control for sprinkler types other than tricklers are contemplated in the present inention:

1. Control by pressure changes effected primarily by varying the speed of the pump or prime fluid mover for the fluid delivery subsystem and/or, of course, utilizing different pumps each capable of driving at one set speed. In this embodiment, hydraulic signals are effectively transmitted along the fluid delivery subsystem.

2. Control utilizing electrically controlled solenoid valves, the solenoid being operated by any desired type of current. In this embodiment, control is effectively along data transmission lines from the computer to the solenoid.

Turning firstly to fluid ejector control means by way of pressure changes, such will be described for a solid set irrigation system comprising a main fluid delivery line with a series of lateral or secondary lines extending therefrom. The lateral lines generally extend between two adjacent rows. Such a system has been shown in FIG. 15 and reference can be made thereto for a brief review of the overall schematical layout of the main/-lateral fluid delivery line system for a solid set irrigation pattern in accordance with the present invention.

In the following discussion, reference will often be made to a "sequence valve". As earlier explained, such valves are commercially available under the trademark, for example, "Sequa-Matic". Upon the introduction of fluid under pressure, such a valve will permit the entrance of water into a desired device, for example, a sprinkler head, and then, when the pressure head is reduced to zero, the sequence valve prevents the entrance of water into the sprinkler head and permits the water flow to advance to a point beyond the sprinkler head initially receiving the water. By using a plurality of sequence valves, the flow of water to various sprinkler heads in series can be advanced step-by-step down a lateral line containing a plurality of such sprinkler heads.

Sequence valves as above have two outputs, i.e., one of which valves water into the sprinkler head during the initial cycle and the other of which advances the water down the lateral line after the pressure head is reduced to zero.

Sequence valves are known which can have more than two ports, and such are also useful in the present invention, for example, the commercially available Pik-A-Port valve manufactured by Flow Valve Enterprises of Rochester, New York, which provides up to six ports. Utilizing such a sequence valve, each port could be used for a separate sprinkler head, or sub-laterals, or sub-networks of trickler tubes, which provides considerable flexibility. Rather than advancing step-by-step down a lateral line, if this type of sequence valve is utilized, water output advances step-by-step from one output port to the next each time the water is turned off, that is, each time the pressure head drops to zero.

Four methods will now be described for utilizing pressure changes to control fluid ejection means which are capable of accomplishing the three functions of irrigation, chemical spraying and frost protection, each of which illustrates different requirements.

No detail is provided on rotation means for any of the fluid ejection means described in the following disclosure as such is conventional, e.g., for the sprinkler heads shown and described with reference to FIGS. 15, 17, 20, 21, 22, 23, and 24. Small sprinklers and tricklers which cover small areas usually do not have any means of rotation. Larger sprinklers with intermediate coverage use Newton's action-reaction principle, in which the orifice is angled relative to a horizontal diameter line drawn through the circle of rotation, such that a small force is exerted perpendicular to the diameter line. Still larger sprinklers as are common in agriculture, produced, for example, by Rain-Bird Sprinkler Manufacturing Corp., use a separate drive nozzle to deflect an impact arm against spring tension, the impact of the arm against the sprinkler body rotating it several degrees at a time.

Figure 17:
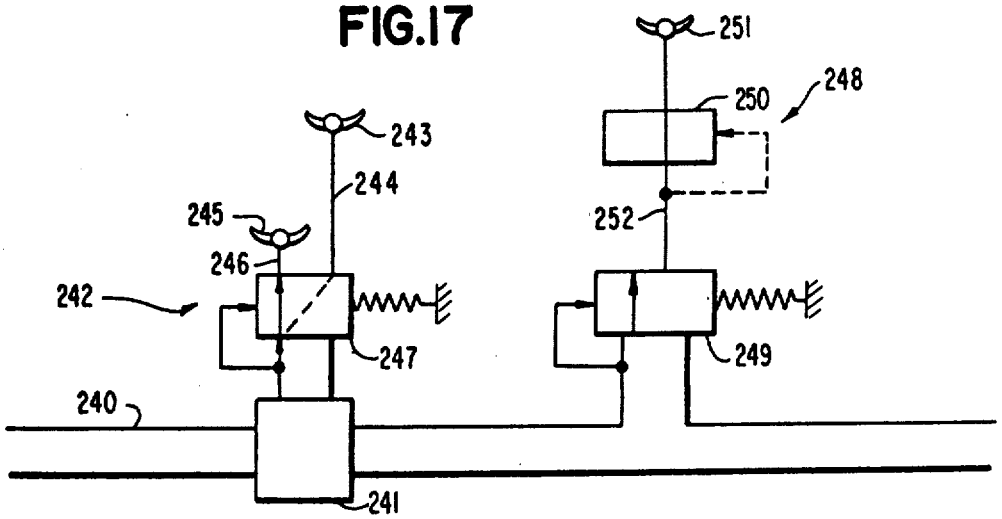
FIG. 17 shows multi-function sprinkling means.

The first method of the present invention is best explained with reference to FIG. 17. In FIG. 17 there is shown a lateral line 240 feeding to a first sequence valve 241. A first sprinkler head assembly 242 is shown comprising a "chemical" spraying sprinkler head 243 on riser 244 and irrigation head 245 on riser 246, both in fluid flow connection with a pressure operated valve 247. Downstream of the first sprinkler head assembly 242 is a second sprinkler head assembly 248, which sprinkler head assembly comprises a pressure operated valve 249, a pressure reducing valve 250 and a frost protection sprinkler head 251, both carried on riser 252.

Pressure valve 247 can be set into any one of three states, depending upon the pressure in the lateral line 240; feed to the irrigation head 245; feed to the sprinkler head 243; and off. In a similar manner, sprinkler head assembly 248 is provided with pressure valve 249 which, in this case, is capable of two positions: feed to the frost protection sprinkler 251, and off.

The activation pressure for each of the sprinkler heads 243, 245 and 251 is distinct from the others. Accordingly, by introduction of fluid into the lateral line 240 at an appropriate pressure (programmed by the computer), one of the three sprinkler heads is activated. To set the system for frost protection, the computer must advance the sequence so that water is at the farthest point from the main line, as depicted in FIG. 15. At this point all sequence valves in the lateral will be open, and all pressure valves 247 will be off because the water source will be blocked by the sequence valves 241, as explained in connection with FIG. 15.

For example, assume that the irrigation head 245 is activated by a pressure of 35 to 50 psi and the sprinkler head 243 is activated by a pressure of 60 to 75 psi. By passing fluid into the lateral line 240 at a pressure of 65 psi, the pressure switch 247 will automatically activate the chemical spraying sprinkler head 243. At a lower pressure, for example 40 psi, the irrigation head 245 will be activated. In a similar manner, assuming that the frost protection sprinkler head assembly 248 is activated at 100 psi, passing fluid under high pressure through lateral line 240 will permit the frost protection sprinkler head assembly 248 to be activated, providing sequence valve 241 is open to it.

Since front protection generally requires sprinkling at low pressure, the pressure reducing valve 250 on the riser above the pressure valve 249 reduces the pressure in the line 240 to an appropriate value.

In those embodiments of the present invention wherein pressure changes in the fluid delivery subsystem are utilized to initiate various sprinklers, it is generally necessary that the pressure activation point of the various valves be preset at the time of the installation of the system. This will allow for pressure variations occurring at different parts of the agricultural system due to variations in, for example, elevation or distance from the pump. Alternately, pump 218 can be set by the computer to provide the pressure needed to activate the pressure valves, and the pressure of activation can be different for each homogeneous agricultural area.

Figure 18:
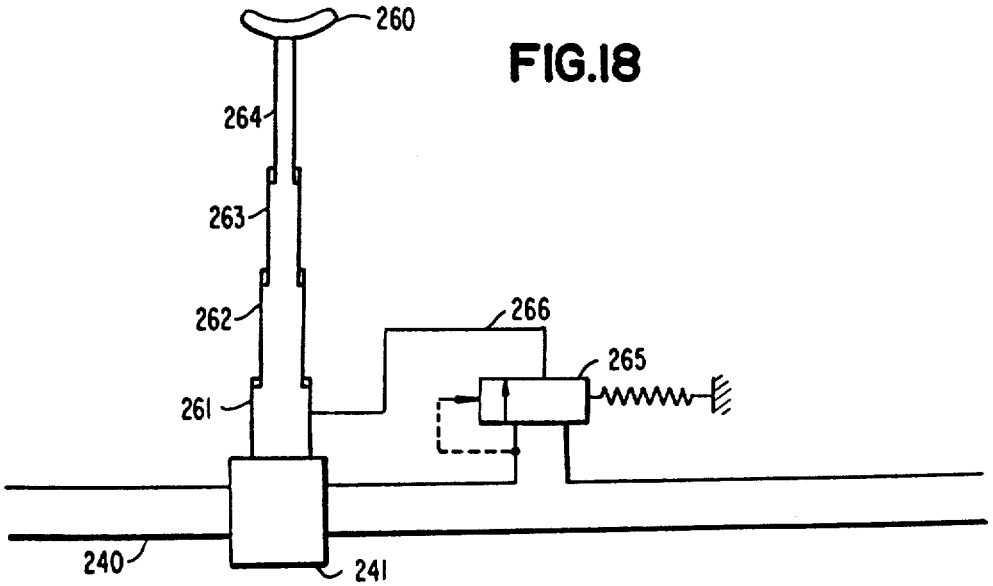
FIG. 18 shows additional multi-function sprinkling means useful in the present invention.

In a second method, a sprinkler head carried at the top of a telescoping actuator as shown in FIG. 18 is utilized. In this embodiment, the pressure in the lateral line 240 is utilized to extend the telescoping actuator, and, accordingly, to extend sprinkler head 260 as shown in FIG. 18 to the desired height to accomplish the functions of irrigation (low angle), chemical spraying (intermediate angle) or frost protection (high angle) by extending the telescoping actuator generally indicated at 261 to permit extension of telescoping members 262 (irrigation), 263 (chemical spraying), or 264 (frost protection), respectively. Sequence valve 241 functions in a manner similar to the sequence valves earlier described.

The telescoping actuator 261 is provided with internally spaced pressure valves which release at varying pressures; for example, at a pressure of 35 psi telescoping member 262 would be extended but 263 and 264 would not be extended. At a higher pressure, for example, 50 psi, telescoping member 263 would be extended but 264 would not be extended. Finally, at a high pressure, for instance 75 psi, telescoping actuator 261 would be fully extended with each of extensible members 262, 263 and 264 being exposed.

Pressure valve 265 is shown in FIG. 18 as connected to lateral line 240 and to telescoping member 261 via line 266. This pressure switch is activated when frost protection sprinkling is conducted and all sprinklers along a lateral line will generally be used. This usually means that all sequence valves along a lateral line have been initiated, and the sequence has advanced to the end of the lateral line and, of course, to the end of the homogeneous agricultural area. When frost protection sprinkling is required, generally all sprinklers will be in the "off" position. One practical way to initiate simultaneous frost protection sprinkling is by way of pressure valve 241 which by-passes sequence valve 265.

Figure 19:
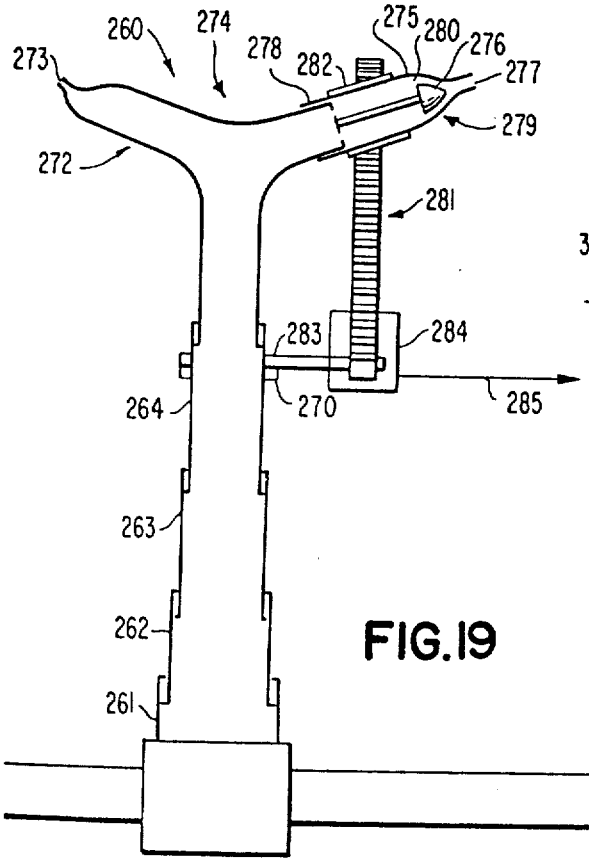
FIG. 19 shows an adjustable orifice sprinkler useful in the present invention.

The telescoping sprinkler head assembly generally shown in FIG. 18 is presented in detail in FIG. 19, where like numerals are utilized to identify like members; in FIG. 19, however, pressure switch 265 is omitted for purposes of simplicity and a detailed explanation is given of various actuating means. As shown in this drawing, sprinkler head 260 is mounted on telescoping member 264 in a rotatable manner by bearing 270. The sprinkler head 260 generally comprises a small fixed diameter orifice 273 and a variable diameter orifice section 274 having rotatably mounted thereon rotatable casing 275 adapted to coact with fixed member 276 to vary the effective diameter of orifice 277 in a manner now to be explained. The small fixed diameter orifice is set at a reaction angle to provide thrust for rotation of the head.

Rotatable casing 275 is threaded to variable diameter orifice section 274 by way of coacting threads 278 in a manner which permits rotatable casing 275 to move up or down section 274. As rotatable casing 275 is rotated, contoured wall section 279 of casing 275 moves so as to increase or decrease the effective flow diameter 280 through variable orifice 277.

Rotatable casing 275 is rotated, in this embodiment, by rack 281 which is attached to rotatable casing 275 in a manner to coact with teeth 282 in rotatable casing 275 and is attached to telescoping member 264 by way of support 283.

Although not shown in detail in FIG. 19, rack 281 can be moved to increase or decrease the effective diameter or orifice 277 using, for example, solenoid means as are later described with reference to FIG. 23, generally represented by 284 in FIG. 19. A wiring system similar to that utilized in FIG. 23 can be used to affect movement of the rack 281 with reference to the adjustable casing 275. Solenoid means 284 would, of course, be linked to the computer by an appropriate data transmission line as generally indicated by 285 in FIG. 19.

In a modification of the device shown in FIG. 19, rack 281 is not raised by computer control but, rather, is raised or lowered utilizing the sequential movement of the telscoping members 262, 263 and 264, as follows: in this embodiment, the rack assembly is fixed to telescoping member 263, it being noted that attachment is to the exterior of telescoping member 263 so that telescoping member 264 is permitted to telescope from the interior of telescoping member 263. At low pressure, where maximum orifice diameter is required, telescoping members 263 and 264 are not extended. At intermediate pressure, only telescoping member 263 is extended. Since rack 281 is fixed to telescoping member 263 and telescoping member 264 is not extended, at this position member 275 is retracted to permit maximum effective orifice diameter of orifice 277. At maximum pressure, however, telescoping member 264 extends; since rack 281 is fixed to telescoping member 263, as the nozzle assembly 260 moves vertically away from telescoping member 263, rack 281, remaining fixed, coacts with rotatable casing 275 so as to turn the same and, via threads 278, bring tapered wall portion 280 closer to member 276, thereby minimizing the effective orifice diameter 277.

As will be appreciated by one skilled in the art, if pressure is varied periodically from low to high, it is possible, utilizing the embodiment of FIG. 19, to cover both ground and trees by a sequential extension and retraction of the telescoping members. This is a hydraulic analog of the system shown in FIGS. 23 and 24 when it is being driven by a saw tooth signal.

In the above embodiment, the telescoping members, of course, lower under the influence of gravity once the pressure is lowered or when the sequence valve turns the pressure off.

A number of means are available to correlate which of members 262, 263 or 264 are exposed with increasing pressure. For example, the pressure in the line can be correlated with the weights of each of members 262, 263 and 264 so that minimum pressure is sufficient to raise only member 262, intermediate pressure is sufficient to raise both members 262 and 263, and maximum pressure is sufficient to raise all of members 262, 263 and 264, in sequence.

As will be apparent to one skilled in the art, by utilizing the telescoping assembly of FIG. 19, it is possible, with one apparatus, to accomplish the functions of irrigation, spraying and frost protection merely by computer controlled variations in pressure change which permit selection of the proper height for the function which is to be accomplished, and which can also be utilized to vary the effective diameter of the variable spray nozzle 277 to achieve distribution at the appropriate pressure for the function desired.

The third method of the present invention permits combination of all valving for an individual sprinkler head assembly, except the sequence valve, into one spool-type four port valve, explained with reference to FIG. 20.

Figure 20:
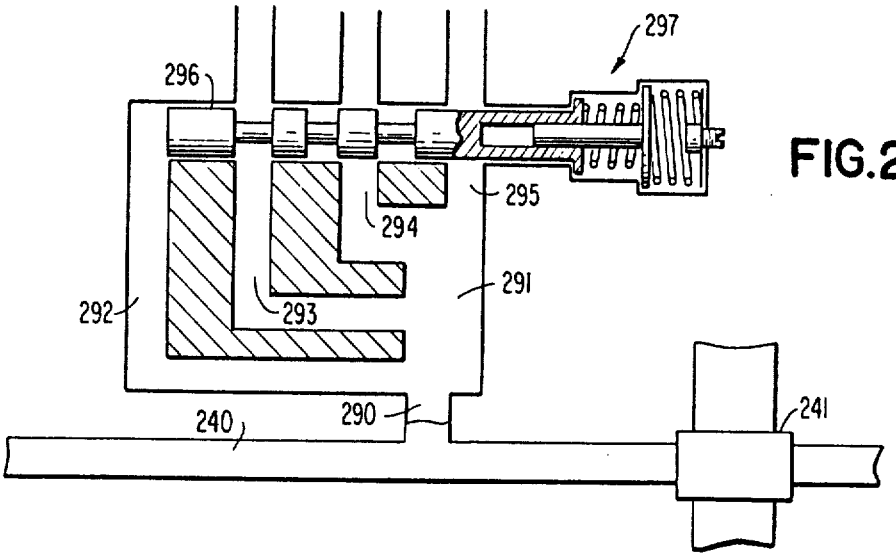
FIG. 20 shows yet another embodiment of multifunction sprinkling means useful in the present invention.

In FIG. 20, lateral line 240 and sequence valve 241 are shown feeding into a main fluid delivery line 290, in communication with secondary fluid delivery line 291. Fluid delivery line 290 permits fluid to be biased against spool member 296 by way of fluid line 292, urging the same to the right against spring biased pressure set spring 297. The pressure set spring 297 is capable of at least three registrations, for example, a low pressure registration which permits spool member 296 to be biased to the right to permit fluid flow via distribution conduit 293 to a low pressure, low elevation sprinkling means, an intermediate pressure registration which permits the spool member 296 to be biased to the right to permit fluid flow via fluid distribution conduit 294 to medium pressure, medium elevation sprinkling means and, finally, a high pressure registration point which permits the spool member 296 to be fully biased to the right to permit flow through conduit 295 which feeds high pressure, high elevation sprinkling means; conduits 293, 294 and 295 would feed, respectively, an irrigation sprinkler head, a chemical spraying sprinkler head and a frost protection sprinkler head. Since frost protection is generally accomplished at lower pressures, a pressure reducing valve (not shown) is required prior to the frost protection sprinkler assembly.

Figure 21:
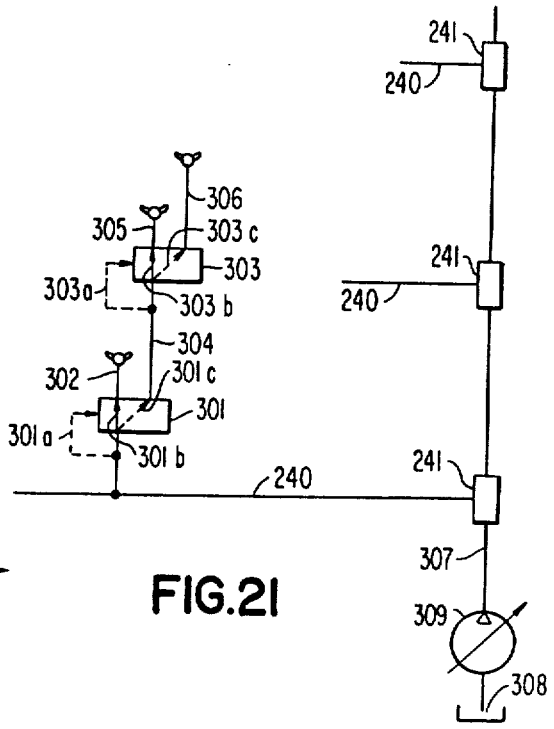
FIG. 21 shows still another embodiment of multifunction sprinkling means useful in the present invention.

While the first two methods described above are similar in nature, the last described above and the fourth method now to be described involve rearranging the fluid distribution system of the present invention. In the first two methods above, one sequence valve was used per sprinkler position. In the third and fourth methods, one sequence valve is used at the input from a main line to each lateral line. As shown in FIG. 21, each individual sprinkler assembly carried on lateral line 240 comprises a medium pressure valve 301 for feeding irrigation sprinkler head 302 and a high pressure valve 303 connected thereto by conduit 304. Medium pressure valve 301 can be in any on of 3 positions: off, irrigate or pass to high pressure valve 303, as indicated by flow lines 301a, 301b and 301c, respectively. In a similar manner, high pressure valve 303 can be in any of 3 positions: off, chemical spray via chemical spray head 305 or frost protection via frost protection head 306, as represented by lines 303a, 303b and 303c, respectively.

Main line 307 is shown in FIG. 21 as connected to a source of water 308 via pump 309.

For this method, it will be apparent to one skilled in the art that an entire lateral line 240 is activated at one time, with a repetitive activation of lateral lines being effected as opposed to a repetitive activation of individual sprinkler head assemblies, which would be the case with the first methods described above.

While fewer sequence valves 241 are required, larger diameter lateral lines 240 will be necessary since an entire lateral line is being activated at the same time.

In any of the above methods, when pump speed increases, these are two causes of pressure increase:

1. increase in pressure head from the pump speed increased per se; and
2. increase in pressure head from a decrease in the velocity head due to pressure responsive switches cutting in smaller nozzles.

Having thus briefly described the utilization of pressure changes to control the fluid flow subsystem of the present invention for effecting the functions of irrigation, chemical spraying and frost protection, it is appropriate to briefly turn to means to accomplish such control by electrically operated solenoid valves.

In one embodiment, one simply replaces every pressure control valve and every valve with a solenoid controlled valve. The solenoid control valves would, of course, be directly controlled by the computer via the data transmission subsystem and individual solenoid valves would be operated by different electrical signals over the line between the solenoid valve and the computer, or alternatively, separate signals could be impressed on separate leads.

An illustrative wiring system for a solenoid controlled fluid delivery system is schematically presented in FIG. 22, in which computer 10 is shown in communication with function selector 310, which in turn is in communication with a column selector 311. The column selector 311 permits opening and/or closing of solenoid valves 318 in the homogeneous agricultural area 314 by way of data transmission line 313. A row selector 315 is also in communcation with the computer 10, and permits activation of valve 312 in the desired lateral line 316 via data transmission line 317. Lateral lines 316 are fed by main line 307, thereby permitting fluid flow into the lateral lines and sprinkling to proceed to the selected sprinkler. Each area can be covered by just one effector such as a sprinkler, or it can be a large one requiring a whole network of sublines and effectors.

Function selector 310, column selector 311 and row selector 315 can be substantially the same, as is explained with reference to FIG. 24. Alternatively, electromechanical selectors can be utilized, for example, rotary stepping switches as are shown and described with reference to FIGS. 6 and 7. Additional alternatives will be apparent to one skilled in the art. For example, high power diode gates could be used.

As will be apparent to one skilled in the art, the row and column selectors can be wired to any number of rows or columns at a time, not merely one at a time a shown in FIG. 22. For example, if row selector 315 and associated sequence valves 312 are deleted, then all areas in any given column can be selected at once. The ability to "change the wiring" is, of course, inherent in the computer program, and this is what allows the computer to change the boundaries of a homogeneous agricultural area as required by the treatment to be given. This freedom from a fixed field wiring layout gives the agricultural system of the present invention great flexibility.

In the instance of utilizing solenoid controlled valves, it is possible to utilize a sprinkler head whose on/off position, nozzle diameter and elevation (or angle) are electrically controlled over one wire by the computer, using solenoid valves to effect the above purposes as will now be explained with reference to FIG. 23.

Referring to FIG. 23, a lateral line 240 is shown feeding a riser 320 upon which is carried sprinkler head assembly 321. The sprinkler head assembly 321 comprises shaft 322 carrying a conventional ball and socket assembly mounted thereon which comprises socket 323 and hollow ball 324, the ball and socket assembly having provided at one end thereof a spray nozzle 325. Socket 323 encloses ball 324 and is provided with an arcuate slot therein through which nozzle 325 projects to permit movement in a vertical plane.

The hollow ball 324 is rotatable in socket 323 so as to permit changes in the elevation of the spray nozzle 325. The assembly 321 can be rotated 360° around shaft 322 by the thrust of the fluid being ejected from nozzle 325 at a small reaction angle.

Elevator solenoid 326 and nozzle diameter solenoid 327 are shown as part of the sprinkler of FIG. 23. The elevator solenoid 326 is secured to the ball and socket by supports 328 in a manner so as to permit the elevator solenoid 326 to move bell crank 329, causing the nozzle 325 to be lowered or elevated.

A simple signal imposed upon the elevator solenoid 326 from the computer (not shown) via conventional slip ring 330 carried on riser 320 and data transmission line 331, which is linked to the computer, permits the solenoid to retract or extend, thereby moving bell crank 329 and decreasing or increasing the angle of nozzle 325 relative to the ground.

At the same time, nozzle diameter solenoid 327, which is supported in nozzle 325 by supports 332, can also be controlled by signal wire 331 to permit plug 333 connected to nozzle diameter solenoid 327 to be inserted into nozzle exit 325a, whereby the effective diameter of nozzle exit 325a can be varied so as to increase or decrease the pressure of fluid leaving nozzle exit 325a at constant pump pressure.

As will be appreciated by one skilled in the art, both solenoids and all wiring are in water-proof assemblies and the apparatus of FIG. 23 essentially achieves fluid application at varying pressures by varying the effective orifice diameter 325a, as opposed to relying upon variations in internal line pressure. Line pressure changes can be used to extend coverage.

Figure 24:
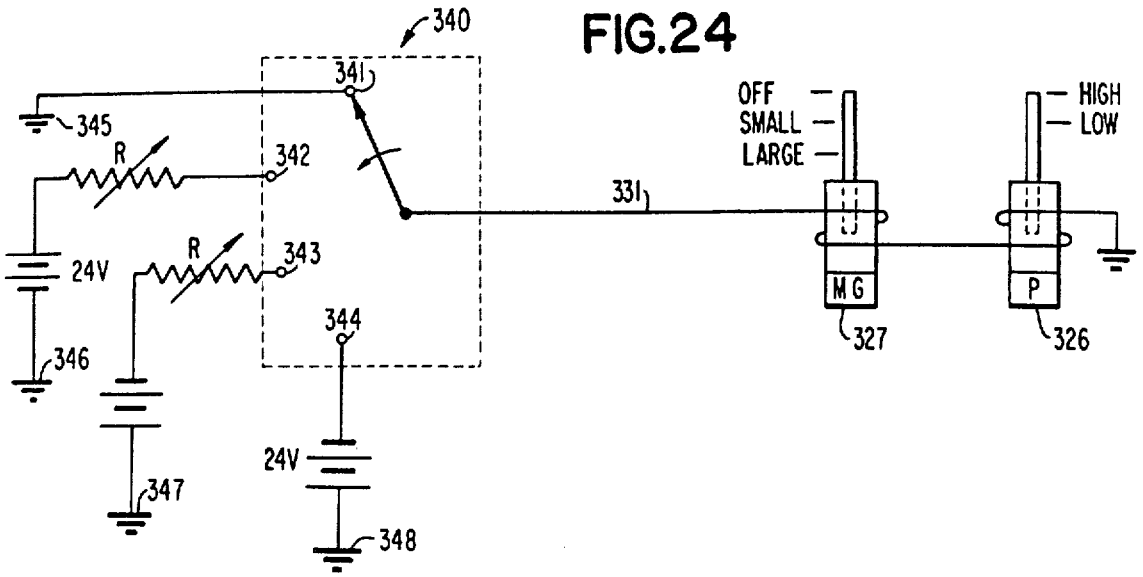
FIG. 24 shows a circuit for controlling the sprinkling device of FIG. 23.

Circuitry and means to control a solenoid operated sprinkler head assembly as shown in FIG. 23 are illustrated in FIG. 24.

In FIG. 24 the nozzle diameter solenoid 327 is shown in combination with the nozzle elevator solenoid 326, both being controlled by the signal wire 331 which, in this case, is interfaced with the computer via switch or function selector 340.

The nozzle diameter solenoid is adapted to reciprocate the plug 333 into one of three positions: a fully extended off position, a partially extended or "small diameter" position and a fully retracted or "large diameter" position. The nozzle elevator solenoid 326 is adapted to permit the nozzle 325 to be moved from a low angle position to a high angle position.

In FIG. 24, switch or function selector 340, controlled by the computer (not shown), is adapted to move to one of four positions to engage contacts 341, 342, 343 and 344. This permits the circuit to be connected to ground 345, a high resistance positive source 346, a high resistance negative source 347 and a low resistance negative source 348, respectively.

This permits the following four functions to be achieved:

Sprinkler head off, when the nozzle diameter solenoid 327 is in the off position;

Spraying and frost protection when the nozzle diameter solenoid 327 is in the small diameter position and the elevator solenoid 326 is in the high position;

Herbicide and fertilizer application when the nozzle diameter solenoid 327 is in the small diameter position and the elevator solenoid 326 is in the low position; and Irrigation when the nozzle diameter solenoid 327 is in the large diameter position and the elevator solenoid 326 is in the low position.

It should be noted that ideally spraying is done with droplets which are very finely divided to maximize coverage and minimize volume. However, it is possible to highly dilute chemicals to compromise the ideal spraying function with some other function, such as frost protection. As earlier explained, frost protection spraying requires sufficient water to supply the heat of fusion necessary to maintain temperature constant; obviously, the volume required varies depending on temperature. Accordingly, it is seen that for any nozzle of the type described to be able to achieve ideal spraying and frost protection, some compromise of maximum result must be accepted.

When switch 340 is in position 341, the entire system is grounded and no flow occurs. All sprinklers are in the off position.

When switch 340 is in the 342 position, high resistance positive source 346 is connected, whereby nozzle diameter solenoid 327 is decreased to the "small diameter" position. The polarity of the positive source causes the nozzle elevator solenoid 326 to move to the "high" angle.

When switch 340 is brought to position 343, the current remains the same as at position 342 so nozzle diameter solenoid 327 remains unchanged, but polarity is reversed so that the nozzle elevator solenoid 326 moves to the "low" position.

When the switch 340 is moved to position 344, nozzle angle remains "low", but the decrease in circuit resistance causes nozzle diameter solenoid 327 to move to its "large" diameter or maximum opening position.

Modifications to the above system would include, for example, replacing nozzle diameter solenoid 327 by a spring-rotary hydraulic actuator closing down an iris-type nozzle in response to pressure increases.

If desired, the embodiment shown in FIGS. 23 and 24 can be modified so as to be provided with a double nozzle, instead of a single nozzle as shown. The only substantial modification would be that a pair of solenoids would be required, one for each nozzle, to increase the water flow, to secure higher rotational velocity or the like.

As a further modification, it will be apparent to one skilled in the art that the nozzle diameter solenoid can be caused to constantly oscillate in a vertical path by varying the resistance in line 331.

While in the system of FIG. 24 as described one specific set of signals is utilized to control nozzle angle and nozzle diameter, it will be appreciated that any comparable set of unique signals can be used to effect the control described, i.e., any set of signals which can be differentiated for nozzle angle and nozzle diameter control. For instance, while polar relays are described which move from one position to another upon receiving a reversal of battery signal, marginal solenoids, the electrical counter-part of a spring-loaded spool valve, could also be used. For instance, two marginal solenoids could be utilized which are controlled by four d.c. signals, each of different amplitude. Alternaively, identical solenoids each with a different spring loading to produce four different positions when connected in series could be utilized, though this last embodiment is mechanically more complex than earlier embodiments.

In a final fluid delivery embodiment, two different types of fluid delivery systems are used in combination:

a. Sprinkler head assemblies as are described in U.S. Pat. No. 3,123,304 to Sutton. Sprinkler head assemblies of this type require both a liquid (typically water)/chemical delivery line and a gas (typically air) delivery line. The use of water and air, both under variable pressure, enables a superior spraying function, and by enabling the use of heated air and/or water, a superior frost protection function as well, to be achieved.

b. "Microtube" tricklers as are commonly available to the art, see for example Kenworthy, A. L.—"Trickler Irrigation Surges Ahead", American Fruit Grower, pp. 15–17, April 1972 and Kuykendall, J. R. et al.—"Trickle Irrigation Proves Its Worth", American Fruit Grower, pp. 22–25, April 1973.

In the above combination, the sprinkler head assemblies as described in the Sutton patent would not be used for standard irrigation purposes or for the dispensing of chemicals intended for the soil itself, such as nutrients, pH controllers, herbicides, rodenticides and the like. Rather, the dispensing of water and chemicals intended for the soil itself would be accomplished by the microtube tricklers, the sprinkler headers of the Sutton patent generally being utilized to apply desired materials directly to the trees in the agricultural area.

Since the sprinkler head assemblies described in the Sutton patent are directly adaptable to the agricultural system of the present invention, no detailed discussion need be offered thereon.

With reference to trickler or aeration irrigation, as is known in the art, the effector devices are extremely inexpensive and are generally made of plastic, one type being simply a very small "spaghetti" tube aptly called a "microtube", which leaks water onto the ground under low pressure at a very low rate such that large agricultural areas can be simultaneously irrigated. The cost of such microtube tricklers is extremely low.

Figure 25:
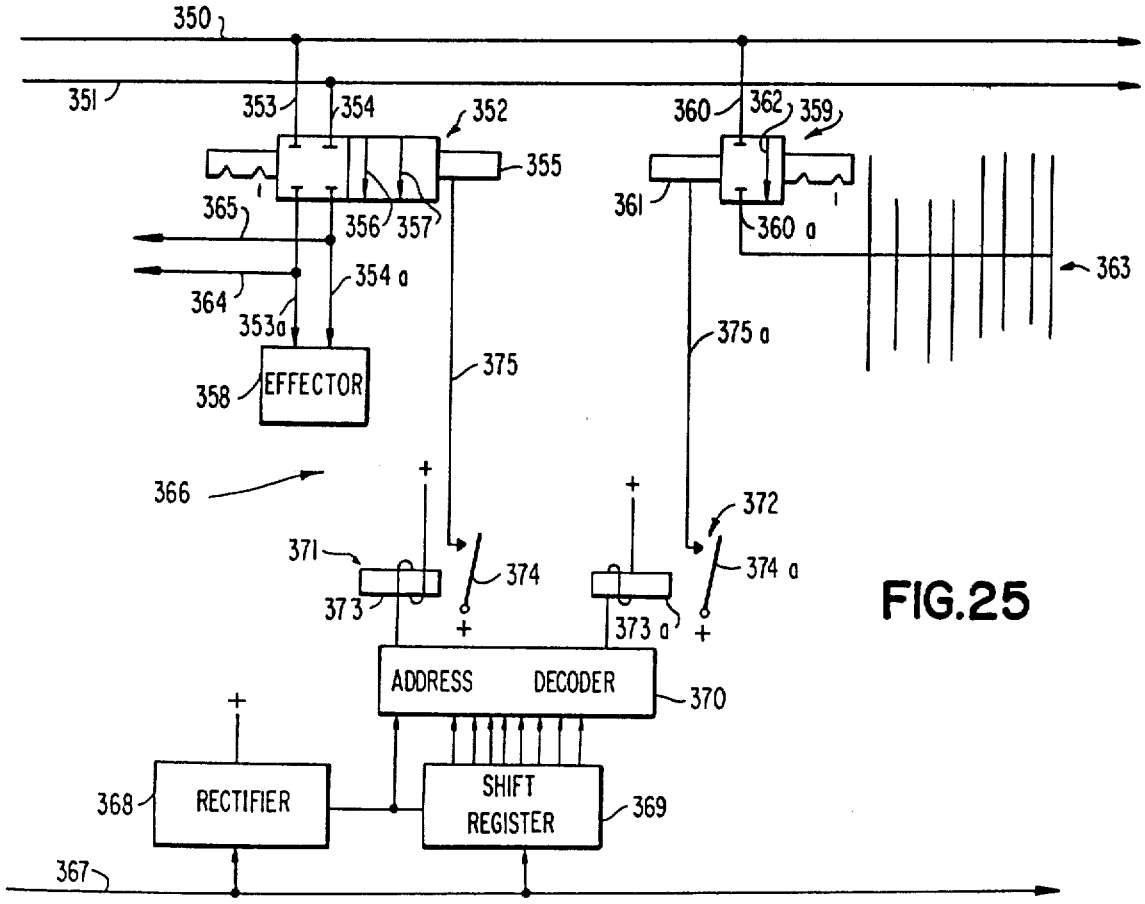
FIG. 25 shows yet another embodiment of multifunction sprinkling means useful in the present invention.

An embodiment of the present invention is schematically shown in FIG. 25, and this embodiment will be explained with reference thereto, FIG. 25 generally showing fluid delivery, application and control means in schematic form.

Referring to FIG. 25, there is shown therein water and chemical delivery line 350 and air delivery line 351, both of these lines being under pressure. Water and chemical delivery line 350 is shown connected to spool valve 352 via lateral line 353 and to spool valve 359 via lateral line 360. Air delivery line 351 is connected to spool valve 352 via lateral line 354.

Spool valve 352 is utilized to control the flow of fluid to sprinkler head assemblies 358 as are described in the Sutton patent.

Upon appropriate activation of solenoid 355, interior flow conduits 356 and 357 can be brought, respectively, into position so as to inter-connect lateral line 353 with lateral line 353a and lateral line 354 with lateral line 354a, respectively, which lead to sprinkler head assembly 358. As will be apparent to one skilled in the art, spool valve 352 is adapted to permit the passage of either liquid or gas or both from the water and chemical delivery line 350 and the air delivery line 351 to the sprinkler head assembly 358. In a similar manner, spool valve 359 permits lateral line 360 to be brought into communication with lateral line 360a via flow conduit 362 to permit water to flow to microtube trickler assembly 363 upon activation of solenoid 361. Both solenoid control means are computer controlled as will later be explained in detail. Spool valves 352 and 359 are conventional and can be selected from those known in the art.

In FIG. 25, fluid delivery lateral line 364 and gas delivery lateral line 365 are shown leading to other sprinkler head assemblies in the homogeneous agricultural area, which sprinkler head assemblies are described in the Sutton patent.

Liquid and chemical flow and gas flow in lines 350 and 351, respectively, are, of course, under computer control as will now be explained.

Control means in FIG. 25 is broadly identified by the numeral 366, and is shown as comprising data transmission line 367 in circuit with rectifier 368, shift register 369, address decoder 370, tree or plant dispense relay 371 which activates solenoid 355 and ground dispense relay 372 which activates solenoid 361 upon receipt of an appropriate digital pulse signal generated by the computer (not shown) and forwarded along data transmission line 367.

Data transmission line 367 carries a.c. power and signal pulses on a common power pair as described with respect to FIG. 9. If desired, of course, separate pairs can be utilized.

For purposes of illustration, the initiation of fluid dispensing in sprinkler head assembly 358 will be described.

The first step to activation of sprinkler head assembly 358 comprises the initiation of a digital pulse signal from the computer which is propagated along data transmission line 367. The digital pulse signal is accumulated in shift register 369, and the content thereof is outputted to address decoder 370, which comprises a conventional diode network. The address decoder 370, when the correct combination of digital pulses to activate sprinkler head assembly 358 is received, generates a low power output signal which is sufficient to activate tree or plant dispense relay 371, shown as comprising electromagnetic coil 373, switch 374 and power transmission line 375, permitting solenoid 355 to be activated and open or close spool valve 352, where liquid (with optional chemical) and/or gas (typically air) can be permitted to pass from lateral lines 353 and 354, respectively, into sprinkler head assembly 358 via lateral lines 356/353a and 357/354a. As will be appreciated by one skilled in the art, since the output signal from the address decoder 370 will be a low-power signal sufficient only to operate a small relay, it is necessary that relays 371 and 372 be connected to a high-power source which provides power sufficient to drive solenoids 355 and 361, respectively.

Ground dispense relay 372 is shown as comprising electromagnetic coil 373a, switch 374a and power transmission line 375a which permits a high power source to be linked to solenoid 361, whereupon spool valve 359 can be activated to permit liquid (typically water and optional chemicals) to be fed to the microtube trickler assembly 363 via lateral lines 360/362/360a. Operation is substantially identical to operation for activation of sprinkler head assembly 358.

In the embodiment shown, the high-power source is provided by the common data transmission and a.c. power line 367, the required d.c. power to shift register 369, decoder 370 and relays 371 and 372 being provided by rectifier 368.

Both solenoids 355 and 361 are double acting solenoids, the solenoids being activated by an appropriate signal from the tree or plant dispense relay 371 or the ground dispense relay 372, respectively. For example, assuming spool valve 352 is moved to the open position by solenoid 355, it remains in the position until a further pulse from the tree or plant dispense relay 371 is received, whereafter the solenoid moves the spool valve to the closed position. The spool can be held in place in a conventional manner, for example, by a detent as is known in the art.

As will be apparent to one skilled in the art, utilizing the embodiment of FIG. 25 it is necessary that the solenoids be either spring-biased so that they can be locked in position to permit fluid passage and then automatically released by the release relay or a solenoid with dual windings should be used to permit movement between a position which permits fluid flow and a position whith prohibits fluid flow.

The above described system enables a number of advantageous results to be achieved. Firstly, the microtube tricklers can deliver hot water, if desired, simultaneously with spraying to achieve frost protection with water and air, either or both the water or air being heated, thereby providing maximum flexibility in achieving frost protection.

Further, as will be apparent, one is able to completely divorce the spraying function from the frost protection function using the embodiment of FIG. 25, thereby avoiding compromising maximum results achievable as is somewhat the case with the earlier described embodiment of FIG. 23.

The fluid delivery subsystem of the present invention is also capable of increasing the concentration of carbon dioxide in a homogeneous agricultural area. The normal concentration of carbon dioxide is about 0.03%; it is known that by increasing the concentration of carbon dioxide three to five times, photosynthesis is increased, resulting in increased yields, improved product quality and accelerated product maturity (see USDA Yearbook-Science for Better Living, U.S. Goverment Printing Office, 1968).

The fluid distribution subsystem of the present invention can be utilized to increase carbon dioxide concentration in a number of ways. Typically, carbon dioxide is introduced directly into a main fluid distribution line at a pumping station where it readily dissolves in cold water under pressure in a stable manner.

Carbon dioxide is contained in cold water at a pressure of about 3–4 atmospheres, well within the pressure limits of the fluid delivery system of the present invention.

While the carbon dioxide will remain in the fluid delivery subsystem while under such elevated pressure, upon being applied to a homogeneous agricultural area the reduction in pressure permits the carbon dioxide which is maintained in the form of carbonic acid in water while under pressure to decompose into carbon dioxide and water.

Since carbon dioxide is heavier than most other constituents in the air, it will collect on the ground and, providing that appropriate baffling is provided surrounding the homogeneous agricultural area, it can be maintained within the homogeneous agricultural area, thereby permitting the benefits of carbon dioxide application set forth above to be achieved.

Obviously the application of carbon dioxide is best adapted to flat terrains, but it should be understood that a desired terrain can be terraced by baffles along contour lines of the elevation to retain the carbon dioxide.

Carbon dioxide can be derived for the agricultural system of the present invention from a variety of sources, for example:

From commercially available high pressure storage cylinders;

From dry ice;

From the combustion of waste cellulose;

From the decomposition of organic wastes, whereby anaerobic bacteria produce methane gas which is, in turn, subjected to combustion to yield carbon dioxide;

By treating limestone with nitric acid, producing calcium nitrate as a by-product which is useful as a source of liquid fertilizer; and From the fermentation of grains and/or plant tops, also producing a valuable by-product similar to low grade bear.

The carbon dioxide can be introduced to the homogeneous agricultural area via the fluid distribution system of the present invention by way of, for example, irrigation sprinklers or tricklers as earlier described. Since a certain finite amount of time is required for the decomposition of carbonic acid, generally the water carrying the carbonic acid will reach the ground prior to such decomposition, and little if any carbon dioxide is lost by premature escape while the spray is passing through the air.

Alternatively, a "trickler system" of irrigation could be utilized for such application of carbon dioxide.

THE FIELD OPERATIONS SUBSYSTEM

As will be apparent to one skilled in the art, it is possible to accomplish all field operations utilizing manual labor, and such is contemplated in a non-preferred embodiment of the present invention. For example, manual labor as is conventionally utilized at the present time can be used to harvest, convey, grade, store and pack the fruit, in addition to accomplishing tree care operations.

Further, if desired, the field operations subsystem of the present invention can comprise conventional mechanical means to accomplish the inidividual operations set forth above.

The prsent invention does, however, provide normal means to accomplish one or more, including all, of the field operations of fruit harvesting, fruit conveying, fruit grading, fruit storage and fruit packing, in addition to typical tree care operation such as pruning, thinning and the like.

In a highly preferred form of the present invention, the field operations of fruit harvesting and fruit conveying and tree care operations are performed utilizing a hydromotor platform as has heretofore been briefly alluded to and which will be described in detail in the following section.

In a further highly preferred form of the present invention, the field operations of fruit harvesting, fruit conveying, fruit grading and fruit storage in addition to some tree care operations are accomplished utilizing the power of water derived from the fluid delivery subsystem of the present invention.

THE HYDROMOTOR POWERED PLATFORM

As indicated above, in a highly preferred embodiment of the present invention a water-powered platform (the hydromotor platform) which is coupled to the fluid delivery subsystem earlier described is utilized.

The following description will be entirely in terms of such a "water-powered" hydromotor platform; however, it will be apparent to one skilled in the art that the propulsion function per se need not be by hydromotor. Rather, the platform can be driven by, for example, a conventional gasoline engine, by electrical power provided from a central source linked to the platform by a power cable, by batteries, or by other means.

However, in view of the fact that water power is available in every part of the agricultural area of the present invention, being provided by the fluid delivery subsystem, and further in view of the fact that after the hydromotor has extracted power from the water to accomplish a propelling function the water is still functionally useful in the present invention, the following description will be in terms of such a "hydromotor" platform.

The term "umbilical" will often be used in referring to the hydromotor platform. In the context of the present discussion, this refers to the pipe or conduit carried by the hydromotor platform through which fluid is derived from the fluid delivery subsystem, which fluid (typically water) can be used to power the hydromotor platform and to drive various ancillary devices carried thereon. As earlier explained with reference to the embodiment of FIG. 13 wherein strut member 184 is absent, if desired the "umbilical" can also carry power leads or data transmission (control) leads. As will further be apparent, the embodiment as shown in FIG. 13 can be utilized as the umbilical to provide not only fluid to the hydromotor platform, but various chemicals, small seeds and the like.

As will be described in substantially greater detail below, the hydromotor platform of the present invention can utilize the water power available from the fluid delivery subsystem to accomplish one or more of the following major field operations;

Fruit harvesting, in this instance using jets of fluid to remove the fruit from the trees in the agricultural area;

Fruit conveying, in this instance by way of a water conveyor mounted on the hydromotor platform and adapted to remove the fruit from the point of harvesting to any desired point in the agricultural area;

Tree care operations such as pruning, thinning of fruit, brush removal and the like, which tree care operations can be accomplished utilizing either the direct power of water in the form of, for example, water jay sprays, or using the indirect power of water to drive ancillary hydromotors which are in turn utilized to power, for instance, slotting saws, pruning saws and the like.

It will be apparent to one skilled in the art that any or all of the above functions need not be performed utilizing water power. For example, only certain of the above functions need be accomplished utilizing water power, whereas other of the above functions can be accomplished in a conventional manner. For instance, the harvesting of the fruit can be accomplished utilizing manual labor, whereafter the conveying of the fruit is accomplished using the water conveyor, mounted either on a hydromotor platform where the water after driving the hydromotor is used to effect a conveying function or mounted on a conventionally powered platform where water is supplied to the platform to accomplish primarily the function of conveying of fruit.

Alternatively, tree care operations can be accomplished in a conventional manner and both harvesting and conveying of fruit accomplished using water from the fluid delivery subsystem.

As a modification, tree card operations can be accomplished utilizing the water power derived from the water in the fluid delivery subsystem and fruit harvesting and fruit conveying performed in a conventional manner using, for instance, manual labor and conventional flatbed trucks.

However, as will be apparent from the later description, the greater utilization which can be made of water power available from the water taken from the fluid delivery subsystem, the more efficient the use of the hydromotor platform becomes. Accordingly, the following discussion will be in terms of a hydromotor platform wherein maximum utilization is made of water power, though the present invention is not limited to such all inclusive use of water power.

It is possible to accomplish the above field operations utilizing water power because even with conventional gasoline driven irrigation pumps which are commercially available it is possible to deliver to any point along the main line of the fluid delivery subsystem of the present invention adequate power to not only drive a hydromotor platform as described but to power ancillary devices carried thereon. The amount of hydraulic power that can be delivered to such a hydromotor platform operating up to 1,000 feet from the main line can range from 10 to 30 hp, or more if needed.

The following are the main features of the hydromotor platform:

First, water power for the hydromotor, and other devices which may be mounted on the hydromotor platform if desired, can come from a pipe or hose connected to the fluid delivery subsystem and unwound from a reel carried by the hydromotor platform.

Second, the hydromotor is reversible so that the hydromotor platform can move down a row middle and back to its starting point. Direction change can be accomplished by a manually operated valve or a solenoid operated valve in the case of computer control of the hydromotor platform.

Thirdly, and vital to the optimum use of the hydromotor platform, water discharged from the hydromotor is further useful because it is discharged into a water conveyor which is unwound from a reel on top of the hydromotor platform as the hydromotor platform moves away from the main line. The water conveyor is an important aspect of the agricultural system of the present invention, and will later be described in substantial detail.

Fourthly, the hydromotor platform is adjustable in height, i.e., its platform is adjustable from about a foot from the ground to as high as needed for most users to reach the highest branch of a tree. While in principle the elevatable portion of the hydromotor platform can be designed to extend to extreme heights, for most fruit tree farms a height capability of about 15 feet will suffice.

Fifthly, the hydromotor platform will have laterally extensible members or "wings" capable of moving into the space between trees. For example, four such laterally extensible members could be provided, two at each end of the hydromotor platform. These laterally extensible members can be utilized to bring various devices or men into various positions closely adjacent to the trees.

In the following discussion, it should be kept in mind that the "portable" water conveyor, be it reel mounted on the hydromotor platform or manually installed in sections as the hydromotor platform proceeds from tree to tree, is generally connected to a "main line" permanently installed water conveyor. The term "water conveyor" will often be used to describe the overall system of "portable" and "permanent" water conveyors in the following discussion; such use will be clear from context.

Referring to FIG. 26(a), the hydromotor platform is shown as comprising a lower support member 380 supported by wheels 381 suspended therefrom in a conventional manner, the lower support member 380 being joined to an elevatable upper member 382 by way of elevating means generally shown at 383, which elevating means comprises support members 384 rotatable at their approximate midpoint about pivots 385a and 385b and rotatable about the upper and lower support members as shown at points 386. Numeral 387 represents a conventional hydraulic ram joined to pivots 385a and 385b; by extending piston 388 of hydraulic ram 387 upper support member 382 can be raised, and by opening a conventional release valve (not shown) in ram 387, upper support member 382 can be lowered under the influence of gravity. The ram can obtain its pressure from the unbilical tied to the main line, or a conventional hydraulic oil pump (not shown) or the like can be used to hydraulically raise upper support member 382. The oil pump can be in turn powered from the primary source which is the high pressure umbilical.

Operator control area 389 is generally shown at the front portion of the lower support member 380, the operator control area 389 comprising various means as will later be explained in detail.

At one end of the lower support member 380 there is shown pipe reel 390 attached to the lower support member 380 by support 391, the pipe reel 390 carrying water line 392 (the pipe reel is described in detail in FIG. 27). Water line 392 in this embodiment is merely a flexible hose connected to the fluid delivery subsystem of the present invention; it serves to drive the hydromotor 393. Water line 392 passes through slot 394 in lower support member 380. Thereafter it is shown as being permitted to lay on the ground as it is unreeled from pipe reel 390.

In the embodiment shown, pipe reel 390 is not drawn to complete scale for purposes of simplicity. For example, where the length of the lower support member (exclusive of the operator control area 389) is about 20 feet, the pipe reel would be, for example, generally about 10 feet in diameter. Wound thereon would be water line 392 which could be, for example, a conduit having an internal effective flow area of about 2 inches. It will be appreciated by one skilled in the art that the exact dimensions of the pipe reel 390 and water line 392 are not per se critical, so long as the water line is capable of carrying sufficient water, under pressure, to drive the hydromotor (later described) and any ancillary apparatus carried by the hydromotor platform. In those instances where the diameter of the pipe reel is larger than the minimum difference between the upper support member 382 and the lower support member 380, one merely would offset the water conveyor 403, conveyor drum 405 and support 406 to either the right or left side of the support member 382 and remove a portion of the upper support member so as it reciprocates in the vertical plane it can pass around the pipe reel 390, as shown in FIG. 29.

As the hydromotor platform moves along its path of travel, the water line 392 is unreeled from pipe line 390 in a counter clockwise direction as shown in FIG. 26(a).

When the water is delivered from the fluid delivery subsystem via water line 392 to pipe reel 390, it passes through the hollow interior of the pipe reel 390 and exists therefrom via lateral line 396 and is forwarded to a conventional valve 397, which permits the water to be routed to hydromotor 393 via a water line (not shown) and thence to vertically extending flexible conduit 398 or directly to conduit 398 when hydromotor 393 is not being driven. In the embodiment shown in FIGS. 26(a) and (b), as later explained, a standard gear box and clutch is utilized to achieve speed control for the hydromotor platform; accordingly, in this embodiment valve 397 can be a conventional flow control valve which is capable of three positions: routing water to the hydromotor; routing water to the vertically extending flexible conduit 398; and off. Valve 397 can be controlled from the control console 409 by conventional mechanical, hydraulic or electrical means. As will further be apparent to one skilled in the art, lateral line 396 can be extended to the control console 409, and valve 397 placed interior the control console 409, whereby water is thence routed to the hydromotor or conduit 398. Either alternative is feasible, and will generally be a matter of design choice.

Hydromotor 393 is essentially a conventional water pressure-to-mechanical torque converter where flowing water is utilized to drive a turbine; such devices are well-known in the art.

As best shown in FIG. 26(b), hydromotor 393 has a conventional rotor output 399 connected via a flexible sleeve or coupling to transmission 400, whose output rotor is connected in a conventional manner to forward wheels to drive the same.

After water is utilized to drive the hydromotor 393, it is passed via flexible conduit 398, which is connected to the upper support member 382 at bracket 401, into vertical spout 402 and thence is introduced into water conveyor 403, shown supported on U-shaped support members 404 in a slidable fashion.

Water conveyor 403 is carried on conveyor drum 405 which is attached to the upper support member 382 by way of bracket 406, and is unreeled in a manner later to be explained from conveyor drum 405 as the hydromotor platform proceeds along its line of travel.

Returning to the operator control area 389, this is shown as comprising support frame 407 attached to the lower support member 380 and being provided with windshield 408, control console 409, steering wheel 410, brake 411 and seat 412. Control cables 413 extend from control console 409, steering wheel 410 and brake 411 to the wheels 381.

The operator control area 389 merely serves as a convenient location to centralize control means for the various devices carried on the hydromotor platform, and the above listing of elements shall be understood to be illustrative. For example, steerng wheel 410 is linked to wheels 380 in a conventional manner. As indicated above, for the situation where valve 397 is mounted adjacent or on the hydromotor 393, mechanical, hydraulic or, if desired, conventional electrical controls can be used to control the positioning of valve 397; the exact construction of such controls and the valve selected form no part of the present invention. In a similar manner, brake 411 can be conventional and can be used to control any type of conventional braking means provided at wheels 381. Although not shown in detail, a conventional clutch and gear box control are provided in the operator control area 398 in the embodiment shown in FIGS. 26(a) and (b).

Ram 387 and various ancillary hydraulically powered devices on the hydromotor platform can be either controlled by an operator switch at the site of the ram or, alternatively, can be controlled in a conventional manner from the operator control area. Again, since hydraulically powered devices and control means therefore are well known in the art, such are not described in detail in the present specification.

The main parameters subject to control are, of course, forward rate of travel, reverse rate of travel and the direction of the routing of the water introduced via water line 392.

In addition to controlling the direction of water flow to either the hydromotor 393 and thence into conduit 398 or directly into conduit 398, valve 397 can be a variable pressure valve, that is, the pressure of the water introduced into the hydromotor 393 or conduit 398 can be controlled by valve 397. In the present embodiment, such a valve can be relatively simple since a standard gear box and clutch is utilized to control the direction of travel of the hydromotor and the rate of travel. Such valves are well-known in the art and any conventional valve can be utilized therefor.

FIG. 27 is a detailed schematical view of the relationship between the pipe reel 390, water line 392 and the hydromotor 393. As shown in FIG. 27, pipe reel 390 comprises a hollow hub 430 rotatable about bearings 431 which would be carried on support 391 (not shown in FIG. 27). Hub 430 is provided with side flanges 432 which contain water line 392 about hollow hub 430. Assuming that section 392a is the last section of the water line 392 reeled on the hub 430, water will flow through the entire water line 392 and enter hollow hub 430 at 392a, filling the same and then exiting therefrom via lateral conduit 396 (sealed by way of sleeve packing 434) and passing to valve 397. Valve 397 either passes the water to fluid line 435 and then into hydromotor 393 or by-passes the hydromotor 393 by way of fluid conduit 398; as shown in FIGS. 26(a) and (b), fluid conduit 398 leads to water conveyor 403.

Laterally extensible members 414 are carried in brackets 415 provided under the upper support member 382; the laterally extensible support members 414 can be moved from their retracted positions under the support member 382 to their extended position as shown in FIG. 26(b), for example, by conventional hydraulic cylinders (not shown) powered in a manner similar to ram 387. If desired, the laterally extensible support members 414 can merely be pivoted about upper support member 382 rather than being carried in brackets 415 and extending and retracting in a line substantially perpendicular to the upper support member 382. For example, they can pivot from a positon parallel to the length of the upper support member 382 to a position substantially perpendicular to the upper support member 382. Pivoting can be accomplished, for example, by a hydraulic cylinder.

In FIG. 26(b), like numerals to those used in FIG. 26(a) are used to identify like elements. Also shown in FIG. 26(b) are axles 416 utilized to joint wheels 381.

It will be apparent to one skilled in the art that the laterally extensible support members 414 will require double-acting hydraulic cylinders, while hydraulic ram 387 need only be single acting (since the upper support member 382 can be lowered under the influence of gravity).

The hydromotor platform can, if desired, be adapted to perform an irrigation function simply by mounting sprinklers or spray guns thereon and connecting the same to the hydromotor or water line.

As water conveyor 403 is pulled from conveyor drum 405 as the hydromotor platform proceeds along its line of travel, the conveyor drum 405 is held under tension so that the water conveyor 403 will unwind therefrom without undergoing "backlash" similar to the effect on a bait-casting fishing reel. Since water conveyor 403 is supported by a series of portable or fixed supports mounted on the ground as it unwinds from the conveyor drum 405, and the rate of travel of the hydromotor platform is very low, this will not prove to be any problem of significance.

On the other hand, when the hydromotor platform is moving back to a main line and rewinding the water conveyor 403 on the conveyor drum 405, a power take-up pulley and clutch are geared to the hydromotor so that the rate of retrieval of the water conveyor 403 is proportional to the rate of travel of the hydromotor platform. Alternatively, if desired, the water conveyor 403 can be manually wound upon the conveyor drum 405.

A similar power take-off pulley and clutch are also geared to the pipe reel 390 to permit the water line to be rewound upon the pipe reel as the hydromotor platform is moving back to a main line.

Such devices are conventional in the art and are not described in detail nor shown in FIGS. 26(a) and (b). Suffice it to say that they would generally be mounted contiguous to the conveyor drum 405 and the pipe reel 390, and power can be taken off the hydromotor in a conventional manner.

In the embodiment described, a standard gear box and clutch were utilized to achieve speed control for the hydromotor platform, such can also be accomplished by a standard flow-control valve, any standard valving means being useful which permits the pressure of the water in line 435 to be varied, whereby the power input to the hydromotor can be controlled to any desired level. For example, such a standard flow-control valve in its relationship to the hydromotor is shown in FIG. 28. In light of the relative complexity of the valve means shown in FIG. 28, consecutive numerology will be used except to identify line 396 from the pipe reel, line 398 to the water conveyor and hydromotor 393, wherein numerology similar to that used in FIGS. 26 and 27 is used.

In one modification of the present invention, a vehicle location system is provided. Two basic classes of means by which vehicle location can be achieved are useful in the present invention. In one case, the vehicle can radiate the signal and be detected by surrounding sensors. These sensors can send signals back to the computer by way of PAM signals as taught by FIG. 6. From these signals the computer can determine the location of the vehicle by knowing the location of these sensors from which the maximum amplitude of the signal is received. This system will work with either the XY system or the N-1 system, as these two systems have been described. This system would work by the computer receiving radiation from the vehicle.

Finally, if desired for certain applications, a vehicle control system as is disclosed in U.S. Pat. No. 3,468,379, Rushing et al, can be used in the present invention.

Keeping in mind that the entire agricultural area is "hard wired" with data transmission lines conducting sensor/effector information, these data transmission lines actually comprise "standard tracks" and the vehicle can be servoed to follow only these standard tracks unless the servo is overridden by manual control. An electromagnetic field sensor can be placed facing the ground on the bottom of the platform to receive a unique signal radiated by the pipe-cable representing the standard track. The exact nature of the signal is not important but it could, for example, be a single-frequency tone having the frequency and amplitude which most readily penetrate the layer of soil between the pipe-cable and the sensor without excessive attenuation or distortion. This same tone can be modulated digitally, and the modulation signals used to carry information which directs the operations of the vehicle.

Using such a servo system, the location of the vehicle can be determined as follows. Whenever the vehicle travels over the top of a sensor package, an electromagnetic detector senses the same and sends out a coded signal, which is unique to the sensor package and which identifies the location of the vehicle. For the interval between sensor packages, the computer can determine the precise location of the vehicle by knowing the rate of travel of the vehicle and the time at which it was over the preceding sensor package.

As there are many branching points in a standard track layout, the computer must be programmed to select the wanted track at the various decision points. The computer can make the selection and then the vehicle can either servo onto the continuing track or execute a "standard turn", at the end of which it will pick up a radiated signal from the track.

An alternative method of steering, vehicle location, and instrument control, that is, an alternative communication system, is to use conductors which are part of the pipe/cable directly. In this embodiment, the water line earlier discussed with reference to FIG. 13 is a pipe/cable, or a pipe and a cable on separate reels. If a unified pipe/cable of the type shown in FIG. 13 is used, then signals can be taken off the conductors by means of slip-rings coming out of the end of the pipe reel; alternatively, signals can be derived by electro-magnetic sensors or shoes placed around the cable to pick up signals that will readily radiate through the plastic sheath of the pipe/cable.

Whether electro-magnetic sensors to pick up the control signals or hard wire slip-rings are used depends primarily on whether electric power is fed through the pipe/cable. If it is, then it is possible to multiplex the signals onto the power cable, since the power cable will have to slip-rings in any case. Electric power for the platform will be desirable for those operations in which a return flow of water is either useless or undesirable, for example, when one is using the platform to dispense chemicals such as herbicides or when the platform is being used for pruning and the prunings are deposited as chips under the trees.

If power is not supplied over the unbilical or tether, it may be necessary that some auxiliary source of power must be provided, perhaps by batteries, to cover those movements by the vehicle when it may be convenient to have tethers connected or, alternatively, to provide for back-up operation to the hydraulic system.

A motor generator set, in which the motor alternatively operates as a generator, could be clutched to the transmission of the hydromotor. When the vehicle is coupled to the water supply, sufficient energy would be taken from the hydromotor to the generator to keep a set of batteries in the floating condition. A 4 to 8 set of lead-acid batteries might be used, each 100 AH at 12 volts. When the vehicle is not coupled to the water supply the batteries could drive the motor, now clutched to the transmission of the vehicle. Such an arrangement could provide sufficient reserve battery power for the vehicle to operate for several hours, if necessary.

The choice of AC vs. DC rises. DC provides an advantage in terms of starting torque available in DC series wound motors, and easy transfer of energy between the batteries and generator. DC transmission over the tether would be efficient also, and its use will avoid the interference problems encountered with AC. Alternatively, AC can be used, and is more efficient for certain applications such as fluorescent field lighting. In particular, high frequency AC greatly increases the efficiency of such lighting, and makes the cost of ballasts much lower, thus increasing the practicability of widespread field lighting.

Referring now to FIG. 28, there is shown therein a four-position, five-way valve which permits one to control the speed of the hydromotor and, when the standard gear box and clutch is omitted, the speed of the hydromotor platform.

Valve 440 is in communication with pipe reel via line 396 and is in direct communication with the water conveyor via line 398.

Water line 443 is shown leading to hydromotor 393 and water line 444 is shown exiting from hydromotor 393.

Valve elements 445–448 are shown in FIG. 28, which valve elements permit the water flow in the assembly of FIG. 28 to be controlled as follows:

In the position shown, valve element 445 is introduced between lines 396/443 and 398/444; in this position the valve is in the "off" position, and no water passes to hydromotor 393.

By bringing valve element 446 into the position which is occupied by valve element 445 in FIG. 28 as shown, fluid flow port 446a is brought into a position to join lines 396 and 443, and fluid flow port 446b is brought into a position to permit fluid communication between lines 398 and 444. In this position the hydromotor drives the hydromotor platform forward by the sequential passage of water from line 396 via fluid flow port 446a to line 443, through hydromotor 393, and then returning to the water conveyor (not shown) via water line 444, fluid flow port 446b and water line 398.

When valve element 447 is brought into the position shown occupied by valve element 445 in FIG. 28, the hydromotor 393 is driven in the "reverse" direction as water line 396 is brought into communication with water line 444 by fluid flow port 447a and water line 398 is brought into fluid communication with water line 443 by fluid flow port 447b.

When valve element 448 has been brought into the position shown occupied by valve element 445 in FIG. 28, water can be bled from valve element 448 via fluid flow port 448a; in FIG. 28 recycle water flow line 448b is also shown, as in this embodiment water under pressure is merely partially bled from fluid flow port 448a.

In the embodiment shown in FIG. 28, casing 449 is provided so that the valve assembly 440 can be reciprocated therein manually by way of valve handle 450. Obviously, mechanical assistance or an electric solenoid can be used to operate valve handle 450.

Generally, the hydromotor platform will travel in the agricultural system of the present invention following the now to be described sequence.

The hydromotor platform begins its travel at the intersection of a row middle (for example, between the first and second rows of trees in a homogeneous agricultural area) and a main line water conveyor. The operator will generally first attach the water conveyor mounted on the hydromotor platform to the main line conveyor so that fruit coming from the top of the hydromotor platform will be conveyed via the water conveyor being unreeled from the hydromotor platform as it drives down the row middle. The operator will also couple one end of a flexible pipe or hose to the fluid delivery subsystem of the present invention to ensure a source of water which most preferably provides the mode of power for the hydromotor platform. As earlier explained, this flexible pipe or hose is reeled upon a large reel mounted on the hydromotor platform, providing moving fluid to drive the hydromotor platform through control valves as earlier described, whereafter, assuming the fluid is water, the water is returned to the water conveyor to convey fruit back to the main line conveyor and eventually to the packing plant.

Utilizing the hydromotor, the hydromotor platform thus initially moves from its starting point at the intersection of a row middle and a main line conveyor down the row middle to a point remote from the main line conveyor.

Once the hydromotor platform reaches the position remote from the main line conveyor, it is then necessary to move the hydromotor platform to, most generally, the next adjacent row middle. This can be accomplished in two fashions.

First, the hydromotor platform can be reversed at high speeds to its starting point. The trough is then uncoupled, the output of the hydromotor is connected using a flexible pipe or tube to the main line conveyor to avoid water waste, and thereafter the operator steers the machine to the next adjacent row middle.

Upon arriving at the next adjacent row middle, the water conveyor of the hydromotor platform is then coupled to the main line conveyor where upon the hydromotor platform proceeds down the next adjacent row middle.

A second method involves the use of an auxiliary vehicle mounting two winch-driven drums which permit one to reel-in the extended water conveyor and flexible tube or pipe from the hydromotor platform once it has reached a completion point remote from the main line conveyor.

The auxiliary vehicle can then move the hydromotor platform to, generally, the next adjacent row middle at a point remote from the main line conveyor, whereafter the auxiliary vehicle travels along the predicted line of travel of the hydromotor platform laying down the water conveyor and flexible pipe so that the hydromotor platform can be coupled thereto and, in this instance, proceed from the point remote from the main line conveyor to a point adjacent the main line conveyor.

The hydromotor platform can, of course, move in and direction under its own power and for any distance up to the limiting length of the flexible tube or hose which provides the mode of water power for the hydromotor platform. At the limiting length, it can either reverse its direction by reversing the hydromotor and return to its starting point or, alternatively, the original hose can be removed and a new hose attached to the fluid delivery subsystem in the direction in which it is desired that the hydromotor platform should travel.

Having thus described one basic embodiment of the hydromotor platform, control means therefor and movement patterns thereof, it is appropriate to turn to some of the particular operations which can be accomplished using the hydromotor platform, for example, pruning, trimming, and brush removal. Trimming and brush removal together comprise the third most expensive operations in a fruit orchard, after fruit harvesting, which is the most expensive, and spraying, which is the second most expensive.

The agricultural system of the present invention improves on currently available means for accomplishing the above functions as follows:

Desired components are directly mounted on the hydromotor platform, e.g., pruning hooks, saws, ladders, hydraulic lift devices, power chippers, top and side edgers for "hedge rowing" an orchard, slotting saws, brush catches and brush conveyors.

Secondly, the hydromotor platform can provide common power source for all tools, either direct water power by partially by-passing the hydromotor or by using a power take-off from the hydromotor itself to drive hydraulic oil pumps, an electrical generator or the like.

Two alternative methods for tree trimming and brush removal are contemplated:

In the first method, manual labor is used and all men and components are mounted on the hydromotor platform which is provided with brush conveyors;

In the second method, following trimming all brush drops to the ground to be later picked up by a hay baler or the like and thereafter conveyed to the desired location.

Briefly turning to the first embodiment where the hydromotor platform is provided with brush conveyors, such an embodiment will be described with reference to FIGS. 29 (a), (b) and (c), top, side and rear views, respectively.

Since the hydromotor platform used in the embodiment as shown in FIG. 29 is essentially a modification of that described in FIG. 26. Like numerals will be used to identify like elements, noting that the pipe reel assembly is shown in approximate scale in FIG. 29 (a) and (b). Several important modifications will now be described, however.

Firstly, at the extremity of each of the forward laterally extending members 414 there is provided a slotting saw 460. Each slotting saw 460 is driven by an auxiliary hydromotor 393a which is provided with a fluid take-off 461 from the main hydromotor 393; conventional valving (not shown) is provided as an addition to the main hydromotor 393 to permit water to be selectively drawn off from the main hydromotor 393. The amount of water required to drive the slotting saws 460 is generally relatively low, and after performing its power function the water is returned to the water conveyor by piping (not shown) or permitted to fall to the ground. Two brush chutes 462 are provided, one brush chute being disposed beneath each slotting saw 460 and having a forwardly extending lip 462a which catches brush as it is cut by the slotting saw 460 and impelled into the brush chute 462. Brush chute 462 comprises a smaller diameter rearward section 462b and a slideable forward section 462c which permits brush chute 460 to extend as, for example, laterally extensible members 414 are moved outwardly from the upper support means 382. The brush chutes can be attached to the lower edge of member 414 in a conventional manner. Though brush chutes 462 are shown as enclosed conduits, they can be used as true "chutes", if desired, merely be removing the upper half of the enclosed conduit.

Brush chutes 462 are adapted to convey brush cut by slotting saws 460 to chipper-blower fan 463. In chipper-blower fan 463, the brush is comminuted to a small size and expelled directly onto the ground at the side of the hydromotor platform via exit port 463a or else conveyed via chipper-blower fan conduit 463b to water conveyor 403. Comminuted brush can be expelled via exit port 463a or entrained up chipper-blower fan conduit 463b by a conventional blower in the chipper-blower fan 463.

If desired, chipper-blower fan 463 can be driven by a hydromotor mounted adjacent thereto and provided with a take-off line from any of the points of the fluid flow subsystem which are carried on the hydromotor platform.

Where the output of the chipper-blower fan 463 is applied directly to the ground, generally it would be placed on the underside of the trees to act as a mulch. Where the output of the chipper-blower fan 463 is placed into the water conveyor, generally it will be forwarded to a central processing point where it can be processed into pulp. The conveying system can be essentially the same as is utilized for the passage of fruit since the comminuted brush quite naturally floats.

It should be specifically noted that a man standing on the rear laterally extensible members can merely drop clippings into the chutes if the upper surface of the chutes is omitted, where they are conveyed by gravity to the chipper or, alternatively, could merely drop the trimmings directly into the water conveyor 403 if they are small enough.

In the second method above, all trimmings are merely dropped to the ground and later picked up by a hay baler or like apparatus. The hay baler can be provided, if desired, with a chipper as earlier described. This hay baler type of apparatus can, of course, be drawn by a hydromotor platform. Essentially this embodiment of the invention involves adding a hay baler to the rear of the hydromotor platform.

An alternative to the use of a chipper in any of the above devices is to, of course, bale the trimmings and treat them as hay. A standard baler can be used for this purpose and will work quite well with reasonably small brush. Such a device could find particular application if the brush is to be transported substantial distances for disposal or if the brush is to be used in a chemical process in which it is to be considered as raw cellulose for producing carbon dioxide, as elsewhere described.

Trimming as described above can, of course, be carried out automatically under the control of the computing subsystem of the present invention, either with no men at all in charge or with one man aboard the hydromotor platform to provide on-site decision making capability for contingencies not programmed into the computer.

Computer control would be particularly applicable to mature orchards for pruning involving a slotting saw, particularly in an orchard in which the slotting saw operation had been conducted to the end of the third or the fourth slot (American Fruit Grower, p. 11, Dec. 1972) at the end of the third or fourth years. The orchard at that stage would be sufficiently stabilized in its growth so that further operations could be carried out automatically under computer control.

The program for a mature orchard would be relatively simple, since essentially the pattern of a preceding year would be repeated. In light of the complexity of a program needed for a growing orchard, in such a case generally men will be mounted on the hydromotor platform or a man would be used in the feedback loops until the proper positioning of the saws was determined, whereafter computer control would be initiated.

If desired, the hydromotor platform of the present invention may also mount a "cherry picker" boom as is conventional in the art to put a man into the center of a tree which may be inaccessible from the laterally extensible members 414. Since "cherry picker" booms are typically hydraulically operated, it will be apparent that the water power from water line 392 can be utilized directly or, to permit easy adaption of conventional "cherry picker" booms, the water from water line 392 can be used to drive a hydraulic oil pump.

The hydromotor platform described above provides for increased efficiency of all manual operations in the agricultural area. It can also be used in conjunction with an automatic picking device which will later be described. In this case, accessory hooks mounted on the laterally extensible members 414 are used to lift a tree-shaped tank, split along its axis, from one tree to the next in a row, the hydromotor platform being provided with such tree-shaped tanks on both sides thereof so that two rows of trees at a time can be subjected to picking. Details of this aspect of the invention will be later provided.

In addition to trimming as described above, the hydromotor platform of the present invention can also be utilized to accomplish thinning operations.

Normally a tree will set more fruit than it is capable of producing. If it sets too much fruit, part of it will drop during the growing season and the remainder will be under-sized. Accordingly, it is common practice to allow the tree to set only as much fruit as it will be able to support, the objective generally being to obtain a maximum volume of fruit during a growing season compatible with obtaining maximum returns over the life-time of the tree.

Thinning is, of course, partially accomplished by normal putting or trimming operations by removing a fraction of the fruit-producing wood. However, the objectives of thinning frequently are sufficiently different from pruning so that pruning does not generally accomplish all of the objectives of thinning.

Two methods of thinning are currently in use. The first is manual for machine thinning and the second chemical thinning. Chemical thinning is a rather recent development in the art; rpresentative chemical thinning procedures involve applying naphthalene acetic acid to apples, and the like.

In accordance with the agricultural system of the present invention, the hydromotor platform can provide a movable base on which standard state of the art thinning methods can be practiced, if desired.

However, with its unique linkage to the fluid delivery subsystem of the present invention, the hydromotor platform of the present invention permits hydraulic thinning to be accomplished wherein a bank of high-pressure jets on each side of the platform is directed at the tree to accomplish fruit thinning, the physical force of the water jets removing the desired fraction of the fruit.

If necessary or desired, "touch-up" thinning can thereafter be accomplished by hand-directed water guns from the rear laterally extensible members of the hydromotor platform.

As will be apparent to one skilled in the art, the hydromotor platform finds particular use in hydraulic thinning since the water pipe which is coupled to the platform can not only drive the hydromotor but also provides the water necessary for the operation of the hydraulic thinning jets.

The water can first be flowed through the hydromotor and then exited through the jet arrays or, alternatively, the water can be appropriate valving be shunted directly through the hydraulic thinning jets.

The hydraulic thinning jets can, without substantial modification, also be used to accomplish chemical spraying operations in those events where the irrigation subsystem of the present invention does not prove economically justifiable for a particular location but a portable system would be economically justified. Spray would be distributed by pipe only as far as the main line to which the platform would be coupled.

Figure 30A:
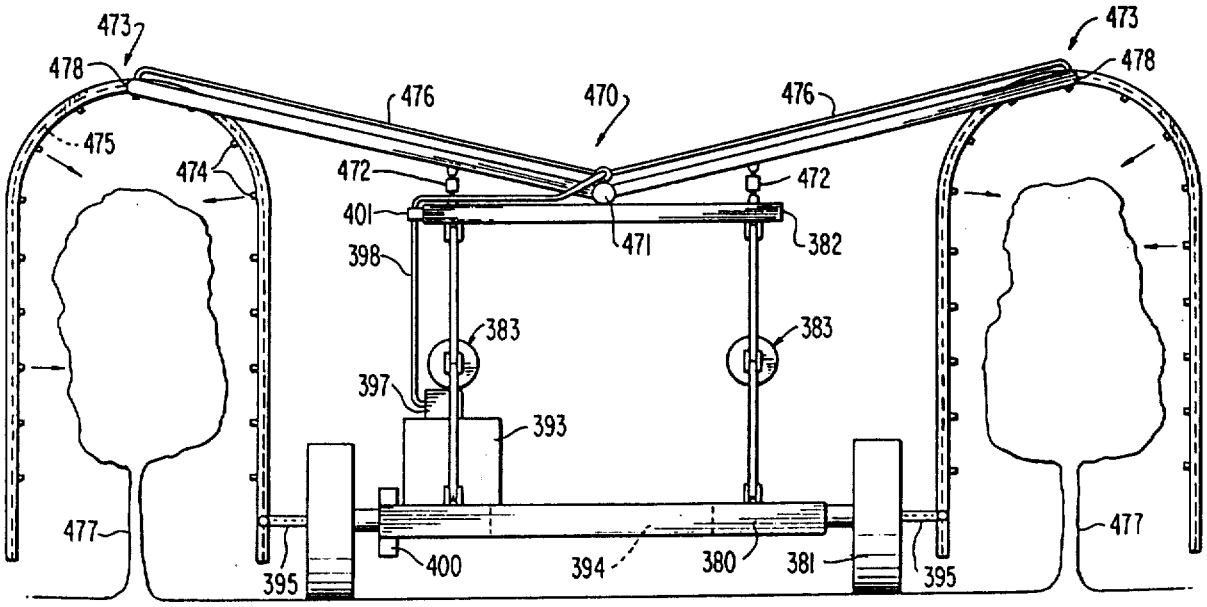

A modification of the hydromotor platform of the present invention for thinning operations is shown in FIG. 30 where for purposes of simplicity the following elements are omitted, as they are substantially identical to those shown in FIGS. 26 and 29: the pipe reel 390, support 391, pipe 392 and conduit 396. Since many of the elements in FIG. 30 are identical to those of FIG. 26, like numerals will be used to identify like elements. Further, since the embodiment of FIG. 30 is similar in arrangement to the embodiment of FIG. 32, only a rear view thereof is presented in combination with a detail of a jet array support member in FIG. 30(a).

Support assembly 470 comprises members substantially identical to support assembly 511 in FIG. 32, and no detailed explanation will be offered other than to note the assembly is pivoted around main support brace 471 and can be raised or lowered by hydraulic rams 472 which are identical to rams 514 in FIG. 32. Certain modifications are provided, however, and these will be discussed in detail. Firstly, support assembly 470 as shown in FIG. 30, carries hydraulic thinning jet array support members 473.

Each hydraulic thinning jet array support member 473 has disposed at the interior thereof a plurality of hydraulic jets 474. The hydraulic thinning jets 474 on each side of the hydromotor platform are fed by pipe 475 which is linked via a fluid supply conduit 476 to water line 398, whereby water at a suitable pressure can be directed from valve 397 to the hydraulic thinning jets 474 and against trees 477 as shown by the arrows in FIG. 30a, whereby the hydraulic force of the water serves to dislodge fruit from the trees and thin the same. Each hydraulic thinning jet support member 473 is suspended from support means 470 via pivot joint 478 and tied to frame 394 by pivoted links 395.

A cross section of a hydraulic thinning jet array support member 473 is shown in FIG. 30 (b) as comprising an aluminum channel 473a having pipe 475 bonded thereto, from which thinning jets 474 project. Thinning jets 474 can be threaded to conduit 475 via threads 479. Pipe 475 can be, e.g., PVC.

Using the apparatus shown in FIG. 30, the hydromotor platform travels between two rows of trees and simultaneously effects hydraulic thinning (or, if desired, high pressure chemical spraying) on all sides of the trees in the two rows at once. Accordingly, the platform need only go down the middle of every other row to accomplish the hydraulic thinning or chemical spraying of two rows.

The only substantial difference between thinning and chemical spraying is that smaller sprayer head orifices would be used for chemical spraying.

In this regard, it is a specific feature of the present invention that the hydromotor platform can be provided with nozzles adapted to blend air and/or gases and/or liquid sprays, instead of just liquid being emitted by the nozzles. Such an embodiment of the present invention finds particular application in combination with the pipe/cable assembly earlier explained with reference to FIG. 13. If gases alone are used, they leave no residue and disease control close to the harvesting time is therefore permitted. Defoliation can also be accomplished utilizing such nozzles to make mechanical picking simpler, e.g., such could be used for tomatoes or cucumbers trained to grow on vertical strings or trellises as in a green house.

Insofar as thinning chemical spraying is concerned, it is to be noted that the apparatus of FIG. 30 could utilize two yokes as shown generally by FIG. 32; this not only permits two angles of spray application to be achieved, but enables one to apply incompatible chemicals in a sequential manner. For example, if two yokes are utilized one can apply chemicals which, if mixed and applied via a single yoke, might lead to nozzle clogging.

FRUIT CONVEYING MEANS

Turning now to a more detailed description of the water conveyor 403, as earlier described with reference to FIG. 26, such is carried on upper support member 382 at the end of the platform which is opposite the main line of the fluid delivery subsystem of the present invention. Most preferably, the water conveyor is carried at about waist height to facilitate the dumping of fruit into the water conveyor in the case of manual picking.

There are no moving parts in the water conveyor since it works by gravity. The water conveyor is U-shaped in its extended form, and is made of prestressed plastic or steel sheet such that it may be wound upon the conveyor drum 405 while flat and yet, upon being unwound from the conveyor drum 405, will assume its prestressed or U-shaped form. If desired, extensions may be provided on the water conveyor in the area of the hydromotor platform to permit fruit or the like to be placed directly from the pickers' hands into the water conveyor.

The water conveyor can, of course, be joined in separate sections of U-shaped channel which are merely stacked on the platform, manually removed, joined and placed on supports rather than provided on a conveyor drum, but such will increase the amount of labor involved for the provision of the water conveyor. In this case, a collecting funnel could be provided on the top of the hydromotor platform, into which picked fruit is placed, the collecting funnel being constantly supplied with water from the water line and the water and contents contained therein thereafter being fed via the downwardly disposed "spout" of the funnel which leads into the water conveyor.

The platform would straddle the last section of conveyor trough in a fashion similar to a Hyster logger, and could travel over the water conveyor along a predetermined path, if desired. If the hydromotor platform is to travel over such an assembled water conveyor, obviously devices on the lower support member of the platform will have to be located in a manner to permit passage of the conveyor, e.g., offset left to provide clear travel to the right.

The size of the water conveyor is of relatively secondary importance so long as, of course, it is adequate to handle the contemplated fruit and like products. Typically, in its flat condition the water conveyor will have a width of about 18 inches, and will have a prestressed width of about 12 inches.

Pre-stressed plastic is particularly useful to form the wateer conveyor, e.g., polyethylene. As a general rule, it is most preferred to utilize pre-stressed plastics having a thickness of about 1/16 inches or less to form the section of the water conveyor which is wound upon the conveyor drum, as at such thicknesses optimum strength can be achieved in combination with adequate ability to change the pre-stressed plastic from the "lay flat" or wound position to the "pre-stressed" or U-shaped conveying position.

In those instances where the water conveyor is not wound but is rather assembled, the material of construction is important in that excess weight is undesirable since large footages thereof must be rested atop the hydromotor platform; again, polyethylene may be used or light metals, e.g., aluminum.

The water conveyor of the present invention which is carried on the hydromotor platform or assembled therebeneath can be considered a temporary "lateral" line which extends between two rows of trees. This lateral line is joined to a main line of the water conveyor system by way of a temporary coupling when it is desired to accomplish a conveying function between two rows of trees.

The construction of the main line can be of a relatively permanent nature, typically aluminum or plastic sections 10 to 20 feet long being used. The sections can be installed overlapped with the top piece uphill or the sections can be joined in an abutting fashion. The main line can be layed directly on the ground providing that the slope is sufficient to provide an elevation head for the water conveyor which is adequate to move fruit under gravity to the desired point of delivery. If the slope is insufficient, it will be necessary to provide artificial supports for the main line of the water conveyor to provide an adequate elevation head.

If lateral water conveyors are of the type which are assembled where the hydromotor platform runs thereover, the water conveyor is merely constructed to ensure rapid erection and take down. Any type of support which can be rapidly erected and disassembled can be used.

In the case where the lateral-water conveyor is actually unwound from a conveyor drum on the hydromotor platform, the first step for the use thereof is for the worker to remove a slip-on port from the side of the main line water conveyor and attach the end of the lateral line water conveyor thereto. As power is supplied to the hydromotor platform and it passes along its predetermined path the lateral line water conveyor is unreeled. Generally, every 10 to 20 feet it is necessary for workers to set a support under the lateral line water conveyor due to the weight of water which will be flowing thereto and, of course, to ensure the necessary slope is maintained. Alternatively, supports can be left standing at their proper elevations. In this case, the supports can be pivoted at ground level such that when the platform runs over them, they will be deflected to the ground and restored by spring tension when the platform has passed over.

In those instances where the water conveyor must describe an arcuate path, alternate sections of the water conveyor are separated and joined at their middle by, for example, a small pin; generally, the up-hill section of the water conveyor will fit inside the down-hill section so that as water passes from the upper section to the lower section leakage is minimized; since the two sections are joined only at the central retaining pin, sufficient flexibility will generally be provided. Alternatively, a flexible "accordion-like" joiner can be used which permits flexing of the water conveyor along an arcuate path. This latter modification is not preferred, however, due to the higher complexity necessary.

In certain instances, it will be apparent that the slope or elevation easily achieved for either a main or lateral line water conveyor will be too great or too small. When the elevation head of a water conveyor is inadequate, underwater air or water jet assists in the inside of the water conveyor may be used. Such would typically be a nozzle or spray head in the bottom of the water conveyor inserted in a manner to introduce high speed water jets along the direction of flow. A quick coupling can be made to the closest riser in the agricultural area and the jet assist directly attached to the water conveyor.

In those instances where the water conveyor is to be wound on a conveyor drum, generaly assists will not be used since the line of travel can be made relatively short to ensure an adequate elevation head and, in addition, the entrance necessary for the jet assist will tend to complicate the manufacturing process of the prestressed material.

On the other hand, for assembled lateral water conveyors or the main water conveyor, the jet assist nozzle or spray head can be integral with the water conveyor itself and a hose merely attached thereto or, alternatively, a complete hose/nozzle or spray head can be inserted into the water conveyor.

It is possible, however, to provide jet assists on a lateral water conveyor which is carried on the conveyor drum. In this instance the complete nozzle assembly must be removable for the water conveyor to be wound on the conveyor drum and, generally, the water conveyor is drilled for jets at whatever spacing is contemplated and, in normal use, plugged with thin plastic inserts so as not to interfere with drum reeling.

In those instances where a severe uphill grade is encountered, generally fruit that will not flow cannot be conveyed even with jet assists in a practical manner. Accordingly, in this instance a physical conveyor is utilized. Power will, of course, be needed in the agricultural area to drive a physical conveyor, and such can be obtained from the fluid delivery system by utilizing the flowing water in the same to drive a hydromotor. Such a physical conveyor would be inserted at the portion of the conveyor trough where an excessive incline is encountered. The fruit can be entrained in paddles or web like members which carry the same from the low elevation point up the area of excessive slope to the upper elevation. If desired, the hydromotor which powers the physical conveyor can also be utilized to force water into a jet assist at the termination of the conveyor, thereby ensuring complete removal of fruit from the conveyor termination area.

For short fast grades, generally a conveyor of the endless belt type will be utilized, the long axis of the belt extending along the center of the water conveyor and the paddles or web like members extending in a manner perpendicular from the surface of the endless belt.

For small but longer grades a similar physical conveyor can be used except that the endless belt conveyor can be replaced by a powered "fruit pump" or paddle wheel which is merely inserted into an enclosed water section of the conveyor. The torque applied to the fruit pump need be just sufficient to lift the fruit carried in the water in the water conveyor up the small but long grade, it only being necessary that the water at the bottom of the small but long grade be provided with a pressure head which exceeds the column head over the grade.

Both of the physical conveyors described above are suitable for use in the field where picking is being done along the route of the conveyor.

However, the water conveyors described might be too expensive and might consume too much power for large, long grades where the water head in the water trough exceeds the power that can easily be extracted from water line through a hydromotor.

In this case, a water lock which is analogous to a water lock used in raising ships from one level to a higher level can be utilized to raise the produce being conveyed the desired level. Such an apparatus is described below for fruit whose specific gravity is less than 1, i.e., fruit that will float in water.

Referring now to FIG. 31, a water lock for elevating fruit substantial distances while it is being transported in the water conveyor system is shown. Produce, e.g., fruit, is introduced to the water lock generally indicated by 490 via water conveyor 491 and enters open holding tank 492. At this stage, gate 493 is closed, whereby the open holding tank 492 fills with fruit and water.

When open holding tank 492 is filled with fruit and water, float valve 494 is activated, whereby water from any high pressure source (the fluid delivery system of the present invention) is admitted to activate hydraulic cyliders 495 and 496, which are connected in parallel. Double acting hydraulic cylinders 495 and 496 are constructed in such a manner that when moved to one end the piston therein remains fixed until operated by an input line at the opposite end thereof. Upon activation, hydraulic cylinder 495 opens gate 493 allowing the contents of open holding tank 492 to be introduced into the water lock chamber 497. As hydraulic cylinder 495 opens gate 493, it simultaneously closes gate 498, thereby holding any water which remains in riser pipe 499 from the previous cycle.

Following the completion of the above operation, hydraulic cylinder 496 opens gate 500 which allows only the water now accumulating in lock chamber 497 to drain via screen 501a into line 501 and into drainage tank 502 (screen 501a excludes produce from line 501). Simultaneous with the opening of gate 500 hydraulic cylinder 496 also closes gate 503, thereby permitting drainage tank 502 to fill.

The flow of water described above continues until drainage tank 502 fills, which activities float valve 504. Float valve 504 is connected to gates 495 and 496 in a manner which reverses the position they have assumed due to the introduction of water from float valve 504.

Pump 505 is then activated to pump water from drainage tank 502 via line 506 via screen 501b to lock chamber 497, thereby causing the fruit to rise through gate 498 which has been opened by float valve 504 and into riser pipe 499 which is on the steep slope over which the fruit must pass into the water conveyor 499a.

While the pump 505 is completing the cycle of fruit removal from lock chamber 497, additional fruit and water is entering the open holding tank 492 via water conveyor 491.

Preferably the interior of the lock is shaped and padded so as to avoid mechanical damage to fruit entering therein.

The volumes of the lock, open holding and drainage tank are established so that when the holding tank is full all fruit will have passed out of the lock. The water level in the lock will further tend to remain constant due to the input through gate 493 being roughly offset by the output through gate 498.

For a given species of fruit or other produce, and with stable input and output water volumes and pressures, the water lock described above will operate automatically without human assistance.

In FIG. 31, the pump 505 is shown being driven by hydromotor 509 via output shaft 509a which is powered by high pressure water line 508. Although not mandatory, hydromotor 509 and pump 505 run continuously. Except for internal friction losses, the hydromotor loads down line 508 only when it is pumping drainage tank 502 dry. Fluid flow lines between various cylinders, gates and valves are generally indicated by 507.

In the case where the water conveyor encounters too sharp a downhill grade, this may lead to fruit bruising and various means can be used to reduce the risk of fruit bruising.

First, the water conveyor can be interrupted and a "buffer storage" zone for energy dissipation introduced, e.g., a tank for reducing the downhill velocity to nearly zero.

A further possibility is to provide jet brakes which introduce high speed water or air streams against the flow of travel of the water in the water conveyor.

Thirdly, hydraulic spoilers similar to the perforated baffles used to slow down a jet aircraft or other form of resistance can be used. For example, deflectable baffles which resist the flow of both the water and produce.

Fourthly, the water level can be reduced merely by providing holes in the bottom of the water conveyor and later reintroducing the water into the water conveyor at a point where the grade is more appropriate. When water level is reduced, it is preferred that a soft material be provided at the bottom of the water conveyor, for example, a soft rubber surface, to slow the flow of the fruit.

One of the most expensive single procedures in fruit growing is fruit picking or harvesting (hereinafter these terms will be used interchangeably). In addition to the expense thereof, it is increasingly) difficult to recruit labor for fruit picking at any price, the results of these factors being that it is imperative that fruit picking operations be mechanized.

Certain fruits are now picked almost fully by the aid of hydraulic shakers which shake the fruit into a canvas catching platform mounted below the tree, a conveyor being provided to convey the fallen fruit to bins or boxes. This method can be used successfully for fruits where bruising is not a problem.

Hydraulic Shaking Machines as mentioned are described in Editors, "The Long Wait Is Over", American Fruit Grower, August, 1972, pg. 14.

In the agricultrual system of the present invention, the plentiful supply of water in the agricultural area is utilized to accomplish fruit picking. Further, fruit picking also utilizes the unique capabilities of the hydromotor platform earlier described.

It is to be specifically noted that one special advantage of the picking methods described for use in the agricultural system of the present invention is that fruit can be selected for picking depending on its degree of ripeness, an advantage which no mechanical picker provides.

In accordance with the agricultural system of the present invention, two highly preferred picking or harvesting methods are contemplated: continuous harvesting and batch harvesting. In both methods, an important aspect of the harvesting is that the fruit is cooled at the moment of picking. It is known in the art that the storage life of fruit and similar produce is affected by the time delay between the picking and cold storage. The storage life of apples, for example, can be reduced three weeks by the normal practice of temporary storage in the field and by conventional air cold storage where it may take several days to reduce the temperature of the apples from ambient to the desired holding or storage temperature.

In this regard, in the agricultural system of the present invention harvesting can be accomplished by using recirculated refrigerated water, thereby maximizing the storage life of the fruit.

Should the agricultural system of the present invention be located in an area where refrigeration costs are extremely high, whereby such an embodiment would not be economically feasible, it is possible to use as the water source the hypolimnion (cold layer) in the primary reservoir of the agricultural area.

It will be apparent, of course, that it is not necesary to utilize cold water for the harvesting operation in the agricultural system of the present invention. However, for the reasons advanced above such is highly preferred, and the following discussion should be read with the understanding that water of any required temperature can be utilized.

CONTINUOUS HARVESTING

Continuous harvesting in accordance with the present invention can be accomplished utilizing jet arrays of water and/or air similar to those described for accomplishing hydraulic thinning and/or chemical spraying with respect to FIG. 30. It is only necessary that the fluid jets be sufficiently numerous and capable of delivering fluid at a sufficiently high pressure that they can dislodge ripe fruit. In fact, by adjusting nozzle pressure, fruit of the desired degree of ripeness can be selectively dislodged since the retention force on the fruit is a function of ripeness. Air and/or water pressure can be adjusted independently to give additional flexibility in meeting picking requirements.

Assuming successful dislodgment of the fruit, in continuous harvesting it is then only necessary to catch the fruit as it falls without damaging the same and thereafter convey it to the water conveyor on top of the hydromotor platform. The apparatus shown in FIGS. 32 (a), (b) and (c), side, top and rear views, respectively, accomplishes all of these functions, and the same will now be described in detail.

Referring to FIG. 32 (a), the hydromotor platform is described using like numerals to those used in FIGS. 26, 29 and 30 to identify like elements. For purposes of simplicity, the pipe reel 390, pipe reel support 391, water line 392 and lateral take-off line 396 have been omitted. The arrangement of these elements can be substantially identical to that shown in either FIG. 26 or FIG. 29. In a similar manner, rather than identifying each element of the elevating means, such is generally identified as 383. Several modifications adapting the hydromotor platform to continous harvesting will now be explained in detail.

Mounted on the upper support member 382 of the hydromotor platform there is shown support assembly 470 which comprises upwardly extending angled support members 510 pivoted about the upper support member 382 by way of ball joint 471 and pivotally joined to upper horizontal vertical support member 511 about points 512. At a point intermediate the ends of the angled support members 510 lower horizontal support member 513 is shown connected thereto, lower horizontal support member 513 being joined by hydraulic ram 514 to the upper support member 382. Hydraulic ram 514 is identical in construction, except for size, to earlier shown hydraulic ram 383, and can be powered and controlled in a conventional manner as can ram 383, shown in FIGS. 26 (a) and (b).

Figure 30B:
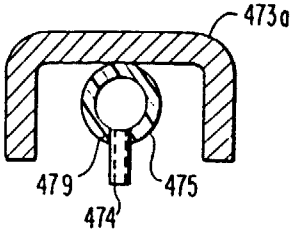

Suspended from the ends of upper support member 511 about pivot points 512 there are shown two U-shaped yokes 473, which yokes are substantially identical to yokes 473 shown in FIG. 30(a) and which comprise a U-shaped aluminum channel yoke having bonded thereto circuit 475 from which projects a plurality of nozzles 474 threaded to conduit 475 by way of threads 479 as shown in FIG. 30(b).

Figure 32C:
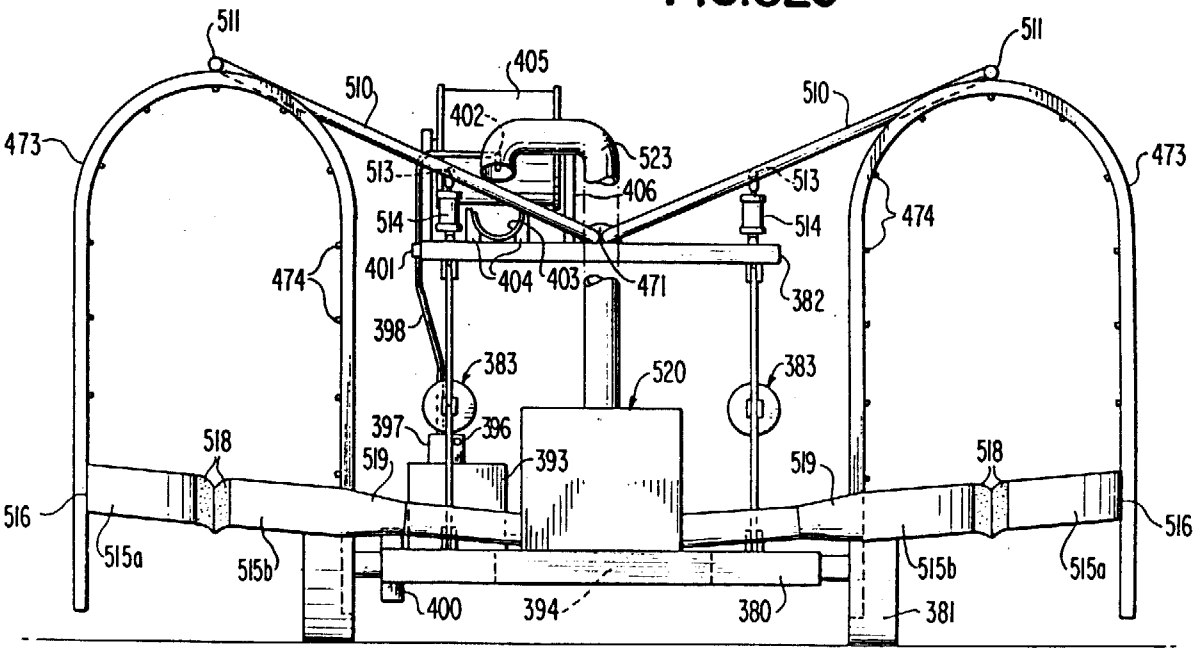

U-shaped yokes 473 extend generally downward and are substantially perpendicular to the major axis of the hydromotor platform. The U-shaped yokes 473 are shaped so as to pass over a tree as shown in FIG. 32(c), and by means of the water and/or air jet nozzles 474 disposed on the inner side of the U-shaped yokes 473 are adapted to dislodge fruit from the trees by expelling jets of water/air therefrom against the tree, whereupon the fruit falls under the influence of gravity into catch basins 515 which are joined to and carried by the lower portions of the U-shaped yokes 473, each catch basin 515, as best seen in FIGS. 32(b) and (c) comprising two metal plates 515(a) and (b) (catch basin halves) hung from the bottom of the U-shaped yokes 473 and being provided with side retaining means 516 which retain fruit and water therein. The catch basins 515 are partly filled with water during harvesting due to water draining from the tree and, in addition, are lined with foam rubber (not shown) to absorb the energy of the falling fruit and to prevent bruising.

As best shown with reference to FIG. 32(b), each half 515(a) and 515(b) of the catch basin 515 is separated from the other half by flexible lips 518. The purpose of the flexible lips 518 is to permit a tree trunk as shown by 476 in FIG. 32(b) to pass therebetween during hydraulic harvesting. The line of travel of a tree during harvesting is generally indicated by the arrow shown in FIG. 32(b).

The orientation of the catch basin halves 515(a) and 515(b) on each side of the hydromotor platform is important, and is best illustrated in the side and rear views as shown in FIGS. 32(a) and (c). The orientation is such that the fruit and water carried therein flow toward the rear of the catch basin and, in addition, toward the hydromotor platform and into telescoping conduit 519, which most preferably is rigid in nature, and thence to agricultural product water pump 520, shown in broken away section as comprising casing 521 and rotatable paddle wheel 522. Rotatable paddle wheel 522 can be powered by a secondary hydromotor with water being taken from valve 397, if desired (the drive means is not shown) or by other conventional means.

Pump 520 is adapted to pass fruit and water received from the telescoping conduit 519 into vertically extending conduit 523 and thence into water conveyor 403 via downwardly extending section 523(a).

Returning briefly to the function of hydraulic ram 514, generally varying tree heights in the agricultural area will be accommodated by raising the upper support member 382. In those instances where the agricultural area is planar, i.e., no hills, both U-shaped yokes 473 can be rigidly attached to the upper support member 382 by support assembly 470, and all pivot points can be omitted as can hydraulic ram 514. It will, of course, be necessary that telescoping conduit 519 be provided so that catch basins 515 will be permitted to raise and lower with respect to the pump 520 as the upper support member is elevated or lowered. As a practical matter, U-shaped yokes 473 will be made large enough to handle the largest trees on the farm, prunning being practiced to insure uniformity of shapes and tree size.

In those instances where, however, harvesting is to be conducted on a hillside and one wishes one U-shaped yoke to be higher than the other, in this case at least one of the two yokes must be adjustable in height. This is accomplished by activating hydraulic ram 514 to raise or lower the U-shaped yoke 473 on one side of the platform.

Referring now specifically to FIG. 32(b), one upper horizontal support member 511 is shown in a broken away view to permit view of the flexible lips 518.

Water is supplied to the nozzles 474 in a manner substantially identical to that earlier explained with reference to FIG. 30(a); accordingly, flow conduits for the U-shaped yokes 473 are not shown in FIGS. 32(a), (b) or (c).

As earlier indicated, catch basin halves 515(a) and (b) are not mechanically coupled to allow trunks of trees undergoing harvesting to pass therebetween. Passage must be accomplished without substantial loss of water or fruit and this is accomplished by a matching pair of flexible lips 518, usually of rubber, which are "puckered" downward as shown in FIG. 32(c). The leading edge of each catch basin half 515(a) and (b) is contoured as shown in FIG. 32B in such a manner that a tree trunk is guided into this space between the catch basin halves and the flexible rubber lips are forced apart. After the tree trunk completes its passage between the catch basins, the flexible rubber lips close behind the tree and restore the substantially flat floor surface of the catch basins.

As will be apparent to one skilled in the art, pump 520 is especially sized and padded for handling fruit, and is adapted to add enough water so that the fruit can be conveyed into the water conveyor on top of the hydromotor platform. The pump 520 can, of course, be driven from a power take-off on the hydromotor platform (not shown).

In the embodiment shown in FIG. 32, both yokes on one side of the hydromotor platform are provided with water jet arrays. This is not always necessary and, if desired, only one of the yokes need be provided with a hydraulic water jet array, and this will generally be the leading yoke. The second yoke, in such a case, provides cantilever support for each catch basin pair. While in theory only one yoke would be necessary, high strength materials are needed in such a case and generally the extra cost will not be warranted.

The water jets in the apparatus of FIG. 32 can be replaced by air jets or a combination of water jets and air jets. In such a case, the pipe cable shown in FIG. 13 could be used as the pipe connected to the fluid delivery subsystem wherein an air line in the pipe cable would deliver compressed air. Of course, compressed air can be delivered either through the umbilical to the platform, or it can be manufactured directly on the platform, since the platform has a large power supply, namely the water pipe which drives the platform hydromotor, and this hydromotor can be coupled to an air compressor tank mounted directly on the platform. If air jets are used, this is potentially the most efficient way of manufacturing the tremendous quantities of compressed air that would be required for such an application.

The operation or use of the above continuous harvesting device is as follows: the harvesting device is brought to a point between two rows of trees: the flexible lips between the catch basins are aligned with the base of the first tree in each line. The water conveyor having been assembled, thereafter the continuous harvesting device shown in FIG. 32 is driven between the rows of trees whereby trees in two rows are simultaneously subjected to harvesting, the fruit automatically being conveyed to the desired delivery point via the water conveyor.

The yokes are adjustable in and out from the hydromotor platform by means of slide adjustments in the supporting braces to provide for a variety of row spacings (not shown).

BATCH HARVESTING

A second procedure contemplated for harvesting in the present invention is a batch procedure where a tree is completely covered with a container that is sufficiently strong to withstand the pressure when the container is full of water. As the container is filled with water from the bottom, ripe fruit is twisted off and rises to the top.

The batch harvesting procedure of the present invention is an improvement on that described in U.S. Pat. No. 3,584,442, White, in the following aspects: the use of a floating annular ring as will be described; capability of automatic unloading by direct connection to the water conveyor; and capability for connection to the fluid delivery subsystem to make up for water losses.

A typical batch harvesting in accordance with the present invention will now be explained with reference to FIG. 33.

Tanks 530 and 531 are shown in FIG. 33. As an example, for a dwarf apple tree each tank is approximately 10 feet tall and 10 feet in diameter, having a volume of approximately 3,000 cubic feet. The tanks are cylindrical in nature and are provided with a flexible bottom 532 having a centrally disposed opening 533 to fit around the trunk of a tree 534. Generally, the tanks are formed of two "semi-cylindrical" halves hinged at the top to permit them to be opened, placed around a tree and then resealed. Alternatively, however, the tanks can be lifted onto a tree by the hydromotor platform; in such a case the flexible bottom 532, which can be formed of a strong rubber material, can be pulled by ropes to the bottom rims of the tank to permit passage of the tree.

At the top of each tank is provided fluid connection means 535 which permits each tank to be coupled with the water conveyor system of the present invention.

Disposed within each tank is a floating annular ring 536 which is adapted to be free floating within the tank. Floating annular ring 536 is connected by way of flexible conduit 537 to a source of water.

As shown in FIG. 34, each floating annular ring 536 comprises a polyfoam float section 538, a water conduit 539 carried within the polyform float section 538 and water jets 540 connected to the water conduit 537. Water introduced via line 537 into the water conduit 539 thus passes from the water jets 540, which are disposed inwardly, into the interior of the tank when the floating annular ring is in place.

Briefly explaining the use of the floatinf annular ring, when a water tank is empty the annular ring rests on the bottom of the tank. As water is introduced into the tank via line 537, it fills conduit 539 and is ejected from the water jets 540. As the water level rises the floating annular ring, of course, rises at the top of the water line. Water jet 540(a) is disposed above the water line and water jet 540(b) is disposed below the water line. Thus, as the water level rises the floating annular ring continuously impinges a high pressure stream of water directly against the tree from water jet nozzle 540 and simultaneously agitates subsurface water by a high pressure jet of water from water jet 540(b).

Following the completion of batch harvesting in one tank, as the water is drained therefrom the floating annular ring drops with the water level, until, at the emptying of the tank, it again rests against the flexible bottom of the tank.

One substantial benefit of the use of a floating annular ring as described above is that the use of hydraulic shakers can be avoided; the use of hydraulic shakers often leads to fruit damage when the fruit strikes the branches of the tree after having been dislodged.

In the batch harvesting procedure illustrated in FIG. 33, two tanks are used. Two tank operation is extremely preferred when trees are being harvested in order to control filling time. for small bushes, for example, grapes, blueberries, raspberries and the like, one tank operation is feasible.

The batch harvesting sequence is best explained by beginning at the point where tank 530 is empty and tank 531 is full of fruit. At this stage, port 541 of 3-position valve 542 is closed. This prevents water from entering the by-pass line 543 and by-passing tank 530.

Valve port 546 is then opened to permit water to enter the tank 530 via line 544, water being supplied to valve 542 via line 545 from the hydromotor on the hydromotor platform generally indicated at 546 or via line 545a from some other water source, such as an autoloading tank truck to be described later in connection with FIG. 35.

Simultaneously with the above, valve 547 is also opened and pump 548 is activated. Pump 548 is preferably located on the hydromotor platform and is driven by the hydromotor thereof.

Pipe 549 interconnects tanks 530 and 531. The diameter of pipe 549 and the capacity of pump 548 are chosen to achieve the desired water transfer time, which should be on the order of 1 to 3 minutes.

With the above sequence of valving, tank 530 is filled with water from tank 531 due to the action of pump 548 and with water from the input via line 544. The connection from line 544 need be only of nominal size since the primary function of the water added via line 544 is to restore water losses. As will be apparent from the following description, the primary source of water used to fill an empty tank is from the other tank which is full, thereby minimizing requirements for fresh water introduction. It should be noted, of course, that gravity serves to effect the transfer to half of the water from a full tank to an empty tank.

As tank 530 fills, floating annular ring 536 rises in the tank and, due to the action of the high pressure water streams impinged against the tree, fruit is harvested from the tree.

When the tank is full, floating fruit may be drawn off the tank via coupling 535 which is joined by way of conduit 551 to a water conveyor (not shown).

When tank 531 is empty, valve 547 is closed. Tank 531 may then be opened and moved by the hydromotor platform to another tree. Valve 550 is then opened and valve 547 opened to permit passage of fluid in a direction opposite to that used to fill tank 530 and tank 531 is filled by a repetition of the above cycle. The tanks are "hopscotched" down adjacent rows of trees until harvesting is completed.

The tanks can be lifted and placed into position over the trees by lifting power supplied from the hydromotor platform or, if desired, from a conventional tractor. While in the above embodiments two rows of trees are being picked simultaneously, it will be apparent that two adjacent trees along the same row can also be picked, or both, working four tanks in all.

The pumping operation described above can be automated to a certain extent by utilizing float valves near the upper portion of the tanks to initiate the valving changes and pump direction changes as described above, though in fact level controllers of any type can be used. The passage of fruit through the output ports 535 can be detected by eye, by photocell or by mechanical members, and the cessation of fruit delivery used to initiate the valving changes and pump direction changes as described above. The exact degree of automation will, of course, be economically decided. Modifications of the picking procedure described above include:

Attaching a hydraulic shaker to the tree, for example through a side portion in the tank which is provided with a seal to stop water loss around the hydraulic shaker arm. Such a procedure is described in U.S. Pat. No. 3,584,442, White.

One or more sonic or ultrasonic transducers can be utilized whose frequency is chosen to resonate with the stems of the fruit in question, the frequency being chosen to select the desired size of fruit. Then, the amplitude of vibration is chosen to achieve the desired selectivity of the fruit by degree of ripeness.

When it is necessary to pick fruit on a hillside, adjustable legs are provided on the sides of the tanks and in such a case the tank is provided with a bottom which can flex and extend, for example, made of rubber latex, so that the bottom of the tank can accommodate to the contour of the ground.

Considering the above methods of harvesting, the important advantage of continuous harvesting is that it is relatively rapid and uses equipment shared in common with other functions. Further, it appears to be substantially more economical than batch harvesting.

The advantages of batch harvesting by the two tank method described above are that it can be more precisely controlled, resulting in less fruit damage and in greater selectivity by the criteria of ripeness and size. Further, it can also harvest dropped fruit separately from the hanging fruit by drawing the flexible bottom of the tank to the sides of the tank, for example, manually, after hanging fruit is removed and thereafter filling the tank with water to permit fruit on the ground to rise. Since the water is in direct contact with the ground, generally some water loss is encountered in harvesting dropped fruit. Finally, when used in combination with tank truck conveyors as later described, batch harvesting can be used as a stand-alone system independent of the remainder of the agricultural system of the present invention.

It should be noted that while in the embodiment described in FIG. 33, removal means are provided at the top of the tanks, it is possible to utilize a pipe provided at the bottom of the tanks. A pipe at the bottom of the tank would be used if the fruit to be picked has a specific gravity greater than 1.

TERMINAL CONVEYING SYSTEMS

From the heretofore offered discussion, it is seen that fruit picked in accordance with the present invention is immediately introduced into water, which may be refrigerated, and thereafter conveyed to a delivery point by the water conveyor system of the present invention. It will be apparent that unless the final delivery point is relatively close to the area of picking it is impossible to completely transport fruit to the packing plant or the cold storage. In those instances where the packing plant or cold storage area are relatively remote from the area of picking, terminal or end point conveying beyond that provided by the water conveyors earlier described is necessary. The following discussion describes such terminal or end point conveying particularly amenable for adaption to the agricultural system of the present invention.

Current technology of conveying is very old. Picking is generally done manually from ladders into canvas bottomed buckets and the buckets then carried to either a field box or a crate or a bulk bin, located on the ground and the fruit dumped therein.

The filled boxes or the like are then carried by hand to a truck and stacked thereon. As an alternative, larger boxes such as bulk bins are filled on the ground and hoisted onto a truck using a fork-lift tractor. Such methods expose the picked fruit to continual brusing and increase its temperature as the boxes or bins are left in the sun.

While with the more recent hydraulic shaking equipment conveyors pass from the catching frame of the hydraulic shaker to a bulk bin located on the ground or on a truck, an improvement over manual handling, the fruit is still subjected to bruising and exposure to temperature rise due to being left in the sun.

The conveying methods described below are all improvements over conventional methods as listed above.

As earlier indicated, in accordance with the present invention, fruit or produce is taken directly from the hydromotor platform via water conveyor or from the top (or bottom) of tank type pickers.

In those instances where substantial distances are involved between the picking point and the packing plant, the agricultural system of the present invention provides proper storage for the picked fruit in the form of automatically loaded and unloaded water-filled tanks, various embodiments of which will now be described.

The first and simplest, buffer storage means provided in accordance with the present invention is a single-bin tank truck conveyor. The shape of the tank is not overly important except that a slight upward slope must be provided from the edges of the tank to the portion of the tank at the top where an entrance/discharge port is provided. The entrance/discharge port need not be in the middle of the tank, but can be located at either end or at any point therebetween. Usually the entrance/discharge port will be located in the middle since this will tend to maximize the capacity of the tank.

The entrance/discharge port is provided with coupling means which can be joined to the water conveyor system of the present invention, typically a main line water conveyor.

At the bottom, tank valving means is provided which permits water to be withdrawn from the tank. The valving means can be coupled to pumping means typically driven by a hydromotor, to permit removal of water from the tank.

As an alternative to the above, since the single-bin truck conveyor of the present invention is self-propelled, it can be coupled directly to the hydromotor platform when the same is used for continuous harvesting or the tanks when batch harvesting is practiced.

Such a single-bin tank truck conveyor is used as follows:

The truck is moved into position with a tank full of water;

The input conveyor pipe, trough or the like is attached to the input port at the top of the tank;

A water hose is attached to the valve at the bottom of the tank. The other end of the hose may be connected directly to the water input in a harvesting machine, for example, as shown in FIG. 33, to provide water thereto, if desired, or can merely be directed to a disposal area.

It will be apparent that when the input of the truck is connected to the output of a batch harvesting machine, the water used is in a substantially closed system, in that the water is conveyed from the truck to the harvesting machine via pipe 545a and the water output from the harvesting machine is used to fill the truck via the water conveyor. In those instances where input water is not so available, the input water can be taken from any appropriate point in the fluid delivery subsystem of the present invention.

As fruit enters the truck from the top entrance port, water is simultaneously pumped out from below using the pump earlier mentioned keeping the water level in balance with the quantity of fruit present at a given time so as not to bruise or damage the fruit.

At the end of filling, the fruit occupies the entire tank and water fills all of the space between the fruit. This is necessary and desirable to provide the fruit with some buoyancy, an important factor in avoiding crushing and bruising.

The output hose from the harvesting machine is then disconnected from the input to the truck, and the output hose from the bottom of the truck which leads to the input to the harvesting machine is disconnected. The next truck is then brought into position for filling.

The truck is unloaded by reversing the above process, i.e., water is introduced via the bottom valved port to remove the fruit from the truck by floating the same to the top entrance/dicharge port.

A further embodiment of the terminal conveying system comprises a multi-bulk bin tank truck which will be described with reference to FIG. 35.

Referring to FIG. 35, fruit is delivered to the multitank assembly by way of conduit 560. Conduit 560 can be coupled to the various sources earlier discussed for the single bin tank truck conveyor. Conduit 560 leads to, and sequentially feeds, as later explained, conduits 561, 562 and 563 which are disposed above tanks 564, 565 and 566, respectively, and which are sealable by valving means 567, 568 and 569, respectively.

The bottom of each tank comprises a perforated bottom 570 through which water can pass, a water catch area 571 being disposed below each perforated bottom 570.

Tanks 564, 565, and 566 each have disposed therebelow valving means 572, 573 and 574, respectively. Below the valving means is a water conduit 575 linked to valving means 576 and pump 577.

As shown in FIG. 35, each tank is supported by an L-bracket 578, the bottom thereof being maintained in a water tight relationship by water seal 579.

Fruit removal is effected via conduit **560*a* attached to conduit 561**.

In a practical embodiment, each single unitized tank would be in a shape of a cube roughly 5 by 5 by 5 feet, and three such tanks could be mounted side-by-side on a flat bed truck.

Assuming that a water conveyor carrying fruit is attached to conduit 560 and a water pipe is attached to pump 577, the operation of such a conveyor storage system will be described.

Firstly, when fruit and water being to enter conduit 560 from the water conveyor system, they enter conduit 561. At this stage, gate 567 is in the position to permit entrance into tank 564 but not into conduit 562. Fruit and water thus begin to enter tank 564.

Valve 572 and valve 576 are both in the open position so that as fruit and water are conveyed into tank 564 water passes through the perforated bottom 570 and is drawn off via water catch basin 571 through conduit 575 and thence through valve 576. Input fruit is, of course, retained by the perforated bottom 570 and the withdrawal of water is maintained is such a balance that bruising of the fruit is minimal.

The above procedure is continued until tank 564 fills with fruit. When tank 564 is filled with fruit, valves 567 and 572 close to accomplish two purposes: first, the closing of valve 567 permits fruit to enter conduit 562 and, since valve 568 is opened, to enter tank 565. The closing of valve 572 permits sufficient water to be maintained in tank 564 to space the fruit to prevent bruising.

The process sequence as described for tank 564 is then repeated with tank 565 and 566 until all tanks are filled.

When all tanks are filled, valve 576 is closed, the water conveyor and pipe attached to conduit 560 and pump 577, respectively, removed and the assembly is now ready for transportation.

As an alternative to the above, of course, all water can initially be permitted to be drained from the tanks and then the space between the fruit filled by reversing the flow of water through valve 576, if desired.

As will be apparent to one skilled in the art, the fruit can be transported in the dry condition, if desired.

When the truck is moved to the point of delivery, it can be unloaded by a process which is the inverse of that just described. Alternatively, since the individual tanks are separate, the tanks can be lifted off the truck by means of a fork lift truck, in which case standard fork-lift slots are provided in the side of the tanks.

Fork-lift trucks would be used only in the case where a farm was not completely equipped with the agricultural system of the present invention. If it were completely equipped, the tank truck would deliver its cargo to a cold storage house employing bulk bins similar in design to those carried on the truck.

The total time that foods can be stored under water is limited by the hydrostatic pressure and the temperature. If desired, storage time can be increased by spraying or immersing the food in an edible wax, or other water-repellant, before final storage.

During cold storage, the food can, however, be stored in tanks which do not contain water, that is, under conventional high humidity cold storage or, alternatively, with the tanks full and containing refrigerated water, or with the tanks empty of water but with refrigerated water being dripped over the fruit. In this latter case, the inside tops of the tanks can be equipped with perforated water lines connected to a source of refrigerated water, and pump 577 can be used to return water to the refrigerating unit. Valves 572, 573 and 574 all are held open for this operation.

It will be apparent to one skilled in the art that, if desired, cold storage can be accomplished utilizing a very large number of tanks as described in FIG. 35. When such is contemplated, most desirably the overall storage system would be automated, that is, the operation of the gates and valves would be placed under the control of sensors which deteect when a particular tank is either full of fruit or empty of fruit, and which directly effect a valve closing on a mechanical gate operation, such as float valves or pressure valves.

Multi-tank trucks as described with reference to FIG. 35 can, of course, be manually controlled where the input conduit or pipe is inserted into the input port of each tank before filling it and, when the tank is full, the input conduit is merely removed and advanced to the next tank.

FRUIT GRADING, STORAGE AND CONTAINERIZING MEANS

As will be apparent to one skilled in the art, while the present invention provides the art with a substantial advance in agricultural production systems to this point, and if desired conventional grading, storing and containerizing means can be used in combination with the agricultural system to the present invention earlier described, nonetheless it would be highly desirable if the fruit being carried in the water conveyor of the present application could thereafter be subjected to grading and storing (storing obviously being optional where the fruit is directly containerized) utilizing the power of water available via the fluid delivery subsystem of the present invention.

The following discussion deals with such aspects of the present invention, i.e., operations which are conducted subsequent to harvesting the fruit and, generally, removing it from the immediate point of harvesting.

As will be apparent upon a reading of the following material, in a highly preferred form of the present invention the grading, storing and containerizing operations are performed utilizing water both as a conveying and storing medium. It is thus seen that even this final aspect of the present invention makes maximum use of water power.

In the following discussion, the initial steps of cleaning and polishing of the harvested fruit are classified under the operation of "grading"; in actuality, they can be viewed as a "pre-grading operation", but for purposes of discussion they are classified under the grading operation.

GRADING

Generally, prior to conducting any grading operations, fruit is cleaned and polished. With the agricultural system of the present invention, the fruit is immediately introduced into water at the time of picking, and cleaning and, to a certain extent, polishing begins immediately at the site of picking. Since the fruit is conveyed from the site of picking to the point of packing in water, a further cleaning and polishing affect is achieved during conveying in the water conveyor system of the present invention.

In addition, since the fruit is partially cooled immediately upon introduction into water in a preferred embodiment of the present invention, and is thereafter maintained cool during passage to the packing site in the water conveyor system of the present invention, overall fruit quality is enhanced, i.e., the fruit is firmer and able to withstand additional handling operations and the storage life of the fruit is increased.

As will be apparent to one skilled in the art, if a sufficiently long distance is involved between the site of picking and the packing area, it is feasible that both cleaning and polishing will be completed in the water conveyor system of the present invention.

If desired, the water conveyors of the present invention can be provided with a variety of brushes, abrasive strips of cloth or means of various types designed to contact the fruit as it passes through the water conveyor and gently scrub and polish the fruit. For example, such might be particularly appropriate for fruits such as peaches where the fuzz can be removed.

An important function which can be achieved in the water conveyor subsystem of the present invention is, of course, the removal of residual toxic chemicals. Such would be an important aspect of the water conveyor system only where the toxic chemicals have not been applied sufficiently in advance of picking to permit the toxic chemicals to naturally degrade into non-toxic compounds. As will be apparent to one skilled in the art, the computer can be programmed to apply toxic chemicals to the fruits only a sufficient time prior to picking to permit such natural degradation, if desired.

Assuming that further cleaning or polishing is necessary prior to packing, i.e., where the passage of the fruit to the water conveyor system is not sufficient to achieve such results, various devices can be provided at any point in the water conveyor system prior to the packing area to complete such operations. Most generally, of course, additional cleaning or polishing will be in the terminal area of the water conveyor system just prior to the packing plant, since maximum cleaning and polishing will thus be achieved in the water conveyor system.

For instance, brushes can be disposed in the water conveyor system above a belt conveyor, both the brushes and belt conveyor being driven in the direction of flow of the water, but the belt conveyor being driven at a somewhat faster rate than the brushes. The system could be powered by a small electric motor or by a hydromotor.

The fruit would be guided into the "upstream" end of the conveyor, the brushes and belt conveyor thus coacting to clean and polish the fruit as it is impelled through the "downstream" side of the system.

If desired, the brushes can be provided with spiral grooves which are slightly offset from a direction directly parallel to the direction of water flow, alternate brushes being provided with grooves which are off-set in the right hand direction and off-set in the left direction, this system of grooves tending to channel the fruit into a number of parallel paths to go to the number of grooves and serving to rotate and spin the fruit to expose all surface areas to the brushes assuring adequate cleaning. This system of spiral grooves is taught in U.S. Pat. No. 1,955,749, Jones, cited earlier.

Following the cleaning/polishing operation, if desired the fruit can then be subjected to drying and, if desired, waxing using an apparatus as described in FIG. 36.

Referring to FIG. 36, the cleaned and polished fruit 580 is shown entering input fruit canal 581 while carried in water 582. The input fruit canal 581 is provided with a drain screen 583 which leads to a water by-pass 584. This permits the majority of the water to drain from the fruit and the substantially dry fruit to pass between belt conveyor 585 and sponge dryers 586. Belt conveyor 585 is provided with soft flexible paddles 587, which paddles contact the sponge dryers 586 and serve to impel the fruit therebetween. The sponge dryers 586 remove the majority of residual water from the fruit as it passes between the belt conveyor 585 and the sponge dryers 586.

Press rollers 597 are shown disposed beneath the sponge rollers 586 and in physical contact therewith; the press rollers 597 serve to squeeze the water from the sponge rollers 586, whereafter the water can pass via conduit 588 into by-pass line 584. The thus treated fruit passes on support surface 589 beneath hot air blast conduits 590, the hot air passing over the fruit at point 591 and removing remaining moisture from the fruit, the hot air after contact with the fruit passing through vent screen 592 into area 593 for venting via a conduit (not shown).

If desired, the fruit can then be subjected to a wax spray to deposit a thin layer of wax therearound, the wax serving as a preservative. In the apparatus shown in FIG. 36, wax spray heads 594 are illustrated as being disposed above fruit tumblers 595. Wax spray heads are provided with nozzles (not shown) so that as the fruit passes between the wax spray heads 594 and fruit tumblers 595, a thin spray of wax is deposited therearound.

Wax may be applied to the fruit to control certain diseases or to control the absorption of water by the fruit during further processing and/or storage in water.

The fruit tumblers 595, which can be rollers or brushes, serve to constantly rotate the fruit during the application of wax thereto ensure complete coverage by the wax.

If desired, the wax spray head/fruit tumbler system can be replaced by an immersion system which is filled with wax, the fruit simply being passed through the wax by, for example, apparatus similar to the roller/belt conveyor system earlier described for effecting cleaning and polishing. After wax application, the fruit passes into output fruit canal 596, where the fruit is again carried in water introduced into the output canal 596 from the termination point of the water by-pass line 584.

Utilizing apparatus as described, the product of the agricultural system of the present invention is cleaned, polished and, essentially, is in a condition amenable to "grading", as this term is conventionally used.

In the apparatus of FIG. 36, the belt conveyor 585, sponge rollers 586, drying rollers 597 and fruit tumbler rollers 595 can all be driven in a conventional manner, e.g., by belts and pulleys powered by a hydromotor deriving its energy from the prime source 218 of the fluid delivery system, or by independent electric motors.

In the agricultural system of the present invention, three types of grading operations are contemplated: electronic grading, grading by means of specific gravity and grading by means of size.

As is known in the art, grading operations refer to classifying and segregating fruits by size, color and quality. Quality refers to a great number of variables, for example, U.S. Extra Fancy and Fancy Grade apples must have proper maturity, and be free from bitter pit, Jonathan spot, russeting, scald, broken skin and bruises, internal breakdown, etc.

Requirements for fruit quality are so complex and, to a certain extent, relatively subjective, that complete automation of quality grading is an ideal only to be approached.

However, the agricultural system of the present invention lends itself excellently to the grading of fruits by size, shape, color and defects, and hence approaches the ideal closer than any known machine.

Size refers only to one physical dimension: the diameter of the fruit at its point of greatest circumference; such is amenable to complete automation. Shape is not generally quantifiable, and hence shape grading has always been done visually by subjective judgment; it is automatically accomplished in the present invention. Color grading can also be automated, and can be accomplished by photocell detection and integration of light reflected from each fruit graded. See Mohsenin—

Physical Properties of Plant And Animal Materials; Vol. 1, Gordon and Breach Science Publishers, New York, 1970.

The following discussion describes, as indicated above, electronic, specific gravity and size grading means.

ELECTRONIC GRADING

Color grading, sizing and eliminating fruit with color differentiable skin defects can be performed by computer analysis of the output of a television scanner or a flying-spot scanner, and using the results to classify and/or reject the fruit according to the pre-programmed grading requirements. Internal defects can be detected and classified by adaptations of sonar technology under which the computer analyzes sound echoes returned from the interior of the fruit.

Computer grading is performed by comparing the output from the television scanner or flying-spot scanner against a set of "templates" stored in the computer.

For example, to grade size the template can be analogous to a metal gauge having a plurality of openings correlated with desired fruit size.

In classifying by color, the reflection of radiation of an appropriate wavelength, for example, visible light, can be integrated by the computer and compared to pre-established standards. Taking the color grading of an apple as illustrative, the computer would integrate the reflected color from the apple, and, assuming the apple is a type such as red delicious, compare it to a series of templates which have been pre-recorded for apples illustrating a desired color. After the apple being examined is correlated with an appropriate pre-recorded template, it can be appropriately routed to a desired classification bin.

Other templates can be prepared to recognize evidence of disease or damage to the fruit undergoing grading, and such will be particularly appropriate for disease or damage which is visible on the skin of the apple or like fruit.

Since at the time of fruit packing the growth period in the agricultural system of the present invention has been completed, essentially the full capacity of the computer will be available for grading and packing. Further, if television scanners have been used for remote sensing of a homogeneous agricultural area, and they are portable, they can be brought into the packing plant to be utilized in the electronic grading machine.

The electronic grading machine utilizes circuitry similar to that earlier explained with reference to FIG. 5 for remote sensing. Referring now to FIG. 37, an electronic grading machine is shown therein where the circuitry of FIG. 5 is adapted to accomplish electronic grading. More specifically, it will be seen that the apparatus of FIG. 5 can be directly used as scanners 604 to provide multi-wavelength capability (provided by filter wheel 117 and array 118 in combination with controller 112), though generally control elements to provide zoom, pan, tilt, etc., will not be necessary (as the camera can be fixed) unless one is to use portable remote sensing apparatus as scanning means as shown in FIG. 37. While the remote sensing means shown in FIG. 5 is usually used with switch means as shown in FIG. 4, unless a plurality of graders as shown in FIG. 37 are used, such interfacing switch means for time division multiplexing will not be necessary.

Referring to FIG. 37, fruit 600 carried in water received, for example, from a water conveyor (not shown) is channelled by members 601 into conveyor orientation area 602 which comprises, for example, a belt conveyor with vertically oriented teeth spaced at a width sufficient to capture one piece of fruit in its naturally floating orientation. The conveyor 603 can be driven by a small electrical motor or by a hydromotor powered from the fluid delivery subsystem of the present invention.

Each individual piece of fruit in water is then passed between scanners 604, which are linked to computer 10 via transmission line 605; subunits of computer 10 comprising a template file 126, a comparator 123 and a temporary memory 121 where the stationary image recorded by scanners 604 is recorded to permit comparison by comparator 123 to templates in the template file 126 are shown.

Templates in the template file 126 will, of course, have been prepared in advance of the packing operation to enable a color image and size comparison to be made, and to recognize surface defects. No special orientation of the fruit while it is between the scanners 604 is necessary since the computer can compare the fruit to a number of templates to allow for various orientations. For example, assuming that apples are the fruit being graded, three classes of templates will generally suffice for any grading since tests have shown that up to 95% of apples floating in water float with the stem end up, a few percent float with the stem end down and the balance with the cheek up.

Assuming that it passes comparison to a template in the template file 126, it then passes from the area between scanners 604. Immediately following scanner 604 in the direction of travel of the produce is grading gate area 607, comprising a series of seven separate grading gates, 608 permitting a first classification, 609a and 609b permitting a second classification and 610a, b, c and d permitting a third classification. The grading gates are under control of grade selector 606 by conventional means, and permit produce passed by scanner 604 to be classified into one of eight separate categories at area 611. As will be appreciated by one skilled in the art, passage along the grading gate area 607 results in the produce being appropriately channelled in response to its classification while undergoing passage between scanner 604. No novelty per se is claimed for the grading gate assembly or the control means therefore.

The circuitry required to operate grade selector 606 is conventional insofar as activation of bin classification means is concerned.

On the other hand, if a fruit fails to match a template image, it results in rejection means being activated, for example, a gate can be provided immediately beneath the area between scanners 604 and the computer can operate a latch to permit the fruit to enter an exit channel (not shown) below the scanners, and thereafter be routed to a reject bin.

In a modification of FIG. 37, most internal defects in the fruit can be detected using reflections of supersonic waves. This can be accomplished prior to, at, or subsequent to, the scanning means 604 by providing an ultrasonic transducer to generate ultrasonic waves, for example, immediately above the fruit while it is being carried in conveyor 603 in combination with a sonic transceiver to detect the reflected supersonic waves. The sonic transceiver would be linked to the computer 10 by an appropriate transmission line, the output from the sonic transceiver being stored in a temporary memory, if desired, and thereafter compared in a comparator to appropriate templates in template file 126. In this particular instance, the templates are prerecorded echo reflection waveforms from healthy produce as well as prerecorded reflection waveforms from produce with known defects. Sonar techniques are well known in the art. In this application, the transmitter generates a supersonic pulse train, typically at 2 MHz, with a pulse duration of 2 microseconds, and a pulse repetition frequency of one thousand per second. Echoes received by the transducer after each pulse of ultrasonic energy are fed to a conventional receiver for amplification and detection to provide an output proportional to the distance from the transducer to the physical features to be used for classification, such as a bruise just under the skin, a worm hole, etc. A "template" to be used for purposes of classification is prepared by passing perfect pieces of fruit, through the sonar grader, and the resulting "ideal" echo reflection waveform will be stored in the template file as a standard for comparison. Other templates used for identifying defects of interest are prepared in the same way. This process of making templates requires that human judgment be used by using a video CRT display of the waveforms so that the ultimate standards of quality initially can be translated into the form of measurement used here, i.e., the presence of wanted or unwanted returned echoes, their locations in time, their amplitudes and widths.

If analysis of internal defects utilizing the supersonic wave reflection is accomplished at the same time that the fruit is being subjected to scanning by scanners 604, further mechanical channellization can be avoided, as can the addition of a second set of reject means, since the reject means for the scanners can be also activated by the failure of the computer to match a template to the fruit being subjected to supersonic analysis.

If desired, ultrasonic analysis can be performed by utilizing a combined transmitting and receiving transducer which can be brought into direct contact with the skin of the fruit as the conveyor moves it into position, the transducer being carried by spring biasing means, for example. Ultrasonic analysis can occur while the fruit is out of the water or while the fruit is in the water and, in fact, for certain applications, ultrasonic analysis will be performed while the fruit is immersed in the water since better coupling of the fruit with the transducer is achievable. The video scanners 604, of course, work equally as well under water as out of the water.

Illustrative of the types of flaws which can be detected utilizing ultrasonic analysis as described, using apples as illustrative, are water core worms, bruising, brown rot, over-ripeness and the like.

Ultrasonic waves which are detected from a flaw in the fruit are quite different from the continuous echoes which are reflected from the floor of the conveyor area 603.

A reflecting plate is provided immediately beneath the upper belt of the endless conveyor under the piece of fruit which is in contact with the transducer, the reflection plate being selected to have known characteristics and to minimize the distance between the transducer and points of ultrasonic wave reflection in the apparatus.

The above described electronic grading machine offers several advantages to the art:

Firstly, many more quality variables are measurable than for any known grading machine;

Secondly, more grades can be differentiated than with any known grading machine, thereby increasing the market value of the total crop;

Thirdly, the information obtained from the computer can be utilized to predict an expected storage life, generally by measuring the ripeness of the fruit. It is well known that the "greener" the fruit, the longer it can undergo storage. Further, fruit with defects generally will not undergo storage as long as healthy fruit. Usually, all fruit illustrating similar degrees of ripeness or similar damages, such as bruises, will be classified together so that the storage life of the homogeneous mass of fruit that is obtained will be relatively equivalent. This will permit lowered spoilage during storage and permit marketing of produce at the time when such produce can draw its highest price;

Fourthly, the computer can be used to derive an analysis of the causes of rejection, actually statistical distribution of produce loss due to various causes such over-ripeness, brown rot, etc., and such information can be fed back into the computer to permit the same to reach decisions regarding future treatment to avoid such causes of rejection.

While the electronic grading apparatus above described enables a number of functions to be achieved, several single purpose devices can also be used in the agricultural system of the present invention, though generally such would not be used in combination with the electronic grading apparatus just described.

GRADING BY SPECIFIC GRAVITY

With certain fruits and vegetables, the degree of ripeness is correlated with specific gravity; riper fruits generally having a lower specific gravity while less ripe fruits have a higher specific gravity.

Depending upon whether the particular species of fruit or vegetable involved has a specific gravity range of above 1 (for example, potatoes) or below 1 (for example, apples), the fruit or vegetable will either sink (for example, potatoes) or rise (for example, apples) when released under water at a given elevation.

If the fruit involved is one which can exhibit a specific gravity less than or greater than 1 (for example, blueberries which can illustrate a specific gravity of from about 0.70 to about 1.20) some fruit will rise and some fruit will fall.

In addition to the correlation between ripeness and specific gravity, certain internal defects, diseases and insects can cause fruits and vegetables to have a specific gravity substantially different from that of normal fruit.

Specific gravities of various fruits and vegetables are presented in Mohsenin—Physical Properties Of Plant And Animal Materials; Gordon and Breach Science Publishers, New York, 1970, and such will be useful in permitting one skilled in the art to obtain the wide application of grading by specific gravity in accordance with the present invention.

Referring to FIG. 38, apparatus for grading by means of specific gravity differences in accordance with the present invention is described therein, the apparatus generally being indicated by 620 as comprising an elongated tank of rectangular shape.

Fruit 621 which is carried in water 622 initially enters the specific grading apparatus 620 at point 623, being received, for example from a water trough conveyor as earlier described (not shown).

The water 622 must be flowing at a constant rate and must be maintained at a constant level; such can be controlled by a flow meter and level sensor as is known in the art, generally indicated at 624. The flow meter and level sensor 624 is linked to the computer of the agricultural system of the present invention (not shown) which constantly receives a data input regarding water velocity and volume and which can be used to increase water velocity and volume by opening or closing valving means upstream from the specific gravity grading device. Since water velocity and volume are controlled for other functions in addition to specific gravity grading, for example, for use in the polisher, waxer, the conveyor system and the like, the cost of such control is shared and effectively pro-rated.

If desired, of course, water velocity may be controlled at no substantial cost merely by initially adjusting the incline of the specific gravity grader for gravity flow; for example, utilizing adjustable hydraulic cylinders under one end of the grader or other conventional elevating/lowering means as are known in the art.

As the fruit 621 carried in water 622 passes from area 623 of the specific gravity grader 620, it passes the area of water jet 625 which is adapted to bring substantially all fruit to the same elevation and thereafter forces the fruit upwardly and over imperforate water ramp 626, whereafter the fruit is permitted to disperse either upwardly or downwardly in the water in area 627, according to its specific gravity, permitting the fruit to disperse either above or below a separator plate 628. In FIG. 38, relatively light fruit 621a is shown entering the area above separator plate 628 and relatively heavier fruit 62b is shown entering the area beneath separator plate 628.

In this particular instance, the relatively heavy or "high density" fruit is desired, and it is shown being removed from the grading apparatus by way of belt conveyor 629 driven by motor/pulley assembly 630 and being forwarded to terminal conveying means 632 which can be, for example, apparatus as earlier described with reference to FIG. 35.

While in FIG. 38 the separator plate 638 is shown extending over the entire length of the belt conveyor 629, in fact it is only necessary that the separator plate occur at the initial portion of the belt conveyor 629 to permit the division of the dispersed fruit earlier described.

The relatively light or "low density" product 621a can be removed from the specific gravity grading apparatus by, for example, providing another belt conveyor above separator plate 628, providing a take-off conveyor in the side of the specific gravity grading device 620 or the like.

The underwater ramp 626 can be adjusted so as to permit specific gravity grading of various types of fruit, and to accomplish this adjusting slots 631 are shown provided in the sidewall thereof, the underwater ramp 626 held by pivotal members 632 in the adjustment slot and thus being capable of assuming various degrees of elevation. The degree of elevation of the underwater ramp 626 will, of course, control the dispersion interval of the fruit, and this adjustment in combination with a similar vertical adjustment of the separator plate (which can be accomplished by vertically oriented adjustment slots, not shown) permits a wide variety of fruits and vegetables to be graded by means of specific gravity differences.

For fruits or vegetables where the specific gravity is less than 1, for example, apples, generally the final portion of the underwater ramp 626 will be relatively deep in the water to permit sufficient upward floatation for purposes of dispersion. On the other hand, if the specific gravity of the fruit or vegetable involved is greater than 1, for example, potatoes, the end portion of the underwater ramp 626 will generally be relatively shallow, permitting the fruit or vegetable involved to disperse as it sinks.

Both underwater ramp 626 and separator plate 628 can be simply formed from sheet metal.

In addition to the above separation of fruit by utilizing specific gravity, undesirable solid material such as twigs, stones, etc., which are generally outside the specific gravity range of the fruit or vegetable involved, can be removed from the top or bottom of the specific gravity grading apparatus, depending on whether the undesirable solid material floats or sinks, respectively.

The primary advantage of the apparatus described in FIG. 38 is the extreme simplicity thereof, i.e., the relatively low number of moving parts. The water jets can, in fact, be omitted if the forward water velocity in area 623 is sufficient to carry the fruit or vegetable involved over the underwater ramp 626; in this case, the only moving part in the system would be the belt conveyor 629.

If the degree of classification due to specific gravity differences is insufficient in one device as shown in FIG. 38, a plurality of such devices can be linked in series, each individual specific gravity separator permitting finer and finer classification, or alternatively, two or more separator plates can be positioned at different depths.

GRADING BY SIZE

Since the agricultural system of the present invention enables a much higher quality of product to be obtained than conventional farming methods in terms of color, lack of disease, uniformity and the like, grading according to size will be an important operation in accordance with the present invention. However, with the lowered size variation obtainable by the utilization of the agricultural system of the present invention, even sizing will be a lesser problem than with products from conventional farms.

Many methods of sizing both by fruit weight and fruit diameter involving dry fruit are in use. Sizing operations utilizing flotaion are also known (see, for example, A. B. Stout et al, A Prototype Hydro-Handling System for Sorting And Sizing Apples Before Storage, ARS 52-14, USDA, 1966), but such are typically predicated upon utilizing chain-type sizers under water.

Since in accordance with the agricultural system of the present invention the fruit or vegetable product is already in the flotation mode, it is convenient and inexpensive to perform sizing while the fruit is being transported in a water containing conveyor.

Four sizing methods are contemplated for use in the agricultural system of the present invention, which will now be described.

In one embodiment, a water conveyor of rectangular cross section is provided with perforated holes in the flat bottom of the conveyor, which holes correspond to the diameter of the fruit to be selected. The holes can be fixed in size or, if desired, can be of a variable diameter. As will be apparent to one skilled in the art, the smallest diameter holes are upstream and the largest diameter holes are downstream, holes of intermediate diameter being provided therebetween, if necessary.

Since any individual sizing area functions in a manner substantially identical to other sizing areas except for fruit or vegetables of different sizes being permitted to pass through the holes in the bottom of the water conveyor, explanation will be offered only for the selection of the fruit or vegetables of the smallest diameter.

Assuming that the fruit carried in water passes over the smallest diameter holes, intermediate and large size fruit passes over the holes because of its size; however, the smallest fruit which has a diameter less than that of the diameter of the holes passes therethrough, falling into a secondary water conveyor thereunder which can be utilized to convey the fruit of the desired size to a boxing station or for further processing as desired.

Water level is controlled in the water conveyor in accordance with the average specific gravity; for high specific gravity, it is high, and for low specific gravity, it is low, to ensure movement over the pattern of holes in the bottom of the water conveyor and to replace water which is lost along with the fruit as it passes through the hole in the bottom of the water conveyor.

Water lost can be minimized, if desired, by using a hinged flap under each hole, the hinged flap being held closed by spring biasing means which maintain the flap closed under the low water head involved but which will open when the weight of a piece of fruit which is small enough to pass through the hole involved is directed thereagainst. The hinged flap can be made concave with reference to the bottom of the water trough and hole so that there is minimal danger of the fruit passing over the hole, rather, it will fall into the concave hinged flap and automatically open the flap.

As will be apparent to one skilled in the art, this embodiment permits fruit to be graded not only by size but also by weight, if desired.

Water level can be controlled by float valves mounted in the side of the water conveyor, and fruit movement at a sufficient velocity can be assured by water jets disposed either in the side of the water conveyor or, more preferably, above the water conveyor in a manner so as to direct the fruit against the holes in the bottom of the water conveyor.

If desired, sizing by the embodiment described above can be effected without utilizing water in the conveyor which contains the holes if the trough is sufficiently inclined to ensure gravity flow of the fruit or vegetable involved. In such an embodiment, of course, water level controls or water jets in the conveyor trough are unnecessary, and input water, after separation from the fruit, can be merely diverted ahead of the sizing holes directly to the water conveyor utilized to convey the fruit to the next processing station.

The second size grading method of the present invention finds particular application in sizing fruits or vegetables which have a specific gravity range which brackets a specific gravity of 1, for example, peaches and blueberries.

Apparatus to effectively size such materials is shown in FIG. 39. Fruit of varying size 640 enters conduit 641 in a flowing stream of water, and strikes deflector 642, being directed against mesh 643 as shown in FIG. 39. Fruit of the smallest size generally indicated as 640a passes through mesh 643 and is removed via conduit 644. The balance of the fruit passes via conduit 641 and strikes deflector 645, being impelled against mesh screen 646 which permits the next larger size of fruit or vegetable 640b to be removed via conduit 647.

The remaining fruit than passes via conduit 641 under the influence of gravity and strikes deflector 648 or is guided by the oppositely faced wall of conduit 641 against mesh screen 649, sized to permit the next desired size of fruit 640c to be removed via conduit 650.

The remaining large size fruit 640d is removed via the terminal portion of conduit 641.

Water level in all conduits can be controlled in any desired fashion, for example, by float valves.

If desired, spring biased hinged flaps can also be provided behind the mesh screens of this embodiment in a manner similar described for the earlier embodiment.

Further, instead of providing convex "deflectors" as shown by 642,645 and 648 in FIG. 39, the deflectors can be omitted and replaced with spring-biased flaps, biasing being provided in a manner such that as the travelling fruit strikes the flap it deflects the flap in the direction of the travel of the fruit, thereby providing a "moveable" ramp up which the fruit can travel to be deflected into conduits 644,647 amd 650. Such spring-biased flaps can be hinged directly to the inner wall of main conduit 641.

The third specific gravity grading method of the present invention finds particular application with fruits and vegetables whose specific gravity is less than 1, and such will be explained with reference to FIG. 40.

Referring to FIG. 40, the sizing apparatus of this embodiment is generally indicated by numeral 660 and is shown linked to a water lock 490 (as earlier described with reference to FIG. 51), or a "fruit-pump" as earlier described, and is suitable for any produce whose specific gravity is below one. The water lock or "fruit-pump" receives fruit or vegetables carried in water from a water conveyor trough 661 as has earlier been described.

Conduit 662 comprises an initial horizontal section 662a and a terminal graded or inclined section 662b. Extending from the graded or inclined section 662b are three vertically oriented conduits 663, 664 and 665, the first two conduits having at the bottom portion thereof vibrating sorting screens 666 and 667, respectively. Vibrating sorting screen 666 has holes of a diameter slightly larger than the smallest fruit or vegetable to be graded; vibrating sorting screen 667 has holes of a diameter slightly larger than medium size fruit or vegetables to be graded; conduit 665 has no vibrating sorting screen as only the largest fruit to be graded remains. These screens can be vibrated in a direction basically parallel to the flow of fruit and water in the inclined portion of the grading pipe by any conventional means.

Exit conduit 668 receives excess water from which the fruit or vegetables have been removed.

A typical grading process utilizing the apparatus of FIG. 40 will now be described.

First, a batch of fruit and water is received in the water lock or fruit pump 490 from water conveyor trough 661. Secondly, the batch of fruit and water is discharged into the grading pipe 662. Vertically oriented conduits 663–665 are at this time filled with water. The vertically oriented conduits need not be circular in diameter but can, for example, be rectangular in orientation and have measurements of 2 feet by 20 feet to allow a large volume of fruit to be spread out. As the fruit and water passes up the graded section 662b, the fruit, which has a specific gravity less than 1, naturally floats to the top of the conduit 662b and sequentially contacts vibrating sorting screens 666 and 667. At vibrating sorting screen 666 the smallest fruits pass through the holes of the smallest diameter and enter vertically oriented conduit 663. A similar procedure is performed for medium fruit in vertically oriented conduit 664; large fruit floats into conduit 665, whereafter the remaining water exits from the specific gravity grading apparatus of FIG. 40 via exit conduit 668.

A substantial advantage of the apparatus of FIG. 40 is that substantially the same amount of water can be forced up the vertically oriented conduits as enters the water lock, whereby the need for "make-up" water is minimized.

The graded fruit can be removed from vertically oriented conduits 663–665 by any conventional means, but preferably by three water conveyors of the type described earlier.

In a modification of the apparatus of FIG. 40, conduit 661 and water lock or fruit pump 490 are omitted, and the balance of the apparatus placed entirely under water in a large open tank of water or, for example, a farm reservoir or lake which serves as temporary storage for the entering fruit.

In this case, horizontally disposed conduit section 662a is removed and a collecting conveyor discharge directly inserted into the inclined grading pipe section 662b. The conveyor, which can be a belt, is provided with members which are adapted to and trap fruit or vegetables floating in the large open tank of water and deliver the same into the grading pipe.

Generally, the large open tank of water will be directly fed by a water conveyor as earlier described. Assuming that a belt conveyor is used, for fruits which have a specific gravity of less than 1 generally the belt conveyor will be disposed in an upward direction since fruits will tend to rise and the belt conveyor is utilized to remove the same from upper portions of the large tank of water and deliver the same into the inclined section of the grading pipe 662b.

The actual structure of the belt conveyor is not overly important and can be, for example, a standard belt conveyor provided with scoops or entrainers which retain the fruit or vegetables during a downward passage but which permit the fruits or vegetables to escape once the upward return of the belt conveyor is initiated.

Any of the grading means earlier described can be located at any desired point in the agricultural system. However, they will generally be fixed at a central point in the agricultural system and, for practical reasons, at the termination of a main line water conveyor system which receives harvested fruit from various hydromotor attached water conveyors.

Following any of the above procedures, fruits or vegetables can be cleaned, polished and graded according to desired quality; following the completion of the above operations, the fruits or vegetables are ready for either direct shipping to market, for direct use, or, alternatively, for storage until ready for shipping to market or use.

It is thus appropriate to turn to representative storage operations contemplated for use in the agricultural system of the present invention.

STORAGE OPERATIONS

Cold storage is essential to any large fruit growing operation for the following reasons:

1. to control the supply of fruit to the market place, thus stabilizing prices and, generally, increasing return to the farmer;
2. farm storage is generally less expensive than commercial storage at intermediate to large volumes;
3. to permit a decrease in packing plant size by increasing storage investment instead of extra lines of grading and packing equipment;
4. smoothing the demand for labor over a longer period by avoiding periods of high intensity grading and packing, and
5. greatly extending the time of availability of a given type of fruit.

Fruit or vegetable storage involves three primary variables: temperature, humidity and ventilation (circulation); pressre is important, but it has not been considered for conventional air storage procedures.

The above variables control the speed of the life processes in fruits or vegetables, fruit respires; it takes in oxygen and evolves carbon dioxide through the skin. In ripening after picking, starch changes to sugar, acids and tannins decrease, pectins change form, esters responsible for flavor and aroma increase, and heat is given off as a result of these chemical changes.

The rate of ripening of picked fruit varies inversely with the temperature of storage, which may be anywhere from the freezing point of the fruit (about 28.5° F. for apples) to atmospheric temperature, depending upon the desired storage life. The longest storage life is achieved for many fruits when the fruit temperature is reduced to about 30° F. as soon as possible after picking and held there at a humidity of not less than 95%, though some varieties of fruit should not be held at such low temperatures. The effect of delay in getting the fruit to storage temperature also has an important effect on shelf life, e.g., the softening of fruit proceeds twice as fast at 70° F. as at 50° F., twice as fast at 50° F. as at 40° F. and twice again as fast at 40° F. as at 32° F.

High humidity (not less than 85%) is required to avoid moisture loss and shriveling. Ninety-five percent humidity can be maintained in air storage without fungus growth if the temperature is at 32° F.

Ventilation refers to the introduction of outside air (in the case of air storage) which is required to remove heat generated from ripening fruit, and to remove ethylene gas and esters which are products of ripening and which can cause scald on succeptible varieties such as apples.

Controlled atmosphere (CA) storage is currently the most advanced storage technology available. CA storage involves the use of an air tight storage chamber which permits oxygen levels therein to be reduced to 10 or 12 percent as oxygen is consumed by ripening, with a simultaneous retention and build up of carbon dioxide. The carbon dioxide level is controlled to about 5 to 10 percent by air scrubbing in water and/or caustic soda. CA storage permits temperature requirements to be relaxed, and temperatures of about 40° F. can be used.

With all current storage systems the cost of the storage building is generally the larges single cost item on a conventional fruit farm. As an example, in Michigan the storage costs for apples in the mid 1950's was $1.75 per bushel for CA storage; today this cost has at least doubled. A 40×60 foot building with a 20 foot ceiling equipped for CA storage today costs in the area of $35,000.

Considering the importance of storage operations to the agricultural system of the present invention, the disadvantage of prior art storage procedures as described above and the fact that the agricultural system of the present invention most preferably comprises a source of refrigerated water, for example, a natural lake or the like, water is used as a refrigerating medium in the agricultural system of the present invention rather than air.

Several advantages are inherently provided by the use of water as opposed to air:

1. the thermal conductivity of water is more than 10 times greater than that of air;
2. the specific heat of water is more than 10,000 times the specific heat of air, these two factors rendering water a much more efficient refrigerating medium than air.
3. underwater storage approximates the conditions for CA storage quite closely; a further substantial advantage of underwater storage is that temperature can be duplicated exactly, under certain circumstances without refrigeration system merely by controlling the thickness of the water "cover".

While it shall be understood by those skilled in the art that any conventional storage procedure known to the art today can be used in the agricultural system of the present invention, the following discussion will be in terms of storage procedures unique to the agricultural system of the present invention, viz:

1. storage where fruit is totally immersed in water, and
2. storage where chilled water is trickled over the fruit while it is held in a container.

Considering firstly the embodiment of the present invention wherein the fruit is totally immersed, an extremely inexpensive procedure of accomplishing is to store the fruit in a naturally occurring or artificial lake. The following benefits ensue:

1. first, water, temperature at the bottom of the lake is appropriate for fruit storage. For example, the water temperature at the bottom of a 15 foot lake in summer is about 40° to 50° F. and in the winter is about 35° to 40° F.
2. oxygen concentration is extremely low, i.e., the amount normaly dissolved in water. Natural carbon dioxide levels are also very low, and any carbon dioxide generated from fruit ripening is quickly dissolved in the water and removed from the area of the fruit by convection currents without any requirements for scrubbing such as is the case with CA storage.
3. the humidity is 100 percent with no danger of frost in the refrigerating apparatus, for example in cooling coils, since such apparatus is not required.
4. construction cost is extremely low since water is the insulating medium; all that is needed to retain the fruit is a container such as wire mesh or corrugated aluminum.
5. transportation from the picking site to the storage area can be rapid using the water trough conveyor system of the present invention.
6. fruit delivery and fruit removal are far less expensive than with conventional systems, as will be shortly explained.

In the second unique storage procedure of the present invention, chilled water is trickled over the fruit as it is stored in containers in a cold storage area, for example, containers as earlier described with reference to FIG. 35 or the single-bin embodiment earlier described.

While this second storage procedure of the present invention does require a refrigerating unit, a disadvantage over storage by immersion in chilled water as above described, the storage area can be of much smaller capacity than is required for air storage because of the relatively high heat capacity of water.

One disadvantage of either of the above storage procedures which can be used in the agricultural system of the present invention is the fact that contact with water will, with the passage of sufficient time, cause water ingestion in the fruit, for example, with apples particularly at the stem and calyx ends of the fruit, which can lead to cell injury if hydrostatic pressure is excessive. In certain instances, or if the desired storage time is long, this factor will lead one to select conventional storage procedures.

A way to extend storage time either under water or under dripping water is to coat the fruit prior to storage with an edible wax, for example, using the apparatus earlier described with reference to FIG. 36. The edible wax can be applied by spraying or dipping, and can be selected not only to seal the skin but also the stem and core ends for fruit such as apples. Edible wax is already in use in many packing plants to produce an attractive surface sheen on fruits, and such wax can be used in the agricultural system of the present invention.

Whatever storage operation is selected, it is necessary that fruit be introduced and removed from the storage means. The following discussion will describe several methods which can be used to so introduce and remove fruit from storage.

In the first method, the apparatus of FIG. 5 is utilized to merely contain the fruit while it is undergoing conventional cold storage, to hold the fruit while chilled water is being trickled thereover or, finally, to contain the fruit while it is immersed in chilled water.

A second method which can be used in the agricultural system of the present invention will be described with reference to FIG. 41 illustrating one specific embodiment of underwater storage procedure where the relatively cool water at the bottom of a lake is utilized as the refrigerant medium, with or without artificially provided refrigerating capability.

Referring to FIG. 41, the storage apparatus is generally designated by 670, shown immersed in lake 671. The storage apparatus essentially comprises a large water-filled silo 672 immersed in lake 671 and supported by ballast members 673. The water filled silo 672 is provided with a conical roof 674 and a chimney 675 fitted with gate valve 676, for example, a gate valve 12 inches in diameter.

Silo 672 in this instance is provided with opening 677 in the bottom thereof into which conveyor 678 extends. Conveyor 678 is provided with a plurality of arms 679 which are L-shaped in cross section. The upper end of conveyor 678 is adapted to receive fruit 680 from water conveyor 681 and carry the same by counterclockwise rotation from water trough conveyor 681 to openfing 677 in silo 672 where the fruit, having a specific gravity less than 1, floats to the top of silo 672 encountering internal baffles 682 during its upward passage in the silo 672, the internal baffles serving to control the upward velocity of the fruit to prevent bruising and to reduce crushing.

When the silo 672 is full, conveyor 678 can be withdrawn and, if desired, opening 677 closed by appropriate means (not shown). While in principle closing means are not needed, potential reasons for using the same include preventing the entrance of unwanted debris, fish and the like.

When it is desired to withdraw fruit 680 from silo 672, gate valve 676 is opened by any conventional means, permitting the fruit 680 to float to the lake surface indicated at 683 and thereafter be removed by way of water conduit 684 which is provided with water jet nozzles 685 fed by water conduit 686. Water jet nozzles 685 are adapted to propel fruit 680 in conduit 684 away from silo 672.

Once the fruit 680 reaches the shore of the lake 671, it can be removed from conduit 684 by a conveyor similar to that used to deliver the fruit to the silo 672 by a conveyor similar to that used to deliver the fruit to the silo 672, for example, by a water lock as shown in FIG. 31, or a water pump as earlier described, and thereafter delivered to the packing plant.

Although the above underwater storage embodiment of the present invention is exemplified for fruits having a specific gravity less than 1 underwafter storage can be used for fruits having a specific gravity greater than 1; essentially by reversing the apparatus 180. That is, fruit is picked up from the bottom of the lake by the conveyor, is lifted to the upper portion of the silo (which has been inverted with reference to the embodiment of FIG. 41,) and for removal is retrieved from the bottom of the silo.

The silo can be constructed in a very simple and inexpensive manner, if desired. It can be constructed with the lake drained, and such is preferred, but it can, of course, be constructed when the lake is full by underwater diving teams.

The simplicity of the silo is partially due to the fact that the major force on the silo is the upward buoyant force of the fruit; this force is not large for any type of fruit that might be stored in this manner, and the sidewalls can be sloped to the center in order to control or compensate for any crushing buoyant force involved in the storage of extremely large amounts of fruit.

For instance, wooden or concrete posts can be set on the lake floor and wire mesh attached to the inside of the lake floor; in this embodiment, there are essentially no solid retaining walls.

In the apparatus of FIG. 41 no special interfacing is needed between water conveyor 681, belt conveyor 678 and silo 672. Generally, however, the L-shaped members 679 are made of a relatively flexible material such as natural rubber or a synthetic plastic while "scoop" the fruit from the terminal edge of the water conveyor without bruising the fruit. Further, it is preferred that slots or perforations be provided in surfaces 679a and 679b, giving a mesh-like effect, to achieve two purposes: first, to reduce the natural drag due to water; secondly, to permit the fruit 680 to be assisted from L-shaped members 679 by a jet of water or air from jet 687 to insure removal/introduction into the silo 672. Jet 687 can be powered by any conventional means or by a line from the fluid delivery subsystem (not shown).

In a further modification of the above structure, the dead weight of the silo and attached apparatus can be made slightly greater than the buoyant force acting upon the silo when it is filled by the use of attached weights, such being necessary only when the specific gravity of the fruits being stored is less than 1. The weights can be made releasable, if desired, to permit the entire filled silo to float to the surface of the lake, if desired; one might use such a modification if, for some reason, it is desired to pull the filled silo to shore.

As will be apparent to one skilled in the art, using an ordinary farm pond or lake for fruit storage as above requires that good sanitation be maintained on the water in the lake, and the lake be suitable for withdrawing water from the top or bottom of the lake so as to control the temperature of the lake. Assuming adequate topographical features of the lake, standard state of the art standpipes as are utilized to draw overflow water from the top of lakes in most farm ponds can be used to limit or control the surface temperature of the lake and, in addition, a gated pipe can be provided a draw water from the bottom of the lake so that the bottom temperature of the lake can be controlled, and, in addition, the lake can be drained if desired.

As a modification to the method described above, underwater storage can be combined with underwater sizing of the fruit. This essentially represents a combination of the device shown in FIG. 41 and the specific gravity grading apparatus which was earlier described as adaptable to complete immersion under water. Such apparatus will now be described with reference to FIG. 42 and 43. Like numerals are used to identify like apparatus.

Referring first to FIG. 42, underwater storage means is generally indicated by 690 and underwater specific gravity sizing means is generally indicated by 691, both means being shown immersed beneath the surface of a lake represented by 692.

Fruit and water are introduced via conduit 693 which can be, for example, a water conveyor as earlier described, and received at the end portion 694 of said conduit by receiving brackets 695 carried on belt conveyor 696 similar to that shown in FIG. 41. The fruit, generally identified as 697, is carried by the conveyor rotating in a counter-clockwise direction into elevated grading conduit 698, which is provided at its upper surface with vibrating screens 699 and 700 which have holes provided therein of a diameter to permit the passage of small fruit and medium fruit, respectively. Grading conduit 698 terminates at opening 701 which is not provided with a grading screen since, as the only fruit remaining at the point of opening 701 is large fruit, no grading screen is required.

Grading screens 699 and 700 are adapted to be vibrated by linkage 702 attached to eccentric 703, part of the drive means for conveyor 696.

Grading screen 699 communicates with storage chamber 704 by way of conduit 705, and in a like manner grading screen 700 communicates with storage chamber 706 by way of conduit 707. Conduit 698 directly communicates with storage chamber 708 by way of opening 701.

Storage chambers 704, 706 and 708 have provided at the upper portion thereof gate valves generally indicated by 709 and withdrawal conduits generally indicated by 710. Above the withdrawal conduits there is shown a horizontally extending fruit removal conduit 711. The laterally extending removal conduit 711 is provided with water jet nozzles (not shown) substantially identical to those shown in FIG. 41 which are connected to a source of water under pressure (also not shown) as in FIG. 41.

In operation, fruit 697 is fed into conduit 693, taken by members 695 on conveyor 696 and fed into conduit 698. Thereafter the fruit having a specific gravity less than 1 (the present embodiment is limited to the grading/storage of such fruit) being sized by grading screens 699 and 700 into small and medium sized fruit in a manner similar to that described for the apparatus of FIG. 40, with large fruit (the balance) automatically passing into storage chamber 708 via opening 701.

Fruit is withdrawn from the storage chambers described via conduits 710 by opening gate valves 709 and withdrawn from the system when storage is to be terminated via conduit 711 in a manner identical to that explained for the apparatus of FIG. 41.

While the apparatus described with reference to FIG. 42 is designed to accomplish underwater storage after specific gravity diameter sizing, the apparatus of 43 is designed to effect underwater specific gravity diameter sizing after underwater storage. Like numerals are used in FIG. 43 as in FIg. 42, the following modifications being noted:

First, silo 720 which is similar to silo 672 shown in FIG. 41 is designed to store fruit of all sizes. At the termination of storage, gate valve 709 is opened, whereupon the buoyant force of the fruit within silo 720 causes it to rise through conduit 721 into elevated grading pipe 698, whereafter small and medium grading screens 699 and 700, respectively, driven by vibrating means (not shown) grade the fruit rising along the incline of conduit 698 into small and medium size fruit, permitting entrance of the same into conduits 705 and 707, respectively. Removal can thereafter be affected using a withdrawal conduit which is water jet assisted substantially identical to withdrawal conduit 711 in FIG. 42, which apparatus is not shown.

Since after passing conduit 707 only large fruit remains, it is not necessary to provide a grading screen at the entrance of conduit 722.

In a modification of the apparatus provided with specific gravity diameter sizing means, it will be apparent that one sizing device can be used to feed more than one storage bin merely by providing a mechanical switch inside the conduit immediately above the grading screens, which can be activated either manually or automatically when one silo is filled. In such a case, the silos would most probably be rectangular at their point of contact to make common use of the wall of adjacent silos.

Release gates as are shown in FIGS. 41, 42 and 43 can be under conventional manual control, due to their relative infrequency of use or can, of course, be controlled by way of a computer controlled double-acting solenoid or hydraulic cylinder capable of moving the valve from the closed to the opened position and returning the same to the closed position.

A further storage procedure in accordance with the present invention will be described with reference to FIG. 44, which essentially comprises below-ground bulk storage means, similar to a swimming pool in nature except that the sides thereof are sufficiently sloped to protect the contents from damage due to freezing in the winter.

With reference to FIG. 44, ground level is indicated by 730 and the primary volume of the below-ground bulk storage area is indicated by 731, the excavation area being provided with sloped walls generally indicated by 732.

The interior of the below-ground bulk storage volume is lined with a soft waterproof material such as rubber, plastic or the like which does not abrade or scuff the fruit contained therein.

The below-ground bulk storage volume is filled with water, the upper level thereof generally being indicated 733.

The entire below-ground storage volume is enclosed by a canopy 734 to prevent undesirable contaminants of any nature from contacting the water surface 733.

Fruit can be introduced into the below-ground storage volume by way of conveying means 735 which can be of any type of conveying as heretofore described, for example, a water jet assisted conduit, an enclosed belt conveyor or the like; such would generally be fed by a water conveyor trough at the above ground level thereof.

A fruit retainer 736, which can be a wire mesh or the like, is provided in the interior of the below-ground bulk storage volume, and is generally anchored to the sides thereof by conventional attaching means 737.

When it is necessary to alter the temperature of the water in the below-ground bulk storage volume, the water can be withdrawn via conduit 738 and passed to conventional refrigerator/heating means 739 and thereafter withdrawn and returned to the below-ground storage volume via conduit 740 and pump 741, which can be hydromotor powered in a manner as heretofore explained, if desired.

Water may be drawn off or supplied to the below-ground bulk storage volume as desired, but in any case sufficient water must be present to provide buoyance for the fruit to prevent the large mass of fruit from injury due to the weight of the fruit itself. On the other hand, insufficient water should be present to raise the entire mass of the fruit excessively from the bottom of the below-ground bulk storage volume, and thus cause inefficient utilization of storage space.

Generally, water and fruit are merely introduced into the below-ground bulk storage volume until the fruit fills the same, whereafter the flow of the fruit and water is ceased.

In the case that insufficient water is present to completely fill the below-ground bulk storage volume to the desired water level 733, water is introduced from any clean source until all interstices between the fruit are filled.

As a modification to the apparatus shown in FIG. 44, canopy 734 can be omitted and the entire below-ground bulk storage volume put under ground.

While it will be apparent that similar apparatus can be constructed above ground using sufficiently strong retaining walls, for example, of steel or a like material, generally cost benefits are achieved with storage means as shown in FIG. 44 to secure moderation of temperature from the ground itself.

Usually, the thickness of water between the retaining means 736 and the water level 733 is selected upon a balance of two factors: the thicker this layer of water, the lesser amount of cool or chilled water which must be introduced into the below-ground bulk storage volume to maintain the stored fruit at a proper temperature. On the other hand, the thinner this layer of water is, the lower the hydrostatic pressure exerted upon the fruit in storage, which tends to lengthen storage life.

Fruit can be removed from storage, for example, using apparatus as described with reference to FIG. 43 by merely reversing the direction of rotation thereof.

Utilizing the below-ground bulk storage means described above, several advantages are obtained: first, the temperature of the water and the fruit can, of course, be more accurately controlled and, in addition, pure water can be supplied from an outside source if necessary. However, substantial benefits are achieved as compared to conventional storage apparatus, even if refrigerating equipment is needed, as building costs are the major cost of conventional storage means and, further, there is no dead space to be cooled as substantially the entire volume is occupied by fruit. Thirdly, as will be apparent, no expensive storage containers are required.

CONTAINERIZING

As will be apparent to one skilled in the art, one of the final steps (other than transportation to market) involved in the present invention is to place the produce into appropriate containers for shipment. The following discussion describes various means in accordance with the present invention which can be utilized to accomplish such containerizing.

The Boxing Function

The machines and arrangements for containerizing fruit for shipment to the market depends largely upon the following factors.

1. Whether the fruit is going to the wholesale or to the retail market. If it is going to the wholesale market, then the bulk shipping means described with reference to FIG. 35, or equivalent apparatus earlier described, can be used.
2. Whether the fruit is bruise resistant, e.g., grapefruit or not, e.g., nectarines and pears. If the fruit is not bruise resistant, and wholesale shipment is selected, then the means above described would carry both water and fruit.
3. The style of the package; single layer tray with shrink fit cover, tray pack, wooden lug, etc.
4. Whether the fruit may be packed wet or dry. This factor is not considered in a conventional plant since all packing is dry.
5. Whether packing is from "out of storage" or "out of the orchard". The differences here are mainly those of scale and location of inputs and conveyors. If the fruit must be dry packed, the output of the grading maching must first be drained of water and sent through rolls as shown by FIG. 36, and then conveyed to any conventional bagger, boxing station for manual boxing, etc.

Wet packing is better suited to the floatation grading methods earlier described and when fruit is to be delivered to a processor in bulk bins, for example, wet packing will certainly be satisfactory.

Wet packing is, in fact, often beneficial for small retail and/or consumer packages, and plastic bags can be used even with a few drops of water in them, as this is beneficial to maintain high humidity in the bag, thus helping preservation.

Conventional packages of wood or paperboard are not satisfactory or wet packing unless waterproof, as they will stain or disintegrate if excessively wet. Waterproofing of both wooden crates or paper boxes of all kinds can be effected simply, however. The use of oiled paper for individually wrapped fruits could also be used for wet packing. Providing waterproof trays and boxes of paper and paperboard for tray-pack methods would probably be more expensive than first drying the fruit, however.

Providing a hydraulic conveyor, analogous to the return flow belt found at conventional packing plants, serving the boxing stations is an obvious device which can be adapted for use in the agricultural system of the present invention.

Referring to FIG. 40, it will further be apparent to one skilled in the art that the output from conduits 663, 664 and 665 could be used for jumble packing in which the graded fruit reservoirs feed directly to conventional jumble packing stations in which both fruit and water are gated and chuted directly into a waterproof jumble pack container. The water can be drained directly from such a jumble package and the package sealed for market.

In short, the output from any storage means as earlier described can be subjected to containerizing using conventional state of the art techniques or any of the modifications described above.

It will, of course, be apparent to one skilled in the art from the above discussion that it is not necessary to containerize stored fruits when a readily available market exists. Rather, in such a case fruit can be taken directly from grading means and subjected to containerizing.

For practical purposes, most purchasers will require that the fruit they purchase be cleaned, polished and graded, and, while in theory cleaning, polishing and grading can be omitted from the agricultural system of the present invention, as a practical matter such will invariably be included in processing steps for preparing the fruit for marketing.

THE ENERGY CONVERSION AND CONSERVATION SUBSYSTEM OF THE AGRICULTURAL SYSTEM OF THE PRESENT INVENTION

As will be apparent from earlier discussion on the agricultural system of the present invention, at various points energy input is required for the efficient functioning of the agricultural system. For example, energy is required for artificial lighting, to power the fluid flow subsystem, to power the computer, and for the many peripheral control devices present in the agricultural system of the present invention. It will thus be apparent that if local generation of power in the agricultural system of the present invention could be accomplished, especially considering the rising cost of energy, such would be highly desirable.

The following material describes an optional but preferred energy conversion and conservation subsystem particularly adapted for use in the agricultural system of the present invention which will be described with reference to FIGS. 45 and 46.

Referring firstly to FIG. 45, FIG. 45 schematically illustrates a hydroelectric system comprising a primary reservoir 750, which can be a lake, a secondary reservoir 751, which can be a tank mounted in an elevated position with respect to the primary reservoir 750, and various interconnections therebetween which permit usage of the hydroelectric capability thereof.

Referring to FIG. 45, fluid flow lines are generally identified by the numeral 752; valves V1, V2, V3, V4, V5 and V6 are also shown, which valves are adapted to be opened or closed under computer control (by means not shown) to permit fluid flow in various directions in fluid flow line 752. Turbine/pump 753 is shown in portion 752a of fluid flow line 752, turbine/pump 753 being in communication with motor/generator 754 by way of shaft 755. Motor/generator 754 can be connected by way of bus bars 756 to appropriate power storage means when motor/generator 754 is performing a generating function and to power delivery means when motor/generator 754 is acting as a motor.

Rather than offering a detailed lengthy explanation of the various valving sequences and the alternatives as to whether motor/generator 754 is used as a motor or a generator per se, the following table is offered to give the various combinations for six applications of interest for the hydroelectric system of FIG. 45. In the following table, "1" signifies that the valve is closed and "0" signifies that the valve is open. The abbreviation R is used to signify the secondary reservoir and the abbreviation L is used to signify the primary reservoir.

| Application | V1 | V2 | V3 | V4 | V5 | V6 | T/P* | M/G** |
|---|---|---|---|---|---|---|---|---|
| 1. Generate elec. from R | 1 | 1 | 0 | 1 | 0 | 0 | T | G |
| 2. Generate elec. from L bottom | 0 | 1 | 1 | 1 | 0 | 1 | T | G |
| 3. Generate elec. from L top | 1 | 0 | 1 | 1 | 0 | 1 | T | G |
| 4. Pump from L bottom to R | 0 | 1 | 1 | 0 | 1 | 1 | P | M |
| 5. Pump from L top to R | 1 | 0 | 1 | 0 | 1 | 1 | P | M |
| 6. Pump from L bottom to L top | 0 | 0 | 0 | 0 | 1 | 1 | P | M |

*T = turbine;
P = pump.
**M = motor,
G = generator.

As will be apparent to one skilled in the art, while two separate turbine blades 757 are schematically shown for turbine/pump 753, both turbine blades rotate in the same direction whether use is as a pump or as a turbine or whether motor/generator 754 is serving as a motor or generator.

As will further be apparent to one skilled in the art from the heretofore offered discussion, the water level in the primary or secondary reservoirs, the weather conditions and other factors are monitored by the computer (not shown) in reaching a decision to generate power utilizing the hydroelectric system of FIG. 45.

The sixth application above, wherein pumping is conducted from the bottom of primary reservoir to the top of primary reservoir 750, can be used to break up thermal stratification in the primary reservoir 750, to oxygenate the cold layer of the primary reservoir 750 or simply to ventilate underwater storage, if used, as has earlier been exemplified. The hydroelectric system of FIG. 45 would find particular use when for example, a large rainfall has occurred to generate electrical power for storage, in this instance using turbine/pump 753 as a turbine and motor/generator 754 as a generator.

Rather than storing the electric power generated, the electric power can be used in d.c. form to decompose water in an electrolysis cell; the resulting gases can be used directly, or stored, if desired. The gases can be during any particular demand period to produce d.c. power in a fuel cell, or hydrogen gas resulting from the decomposition of water can be used for direct burning or the like and oxygen gas can be used to enhance chemical oxidation processes.

Turning now to FIG. 46, a multi-function tower is shown which is particularly applicable for use in the agricultural system of the present invention.

In this embodiment, the multi-function tower is shown as comprising a base section 760 and a tower section 761.

Base 760 essentially comprises a large truncated cone, for instance, on the order of 40 feet high and 50 to 100 feet in diameter. As shown in FIG. 46, the bottom of the base 760 can comprise water storage zone 762 and fruit storage zone 763. If used for fruit storage, means as earlier described with reference to FIGS. 41 or 44 could be utilized. In addition, water storage zone 762 provides thermal insulation for the fruit storage zone 763.

In instances where extra cooling is required, a small amount of water can be pumped to the portion of the base 760 above the fruit storage zone 763 and distributed to a ring sprinkler (not shown) which encircles the base 760. The water will drip down the base 770 and, by evaporation, tend to cool the base. If desired, metal evaporation trays 765 can be provided at the area of the base 760 exterior the fruit storage zone 763, thereby increasing the cooling effect due to evaporation.

If additional thermal control is required, the entire base can be painted with a silicated zinc oxide silicone elastomer coating as is utilized in space craft with primary thermal control (see NASA Technical Briefs, B72-10596 and B72-10711).

The upper portion of base 760 is provided with a sun shield 766; if desired about one third of the upper surface of the sun shield 766 can be covered with conventional solar cells 767. In such case, preferably sun shield 766 is rotatable about the base 760 by way of roller track/motor assembly 768 and lower roller track 764 so as to permit the solar cells to face the sun. If desired, the sun shield 766 can be pivotable around point 769, for example, by conventionally driven piston 770, so that the solar cells can always be maintained perpendicular to the sun. Control of the sun shield will be effected by the computer (not shown) which accomplishes this function by calendar and time-of-day information.

The upper portion of base 760 can contain storage compartments for gases as shown by 771 a, b, c and d, in this case containing carbon dioxide, methane, oxygen and hydrogen, respectively, of which the latter two can be derived from the electrolysis cell 772. Fuel cell 773 is shown to permit maximum utilization of gases stored in the indicated compartments.

Tower 761 is shown mounted atop base 760 and, in this instance, is provided with windmill 774 which can be utilized to power the generator 775. One highly efficient windmill assembly which can be used is described in Kidd, S. Princeton Alumini Weekly, April 24, 1973.

Mounted atop the tower 761 are lights 776, indirect sensor 777, for example, a flying spot scanner, communications antennas 778 and, due to the height of the tower, aircraft warning light 779. In the embodiment shown, the tower is about 100 feet tall.

At the bottom of the base 760, conduit 780 is shown which is adapted to receive water from the fluid flow subsystem of the present invention, and conduit 781 is shown which is adapted to remove water from, for example, the water storage zone 762 or the fruit storage zone 763. Conduit 781 can also be utilized to remove fruit from the fruit storage zone by means as earlier described.

Ground level in FIG. 46 is generally indicated at 782.

OPTIONAL WASTE UTILIZATION AND METHANE GENERATION

If desired, especially in those instances where the agricultural system of the present invention is utilized to raise livestock or the like, waste utilization means can be provided therein. For instance, waste utilization systems are commercially available from Agpro, Inc. of Santa Rosa, California and Chattanooga, Tennessee. Such systems are generally utilized to remove manure, hay and straw from the floor of a dairy barn or the like by means of a periodic water flush.

In the following discussion, it will be understood that not only is such an embodiment included but, more generally, plant cuttings and wastes of all types from the agricultural system of the present invention can be delivered by the water conveyor system of the present invention to the system to be described below.

In any case, all waste products from the agricultural system are delivered to a cutter, chopper and grinder system by way of any appropriate conduit or collecting trough in a dairy barn. Not only can natural products be fed to the cutter/chopper/grinder, but garbage and other waste products from the agricultural system of the present invention can be fed thereto.

The cutter/chopper/grinder can generally comprise a large tank or underground area wherein a series of comminuting blades are provided to substantially reduce the size of any large particles of waste introduced into the system. A conventional motor or a fluid driven turbine can be used to power the cutter/chopper/-grinder.

To this point, the system is essentially identical to the Agpro System described above.

After appropriate processing of the waste products, the waste products can be forwarded by a conventional pump to a storage tank or an outside storage area. Thereafter, if desired, the comminuted product can be diluted with water, if necessary, to form a slurry which is pumpable in the fluid delivery subsystem of the present invention to various parts of the agricultural area for utilization as, for instance, fertilizer. If necessary or desired, additional fertilizer can be added to the thinned slurry, the slurry can be chlorinated if necessary, and the slurry thereafter forwarded to the field for utilization as an agricultural fertilizer.

In a modification of this system in accordance with the present invention, the elements of the system are controlled automatically by the computer. The necessary means for control are basically an adaption of the earlier described control means, for example, appropriate solenoid control for an input valve to the cutter/chopper/grinder is provided, a data transmission line leads to the motor to activate the cutter/chopper/-grinder and, thereafter, simple data transmission lines are used to initiate the pump and other appropriate valving to remove the comminuted product from the comminution area to the storage tank. Valving and control means similar to that illustrated in FIG. 15 can be utilized for the introduction of thinning water, fertilizer and chlorine, as desired.

In addition, the storage tank for the slurried waste product will generally contain sensors, one for temperature and one for pH measurement, for those instances where the slurried waste is to be utilized to generate methane, and the residue used as a fertilizer. The pH control can be utilized to measure the pH and by appropriate chemical introduction means as exemplified in FIG. 15, introduce acid or basic material to control the pH of the slurried waste.

It will be understood from the above discussion that any cellulosic or biodegradable products can be utilized.

Methane gas produced by anerobic decomposition of the waste materials can be compressed and stored in cylinders. It can be used for the production of heat, electricity, or carbon dioxide, as needed by the system of the present invention. Carbon dioxide is produced by combustion of methane in a closed burner unit.

While the invention has been particularly shown and described with reference to the preferred embodiment thereof, it will be understood by those skilled in the art that various changes in form and details may be made therein without departing from the spirit and scope of the invention.

What is claimed is:

1. A computerized system for the production of agricultural products in an agricultural area which comprises a plurality of homogeneous agricultural areas, said system comprising:

a. sensing means for sensing a plurality of desired parameters in said plurality of homogeneous agricultural areas, which parameters are necessary to achieve desired agricultural product growth, and for generating sensor data output representative of said parameters;

b. a plurality of different controlled means operative in response to selectively applied control signals for producing desired changes in said parameters;

c. computing means for comparing said sensor data output to pre-established standards for said plurality of parameters in said agricultural areas, said computing means being programmed to generate said control signals as a result of the comparison of said sensor data output and said pre-established standards both directly and in relation to the sensed inter-relationship of such comparisons from others of said parameters and to optimize said control signals; and d. data transmission means connecting said sensing means and said controlled means to said computing means for receiving said sensor data output from said sensing means and transmitting said sensor data output to said computing means, and for receiving said control signal from said computing means and transmitting said control signal to said controlled means, said data transmission means comprising means for coding and multiplexing sensor data output from a plurality of said sensing means onto a single data transmission channel and means for coding and multiplexing control signals for a plurality of said controlled means onto a single data transmission channel.

2. The system of claim 1 wherein said data transmission means comprises a pair of conductors for two-directional transmission, and code detecting means associated with each of said sensing means and said controlled means and responsive to coded signals on said pair of conductors for connecting said sensing means and said controlled means to said computing means.

3. The system of claim 1 wherein said data transmission means comprises a matrix of conductors in said agricultural area, said sensing means and said controlled means being located at intersections of conductors in said matrix and responsive to the simultaneous occurrence of at least two signals at an intersection for actuation.

4. The system of claim 1 further comprising a power distribution network for providing electric energy to said sensing means and to said controlled means, said data transmission means being congruent with said power distribution network.

5. The system of claim 4 wherein the power and control signals are multiplexed onto the same lead.

6. The system of claim 1 wherein said sensing means includes both direct sensing means in said homogeneous agricultural area for directly measuring said parameters, and indirect sensing means located at a point remote from said homogeneous agricultural area for detecting and measuring radation from said homogeneous agricultural areas as an indirect measurement of said parameters.

7. The system of claim 2 further comprising fluid delivery means in said agricultural area and connected to said computing means by said data transmission means for conveying fluid to or selected one of said homogeneous agricultural areas under the control of said computing means.

8. The system of claim 7 wherein said fluid delivery means comprises a conduit network throughout said agricultural area.

9. The system of claim 8 wherein said fluid delivery means comprises fluid ejection means.

10. The system of claim 9 wherein said fluid delivery means is in communication with a source of heated water.

11. The system of claim 10 further comprising means for heating said heated water to temperatures selected by said computing means.

12. The system of claim 9 wherein said fluid ejection means comprises solid set sprinklers.

13. The system of claim 9 wherein said fluid ejection means comprises solid set sprinklers in combination with microtube tricklers, said solid set sprinklers being connected to a source of gas and a source of liquid, trickler irrigation is accomplished using a stream of liquid, and spraying is accomplished using a combined stream of gas and liquid.

14. The system of claim 13 wherein said fluid ejection means is activated by solenoids, which solenoids are in electrical communication with said controlled means, said controlled means being linked to said computing means by said data transmission system.

15. The system of claim 9 wherein said fluid ejection means is activated by hydraulic pressure changes in said fluid delivery system.

16. The system of claim 9 wherein said fluid ejection means is activated by an electrical signal delivered to said fluid ejection means via said data transmission means.

17. The system of claim 9 wherein said fluid delivery means is in communication with a source of water-soluble agricultural chemicals which can be introduced into and dispensed via said fluid ejection means.

18. The system of claim 9 wherein said fluid delivery means is in communication with a source of water in which the water temperature is stratified by natural forces and wherein said fluid delivery system is adapted to draw water therefrom in at least two different temperature strata.

19. The system of claim 9 which further comprises frost protection means.

20. The system of claim 19 wherein said frost protection means is adapted to spray water at a selected temperature onto trees in said agricultural area at a selected, extremely low level of application, whereby the heat of the water and the heat of fusion of said water provides frost protection.

21. The system of claim 20 wherein said frost protection means further comprises means for illuminating said trees with infrared illumination and means for directing heated gas on said trees, the blend of the use of said water spraying means, said illumination means, and said gas directing means being controlled by said computing means.

22. The system of claim 9 wherein said fluid delivery means is in communication with a source of carbon dioxide as carbonic acid and is adapted to receive, convey and dispense said carbon dioxide.

23. The system of claim 8 wherein said conduit network comprises at least one main conduit feeding a plurality of secondary lateral conduits, said lateral conduits comprising a plurality of sequence valves in series therealong, each sequence valve being in controllable fluid communication with a pressure activated valve capable of selectively introducing fluid into one of a plurality of fluid ejection means in response to variations in the line pressure of said fluid.

24. The system of claim 8 wherein said conduit network comprises at least one main conduit feeding a plurality of secondary lateral conduits, said lateral conduits comprising a plurality of sequence valves in series therealong, each sequence valve being in controllable fluid communication with fluid ejection means comprising a telescoping support member reciprocable in the vertical plane in response to varying line pressures of said fluid, which telescoping support member carries a fluid sprinkler head having a least one fluid ejection orifice whose effective flow diameter is automatically variable in response to said varying line pressures.

25. The system of claim 8 wherein said conduit network comprises at least one main conduit feeding a plurality of secondary lateral conduits, said lateral conduits comprising a plurality of sequence valves in series therealong, each sequence valve being in controllable fluid communication with a plurality of fluid ejection means, which fluid ejection means comprises a fluid ejection nozzle having a fluid ejection orifice of variable orifice diameter, said nozzle being adjustable in elevation by a first solenoid and said orifice diameter being adjusted by a second solenoid, said first and second solenoids being in series and in communication with said computing means over a single data transmission line.

26. A computerized system for the production of agricultural products in an agricultural area which comprises at least one homogeneous agricultural area, said system comprising:

a. sensing means for sensing at least one desired parameter in said homogeneous agricultural area, which parameter is necessary to achieve desired agricultural product growth, and for generating a sensor data output representative of said at least one parameter, said sensing means including both direct sensing means in said at least one homogeneous agricultural area for directly measuring said one parameter, and indirect sensing means located at a point remote from said homogeneous agricultural area for detecting and measuring radiation from said homogeneous agricultural area as an indirect measurement of said one parameter;

b. controlled means operative in response to a control signal for producing a desired change in said one parameter;

c. computing means for comparing said sensor data output to at least one pre-established standard for said parameter in said agricultural area, said computing means being programmed to generate said control signal as a result of the comparison of said sensor data output and said pre-established standard;

d. data transmission means connecting said sensing means and said controlled means to said computing means for receiving said sensor data output from said sensing means and transmitting said sensor data output to said computing means, and for receiving said control signal from said computing means and transmitting said control signal to said controlled means;

e. fluid delivery means in said agricultural area and connected to said computing means by said data transmission means for conveying fluid to said homogeneous agricultural area under the control of said computing means; and f. field operation means controlled by said computing means to accomplish at least the harvesting of said agricultural product.

27. The system of claim 26 further comprising fluid transportation means hydraulically connected to said fluid delivery means for the transportation of said agricultural product in fluid from the area of growth thereof in said agricultural area to a different location.

28. The system of claim 27 further comprising means controlled by said computing means for the classification of said agricultural product while said agricultural product is being transported in said liquid.

29. The system of claim 28 wherein said means for the classification of said agricultural product comprises a fluid flow conduit disposed at an upwardly extending angle to receive fluid and said agricultural product, which has a specific gravity less than one, and convey the same upwardly while said agricultural product is in contact with the upper surface of said fluid flow conduit, said fluid flow conduit having disposed thereabove and in fluid flow communication therewith at least one substantially vertically oriented conduit, there being disposed between said fluid flow conduit and said substantially vertically oriented conduit means to permit the passage of agricultural product of a desired size but to prevent the passage of agricultural product not of the desired size.

30. The system of claim 28 wherein said means for the classification of said agricultural product comprises:

an elongated fluid flow conduit having an agricultural product receiving area to receive said agricultural product while in said fluid at a first elevation;

ramp means having one end in said receiving area and a second end in the beginning of an agricultural product vertical dispersal area in said fluid, which second end is at a second elevation which is higher than said first elevation; and agricultural product removal means in said fluid at the ending of said agricultural product vertical dispersion area, said agricultural product removal means being at an elevation in said fluid whereby agricultural product of a predetermined specific gravity is dispersed to a degree which permits removal by said agricultural product removal means.

31. The system of claim 28 wherein said means for the classification of said agricultural product comprises a generally horizontal U-shaped main conduit having a first upper horizontal fluid receiving section joined to a second lower horizontal fluid removal section by an arcuate vertically oriented section, at least one portion of the inner wall of said conduit being provided with means to cause agricultural product in said conduit to be impelled against a portion of the outer wall of said conduit, which portion contains means to permit passage of agricultural product of a desired size into an agricultural product removal conduit but which means prohibits passage of agricultural product not of the desired size.

32. The system of claim 28 wherein said means for classification includes at least two television cameras positioned to provide multiviewpoint sensing of said agricultural product, and television monitoring means and video recording means connected to said television cameras by said data transmission means.

33. The system of claim 32 wherein each television camera is a monochromatic television camera and associated therewith is a. a filter wheel containing a plurality of filter means in the periphery thereof, b. stepping means connected to said filter wheel to rotate said filter wheel in discrete steps thereby inserting into the path of radiation detected by said monochromatic television camera a selected filter means, and c. controller means connected to said data transmission means and responsive to control signals from said computing means for positioning said monochromatic television camera by tilting and rotating the same for focusing said monochromatic television camera, and for controlling said stepping means.

34. The system of claim 33 further comprising light array means including a plurality of radiation sources controlled by said controller means for selectively impinging radiation of different wavelengths on the field of view of said monochromatic television camera.

35. The system of claim 32 wherein said computing means includes image storage means for storing video signals which serve as templates of standard conditions, said computing means comparing video signals recorded by said video recording means with the video signals stored in said image storage means and generating a signal indicating a condition detected in said agricultural product.

36. The system of claim 28 further comprising means for storing said agricultural product while in contact with a liquid after said agricultural product has been harvested by said field operations means.

37. The system of claim 36 wherein said storage means comprises means for introducing said agricultural product into a storage area and means for removing said agricultural product from said storage area, which comprises at least two storage zones in series fluid communication with means for the transportation of said agricultural product, which storage zones comprise first valving means to permit and prevent the entrance of said fluid into said storage zones; second valving means to permit and prevent the removal of said fluid from said storage zones; means to prevent agricultural product in said fluid from reaching said second valving means; and pumping means to introduce fluid into said storage zones via said second valving means to permit removal of agricultural product in said fluid via said first valving means.

38. The system of claim 36 wherein said agricultural product storage means comprises means to receive said agricultural product and convey the same to the entrance of an agricultural product storage zone, which entrance is underwater, and which entrance is disposed lower than the exit of said agricultural product storage zone;

an agricultural product storage zone comprising a substantially vertically oriented enclosed area for the storage of agricultural product, which area contains baffles and has an entrance and an exit, which entrance is underwater and disposed lower than said exit, said enclosed area also being underwater; and agricultural product removal means in fluid communication with said exit.

39. The system of claim 26 wherein said field operation means includes a wheeled vehicle attached by a conduit to said fluid delivery means, said fluid delivery means containing water, whereby water can flow from said fluid delivery means to said wheeled vehicle via said conduit.

40. The system of claim 39 wherein said wheeled vehicle comprises at least one support member carrying a rotatable reel upon which said conduit is reeled in a removable manner.

41. The system of claim 40 wherein said wheeled vehicle is powered by a water-to-mechanical torque converter, which converter is powered by water received from said conduit which is joined to said fluid delivery means.

42. The system of claim 41 wherein said vehicle has attached thereto a water conveyor which receives water from said conduit and conveys said water to a point remote from said vehicle.

43. The system of claim 42 wherein said water conveyer is U-shaped at least in the area wherein said water is received from said conduit.

44. The system of claim 43 wherein said vehicle carries thereon a water conveyer drum upon which said water conveyer is reeled in flat form.

45. The system of claim 44 wherein said vehicle comprises upper and lower support members, said upper support member being elevatable with respect to said lower support member.

46. The system of claim 45 wherein said water conveyer is carried by said vehicle at said upper support member.

47. The system of claim 46 wherein said upper support member has attached thereto laterally extensible members which are reciprocal.

48. The system of claim 46 wherein said vehicle further comprises water jet spray means attached thereto and adapted to pass around two rows of trees and remove fruit therefrom by striking water jet sprays thereagainst.

49. The system of claim 46 wherein said vehicle further comprises at least one laterally extensible member carried by said upper support member, said laterally extensible member having at the extremity thereof a slotting saw and carrying disposed beneath said slotting saw a chute for the receipt of plant trimmings cut by said slotting saw, which chute communicates with comminuting means carried by said lower support member, which comminuting means receives said plant trimmings and comminutes the same.

50. The system of claim 49 wherein said comminuting means is provided with an exit port which communicates with a conduit leading to said water conveyer whereby said comminuted trimmings are fed to said water conveyer.

51. The system of claim 46 wherein said vehicle further comprises:

a. fluid jet spray means carried at the side of said vehicle carrying fluid ejection nozzles suspended from said upper support member, said fluid ejection nozzles being in fluid communication with said conduit to receive fluid therefrom and adapted to pass around a plant on each side of said vehicle and by way of fluid ejected from said fluid ejection nozzles remove produce from said plants;

b. produce receiving means disposed at the lower portion of said fluid jet spray means to receive said produce removed from said plants due to said fluid ejected from said fluid ejection nozzles; and c. means to convey said produce from said produce receiving means while in said fluid into said water conveyer.

52. The system of claim 41 wherein said vehicle comprises at least one support carrying a rotatable reel upon which said conduit is reeled in a removable manner and said vehicle has a water conveyer attached thereto which receives water from said conduit, said water conveyer conveying said water to a point remote from said vehicle.

53. The system of claim 27 wherein said means for the transportation of said agricultural product in fluid from the area of growth thereof is in fluid communication with agricultural product storage and grading means, which storage and grading means comprises means to receive said agricultural product and convey the same to the lowermost portion of a fluid flow conduit disposed at an upwardly extending angle which receives said fluid and said agricultural product, which agricultural product has a specific gravity less than 1, and conveys the same while said agricultural product is in contact with the upper surface of said fluid flow conduit, said fluid flow conduit having disposed thereabove and in fluid flow communication therewith at least one storage area for said agricultural product, there being disposed between said fluid flow conduit and said at least one storage area means to permit the passage of agricultural product of a desired size but prevent the passage of agricultural product of other than the desired size; and agricultural product removal means in fluid flow communication with said at least one storage area to permit the removal of said agricultural product.

54. The system of claim 27 wherein said means for the transportation of said agricultural product in liquid from the area of growth thereof is in communication with agricultural product storage and grading means which comprises:

means to receive said agricultural product and convey the same to the entrance of an agricultural product storage zone, which entrance is underwater and which entrance is disposed lower than the exit of said agricultural product storage zone, said exit being in fluid flow communication with the lowermost portion of a fluid flow conduit disposed at an upwardly extending angle which receives said fluid and said agricultural product, which agricultural product has a specific gravity less than one, and conveys the same while said agricultural product is in contact with the upper surface of said fluid flow conduit, said fluid flow conduit having disposed thereabove and in fluid flow communication therewith at least one substantially vertically oriented conduit, there being disposed between said fluid flow conduit and said substantially vertically oriented conduit means to permit the passage of agricultural product of a desired size but to prevent the passage of agricultural product not of the desired size, and means to remove agricultural product from said at least one substantially vertically oriented conduit.

55. The system of claim 26 wherein said field operation means includes means for the batch harvesting of agricultural product which comprises:

a first container provided with means adapting the same to fit around and substantially completely enclose a plant upon which said agricultural product is growing, which agricultural product is to be picked;

a second container provided with means adapting the same to fit around and substantially completely enclose a plant upon which agricultural product is growing, which agricultural product is to be picked;

a first fluid flow conduit interconnecting said first container and said second container and being provided with pumping means to transfer fluid from said first container to said second container and vice versa, whereby as said first container is emptied said second container is filled and as said second container is emptied said first container is filled;

a second fluid flow conduit adapted to introduce fluid into said first container and said second container from said fluid delivering means, and at least one of said containers having disposed therein a buoyant member which is adapted to reciprocate vertically in said container in response to changes in fluid level therein, said buoyant member being connected to a source of fluid and being adapted to forceably eject fluid against said plant upon which said agricultural product is growing while said plant is enclosed in said container.

56. The system of claim 55 wherein said second fluid flow conduit is interconnected with said first and second containers by a multiport valve which permits fluid to be selectively introduced into said first or said second containers.

57. The system of claim 56 wherein said multiport valve is fed with fluid derived from said fluid delivery means.

58. The system of claim 55 wherein said first and second containers are provided with exit means to permit the removal of agricultural product and fluid, which exit means is joined to fluid conveying means for removal of said agricultural product and fluid from said first and second containers.

59. The system of claim 27 wherein said fluid transportation means includes means to elevate said fluid in a vertical direction which comprises:

a first fluid storage area adapted to receive fluid and agricultural product carried in a fluid;

a second fluid storage area in controllable fluid communication with said first storage area adapted to receive fluid and agricultural product from said first storage area;

a third fluid storage area adapted to receive fluid from said second—third fluid storage area adapted to receive fluid from said second means;

fluid flow control means to permit flow from said first fluid storage area to said second storage area upon the filling of said first storage area and to prevent fluid flow into said third storage area from said second storage area;

second interconnecting means between said third fluid storage area and said second fluid storage area containing pumping means to remove fluid from said third storage area and reintroduce the same into said second storage area via said second interconnecting means, and means for the introduction of fluid into said third storage area and then into said second storage area via said second interconnecting means, which fluid displaces the original batch of fluid and agricultural product therein.

60. The system of claim 27 wherein said fluid transportation means includes means for polishing, drying and waxing said agricultural product while temporarily removing said agricultural product from said fluid.

61. A computerized system for the production of agricultural products in an agricultural area which comprises at least one homogeneous agricultural area, said system comprising:

a. sensing means for sensing at least one desired parameter in said homogeneous agricultural area, which parameter is necessary to achieve desired agricultural product growth, and for generating a sensor data output representative of said at least one parameter, said sensing means including both direct sensing means in said at least one homogeneous agricultural area for directly measuring said one parameter, and indirect sensing means located at a point remote from said homogeneous agricultural area for detecting and measuring radiation from said homogeneous agricultural area as an indirect measurement of said one parameter;

b. controlled means operative in response to a control signal for producing a desired change in said one parameter;

c. computing means for comparing said sensor data output to at least one pre-established standard for said parameter in said agricultural area, said computing means being programmed to generate said control signal as a result of the comparison of said sensor data output and said pre-established standard.

d. data transmission means connecting said sensing means and said controlled means to said computing means for receiving said sensor data output from said sensing means and transmitting said sensor data output to said computing means, and for receiving said control signal from said computing means and transmitting said control signal to said controlled means; and e. fluid delivery means in said agricultural area and connected to said computing means by said data transmission means for conveying fluid to said homogeneous agricultural area under the control of said computing means, said data transmission means and said fluid delivery means being housed in a common conduit in contiguous but separated relationship.

62. The system of claim 61 wherein said common conduit comprises a plurality of separated compartments along its length.

63. A computerized system for the production of agricultural products in an agricultural area which comprises at least one homogeneous agricultural area, said system comprising:

a. sensing means for sensing at least one desired parameter in said homogeneous agricultural area, which parameter is necessary to achieve desired agricultural product growth, and for generating a sensor data output representative of said at least one parameter, said sensing means including both direct sensing means in said at least one homogeneous agricultural area for directly measuring said one parameter, and indirect sensing means located at a point remote from said homogeneous agricultural area for detecting and measuring radiation from said homogeneous agricultural area as an indirect measurement of said one parameter, said direct sensing means comprising two carbon dioxide sensors at different elevations in at least one homogeneous agricultural area;

b. controlled means operative in response to a control signal for producing a desired change in said one parameter;

c. computing means for comparing said sensor data output to at least one pre-established standard for said parameter in said agricultural area, said computing means being programmed to generate said control signal as a result of the comparison of said sensor data output and said pre-established standard;

d. data transmission means connecting said sensing means and said controlled means to said computing means for receiving said sensor data output from said sensing means and transmitting said sensor data output to said computing means, and for receiving said control signal from said computing means and transmitting said control signal to said controlled means;

e. a source of carbon dioxide; and f. fluid delivery means in said agricultural area and connected to said computing means by said data transmission means for conveying fluid to said homogeneous agricultural area under the control of said computing means, said fluid delivery means comprising a conduit network throughout said agricultural area and fluid ejection means, said fluid delivery means being in communication with said source of carbon dioxide and being adapted to receive, convey, and dispense carbon dioxide from said source.

64. The system of claim 63 comprising baffles enclosing an area along contour lines of elevation to contain carbon dioxide.

65. The system of claim 63 wherein each of said two carbon dioxide sensors comprises at least two electrodes and temperature sensing means in contact with distilled water.

66. The system of claim 65 further comprising a Wheatstone bridge two arms of which are in electrical contact with respective ones of said electrodes and which is arranged to be interrogated by activating two arms of the Wheatstone bridge while measuring the voltage across the other two arms, the signals for both pairs of arms being sent and received, respectively, over said data transmission means.

67. Agricultural product storage means comprising:

means to receive an agricultural product and convey the same to the entrance of an agricultural product storage zone, which entrance is underwater and which entrance is disposed lower than the exit of said agricultural product storage zone;

an agricultural product storage zone comprising a substantially vertically oriented enclosed area for the storage of agricultural product, which area has an entrance and an exit, which entrance is underwater and disposed lower than said exit, said enclosed area also being underwater; and agricultural product removal means in fluid communication with said exit.

68. A computerized system for the production of agricultural products in an agricultural area which comprises at least one homogeneous agricultural area, said system comprising:

a. sensing means for sensing at least one desired parameter in said homogeneous agricultural area, which parameter is necessary to achieve desired agricultural product growth, and for generating a sensor data output representative of said at least one parameter, said sensing means including both direct sensing means in said at least one homogeneous agricultural area for directly measuring said one parameter and indirect sensing means located at a point remote from said homogeneous agricultural area for detecting and measuring radiation from said homogeneous agricultural area as an indirect measurement of said one parameter; said indirect sensing means including a network of television cameras;

b. television monitoring means and video recording means connected to said network of television cameras by data transmission means to be recited;

c. controlled means operative in response to a control signal for producing a desired change in said one parameter;

d. computing means for comparing said sensor data output to at least one pre-established standard for said parameter in said agricultural area, said computing means being programmed to generate said control signal as a result of the comparison of said sensor data output and said pre-established standard; and e. data transmission means connecting said sensing means and said controlled means to said computing means for receiving said sensor data output from said sensing means and transmitting said sensor data output to said computing means, and for receiving said control signal from said computing means and transmitting said control signal to said controlled means.

69. The system of claim 68 wherein each television camera in said network is a monochromatic television camera and associated therewith is a. a filter wheel containing a plurality of filter means in the periphery thereof, b. stepping means connected to said filter wheel to rotate said filter wheel in discrete steps thereby inserting into the path of radiation detected by said monochromatic television camera a selected filter means, and c. controller means connected to said data transmission means and responsive to control signals from said computing means for positioning said monochromatic television camera by tilting and rotating the same for focusing said monochromatic television camera, and for controlling said stepping means.

70. The system of claim 69 further comprising light array means including a plurality of radiation sources controlled by said controller means for selectively impinging radiation of different wavelengths on the field of view of said monochromatic television camara.

71. The system of claim 70 wherein said plurality of radiation sources include a monochromatic laser, a lithium flare, a xenon flash, a mercury arc lamp.

72. The system of claim 68 wherein said television monitoring means comprises a plurality of television receivers and said video recording means comprises a plurality of video tape recorders, said system further comprising switch means interposed between said network of television cameras and said television monitoring means and video recording means for selectively connecting any one of the television cameras in said network to any one of said television receivers and any one of said video tape recorders.

73. The system of claim 72 wherein said switch means comprises a switch array having horizontal switch conductors and intersecting vertical switch conductors, said horizontal switch conductors being connected to said network of television cameras and said vertical switch conductors being connected to said television monitoring means and video recording means, and switch array control means connected to said data transmission means and responsive to control signals from said computing means for selectively electrically connecting the intersections of said horiziontal and vertical switch conductors whereby said switch array serves as a means to concentrate or expand said television cameras and said television receivers and video tape recorders.

74. The system of claim 68 further comprising selector means associated with said television monitoring means and video recording means for selecting the signal of a single one of the television cameras in said network for monitoring and/or recording.

75. The system of claim 74 wherein said selector means is a time division multiplexor.

76. The system of claim 68 wherein said computing means includes image storage means for storing video signals which serve as templates of standard conditions, said computing means comparing video signals recorded by said video recording means with the video signals stored in said image storage means and generating a signal indicating a condition detected in said homogeneous agricultural area.

77. The system of claim 68 wherein said television monitoring means comprises a plurality of television receivers and said video recording means comprises a plurality of video tape recorders, said system further comprising switch means interposed between said television cameras and said television monitoring means and video recording means for selectively connecting any one of the television cameras in said network to any one of said television receivers and any one of said video tape recorders.

78. The system of claim 77 wherein said switch means comprises a switch array having horizontal switch conductors and intersecting vertical switch conductors, said horizontal switch conductors being connected to said television cameras and said vertical switch conductors being connected to said television monitoring means and video recording means, and switch array control means connected to said data transmission means and responsive to control signals from said computing means for selectively electrically connecting the intersections of said horizontal and vertical switch conductors whereby said switch array serves as a means to concentrate or expand said television cameras and said television receivers and video tape recorders.

79. A computerized system for the production of agricultural products in an agricultural area which comprises at least one homogeneous agricultural area, said system comprising:

a. sensing means for sensing at least one desired parameter in said homogeneous agricultural area, which parameter is necessary to achieve desired agricultural product growth, and for generating a sensor data output representive of said at least one parameter, said sensing means and controlled means to be recited comprising a field package:

b. controlled means operative in response to a control signal for producing a desired change in said one parameter;

c. computing means for comparing said sensor data output to at least one pre-established standard for said parameter in said agricultural area, said computing means being programmed to generate said control signal as a result of the comparison of said sensor data output and said pre-established standard;

d. data transmission means connecting said sensing means and said controlled means to said computing means for receiving said sensor data output from said sensing means and transmitting said sensor data output to said computing means, and for receiving said control signal from said computing means and transmitting said control signal to said controlled means, said data transmission means comprising a pair of conductors for two-directional transmission;

e. code detecting means associated with each of said sensing means and said controlled means and responsive to coded signals on said pair of conductors for connecting said sensing means and said controlled means to said computing means; and f. fluid delivery means in said agricultural area and connected to said computing means by said data transmission means for conveying fluid to said controlled means under the control of said computing means, said data transmission means being congruent with said fluid delivery means.

80. The system of claim 79 further comprising a power distribution network for providing electric energy to said sensing means and to said controlled means, said power distribution network being congruent with said data transmission means and said fluid delivery means.

81. The system of claim 79 wherein said fluid delivery means includes an air delivery line and a liquid delivery line and said controlled means includes liquid spray means and liquid irrigation means, first spool valve means connected between said air delivery and liquid delivery line and said liquid spray means and controlled by said code detecting means for spraying said agricultural area, and second spool valve means connected between said liquid delivery line and said liquid irrigation means and controlled by said code detecting means for irrigating said agricultural area.

82. A computerized system for the production of agricultural products in an agricultural area which comprises at least one homogeneous agricultural area, said system comprising:

a. sensing means for sensing at least one desired parameter in said homogeneous agricultural area, which parameter is necessary to achieve desired agricultural product growth, and for generating a sensor data output representtive of said at least one parameter;

b. controlled means operative to response to a control signal for producing a desired change in said one parameter;

c. computing means for comparing said sensor data output to at least one pre-established standard for said parameter in said agricultural area, said computing means being programmed to generate said control signal as a result of the comparison of said sensor data output and said pre-established standard;

d. data transmission means connecting said sensing means and said controlled means to said computing means for receiving said sensor data output from said sensing means and transmitting said sensing data output to said computing means, and for receiving said control signal from said computing means and transmitting said control signal to said controlled means, said data transmission means comprising a pair of conductors for two-directional transmission;

e. code detecting means associated with each of said sensing means and said controlled means and responsive to coded signals on said pair of conductors for connecting said sensing means and said controlled means to said computing means;

f. address sending means controlled by said computing means and connected to said data transmission means for sending a binary signal to said code detecting means; and g. signal receiver means connected to said data transmission means for detecting a pulse amplitude modulated signal from said sensing means.

83. The system of claim 82 further comprising an analog-to-digital converter connected between said signal receiver means and said computing means for converting said pulse amplitude modulated signal to a digital signal.

84. A computerized system for the production of agricultural products in an agricultural area which comprises at least one homogeneous agricultural area, said system comprising:

a. sensing means for sensing at least one desired parameter in said homogeneous agricultural area, which parameter is necessary to achieve desired agricultural product growth, and for generating a sensor data output representative of said at least one parameter;

b. a controlled means operative in response to a control signal for producing a desired change in said one parameter;

c. computing means for comparing said sensor data output to at least one pre-established standard for said parameter in said agricultural area, said computing means being programmed to generate said control signal as a result of the comparison of said sensor data output and said pre-established standard; and d. data transmission means connecting said sensing means and said controlled means to said computing means for receiving said sensor data output from said sensing means and transmitting said sensor data output to said computing means and for receiving said control signal from said computing means and transmitting said control signal to said controlled means, said data transmission means comprising:

i. a matrix of conductors in said agricultural area, said sensing means and said controlled means being located at intersections of conductors in said matrix and being responsive to the simultaneous ocurrence of at least two signals at an intersection for activation, and ii. a further single data conductor connected to all of said sensing means and to said computer, whereby only that sensing means which is addressed by said at least two signals in said matrix is connected to said computing means by said further single data conductor.

85. A computerized system for the production of agricultural products in an agricultural area which comprises at least one homogeneous agricultural area, said system comprising:

a. sensing means for sensing at least one desired parameter in said homogeneous agricultural area, which parameter is necessary to achieve desired agricultural product growth, and for generating a sensor data output representative of said at least one parameter;

b. controlled means operative in response to a control signal for producing a desired change in said one parameter;

c. computing means for comparing said sensor data output to at least one pre-established standard for said parameter in said agricultural area, said computing means being programmed to generate said control signal as a result of the comparison of said sensor data output and said pre-established standard;

d. data transmission means connecting said sensing means and said controlled means to said computing means for receiving said sensor data output from said sensing means and transmitting said sensor data output to said computing means and for receiving said control signal from said computing means and transmitting said control signal to said controlled means, said data transmission means comprising a matrix of conductors comprising row conductors and column conductors in said agricultural area, said sensing means and said controlled means being located at intersections of conductors in said matrix and being responsive to the simultaneous occurrence of at least two signals at an intersection for activation;

e. row selector means connected to said row conductors and controlled by said computing means to select a single one of said row conductors;

f. column selector means connected to said column conductors and controlled by said computing means to select a single one of said column conductors; and g. function selector means connected to said column selector means and controlled by said computing means to control the function of a selected controlled means.

86. The system of claim 85 wherein said controlled means are fluid dispensing means, said system further comprising fluid delivery means in said agricultural area and connected to convey fluid to said fluid dispensing means, said fluid dispensing means being connected in rows by said fluid delivery means, said fluid delivery means including solenoid valve means in each of said rows of fluid dispensing means and connected to said row conductors for passing fluid in response to a signal on a corresponding row conductor.

87. The system of claim 86 wherein said fluid dispensing means are spray heads having position control means and nozzle orifice control means connected to said column conductors and responsive to said function selector means to position said spray heads and adjust size of the nozzle orifices of said spray heads.

88. A computerized system for the production of agricultural products in an agricultural area which comprises at least one homogeneous agricultural area, said system comprising:

a. sensing means for sensing soil moisture in said homogeneous agricultural area and for generating a sensor data output representative of said soil moisture;

b. an irrigation system operative in response to a control signal for producing a desired change in said soil moisture, said irrigation system including means for storing water;

c. computing means for comparing said sensor data output to at least one pre-established standard for soil moisture in said agricultural area, said computing means being programmed to generate said control signal as a result of the comparison of said sensor data output and said pre-established standard;

d. data transmission means connecting said sensing means and said controlled means to said computing means for receiving said sensor data output from said sensing means and transmitting said sensor data output to said computing means, and for receiving said control signal from said computing means and transmitting said control signal to said controlled means;

e. means for measuring the amount of water in said means for storing water and supplying a signal proportional thereto to said computing means; and f. means for supplying weather forecast data in the form of signals proportional to the forecast time and amount of rain to said computing means, g. said computing means being programmed to compute the amount of irrigation water required to bring the soil moisture up to a pre-established standard, to compare the computed amount of irrigation water with the amount of water in said means for storing water and the amount of rain forecast, and to adjust the computed amount of irrigation water based on those computations in order to generate said control signal.

*89. A computerized system for the production of agricultural products in an agricultural area which comprises at least one homogeneous agricultural area, said system comprising:*

*(a) sensing means for sensing at least one desired parameter in said homogeneous agricultural area, which parameter is necessary to achieve desired agricultural product growth, and for generating a sensor data output representative of said at least one parameter;*

*(b) a plurality of different controlled means each operative in response to a different respective control signal and functioning together to produce a desired change in said at least one parameter;*

*(c) computing means for comparing said sensor data output to at least one pre-established standard for said at least one parameter in said agricultural area, said computing means being programmed to generate said respective control signals as a result of the comparison of said sensor data output and said pre-established standard; and*

*(d) data transmission means connecting said sensing means and said controlled means to said computing means for receiving said sensor data output from said sensing means and transmitting said sensor data output to said computing means, and for receiving said control signals from said computing means and transmitting said control signals to said controlled means.*

*90. A computerized system for the production of agricultural products in an agricultural area which comprises at least one homogeneous agricultural area, said system comprising:*

*(a) a plurality of sensing means for sensing at least one desired parameter in said homogeneous agricultural area, which parameter is necessary to achieve desired agricultural product growth, and for generating sensor data output signals representative of said at least one parameter;*

*(b) a plurality of controlled means operative in response to respective control signals for producing a desired change in said at least one parameter;*

*(c) computing means for comparing said sensor data output signals to at least one pre-established standard for said at least one parameter in said agricultural area, said computing means being programmed to generate said control signals as a result of the comparison of said sensor data output signals and said pre-established standards; and*

*(d) data transmission means connecting said sensing means and said controlled means to said computing means for receiving said sensor data output from said sensing means and transmitting said sensor data output to said computing means, and for receiving said control signals from said computing means and transmitting said control signals to said controlled means, said data transmission means comprising means for multiplexing sensor data output signals from said plurality of sensing means onto a single data transmission channel.*

*91. The system of claim 90, wherein there are a plurality of controlled means and said data transmission means further comprises means for multiplexing control signals for said plurality of controlled means onto a single data transmission channel.*

*92. The system according to claim 90, wherein said data transmission means includes address means for sending respective address signals to said sensing means, and each said sensing means includes means for receiving said address signals and providing a sensor data output signal in response to its respective address signal.*

*93. The system according to claim 91, wherein said data transmission means includes address means for sending respective address signals to said plurality of controlled means, and each said controlled means includes means for receiving and responding to its respective address signal.*

*94. A computerized system for the production of agricultural products in an agricultural area, said system comprising:*

*(a) sensing means for sensing a plurality of parameters in said agricultural area, at least one of said plurality of parameters being a desired parameter which is necessary to achieve desired agricultural product growth and for generating sensor data output signals representative of said plurality of parameters;*

*(b) controlled means operative in response to a control signal for producing a desired change in said desired parameter;*

(c) *computing means for comparing the sensor data output signal representative of said desired parameter to at least one pre-established standard for said desired parameter in said agricultural area, calculating the proper control signal which should be provided to said controlled means in order to produce said desired change in said desired parameter and generating said proper control signal, said computing means comparing sensor data output signals, other than that representative of said desired parameter, to one another for ensuring that said controlled means has responded to said proper control signal; and*

(d) *data transmission means connecting said sensing means and said control means to said computing means for receiving said sensor data output signals from said sensing means and transmitting said sensor data output signals to said computing means, and for receiving said control signal from said computing means and transmitting said control signal to said controlled means.*

*95. A computerized system as defined in claim 94 wherein said computing means continues to generate said control signal until the comparison of said pre-established standard and said sensor data output signal representative of said desired parameter indicates that the desired change in said desired parameter has been achieved.*

*96. A computerized system as defined in claim 95, wherein said desired parameter is moisture and said computing means computes the amount of irrigation water necessary to produce a desired change in the sensed moisture.*

*97. A computerized system for the production of agricultural products in an agricultural area which comprises at least one homogeneous agricultural area, said system comprising:*

(a) *sensing means for sensing a plurality of different parameters in said homogeneous agricultural area, which parameters are necessary to achieve desired agricultural product growth, and for generating sensor data outputs representative of said parameters;*

(b) *controlled means operative in response to a control signal for producing desired changes in said parameters;*

(c) *computing means for comparing said sensor data outputs to pre-established standards for said plurality of parameters in said agricultural area and for comparing said sensor data outputs to one another, said computing means being programmed to generate said control signals as a result of both* (1) *the comparison of said sensor data ouptuts and said pre-established standards and* (2) *the comparison of various ones of the sensor data output signals to one another; and*

(d) *data transmission means connecting said sensing means and said controlled means to said computing means for receiving said sensor data outputs from said sensing means and transmitting said sensor data outputs to said computing means, and for receiving said control signals from said computing means and transmitting said control signals to said controlled means.*

* * * * *